United States Patent
Zhang et al.

(10) Patent No.: US 12,177,117 B2
(45) Date of Patent: Dec. 24, 2024

(54) PACKET TRANSMISSION METHOD, PROXY NODE, AND STORAGE MEDIUM

(71) Applicant: HUAWEI TECHNOLOGIES CO., LTD., Guangdong (CN)

(72) Inventors: Yongkang Zhang, Nanjing (CN); Bosen Chu, Nanjing (CN); Kuili Zheng, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 434 days.

(21) Appl. No.: 17/738,345

(22) Filed: May 6, 2022

(65) Prior Publication Data

US 2022/0263753 A1    Aug. 18, 2022

Related U.S. Application Data

(63) Continuation of application No. PCT/CN2020/127580, filed on Nov. 9, 2020.

(30) Foreign Application Priority Data

Nov. 8, 2019 (CN) .......................... 201911089812.7

(51) Int. Cl.
  *H04L 45/00* (2022.01)
  *H04L 45/74* (2022.01)
  (Continued)

(52) U.S. Cl.
  CPC ............ *H04L 45/34* (2013.01); *H04L 45/742* (2013.01); *H04L 45/745* (2013.01); *H04L 69/22* (2013.01)

(58) Field of Classification Search
  CPC ..... H04L 45/34; H04L 45/745; H04L 45/742; H04L 69/22
  See application file for complete search history.

(56) References Cited

U.S. PATENT DOCUMENTS 9,794,148 B1    10/2017    Ramachandran et al.
2018/0103128 A1    4/2018    Muscariello et al.
(Continued)

FOREIGN PATENT DOCUMENTS

CN    106330714 A    1/2017
CN    109561021 A    4/2019
(Continued)

OTHER PUBLICATIONS

F. Clad, Ed et al, Service Programming with Segment Routing, draft-ietf-spring-sr-service-programming-00, Spring Internet-Draft, Oct. 14, 2019, 36 pages.

(Continued)

*Primary Examiner* — Elton Williams
(74) *Attorney, Agent, or Firm* — WOMBLE BOND DICKINSON (US) LLP

(57) ABSTRACT

This application discloses a packet transmission method and device. This application provides a method for forwarding a packet to a peer end to restore an SRH. A new SID with a bypass function is extended for an End.AD SID, so that when a local proxy node fails to find the SRH from a local cache, the new SID and control information used to indicate to restore the SRH are carried in the packet whose SRH needs to be restored. The packet is transmitted to a peer proxy node by using the new SID, to indicate the peer proxy node to replace the local proxy node to restore the SRH. In this way, the SRH corresponding to the packet can be restored through the peer proxy node, and then the packet can continue to be forwarded in a network by using the SRH.

20 Claims, 56 Drawing Sheets

(51) Int. Cl.
*H04L 45/745* (2022.01)
*H04L 69/22* (2022.01)

(56) References Cited

U.S. PATENT DOCUMENTS

| | | | |
|---|---|---|---|
| 2018/0198705 A1 | 7/2018 | Wang et al. | |
| 2018/0375968 A1* | 12/2018 | Bashandy | H04L 45/741 |
| 2019/0036818 A1 | 1/2019 | Nainar et al. | |
| 2019/0081894 A1 | 3/2019 | Yousaf et al. | |

FOREIGN PATENT DOCUMENTS

| | | |
|---|---|---|
| CN | 109981457 A | 7/2019 |
| JP | 2016092530 A | 5/2016 |
| JP | 2017038179 A | 2/2017 |
| JP | 2017147601 A | 8/2017 |
| JP | 2018518927 A | 7/2018 |
| JP | 2019083469 A | 5/2019 |
| WO | 2015184687 A1 | 12/2015 |
| WO | 2016165492 A1 | 10/2016 |
| WO | 2019120042 A1 | 6/2019 |
| WO | 2019210769 A1 | 11/2019 |
| WO | 2021047317 A1 | 3/2021 |

OTHER PUBLICATIONS

C. Filsfils et al., SRv6 Network Programming, draft-filsfils-spring-srv6-network-programming-05, Spring Internet-Draft, Jul. 2, 2018, 61 pages.
C. Filsfils, Ed et al, IPv6 Segment Routing Header (SRH), draft-ietf-6man-segment-routing-header-21, Network Working Group Internet-Draft, Jun. 13, 2019, 37 pages.
C. Filsfils et al, Segment Routing Policy Architecture, draft-ietf-spring-segment-routing-policy-03.txt, Spring Working Group Internet-Draft, May 12, 2019, 38 pages.
C. Filsfils et al, SRv6 Network Programming, draft-ietf-spring-srv6-network-programming-01, Spring Internet-Draft, Jul. 3, 2019, 47 pages.
F. Clad, Ed. et al, Service Programming with Segment Routing, draft-xuclad-spring-sr-service-programming-02, Spring Internet-Draft, Apr. 23, 2019, 36 pages.
RFC: 791, Internet Protocol, DARPA Internet Program Protocol Specification, Sep. 1981, 51 pages.
Request for Comments: 3692, T. Narten IBM, Assigning Experimental and Testing Nos. Considered Useful, Network Working Group, Jan. 2004, 7 pages.
Request for Comments: 4727, B. Fenner ATandT Labs—Research, Experimental Values in IPV4, IPv6, ICMPv4, CMPv6, UDP, and TCP Headers, Network Working Group, Nov. 2006, 11 pages.
Request for Comments: 7665, J. Halpern, Ed. et al, Service Function Chaining (SFC) Architecture, Internet Engineering Task Force (IETF), Oct. 2015, 32 pages.
Request for Comments: 8200, S. Deering et al, Internet Protocol, Version 6 (IPv6) Specification, Internet Engineering Task Force (IETF), Jul. 2017, 42 pages.
Request for Comments: 8300, P. Quinn, Ed. et al, Network Service Header (NSH), Internet Engineering Task Force (IETF), Jan. 2018, 40 pages.
Request for Comments: 8402, C. Filsfils, Ed. et al, Segment Routing Architecture, Internet Engineering Task Force (IETF), Jul. 2018, total 32 pages.
Q. Zhao et al., The Use Cases for Path Computation Element (PCE) as a Central Controller (PCECC)., draft-ietf-teas-pcecc-use-cases-02, Oct. 18, 2018, 34 pages.
Andrea Mayer et al., An Efficient Linux Kernel Implementation of Service Function Chaining for Legacy VNFs Based on Pv6 Segment Routing, IEEE, Jun. 24-28, 2019, 16 pages.

* cited by examiner

Example of an extension header

| Type of a next packet header (Next Header) | Extension header length (Hdr Ext len) | Option type (OptType) | | Option length (OptLen) | |
|---|---|---|---|---|---|
| Suboption type (SubOptType) | Suboption length (SubOptLen) | Reserved (Reserved1) | | TB (target interface board) | |
| Reserved flags field (Flags) | | CM (first flag) | N (second flag) | A (fourth flag) | C (third flag) |
| Cache index | | | | | |
| Anycast index | | | | | |
| Reserved (Reserved2) | | | | | |

FIG. 20

Example of a bypass SID (End.ADB.SID)

Example of a segment list update

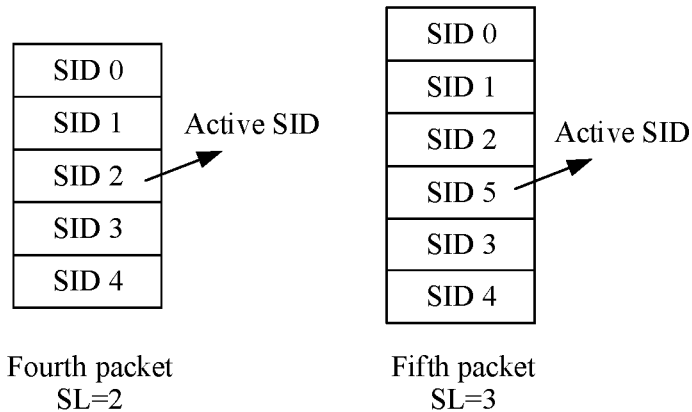

Fourth packet
SL=2

Fifth packet
SL=3

The SID 2 is an End.AD.SID (an endpoint dynamic proxy SID)
The SID 5 is an End.ADB.SID (a second bypass SID)

FIG. 40

Example of a segment list update

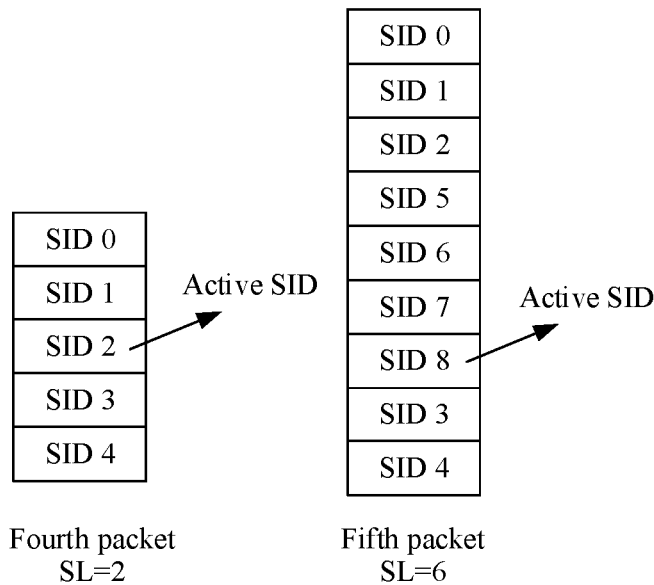

Fourth packet
SL=2

Fifth packet
SL=6

The SID 2 is an End.AD.SID (an endpoint dynamic proxy SID)
The SID 5 is an End.ADB.SID (a second bypass SID)
The SID 6, the SID 7, and the SID 8 are target SIDs

FIG. 41

PACKET TRANSMISSION METHOD, PROXY NODE, AND STORAGE MEDIUM

CROSS-REFERENCE TO RELATED APPLICATIONS

This application is a continuation of International Application No. PCT/CN2020/127580, filed on Nov. 9, 2020, which claims priority to Chinese Patent Application No. 201911089812.7, filed on Nov. 8, 2019. The disclosures of the aforementioned applications are hereby incorporated by reference in their entireties.

TECHNICAL FIELD

This application relates to the field of communication technologies, and in particular, to a packet transmission method, a proxy node, and a storage medium.

BACKGROUND

Segment routing (SR) is a technology for forwarding a packet based on a concept of source routing, and segment routing over the internet protocol version 6 (SRv6) is a technology that combines the SR technology with the IPv6 protocol. Specifically, an SRv6 packet carries not only an IPv6 header but also a segment routing header (SRH). The SRH includes information such as a segment identifier (SID, also referred to as segment) list (SID list, also referred to as a segment list) and a segment left (SL). The segment list includes one or more SIDs arranged in sequence, where each SID is in a form of a 128-bit IPv6 address, and can indicate a topology, an instruction, or a service in essence. The SL is equivalent to a pointer, is a value not less than 0, and points to an active SID in the segment list, and the active SID is a destination address in the IPv6 header. When a node supporting SRv6 receives a packet, the node reads a destination address of the packet, and looks up a local SID table based on the destination address. When the destination address is a SID in the local SID table, the node identifies the packet as an SRv6 packet, and performs a corresponding operation based on a topology, an instruction, or a service corresponding to the SID.

A service function chain (SFC, also referred to as a service chain) is an ordered service function set, and can enable traffic to pass through a plurality of service function (SF) nodes in a specified sequence, so that the plurality of SF nodes sequentially process a packet, to complete a service processing procedure.

When a packet is an SRv6 packet, but an SF node does not support SRv6, a proxy (proxy) node is introduced to enable the SF node to normally process the packet. The proxy node is configured to act as a proxy for the SF node to process an SRH. Proxy nodes may be classified into a dynamic proxy, a static proxy, a shared memory proxy, a masquerading proxy, and the like. A processing procedure performed by the dynamic proxy is as follows: A proxy node receives an SRv6 packet, and looks up a local SID table based on a destination address of the SRv6 packet; and when the destination address is an endpoint dynamic proxy SID (End.AD SID, where End is endpoint and represents an endpoint, AD is dynamic and represents dynamic, and SID represents a segment identifier) in the local SID table, the proxy node performs a dynamic proxy operation corresponding to the End.AD SID. The dynamic proxy operation includes: decapsulating an SRH from the SRv6 packet to obtain a packet not including the SRH, and sending the packet not including the SRH to an SF. In addition, the proxy node stores the SRH in a cache entry by using a 5-tuple of the packet as an index. The SF node receives the packet not including the SRH, processes the packet, and returns a processed packet to the proxy node. The proxy node looks up for the cache entry by using a 5-tuple of the processed packet as an index, to obtain the SRH. The proxy node encapsulates the SRH into the processed packet, to restore the SRH and obtain an SRv6 packet including the SRH. The proxy node decreases an SL of the SRv6 packet by 1, and updates a destination address of the SRv6 packet to a SID that is in a segment list and that corresponds to the SL decreased by 1, namely, a next SID of the End.AD SID, to obtain an updated SRv6 packet. The proxy node sends the updated SRv6 packet to a next node.

After receiving the packet returned by the SF node, the proxy node often fails to find the SRH, in other words, a cache miss event occurs. In this case, because the proxy node cannot restore the SRH, the proxy node discards the packet returned by the SF node. This causes a packet transmission failure.

SUMMARY

Embodiments of this application provide a packet transmission method, a proxy node, and a storage medium, to resolve a technical problem of a packet transmission failure in a cache miss scenario in a related technology. The technical solutions are as follows:

According to a first aspect, a packet transmission method is provided. In the method, a first proxy node and a second proxy node are connected to a same SF node, the first proxy node receives a first packet from the SF node, and the first proxy node looks up a local cache, but finds no SRH corresponding to the first packet. In this case, the first proxy node generates a second packet based on the first packet and a first bypass SID corresponding to the second proxy node, and sends the second packet to a peer end, namely, the second proxy node. The second packet includes the first bypass segment identifier SID, first control information, and a payload of the first packet. The first bypass SID is used to identify that a destination node of the second packet is the second proxy node, so that the second packet is transmitted to the peer end by using the first bypass SID. The first control information is used to indicate the second proxy node to restore the SRH corresponding to the first packet. Therefore, the second proxy node can restore the SRH corresponding to the first packet by identifying the first control information.

An embodiment provides a method for forwarding a packet to a peer end to restore an SRH. A new SID with a bypass function is extended for an End.AD SID, so that when a local proxy node fails to find the SRH from a local cache, the new SID and control information used to indicate to restore the SRH are carried in the packet whose SRH needs to be restored. The packet is transmitted to a peer proxy node by using the new SID, to indicate the peer proxy node to replace the local proxy node to restore the SRH. In this way, the SRH corresponding to the packet can be restored through the peer proxy node, and then the packet can continue to be forwarded in a network by using the SRH. This avoids a problem of a packet transmission failure caused by a failure in restoring the SRH.

In an embodiment, the second packet includes an internet protocol (IP) header, and a destination address of the IP header is the first bypass SID.

In an embodiment, the destination address may be used to indicate that the second packet needs to be sent to the second proxy node, to ensure that the second packet is to be routed from the first proxy node to the second proxy node. In addition, after receiving the second packet, the second proxy node may identify the destination address of the IP header. When finding that the destination address is the first bypass SID in a local SID table, the second proxy node may determine to perform a corresponding operation based on the first bypass SID. In addition, this manner may be applied to a plurality of application scenarios such as a scenario in which the first proxy node and the second proxy node are located on a one-hop IP link (on-link), a scenario in which the first proxy node and the second proxy node are located on a multi-hop IP link (off-link) but an SR function of a transit node between the first proxy node and the second proxy node is not enabled, and a scenario in which the first proxy node and the second proxy node are located on a multi-hop IP link but there is no service requirement for specifying a transit node to forward the second packet. Therefore, this manner is widely applied and highly flexible.

In an embodiment, the second packet may include not only an IP header but also an SRH. The SRH of the second packet includes the first bypass SID and one or more target SIDs, and a destination address of the IP header is a SID in the one or more target SIDs that corresponds to a next SR node. The one or more target SIDs are used to indicate a target forwarding path, and the target forwarding path is a path from the first proxy node to the second proxy node.

This manner may be applied to a scenario in which the first proxy node and the second proxy node are located on a multi-hop IP link and there is a service requirement for specifying a transit node to forward the second packet. The first proxy node may include the SID corresponding to the next SR node in the destination address, to indicate that the second packet needs to be forwarded from a local end to the SR node, so that the second packet is forwarded by the SR node to the second proxy node. In this case, the first proxy node can specify, based on the service requirement, the transit node for forwarding the second packet, to flexibly select a forwarding path of the second packet. This facilitates path planning and implements traffic optimization.

In an embodiment, in a process of generating the second packet, the first proxy node may generate the IP header for the second packet, and encapsulate the IP header of the second packet into the first packet.

In this manner of generating the second packet, the received first packet is re-encapsulated by adding the IP header, to obtain the second packet. Compared with a manner of regenerating an entire packet, this manner is simple in processing operations. Therefore, the packet generation process may be performed by a data plane (for example, a forwarding chip) of the proxy node without depending on a control plane (for example, a CPU) of the proxy node. This saves processing resources of the CPU. Because the forwarding chip can independently perform a packet generation task and a packet forwarding task, interaction between the forwarding chip and the CPU is reduced, so that processing resources required for the interaction between the forwarding chip and the CPU are saved. Therefore, forwarding performance of the forwarding chip is improved. By experiment, the foregoing packet generation logic is configured for microcode of the forwarding chip, so that the forwarding chip can perform an operation of generating the second packet. Therefore, this manner supports a microcode architecture and has strong practicality.

In an embodiment, in a process of generating the second packet, the first proxy node may update an IP header of the first packet to the IP header of the second packet.

In this manner of generating the second packet, the second packet may be obtained by modifying the original IP header of the first packet. Compared with a manner of regenerating an entire packet, this manner is simple in operations, and can also be applied to a forwarding chip. In addition, this manner can further support a microcode architecture and has strong practicality.

In an embodiment, the second packet further includes second control information, and the second control information is used to indicate the transit node between the first proxy node and the second proxy node to check validity of the second packet.

The second packet carries the second control information, so that in a process in which the second packet is forwarded between the first proxy node and the second proxy node, the second control information of the second packet can be used to indicate the transit node to check the validity of the second packet. This can improve security of transmitting the second packet.

In an embodiment, the second control information is carried in a type length value (TLV) in the SRH of the second packet.

In an embodiment, required information is carried with full use of extensibility of the TLV in the SRH, to indicate the transit node to perform a specified function or process the packet. This facilitates network function expansion and improves flexibility.

In an embodiment, the second control information is carried in the IP header of the second packet.

In an embodiment, required information may be carried in some reserved fields in the IP header. This extends functions of the IP header and improves flexibility.

In an embodiment, the second packet may include an extension header, and the first control information may be carried in the extension header of the second packet.

In an embodiment, if a new function needs to be added on the basis of an embodiment of the application, additional information is further added to the extension header. For example, if the second proxy node needs to be indicated to perform a behavior or a service, other control information corresponding to the behavior or the service is added to the extension header. In this way, the second packet has good extensibility, so that an SRH restoration function provided in an embodiment can be used together with another function.

In an embodiment, the first control information may be directly carried in the first bypass SID.

In an embodiment, the peer proxy node may be controlled by using the bypass SID to store the SRH. In this way, the second packet is compressed, and the first control information is prevented from additionally occupying a byte in the packet, so that a data amount of the second packet is reduced, and therefore network overheads for transmitting the second packet are reduced.

In an embodiment, the second packet may include the IP header, and the first control information may be carried in the IP header of the second packet.

The IP header of the second packet may be obtained by re-encapsulating the original IP header of the first packet. In this case, the first control information is directly carried in the IP header, so that the IP header can play both a routing function and a function of carrying the first control information. In this way, the first control information is also prevented from additionally occupying a byte in the packet, so that a data amount of the packet is reduced, and therefore overheads for transmitting the packet are reduced.

In an embodiment, the SRH of the second packet may include the TLV, and the first control information may be carried in the TLV in the SRH.

This manner uses a capability of the SRH to carry information by using the TLV. In this way, the first control information is also prevented from additionally occupying a byte in the packet, so that a data amount of the packet is reduced, and therefore overheads for transmitting the packet are reduced.

In an embodiment, the first packet is obtained after service function processing is performed on a packet from the second proxy node, the first packet includes an identifier of a second cache entry, and the second cache entry is a cache entry used by the second proxy node to store the SRH corresponding to the first packet. The second packet further includes the identifier of the second cache entry, and the first control information is further used to indicate the second proxy node to look up for the SRH corresponding to the first packet by using the identifier of the second cache entry as an index.

In an embodiment, a cache entry for storing an SRH is usually fixed to a proxy node, and does not change due to modification of a flow identifier. Therefore, an SRH of a packet with a modified flow identifier can be found by using an identifier of the cache entry as an index, to restore the SRH for the packet with the modified flow identifier. Based on this manner, even if the SF is an SF with a network address translation (NAT) function, and causes the flow identifier of the packet to be changed in a transmission process, the proxy node can still restore the SRH. Therefore, the proxy node may be enabled to support access to the SF with the NAT function, to provide a dynamic proxy function for the SF with the NAT function.

In an embodiment, the first packet is obtained after service function processing is performed on a packet from the first proxy node, the first packet includes an identifier of a first cache entry, and the first cache entry is a cache entry used by the first proxy node to historically store the SRH corresponding to the first packet. The second packet includes the identifier of the first cache entry, and the first control information is further used to indicate the second proxy node to look up for the SRH corresponding to the first packet by using, as an index, an identifier that is of a second cache entry and that is in a mapping relationship with the identifier of the first cache entry.

In an embodiment, the proxy node maintains a mapping relationship between a local cache entry and a peer cache entry. When the first proxy node does not find the SRH from a local cache, the first proxy node may transmit the identifier of the cache entry to the second proxy node, and indicate the second proxy node by using the control information to find, with reference to the mapping relationship, the cache entry for storing the SRH in the second proxy node, so that the second proxy node finds the SRH of the packet from the cache entry, and restores the SRH for the packet with the modified flow identifier. Based on this manner, even if the SF is an SF with a NAT function, and causes the flow identifier of the packet to be changed in a transmission process, the proxy node can still restore the SRH. Therefore, the proxy node may be enabled to support access to the SF with the NAT function, to provide a dynamic proxy function for the SF with the NAT function.

In an embodiment, the first proxy node may be connected to the second proxy node through a first link. Based on this topology, in the process of sending the second packet, the first proxy node may send the second packet to the second proxy node through a first outbound interface corresponding to the first link.

In an embodiment, the first proxy node may select a peer link as the forwarding path of the second packet, so that the second packet can be transmitted to the peer end through the peer link.

In an embodiment, the first proxy node may be connected to a router node through a second link, and the router node may be connected to the second proxy node through a third link. Based on this topology, in the process of sending the second packet, the first proxy node may send the second packet to the router node through a second outbound interface corresponding to the second link, where the second packet is forwarded by the router node to the second proxy node through the third link.

In an embodiment, the first proxy node may select, as the forwarding path of the second packet, a path based on forwarding by the router node, so that the second packet can be forwarded by the router node and then transmitted to the peer end.

In an embodiment, in the process of sending the second packet, the first proxy node may detect a status of the first link. If the first link is in an available state, the first proxy node may send the second packet to the second proxy node through the first outbound interface corresponding to the first link. If the first link is in an unavailable state, the first proxy node may send the second packet to the router node through the second outbound interface corresponding to the second link.

In an embodiment, if the peer link is in the available state, the first proxy node preferentially uses the peer link, so that the second packet is preferentially transmitted to the second proxy node through the peer link. In this case, because the peer link is shorter than the path based on forwarding by the router node, the peer link passes through fewer nodes than the path based on forwarding by the router node, so that a delay of transmitting the second packet can be reduced.

According to a second aspect, a packet transmission method is provided. In the method, a first proxy node and a second proxy node are connected to a same SF node, and the second proxy node receives a second packet from the first proxy node, where the second packet includes a first bypass segment identifier SID corresponding to the second proxy node, first control information, and a payload of the first packet, the first bypass SID is used to identify that a destination node of the second packet is the second proxy node, and the first packet is a packet received by the first proxy node from the service function node. The second proxy node determines that the first control information indicates the second proxy node to restore an SRH corresponding to the first packet. The second proxy node looks up a cache of the second proxy node based on the second packet, to obtain the SRH corresponding to the first packet. The second proxy node generates a third packet based on the second packet and the SRH corresponding to the first packet, and sends the third packet. The third packet includes the SRH corresponding to the first packet and the payload of the first packet.

In an embodiment, the second packet includes an IP header, and a destination address of the IP header is the first bypass SID.

In an embodiment, the destination address may be used to indicate that the second packet needs to be sent to the second proxy node, to ensure that the second packet is to be routed from the first proxy node to the second proxy node. In addition, after receiving the second packet, the second proxy node may identify the destination address of the IP header. When finding that the destination address is the first bypass SID in a local SID table, the second proxy node may determine to perform a corresponding operation based on the first bypass SID. In addition, this manner may be applied to a plurality of application scenarios such as a scenario in which the first proxy node and the second proxy node are located on a one-hop IP link (on-link), a scenario in which the first proxy node and the second proxy node are located on a multi-hop IP link (off-link) but an SR function of a transit node between the first proxy node and the second proxy node is not enabled, and a scenario in which the first proxy node and the second proxy node are located on a multi-hop IP link but there is no service requirement for specifying a transit node to forward the second packet. Therefore, this manner is widely applied and highly flexible.

In an embodiment, the second packet includes an IP header and an SRH of the second packet, a destination address of the IP header is a SID in one or more target SIDs that corresponds to a next SR node, the one or more target SIDs are used to indicate a target forwarding path, the target forwarding path is a path from the first proxy node to the second proxy node, and the SRH of the second packet includes the first bypass SID and the one or more target SIDs.

This manner may be applied to a scenario in which the first proxy node and the second proxy node are located on a multi-hop IP link and there is a service requirement for specifying a transit node to forward the second packet. The first proxy node may include the SID corresponding to the next SR node in the destination address, to indicate that the second packet needs to be forwarded from a local end to the SR node, so that the second packet is forwarded by the SR node to the second proxy node. In this case, a forwarding path of the second packet can be selected based on the service requirement, to control the second packet to be transmitted through the specified SR node. This facilitates path planning and implements traffic optimization.

In an embodiment, in a process of generating the third packet, the second proxy node strips the IP header of the second packet from the second packet, and encapsulates the SRH corresponding to the first packet, to obtain the third packet.

By performing the stripping operation, the second proxy node can restore the packet obtained by the first proxy node through re-encapsulation to the packet returned by the SF node to the first proxy node; and by performing the SRH encapsulation operation, the second proxy node can restore the packet returned by the SF node to the packet including the SRH. This implements a dynamic proxy function.

In an embodiment, in a process of generating the third packet, the second proxy node updates the IP header of the second packet to an IP header of the first packet, and encapsulates the SRH corresponding to the first packet, to obtain the third packet.

In an embodiment, the second packet further includes the SRH, and a segment list in the SRH of the second packet includes the first bypass SID.

The second packet carries the SRH, so that some additional information may be carried by using one or more TLVs and the segment list in the SRH, to indicate the second proxy node or a transit node between the two proxy nodes by using the additional information to perform a specified forwarding behavior or a service. In this way, the second packet has good extensibility to provide an SRH restoration function together with another function.

In an embodiment, the SRH of the second packet includes second control information, and the second control information is used to indicate the transit node between the first proxy node and the second proxy node to check validity of the second packet.

The TLV carries the second control information, so that in a process in which the second packet is forwarded between the first proxy node and the second proxy node, the second control information in the second packet can be used to indicate the transit node to perform a specified function or process the packet. This facilitates network function expansion and improves flexibility. In particular, the transit node is indicated to check the validity of the second packet, so that security of transmitting the second packet can be improved.

In an embodiment, the second control information is carried in the type length value TLV in the SRH of the second packet; or the second control information is carried in the IP header of the second packet.

In an embodiment, the second packet may include an extension header, and the first control information may be carried in the extension header of the second packet.

In an embodiment, if a new function needs to be added on the basis of the method provided in an embodiment, additional information is further added to the extension header. For example, if the second proxy node needs to be indicated to perform a behavior or a service, other control information corresponding to the behavior or the service is added to the extension header. In this way, the second packet has good extensibility, and an SRH backup function provided in an embodiment can be used together with another function.

In an embodiment, the first control information may be directly carried in the first bypass SID.

In an embodiment, a peer proxy node may be controlled by using the bypass SID to store the SRH. In this way, the first control information is prevented from additionally occupying a byte in the packet, so that a data amount of the packet is reduced, and therefore overheads for transmitting the packet are reduced.

In an embodiment, the second packet may include the IP header, and the first control information may be carried in the IP header of the second packet.

The IP header of the second packet may be obtained by re-encapsulating the original IP header of the first packet. In this case, the first control information is directly carried in the IP header, so that the IP header can play both a routing function and a function of carrying the first control information. In this way, the first control information is also prevented from additionally occupying a byte in the packet, so that a data amount of the packet is reduced, and therefore overheads for transmitting the packet are reduced.

In an embodiment, the SRH of the second packet may include the TLV, and the first control information may be carried in the TLV in the SRH.

This manner uses a capability of the SRH to carry information by using the TLV. In this way, the first control information is also prevented from additionally occupying a byte in the packet, so that a data amount of the packet is reduced, and therefore overheads for transmitting the packet are reduced.

In an embodiment, the second packet further includes an identifier of a second cache entry, and the second proxy node determines that the first control information further indicates to look up for the SRH corresponding to the first packet by using the identifier of the second cache entry as an index. In a cache lookup process, the second proxy node may look up the cache of the second proxy node by using the identifier of the second cache entry as the index, to obtain the SRH corresponding to the first packet from the second cache entry.

In an embodiment, a cache entry for storing an SRH is usually fixed to a proxy node, and does not change due to modification of a flow identifier. Therefore, an SRH of a packet with a modified flow identifier can be found by using an identifier of the cache entry as an index, to restore the SRH for the packet with the modified flow identifier. Based on this manner, even if the SF is an SF with a NAT function, and causes the flow identifier of the packet to be changed in a transmission process, the proxy node can still restore the SRH. Therefore, the proxy node may be enabled to support access to the SF with the NAT function, to provide a dynamic proxy function for the SF with the NAT function.

In an embodiment, the second packet may further include an identifier of a first cache entry used by the first proxy node to historically store the SRH corresponding to the first packet. If the second proxy node determines that the first control information further indicates to look up for the SRH corresponding to the first packet by using, as an index, an identifier that is of a second cache entry and that is in a mapping relationship with the identifier of the first cache entry, the second proxy node may look up the mapping relationship between the identifier of the first cache entry and the identifier of the second cache entry based on the identifier of the first cache entry in a cache lookup process, to obtain the identifier of the second cache entry; and look up the cache of the second proxy node by using the identifier of the second cache entry as the index, to obtain the SRH corresponding to the first packet from the second cache entry.

In an embodiment, the proxy node maintains a mapping relationship between a local cache entry and a peer cache entry. When the first proxy node does not find the SRH from a local cache, the first proxy node may transmit the identifier of the cache entry to the second proxy node, and indicate the second proxy node by using the control information to find, with reference to the mapping relationship, the cache entry for storing the SRH in the second proxy node, so that the second proxy node finds the SRH of the packet from the cache entry, and restores the SRH for the packet with the modified flow identifier. Based on this manner, even if the SF is an SF with a NAT function, and causes the flow identifier of the packet to be changed in a transmission process, the proxy node can still restore the SRH. Therefore, the proxy node may be enabled to support access to the SF with the NAT function, to provide a dynamic proxy function for the SF with the NAT function.

In an embodiment, before looking up the cache, the second proxy node may determine that a service function of the service function node includes modifying a flow identifier.

In an embodiment, if the SF node returns, to the proxy node, the packet with the modified flow identifier, because the cache entry for storing the SRH is usually fixed to the proxy node, and does not change due to the modification of the flow identifier, an identifier that is of the cache entry and that is used for storing the SRH can be consistent with the identifier that is of the cache entry and that is used for looking up for the SRH. Therefore, the SRH of the packet with the modified flow identifier can be found by using the identifier of the cache entry as the index, to restore the SRH for the packet with the modified flow identifier. In this case, even if the SF is the SF with the NAT function, and causes the flow identifier of the packet to be changed in the transmission process, the proxy node can still restore the SRH. Therefore, the proxy node may be enabled to support the access to the SF with the NAT function, to provide the dynamic proxy function for the SF with the NAT function.

In an embodiment, in the cache lookup process, the second proxy node may look up the cache of the second proxy node by using a flow identifier corresponding to the first packet and an endpoint dynamic proxy SID corresponding to the service function node as an index, to obtain the SRH corresponding to the first packet. A flow identifier corresponding to the second packet is the flow identifier corresponding to the first packet.

In this optional manner, a method for providing a dynamic proxy service in an SRv6 VPN scenario is provided. In a scenario in which the SF node implements a VPN service, packets of different VPNs may have a same flow identifier. In this case, if only the flow identifier is used as an index to look up a cache, SRHs corresponding to packets of a plurality of VPNs may be hit, and therefore the second proxy node cannot determine an SRH that is to be encapsulated into the received packet. This causes an SRH restoration failure. However, using not only the flow identifier but also an End. AD SID as an index can ensure that indexes of the packets of the different VPNs are distinguished by using End.AD SIDs, to avoid hitting SRHs of packets of a plurality of VPNs by using a same index. This ensures lookup accuracy.

In an embodiment, before looking up the cache, the second proxy node may further look up a mapping relationship between an endpoint dynamic proxy SID and a VPN identifier based on a VPN identifier that is carried in the second packet and that is of a virtual private network VPN to which the SF node belongs, to obtain the endpoint dynamic proxy SID corresponding to the VPN identifier.

In an embodiment, the mapping relationship between an End.AD SID and a VPN identifier carried in a packet is established, so that the End.AD SID is mapped as a VPN identifier carried in the packet. Therefore, the second proxy node can determine, with reference to the VPN identifier carried in the received packet and the pre-established mapping relationship, the End. AD SID that is to be used as an index, to find the SRH from the cache by using the determined index.

In an embodiment, before looking up the mapping relationship between an endpoint dynamic proxy SID and a VPN identifier based on the VPN identifier, the second proxy node may further receive a configuration instruction, where the configuration instruction includes an endpoint dynamic proxy SID corresponding to a service function node in each VPN; and the second proxy node stores the mapping relationship between an endpoint dynamic proxy SID and a VPN identifier based on the configuration instruction.

In this End. AD SID allocation manner, the End.AD SID can be used as a VPN identifier, packets sent by SF nodes in different VPNs carry different End.AD SIDs, and the packets of the different VPNs can be distinguished by using the different End.AD SIDs.

In an embodiment, before looking up the cache, the second proxy node may further receive a fourth packet, where the fourth packet includes the SRH corresponding to the first packet, a destination address of the fourth packet is the endpoint dynamic proxy SID, and a flow identifier corresponding to the fourth packet is the flow identifier corresponding to the first packet. The second proxy node stores the SRH corresponding to the first packet in the second cache entry by using the flow identifier corresponding to the first packet and the endpoint dynamic proxy SID as an index.

In an embodiment, the SRH is stored by using the flow identifier and the End.AD SID as the index, so that indexes of SRHs of packets of different VPNs can be distinguished by using different End.AD SIDs, to ensure that the indexes of the SRHs of the packets of the different VPNs are different. In this way, the SRHs of the packets of the different VPNs are stored separately, thereby implementing information isolation between the different VPNs.

In an embodiment, the second proxy node is connected to the first proxy node through a first link. In a process of receiving the second packet, the second proxy node receives the second packet from the first proxy node through a first inbound interface corresponding to the first link.

In an embodiment, a peer link is used as the forwarding path of the second packet, so that the second packet can be transmitted to the second proxy node through the peer link.

The second proxy node is connected to a router node through a third link, and the router node is connected to the first proxy node through a second link. In a process of receiving the second packet, the second proxy node receives the second packet from the router node through a second inbound interface corresponding to the third link, where the second packet is sent by the first proxy node to the router node through the second link.

In an embodiment, a path based on forwarding by the router node is used as the forwarding path of the second packet, so that the second packet is forwarded by the router node and then transmitted to the second proxy node.

According to a third aspect, a first proxy node is provided, and the first proxy node has a function of implementing packet transmission according to any one of the first aspect or the optional manners of the first aspect. The first proxy node includes at least one module, and the at least one module is configured to implement the packet transmission method according to any one of the first aspect or the optional manners of the first aspect. For details of the first proxy node provided in the third aspect, refer to any one of the first aspect or the optional manners of the first aspect. The details are not described herein again.

According to a fourth aspect, a second proxy node is provided, and the second proxy node has a function of implementing packet transmission according to any one of the second aspect or the optional manners of the second aspect. The second proxy node includes at least one module, and the at least one module is configured to implement the packet transmission method according to any one of the second aspect or the optional manners of the second aspect. For details of the second proxy node provided in the fourth aspect, refer to any one of the second aspect or the optional manners of the second aspect. The details are not described herein again.

According to a fifth aspect, a first proxy node is provided. The first proxy node includes a processor, and the processor is configured to execute instructions, so that the first proxy node performs the packet transmission method according to any one of the first aspect or the optional manners of the first aspect. For details of the first proxy node provided in the fifth aspect, refer to any one of the first aspect or the optional manners of the first aspect. The details are not described herein again.

According to a sixth aspect, a second proxy node is provided. The second proxy node includes a processor, and the processor is configured to execute instructions, so that the second proxy node performs the packet transmission method according to any one of the second aspect or the optional manners of the second aspect. For details of the second proxy node provided in the sixth aspect, refer to any one of the second aspect or the optional manners of the second aspect. The details are not described herein again.

According to a seventh aspect, a computer-readable storage medium is provided. The storage medium stores at least one instruction, and the instruction is read by a processor, so that a first proxy node performs the packet transmission method according to any one of the first aspect or the optional manners of the first aspect.

According to an eighth aspect, a computer-readable storage medium is provided. The storage medium stores at least one instruction, and the instruction is read by a processor, so that a second proxy node performs the packet transmission method according to any one of the second aspect or the optional manners of the second aspect.

According to a ninth aspect, a computer program product is provided. When the computer program product runs on a first proxy node, the first proxy node is enabled to perform the packet transmission method according to any one of the first aspect or the optional manners of the first aspect.

According to a tenth aspect, a computer program product is provided. When the computer program product runs on a second proxy node, the second proxy node is enabled to perform the packet transmission method according to any one of the second aspect or the optional manners of the second aspect.

According to an eleventh aspect, a chip is provided. When the chip runs on a first proxy node, the first proxy node is enabled to perform the packet transmission method according to any one of the first aspect or the optional manners of the first aspect.

According to a twelfth aspect, a chip is provided. When the chip runs on a second proxy node, the second proxy node is enabled to perform the packet transmission method according to any one of the second aspect or the optional manners of the second aspect.

According to a thirteenth aspect, a packet transmission system is provided. The packet transmission system includes a first proxy node and a second proxy node, where the first proxy node is configured to perform the method according to any one of the first aspect or the optional manners of the first aspect, and the second proxy node is configured to perform the method according to any one of the second aspect or the optional manners of the second aspect.

BRIEF DESCRIPTION OF DRAWINGS

FIG. 20 is a schematic diagram of an extension header according to an embodiment of this application;

FIG. 40 is a schematic diagram of updating a segment list according to an embodiment of this application;

FIG. 41 is a schematic diagram of updating a segment list according to an embodiment of this application;

DESCRIPTION OF EMBODIMENTS

Figure 1:
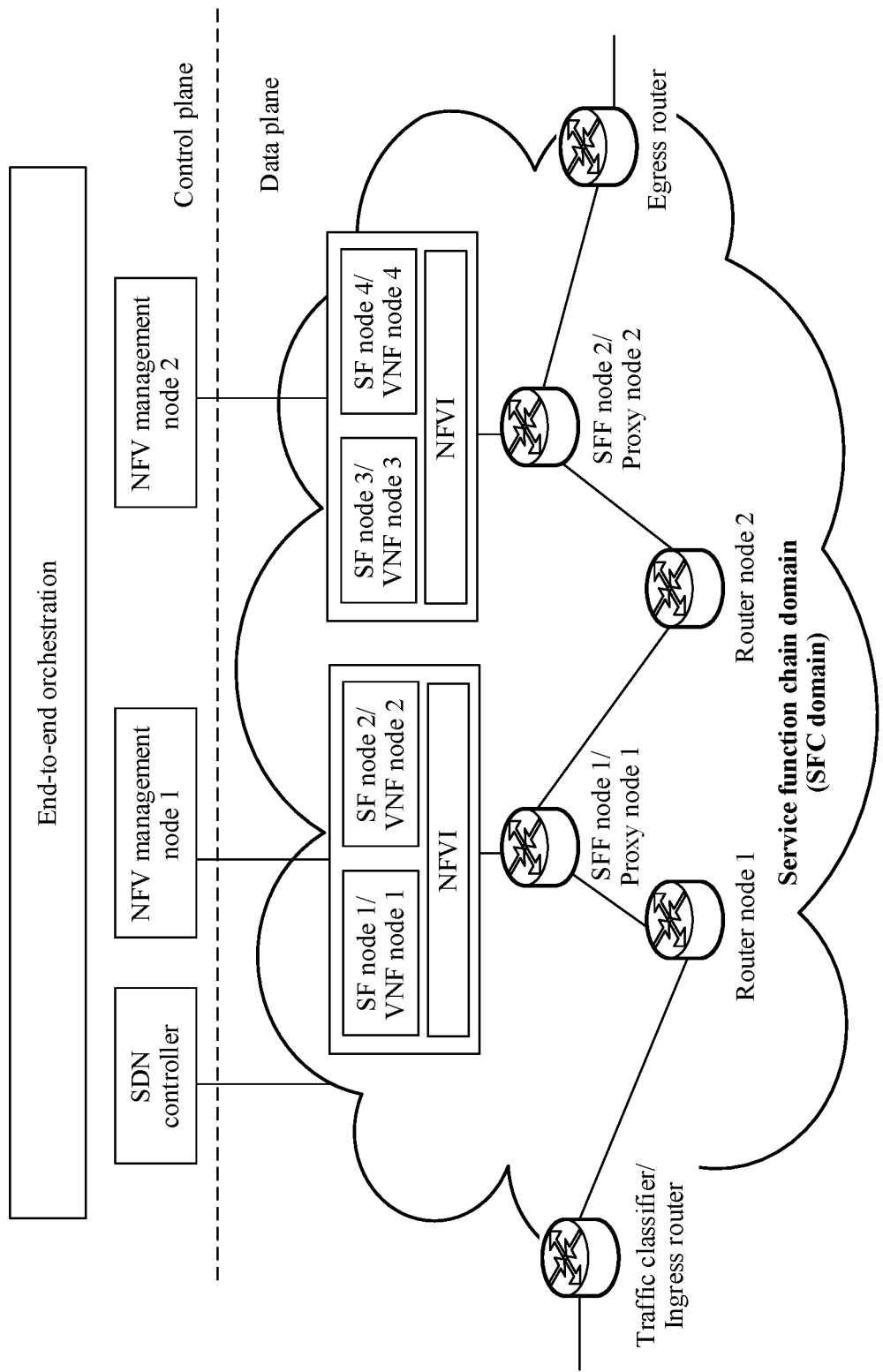
FIG. 1 is a diagram of a system architecture of an SFC according to an embodiment of this application.

To make objectives, technical solutions, and advantages of this application clearer, the following further describes implementations of this application in detail with reference to accompanying drawings.

The term "at least one" in this application means one or more, and the term "a plurality of" in this application means two or more than two. For example, "a plurality of second packets" means two or more than two second packets. The terms "system" and "network" may be used interchangeably in this specification.

In this application, terms such as "first" and "second" are used to distinguish between same items or similar items that have basically same functions. It should be understood that there is no logical or temporal dependency between "first", "second", and "n$^{th}$", and a quantity and an execution sequence are not limited.

It should be understood that sequence numbers of processes do not mean execution sequences in embodiments of this application. The execution sequences of the processes should be determined based on functions and internal logic of the processes, and should not be construed as any limitation on the implementation processes of the embodiments of this application.

It should be understood that determining B based on A does not mean that B is determined based on only A, but B may alternatively be determined based on A and/or other information.

It should be understood that "one embodiment" or "an embodiment" mentioned throughout this specification means that particular features, structures, or characteristics related to the embodiment are included in at least one embodiment of this application. Therefore, "in one embodiment" or "in an embodiment" appearing in this specification does not necessarily refer to a same embodiment. In addition, these particular features, structures, or characteristics may be combined in one or more embodiments in any appropriate manner.

The following describes an example of a system architecture of a service function chain.

Service functions (such as firewalls and load balancing) of a conventional telecommunication network are usually closely coupled with hardware resources, and each service node is in a product form of a dedicated device. Consequently, deployment is complex, and it is difficult for capacity expansion, migration, and upgrade. In the SFC, each service function is virtualized into one SF node, and a plurality of SF nodes are combined to obtain an ordered service function set, namely, the service function chain. In the SFC, traffic passes through the SF nodes in the service chain in a specified sequence. The SF nodes process a packet in sequence to complete a service processing procedure. On the one hand, an SFC technology can be used to decouple the service functions from the hardware resources, to facilitate flexible provisioning and rapid deployment of services. For example, if a new service is provisioned, complex operations of hardware device reconstruction and upgrade in the conventional telecommunication network can be avoided. A new SF node is added to the service chain provided by the SFC, so that running of the new service can be supported through the new SF node. On the other hand, the SFC can be flexibly combined with other virtualization technologies. For example, the SFC may be combined with network function virtualization (NFV). In this case, an NFV management node, for example, a virtualized network function manager (VNFM), in the NFV can function as a control plane of the SFC to control the nodes in the SFC. For another example, the SFC may be combined with software-defined networking (SDN). In this case, an SDN controller in the SDN can function as a control plane of the SFC to control the nodes in the SFC.

The system architecture of the SFC may include a plurality of types of nodes, each type of node has a corresponding function, and different types of nodes cooperate with each other to implement an overall function of the service chain. Usually, the system architecture of the SFC may include a traffic classifier (CF), the SF node, a proxy node, a service function forwarder (SFF) node, and a router node.

For example, FIG. 1 is a diagram of a system architecture of an SFC according to an embodiment of this application.

In FIG. 1, an SF node is an SF node 1, an SF node 2, an SF node 3, or an SF node 4; an SFF node is an SFF node 1 or an SFF node 2; a proxy node is a proxy node 1 or a proxy node 2; and a router node is a router node 1 or a router node 2. A service function chain domain (SFC domain) in FIG. 1 is a set of SFC-enabled nodes.

It should be noted that the SFF node and the proxy node may be integrated into a same device, that is, a hardware device in which the SFF node is located further implements a function of the proxy node. Refer to FIG. 1. For example, the SFF node 1 and the proxy node 1 are located in a same hardware device, and the SFF node 2 and the proxy node 2 are located in a same hardware device.

The traffic classifier may be an ingress router of the SFC. The traffic classifier is configured to classify received traffic according to a classification rule. If the traffic meets a classification criterion, the traffic classifier forwards the traffic, so that the traffic enters the service chain provided by the SFC. Usually, after determining that the traffic meets the classification criterion, the traffic classifier adds SFC information to each packet corresponding to the traffic, so that the packet arrives at the SF nodes in a network based on the SFC information in a sequence corresponding to the service function chain, and then the SF nodes sequentially perform service processing on the packet. The traffic classifier may be a router, a switch, or another network device.

The SF node is configured to perform service processing on a packet. Usually, the SF node may be connected to one or more SFF nodes, and may receive a to-be-processed packet from the one or more SFF nodes. A service function corresponding to the SF node may be configured based on a service scenario. For example, the service function corresponding to the SF node may be user authentication, firewalls, NAT, bandwidth control, virus detection, cloud storage, deep packet inspection (DPI), intrusion detection, or intrusion prevention. The SF node may be a server, a host, a personal computer, a network device, or a terminal device.

The SFF node is configured to forward a received packet to the SF node based on SFC information. Usually, after completing processing the packet, the SF node returns a packet to the same SFF node, namely, the SFF node that previously sends the unprocessed packet to the SF node, and the SFF node returns the processed packet to the network. The SFF node may be a router, a switch, or another network device.

The SFF node and the SF node may serve as a data plane of the SFC. In an embodiment, a tunnel may be established between the SFF node and the SF node, and a packet may be transmitted between the SFF node and the SF node through the tunnel. The tunnel may be a virtual extensible local area network (VXLAN) tunnel, a generic routing encapsulation (GRE) tunnel, an IP in IP tunnel, or the like. In another embodiment, a packet may not be transmitted between the SFF node and the SF node through a tunnel, but an IP packet or an Ethernet packet is directly transmitted between the SFF node and the SF node.

The data plane of the SFC may be controlled via the control plane of the SFC. The control plane of the SFC may include one or more SFC controllers. Refer to FIG. 1. For example, the SFC controller may be an SDN controller, an NFV management node 1, or an NFV management node 2. In an embodiment, before packet transmission, a client of the SFC may send information such as an attribute, a configuration, and a policy of the service function chain to the SFC controller. The SFC controller may generate, based on the information sent by the client and a topology of the SFC, information related to the service function chain such as a classification rule for a packet that is to enter the SFC and an identifier of each SF node corresponding to the service function chain, and send the information related to the service function chain to a traffic classifier and another node in the SFC, so that the traffic classifier classifies the received packet and adds SFC information based on the information sent by the SFC controller.

It should be understood that types of the nodes in the system architecture of the SFC shown in FIG. 1 are optional. In the embodiments of this application, there may be more types of nodes in the system architecture of the SFC than those shown in FIG. 1. In this case, the system architecture of the SFC may further include another type of node. Alternatively, there may be fewer types of nodes in the system architecture of the SFC than those shown in FIG. 1. The types of the nodes in the system architecture of the SFC are not limited in the embodiments of this application.

It should be understood that a quantity of each type of nodes in the system architecture of the SFC shown in FIG. 1 is optional. In the embodiments of this application, a quantity of nodes in the system architecture of the SFC may be greater than that shown in FIG. 1, or less than that shown in FIG. 1. For example, there may be only one router node, or there may be dozens, hundreds, or more router nodes. For another example, there are dozens, hundreds, or more SF nodes. The quantity of nodes in the system architecture of the SFC is not limited in the embodiments of this application.

The foregoing describes the system architecture of the SFC. The SFC may be combined with SRv6, and a combination of the two technologies is generally referred to as an SRv6 SFC. The following describes an example of a system architecture of the SRv6 SFC.

Segment routing (SR) is a protocol designed based on a concept of source routing to forward a data packet in a network. The SR is used to divide a forwarding path into segments, and allocate segment identifiers (SID) to the segments and nodes in the network. A list including the SIDs may be obtained by arranging the SIDs in order. The list is generally referred to as a segment list (SID list, also referred to as a segment identifier list) in segment routing over the internet protocol version 6 (SRv6), and is generally referred to as a label stack in segment routing-multiprotocol label switching (SR-MPLS). The segment list may indicate a forwarding path. A node and a path that a packet carrying a SID list passes through can be specified by using an SR technology, to meet a traffic optimization requirement. Metaphorically, a packet may be likened to luggage, and SR may be likened to a label on the luggage. If the luggage needs to be sent from a region A to a region D through a region B and a region C, a label "Go to the region B first, then the region C, and finally the region D" may be put on the luggage in an originating location, namely, the region A. In this way, the label on the luggage only needs to be identified in each region, and the luggage is forwarded from a region to another based on the label on the luggage. In the SR technology, a source node adds a label to a packet, and a transit node may forward the packet to a next node based on the label until the packet arrives at a destination node. For example, <SID 1, SID 2, SID 3> is inserted into a header of the packet. In this case, the packet is first forwarded to a node corresponding to the SID 1, then forwarded to a node corresponding to the SID 2, and finally forwarded to a node corresponding to the SID 3.

SRv6 means applying the SR technology to an IPv6 network, where a 128-bit IPv6 address is used as a form of a SID. During packet forwarding, a node supporting SRv6 looks up a local SID table (local SID table, also referred to as a local segment identifier table or my SID table) based on a destination address (DA) in a packet. When the destination address in the packet matches any SID in the local SID table, the node determines that the destination address hits the local SID table, and performs a corresponding operation, for example, forwarding the packet through an outbound interface corresponding to the SID, based on a topology, an instruction, or a service corresponding to the SID. If the destination address of the packet does not match any SID in the local SID table, the node looks up an IPv6 forward Information database (FIB) based on the destination address, and forwards the packet based on an entry that is hit by the destination address and that is in the FIB. The local SID table is a table that includes a SID and that is locally stored by the node. To distinguish between the local SID table and a segment list carried in the packet, a name of the local SID table usually includes a prefix of "local".

In the system architecture of the SRv6 SFC, a head-end node of SRv6 may be a traffic classifier in the SFC, and an SRv6 node may be a router node, an SFF node, a proxy node, or an SF node in the SFC. In an embodiment, SFC information may be in an SRv6 encapsulated format, and the SFC information may be a segment list. A SID in the segment list of a packet is orchestrated, to indicate a forwarding path of the packet in the SFC or various service processing operations to be performed on the packet. For example, the segment list includes one or more SIDs arranged in sequence, where each SID is in a form of a 128-bit IPv6 address, and can indicate a topology, an instruction, or a service in essence. A destination address of the packet is a SID that is in the segment list and to which an SL currently points. After receiving the packet, a node in the SFC reads the destination address of the packet, and forwards the packet based on the destination address. If the node that receives the packet supports SRv6, the node looks up a local SID table based on the destination address. When the destination address hits a SID in the local SID table, the node performs a corresponding operation based on a topology, an instruction, or a service corresponding to the SID. If the destination address does not hit any SID in the local SID table, the node looks up an IPv6 FIB based on the destination address, and forwards the packet based on an entry that is in the FIB and that is hit by the destination address. If the node that receives the packet does not support SRv6, the node directly looks up an IPv6 FIB based on the destination address to forward the packet.

In some scenarios, the SF node may be a node that does not support SRv6, namely, an SRv6-unaware node, and the SF node may fail to identify an SRH. In this case, it may be ensured that the SF node that cannot identify the SRH can normally process a packet through a proxy node.

The proxy node is configured to identify the SRH as a proxy for the SF node, strip the SRH of the packet, and forward a packet that does not include the SRH to the SF node. In this case, because the packet received by the SF node does not include the SRH, the SF node that does not support SRv6 can process the packet.

Figure 2:
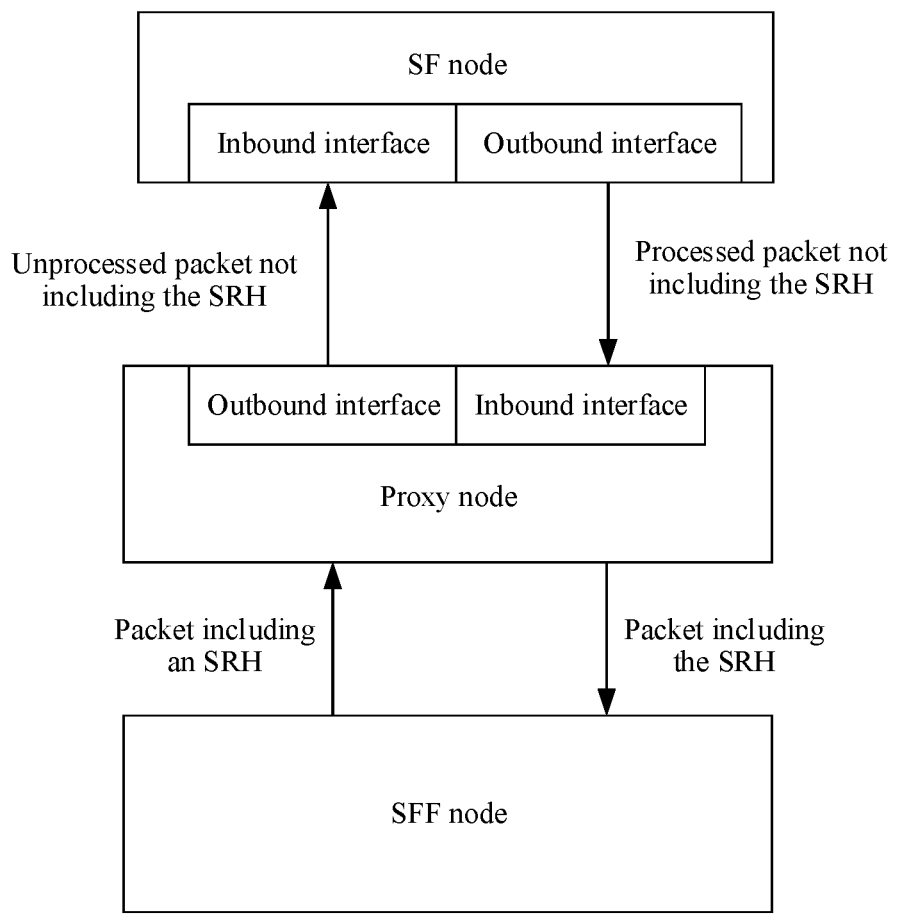
FIG. 2 is a schematic diagram of performing proxy operations in an SRv6 SFC according to an embodiment of this application.

FIG. 2 is a schematic diagram of performing proxy operations in an SRv6 SFC according to an embodiment of this application. A proxy node can communicate with an SFF node and an SF node. As a proxy for the SF node, the proxy node receives a packet including an SRH from the SFF node. The proxy node strips the SRH from the packet to obtain a packet that does not include the SRH, and sends the packet that does not include the SRH through an outbound interface. The SF node receives the packet that does not include the SRH through an inbound interface, processes the packet, and sends a packet that does not include the SRH through an outbound interface. The proxy node receives the packet that does not include the SRH, encapsulates the SRH into the packet to obtain a packet that includes the SRH, and sends the packet that includes the SRH through the outbound interface, so that the packet is returned to the SFF node. The proxy node may be a network device, for example, a router or a switch; or the proxy node may be a server, a host, a personal computer, or a terminal device. Proxy nodes may be classified a dynamic proxy, a static proxy, a shared memory proxy, a masquerading proxy, and the like. A difference between the dynamic proxy and the static proxy lies in: A stripped SRH is cached in a dynamic proxy operation, but a stripped SRH is discarded in a static proxy operation.

It should be understood that the foregoing integrated disposition of the SFF node and the proxy node is merely an optional manner. In another embodiment, the SFF node and the proxy node may alternatively be separately disposed in different hardware devices. A hardware device in which the SFF node is located may communicate over the network with a hardware device in which the proxy node is located.

The foregoing describes the overall architecture of the SRv6 SFC. The following describes an example of an SRv6 SFC-based dual-homing access system architecture. The dual-homing access system architecture is an architecture in which network reliability is improved by deploying a redundant link and/or a redundant device. In the SRv6 SFC, dual-homing access may be dual-homing access of an SF node to proxy nodes, that is, a same SF node is simultaneously connected to two proxy nodes. Through SRv6 SFC-based dual-homing access, a packet that needs to be sent to the SF node starts from a router node, and may pass through a proxy node and then arrive at the SF node, or may pass through another proxy node and then arrive at the SF node. The network reliability can be greatly improved through a redundant path.

Figure 3:
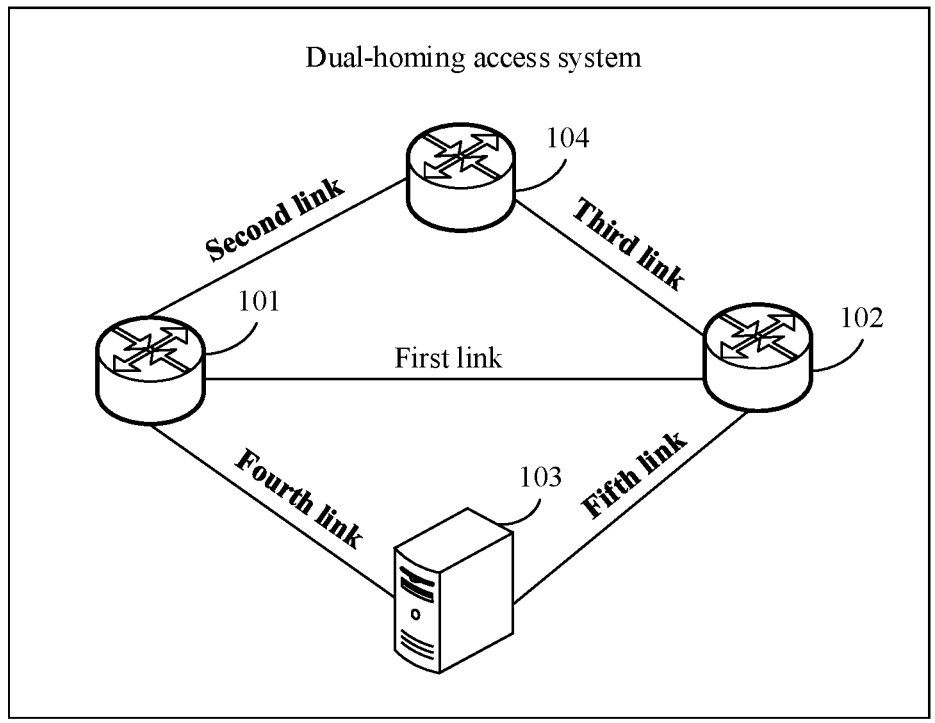
FIG. 3 is an architectural diagram of a dual-homing access system according to an embodiment of this application.

For example, FIG. 3 is an architectural diagram of a dual-homing access system according to an embodiment of this application. The system includes a first proxy node 101, a second proxy node 102, an SF node 103, and a router node 104. The first proxy node 101 and the second proxy node 102 are connected to the same SF node 103. Each node in the system may be a node in an SFC. For example, the first proxy node 101 may be the proxy node 1 in FIG. 1, the second proxy node 102 may be the proxy node 2 in FIG. 1, the SF node 103 may be the SF node 1 or the SF node 2 in FIG. 1, and the router node 104 may be the router node 2 in FIG. 1.

In the system shown in FIG. 3, a link may be established between different nodes, and the different nodes are connected through the link. For example, in FIG. 3, the first proxy node 101 may be connected to the second proxy node 102 through a first link, the first proxy node 101 may be connected to the router node 104 through a second link, the router node 104 may be connected to the second proxy node 102 through a third link, the first proxy node 101 may be connected to the SF node 103 through a fourth link, and the second proxy node 102 may be connected to the SF node 103 through a fifth link.

The first proxy node 101 and the second proxy node 102 may be peer nodes, that is, in a packet transmission process, the first proxy node 101 and the second proxy node 102 have a same function, in other words, play a same role. For the first proxy node 101, the first proxy node 101 may be denoted as a local proxy, and the second proxy node 102 may be denoted as a peer proxy. Similarly, for the second proxy node 102, the second proxy node 102 may be denoted as a local proxy, and the first proxy node 101 may be denoted as a peer proxy. The link between the first proxy node 101 and the second proxy node 102 may be denoted as a peer link.

Because the first proxy node 101 and the second proxy node 102 are peer nodes, usually, the router node 104 may choose to send a received packet to the first proxy node 101, or may choose to send a received packet to the second proxy node 102. As a result, the packet may be forwarded from the first proxy node 101 to the SF node 103, or may be forwarded from the second proxy node 102 to the SF node 103. Similarly, after processing the packet, the SF node 103 may choose to send a processed packet to the first proxy node 101, or may choose to send a processed packet to the second proxy node 102. Therefore, the processed packet may be returned from the first proxy node 101 to the router node 104, or may be returned from the second proxy node 102 to the router node 104. It can be learned that the SF node 103 is simultaneously connected to the first proxy node 101 and the second proxy node 102, to implement a dual-homing access function.

Through the dual-homing access, a load balancing function can be implemented. For a packet to be transmitted to the SF node 103, both the first proxy node 101 and the second proxy node 102 may perform a dynamic proxy operation on the packet, so that the two proxy nodes perform dynamic proxy operations together, thereby reducing pressure of a single proxy node to process the packet. In addition, for a packet processed by the SF node 103, the packet may be returned to the router node 104 through both the first proxy node 101 and the second proxy node 102, to distribute traffic processed by the SF node 103, and reduce pressure of a single proxy node to forward the packet. In addition, the packet is transmitted through two links, so that a transmission bandwidth is increased, and therefore a transmission speed is improved. Moreover, transmission reliability can be improved. If the first proxy node 101 or the fourth link is faulty, the packet can still be returned to the router node 104 through the second proxy node 102; if the second proxy node 102 or the fifth link is faulty, a packet can still be returned to the router node 104 through the first proxy node 101. This avoids a problem that packet transmission is interrupted after a single proxy node is faulty.

It should be understood that the networking mode shown in FIG. 3 is merely an optional mode. In FIG. 3, the peer link is deployed between the first proxy node 101 and the second proxy node 102, so that the network reliability can be improved. In a scenario with a fault, traffic arriving at the first proxy node 101 may be forwarded to the second proxy node 102 through the peer link, to avoid occupying a bandwidth between the router node and the proxy node.

Figure 4:
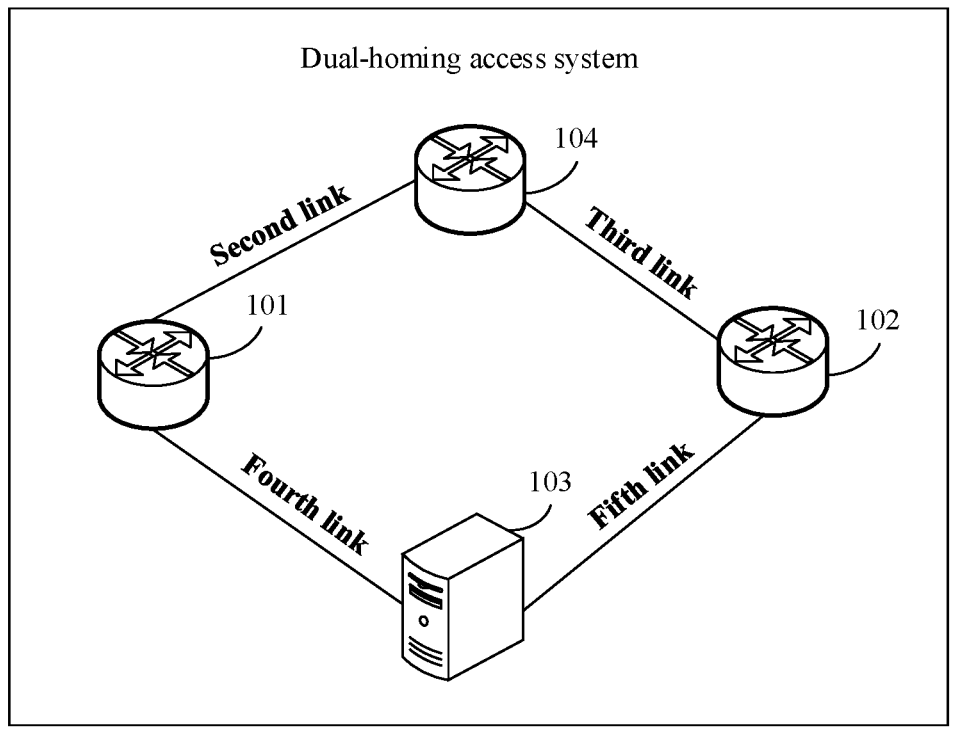
FIG. 4 is an architectural diagram of a dual-homing access system according to an embodiment of this application.

In another embodiment, another networking mode may alternatively be applied to the dual-homing access system. Refer to FIG. 4. For example, no peer link may be deployed between a first proxy node 101 and a second proxy node 102. Deployment in this networking is relatively simple, and an outbound interface occupied by the peer link is omitted, thereby saving an interface resource of the first proxy node 101 and an interface resource of the second proxy node 102.

It should be understood that each link shown in FIG. 3 or FIG. 4 may be a one-hop IP link, or may be multi-hop IP links. If two nodes are connected through a multi-hop IP link, a forwarding path between the two nodes may pass through one or more transit nodes, and the transit node may forward a packet between the two nodes. A quantity of hops included in each link is not limited in an embodiment.

If two nodes are located on a one-hop IP link, it may be referred to as that the two nodes are on-link. From the perspective of IP routing, the two nodes are one-hop connectable. For example, if an IPv4 packet is forwarded between the two nodes, when a node sends the IPv4 packet, the IPv4 packet may arrive at the other node after a time to live (TTL) in the IPv4 packet is decreased by 1. For another example, if an IPv6 packet is forwarded between the two nodes, when a node sends the IPv6 packet, the IPv6 packet may arrive at the other node after a hop-limit in the IPv6 packet is decreased by 1.

It should be noted: That two nodes are located on a one-hop IP link does not mean that the two nodes must be physically directly connected. If two nodes are located on a one-hop IP link, the two nodes may be or may not be physically directly connected. For example, when the two nodes are connected through one or more Layer 2 switches, it may also be referred to as that the two nodes are located on a one-hop IP link.

In addition, if two nodes are located on a multi-hop IP link, it may be referred to as that the two nodes are off-link. From the perspective of IP routing, the two nodes are connectable through multi-hop routing.

It should be understood that the dual-homing access system described in FIG. 3 or FIG. 4 is merely optional, and that there are two peer proxy nodes in the SFC is also merely optional. In another embodiment, there may be more than two peer proxy nodes in the SFC, and there may be more than one peer proxy for any proxy node. Any proxy node may access more than one peer link, and the proxy node may be connected to a corresponding peer proxy through each peer link.

The foregoing describes the SRv6 SFC-based dual-homing access system architecture. The following describes an example of a method procedure for transmitting a packet based on the foregoing system architecture.

Figure 5:
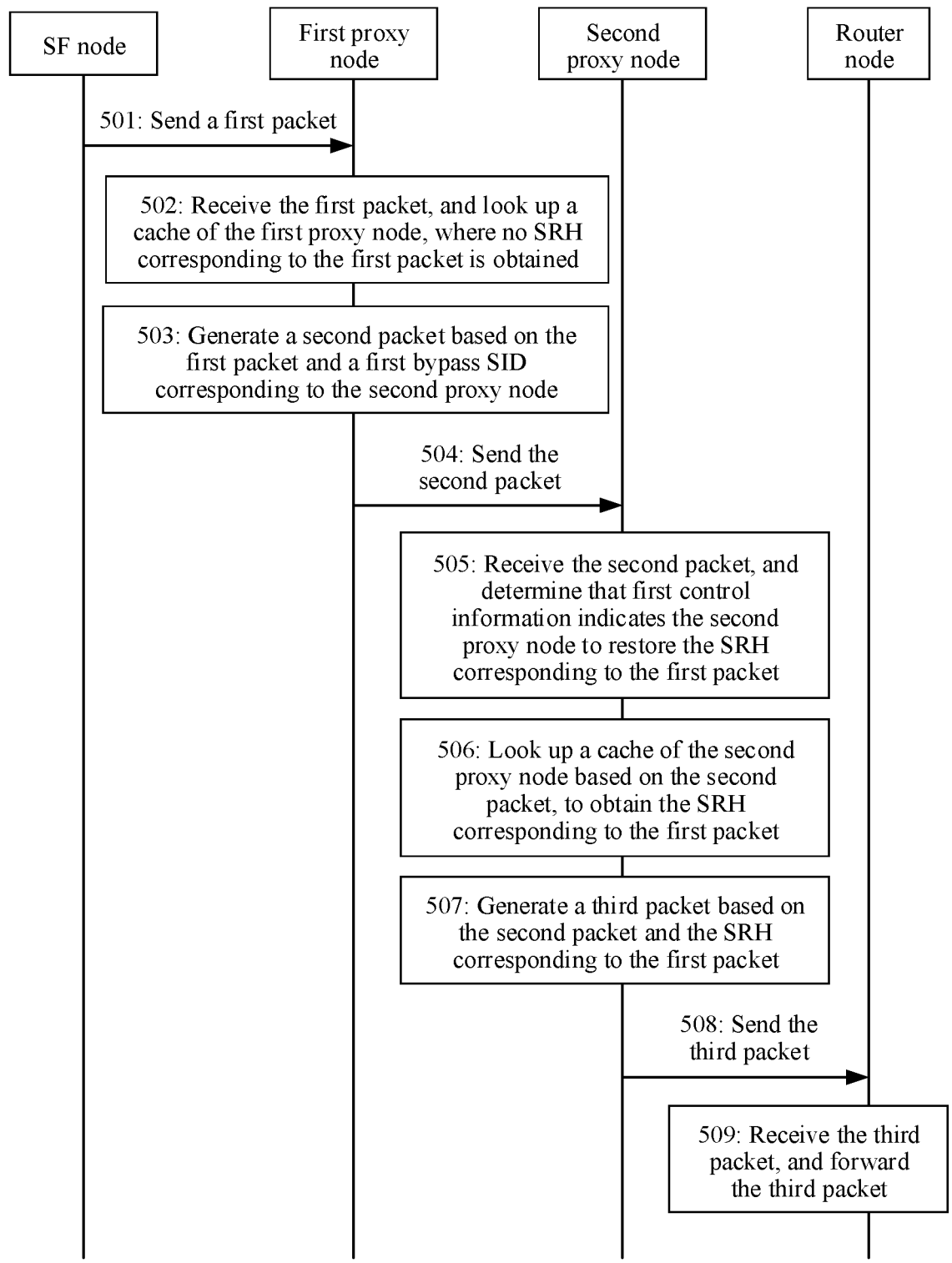
FIG. 5 is a flowchart of a packet transmission method according to an embodiment of this application.

FIG. 5 is a flowchart of a packet transmission method according to an embodiment of this application. As shown in FIG. 5, interaction bodies in the method include a first proxy node, a second proxy node, an SF node, and a router node. The first proxy node may be the first proxy node 101 in FIG. 3 or FIG. 4, the second proxy node may be the second proxy node 102 in FIG. 3 or FIG. 4, the SF node may be the SF node 103 in FIG. 3 or FIG. 4, and the router node may be the router node 104 in FIG. 3 or FIG. 4. The method may include the following operations.

Operation 501: The SF node sends a first packet to the first proxy node.

The first packet may be a packet obtained after the SF node performs service function processing. The first packet may not include an SRH, and the SRH corresponding to the first packet may be pre-stripped by the first proxy node or the second proxy node. The SRH corresponding to the first packet needs to be restored, so that the first packet continues to be forwarded in a network by using the SRH. The first packet may be a data packet. The first packet may be an IPv4 packet, an IPv6 packet, or an Ethernet frame.

In an embodiment, the first packet may further include a tunnel header. For example, a transmission tunnel may be established between the first proxy node and the SF node, and the first packet may include a tunnel header corresponding to the transmission tunnel. The transmission tunnel between the first proxy node and the SF node may be a VXLAN tunnel, a GRE tunnel, an IP in IP tunnel, or the like. Correspondingly, the tunnel header of the first packet may be a VXLAN tunnel header, a GRE tunnel header, an IP in IP tunnel header, or the like.

In some embodiments, the tunnel header may include a source address, a destination address, and a VPN identifier. The source address in the tunnel header is used to identify the SF node, and the destination address in the tunnel header is used to identify the first proxy node. An address of the SF node and an address of the first proxy node may be preconfigured on the SF node. In a process of generating the first packet, the SF node may look up a configuration, to obtain the address of the SF node and write the address into the source address in the tunnel header; and obtain the address of the first proxy node and write the address into the destination address of in tunnel header. Addresses separately configured on the SF node and the first proxy node may be mutually referenced. For example, the address of the SF node that is configured on the SF node may be the same as an address of the SF node that is configured on the first proxy node, and the address of the first proxy node that is configured on the SF node may be the same as an address of the first proxy node that is configured on the first proxy node. Forms of the source address and the destination address in the tunnel header may be determined based on a configuration operation, for example, may be IPv4 address forms or IPv6 address forms. Certainly, the source address and the destination address may alternatively be configured into other forms based on a requirement.

Figure 6:
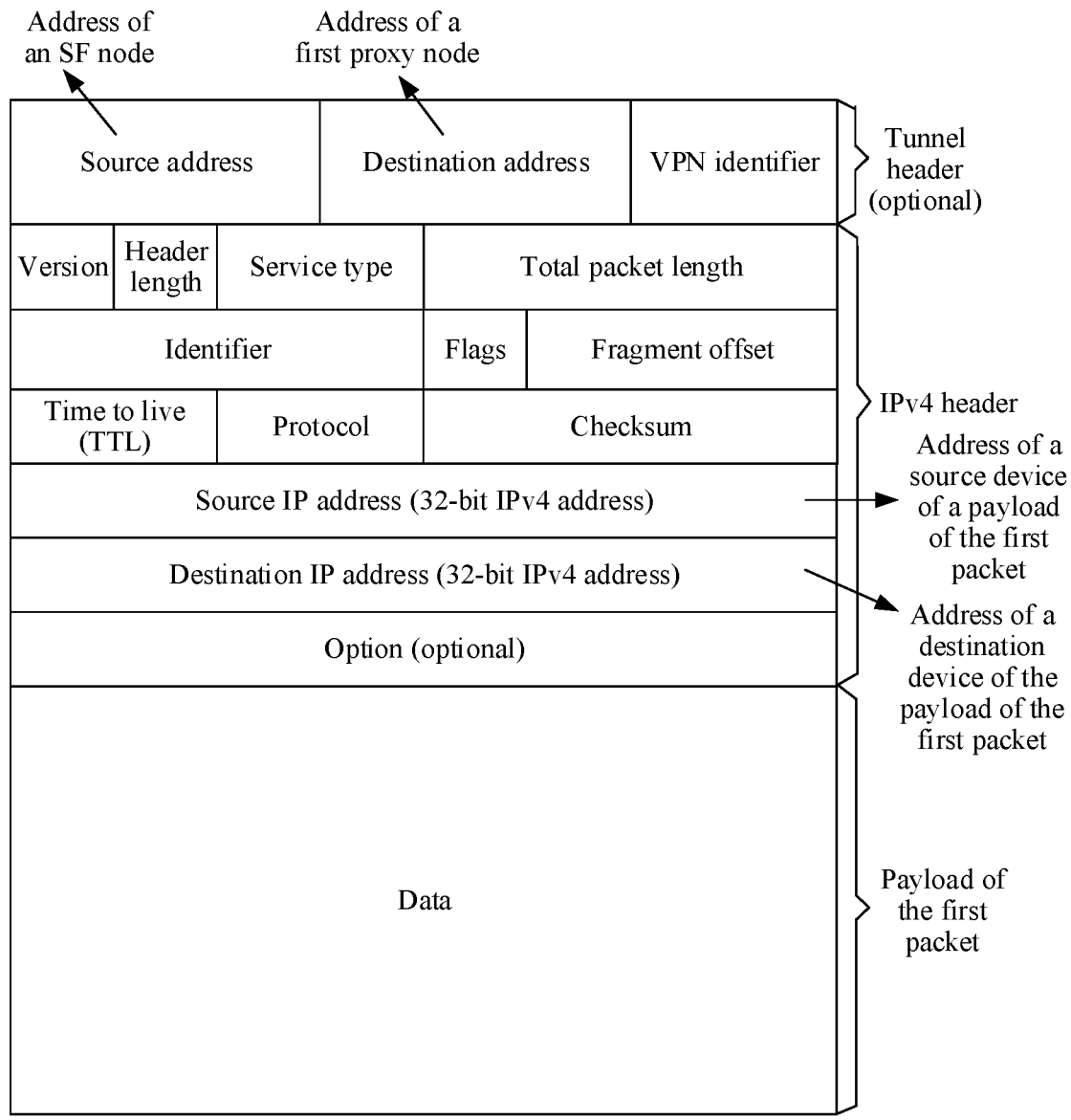
FIG. 6 is a schematic diagram of a first packet according to an embodiment of this application.
Figure 7:
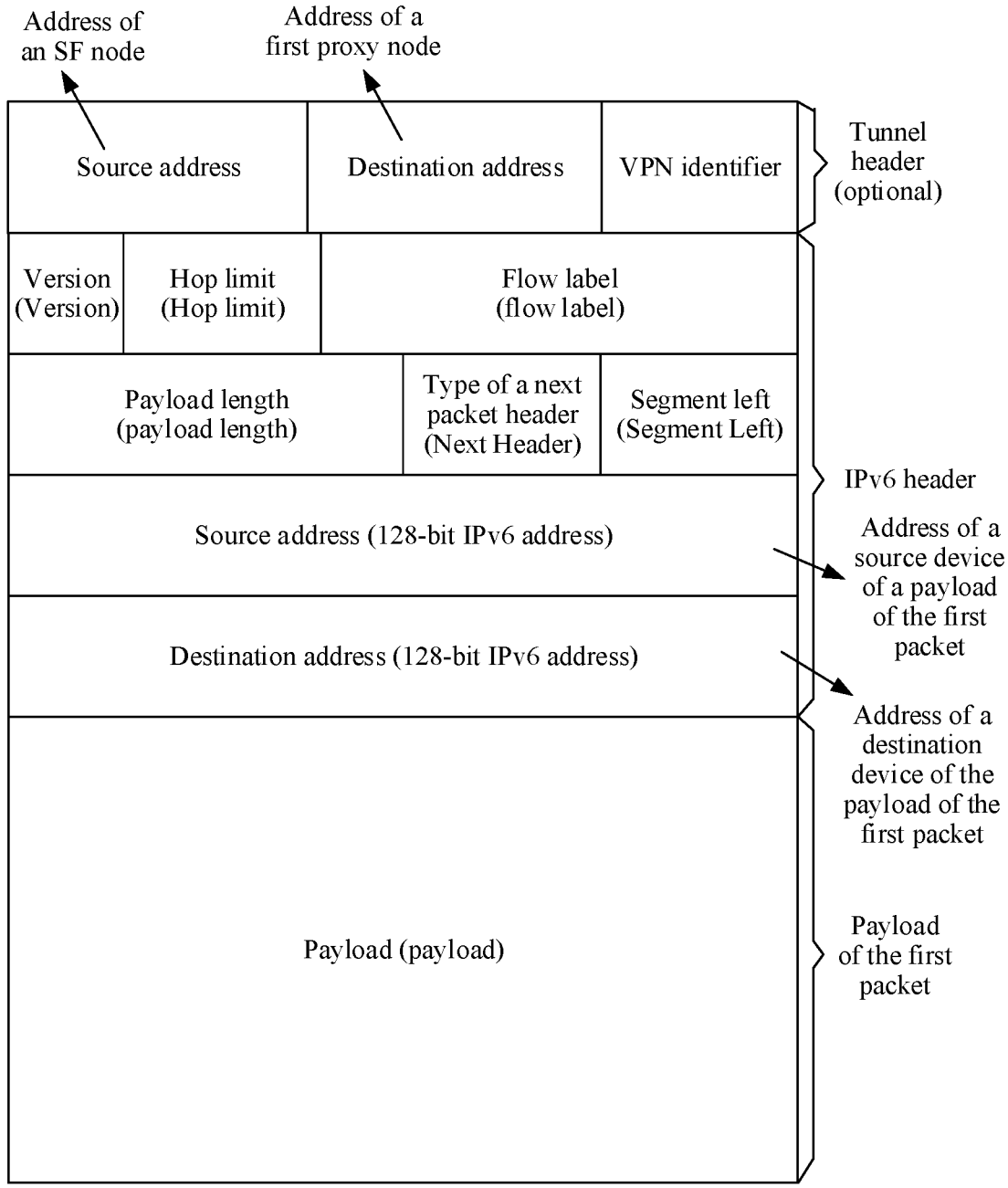
FIG. 7 is a schematic diagram of a first packet according to an embodiment of this application.
Figure 8:
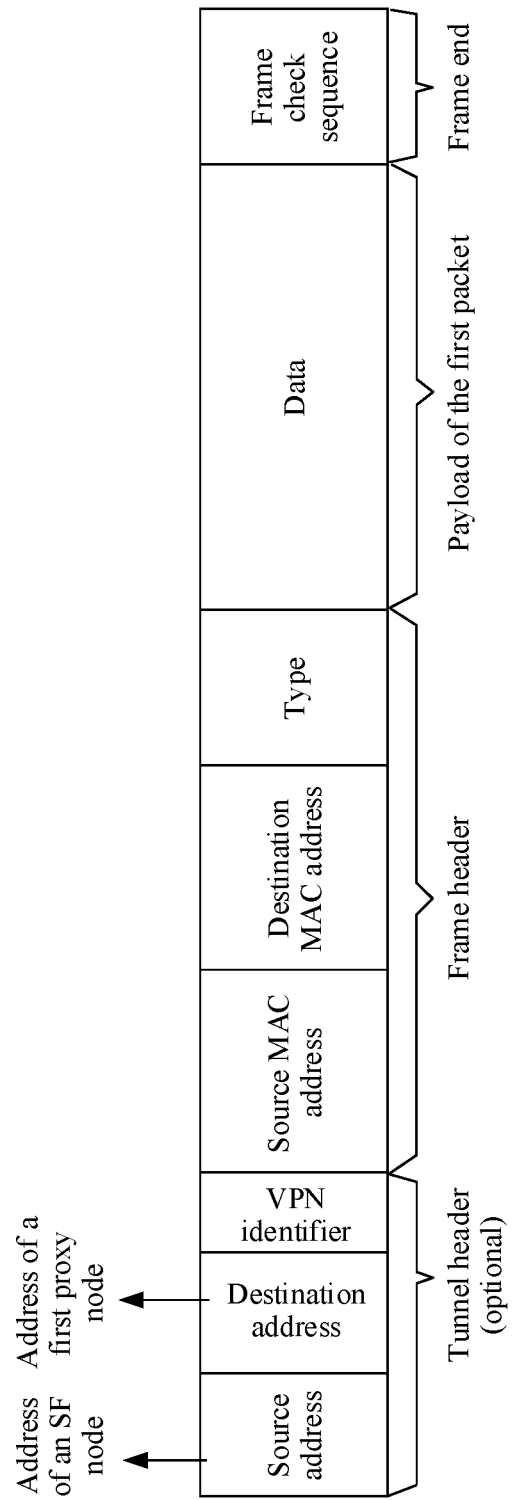
FIG. 8 is a schematic diagram of a first packet according to an embodiment of this application.

For example, FIG. 6 is a schematic diagram of a first packet according to an embodiment of this application, where an example in which the first packet is an IPv4 packet is used in FIG. 6 for description, and a packet header of the first packet includes an IPv4 header. FIG. 7 is a schematic diagram of a first packet according to an embodiment of this application, where an example in which the first packet is an IPv6 packet is used in FIG. 7 for description, and a packet header of the first packet includes an IPv6 header. FIG. 8 is a schematic diagram of a first packet according to an embodiment of this application, where an example in which the first packet is an Ethernet frame is used in FIG. 8 for description, and a packet header of the first packet includes a MAC frame header.

Operation 502: The first proxy node receives the first packet from the SF node, and looks up a cache of the first proxy node, where no SRH corresponding to the first packet is obtained.

The first proxy node looks up for a local cache entry based on the first packet. However, in a plurality of scenarios, a cache miss event may occur on the first proxy node, that is, the first proxy node finds no SRH corresponding to the first packet in the cache, and consequently the SRH cannot be restored for the first packet. For example, the cache miss event may be triggered in any one of the following scenario 1 to scenario 5.

Scenario 1: Cache Miss

For example, a fault may occur on the first proxy node, and a cached SRH is lost due to the fault. In this case, after being recovered from a faulty state, the first proxy node cannot find the SRH from the cache. For another example, the first proxy node is powered off. Because the cache is a volatile storage, the power-off causes a cached SRH to be lost. In this case, after the first proxy node is powered on again, the first proxy node cannot find the SRH from the cache. For still another example, a board of the first proxy node or the entire first proxy node is restarted. In this case, the cache may also be lost.

Scenario 2: Cache Aging

The first proxy node may have a route aging function, and may start an aging timer for the cache entry, and set a corresponding aging flag for the cache entry. The aging flag is used to identify whether the cache entry has aged, and a value of the aging flag may be 1 or 0. The first proxy node may periodically scan each cache entry in the cache by using the aging timer. If finding through scanning that an aging flag corresponding any cache entry is 1, the first proxy node modifies the aging flag to 0; or if finding through scanning that an aging flag corresponding to any cache entry is 0, the first proxy node deletes the cache entry. In addition, in a process in which the first proxy node forwards the packet, if a cache entry is hit during cache lookup, the first proxy node sets an aging flag corresponding to the cache entry to 1. Through the route aging function, a cache entry with high access frequency can be retained in the cache, and a cache entry with low access frequency can be cleared to release cache space occupied by the cache entry with low access frequency. In this way, cache resources are saved. When the route aging function is provided, if a cache entry used to store the SRH corresponding to the first packet is missed until the aging timer expires, an aging flag corresponding to the cache entry is set to 0, to clear the cache entry. In this case, the first proxy node cannot find the SRH corresponding to the first packet during subsequent cache lookup.

Scenario 3: Cache Clearing

If a user performs device maintenance or performs a misoperation on the first proxy node, the user may manually clear the cache entry of the first proxy node. In this case, after the cache entry is cleared, the first proxy node cannot find the SRH corresponding to the first packet during subsequent cache lookup.

Scenario 4: No Storage of the SRH Corresponding to the First Packet Ever

A difference from the scenario 1 to the scenario 3 lies in: In the scenario 1 to the scenario 3, before receiving the first packet, the first proxy node historically stored the SRH corresponding to the first packet, but when the first proxy node receives the first packet, the SRH corresponding to the first packet is not stored in the cache; in the scenario 4, the first proxy node has never stored the SRH corresponding to the first packet, in other words, the SRH corresponding to the first packet has never been stored in the cache. As a result, the first proxy node cannot find the SRH corresponding to the first packet from the cache.

Refer to FIG. 3 or FIG. 4. In an example scenario, after receiving an SRv6 packet, the router node 104 may send the SRv6 packet to the second proxy node 102. The second proxy node 102 strips an SRH of the SRv6 packet, caches the SRH of the SRv6 packet, and sends a payload of the SRv6 packet to the SF node 103. After performing processing based on the payload, the SF node 103 generates a first packet, and sends the first packet to the first proxy node 101. After the first proxy node 101 receives the first packet, because an SRv6 packet corresponding to the first packet is previously sent to the SF node by the second proxy node instead of the first proxy node, the SRH corresponding to the first packet is in a cache of the second proxy node 102 but is not in a cache of the first proxy node 101. In this case, because the first proxy node 101 does not cache the SRH corresponding to the first packet, the first proxy node 101 cannot find the SRH corresponding to the first packet.

In an embodiment, the first packet may include a proxy node identifier, where the proxy node identifier is used to identify a proxy node that sends a payload of an SRv6 packet to the SF node, and the proxy node identifier may be a device ID of the proxy node. When receiving the first packet, the first proxy node may identify the proxy node identifier in the first packet, and determine whether the proxy node identifier is an identifier of the first proxy node. If the proxy node identifier is not the identifier of the first proxy node, the first proxy node may determine that an SRv6 packet corresponding to the first packet was not previously sent from a local end to the SF node, and therefore perform the following operation 503. The first proxy node may determine the proxy node corresponding to the proxy node identifier as the second proxy node to which a second packet is to be sent.

For example, after receiving the first packet, if a proxy node 1 finds that the proxy node identifier in the first packet is a device ID of a proxy node 2, the proxy node 1 determines that the SRv6 packet corresponding to the first packet was previously sent to the SF node by the proxy node 2 instead of the proxy node 1. In this case, the proxy node 1 re-encapsulates the first packet to obtain the second packet, and sends the second packet to the proxy node 2.

Scenario 5: NAT

A difference from the scenario 1 to the scenario 4 lies in: A cache miss reason in the scenario 1 to the scenario 4 is that the SRH corresponding to the first packet is not in the cache, but a cache miss reason in the scenario 5 is that an index of the SRH corresponding to the first packet is modified. That is, even if the SRH corresponding to the first packet is still in the cache, because an index used in a lookup process does not correspond to the SRH, an SRH corresponding to the index cannot be found from the cache.

For example, the NAT scenario means that a service function of the SF node includes modifying a flow identifier. In a process of pre-storing the SRH, the first proxy node usually stores the SRH corresponding to the first packet by using a flow identifier corresponding to the first packet as a key.

In the NAT scenario, after the SF node performs service processing on a packet, usually, a flow identifier corresponding to a processed packet is inconsistent with a flow identifier corresponding to the unprocessed packet. Consequently, the first proxy node cannot find a corresponding SRH by using the flow identifier corresponding to the processed packet. For example, if the service function of the SF node includes performing NAT, the SF node modifies a 5-tuple of a packet. In this case, a 5-tuple of a processed packet is inconsistent with the 5-tuple of the unprocessed packet. In an example scenario, if the SF node is a firewall, the SF node usually includes a service function of destination network address translation (DNAT). The SF node stores an address pool, replaces a destination address in a packet with an address in the address pool, and returns, to the first proxy node, a packet obtained by replacing the destination address, so that a destination address of the packet received by the first proxy node is different from the destination address of the packet previously sent to the SF node. In this case, when looking up for an SRH by using a 5-tuple corresponding to the destination address of the received packet, the first proxy node cannot find the SRH.

In an embodiment, in various cache miss scenarios, although the first proxy node cannot locally perform an SRH restoration task, the first proxy node may perform the following operation 503 and operation 504 to re-encapsulate the packet and forward a packet obtained through re-encapsulation to the second proxy node. The second proxy node replaces the first proxy node to restore the SRH, to ensure that the SRH of the packet can be restored.

Operation 503: The first proxy node generates the second packet based on the first packet and a first bypass SID corresponding to the second proxy node.

The second packet is a packet used to control a peer proxy node to restore the SRH. The second packet includes the first bypass SID, first control information, and a payload of the first packet. A source address of the second packet may be in a plurality of cases. For example, the source address of the second packet may be a second bypass SID corresponding to the first proxy node, an IP address of the first proxy node, or other information that can identify the first proxy node; or the source address of the second packet may be a default address. The second packet may include a payload, and the payload of the second packet may be the payload of the first packet, or may be the first packet itself. Refer to FIG. 9, FIG. 10, FIG. 11, FIG. 12, FIG. 14, FIG. 15, FIG. 16, and FIG. 17. For example, the payload of the second packet may include the payload of the first packet and a packet header of the first packet, where the packet header of the first packet is determined based on a type of the first packet, and for example, may be an IPv4 header, an IPv6 header, or a MAC frame header.

A bypass SID is a new SID provided in the embodiments. The bypass SID is used to send a packet of a local proxy node to a peer proxy node, in other words, send a packet of a local proxy to a peer proxy. In an embodiment, the local proxy node can transmit the packet to the peer proxy node by including a bypass SID of the peer proxy node in a destination address of the packet, to forward the packet from a local end to the peer proxy node. The bypass SID may be referred to as an End.ADB SID, and the End.ADB SID is a bypass SID for an End.AD SID (where the End.ADB SID is a SID that has a bypass function and that is extended for a dynamic proxy operation). The name of the End.ADB SID may be considered as a combination of the End.AD SID and B, where "B" in "ADB" stands for bypass. The bypass SID may be in a form of an IPv6 address, and may include 128 bits. The bypass SID may include location information (Locator) and function information (Function), and a format of the bypass SID is Locator:Function. Locator occupies a high bit of the bypass SID, and Function occupies a low bit of the bypass SID. In an embodiment, the bypass SID may further include arguments information (Arguments). In this case, the format of the bypass SID is Locator:Function: Arguments.

In an embodiment, the bypass SID may be a node SID, and each bypass SID may uniquely correspond to one proxy node. If a system architecture of an SFC includes a plurality of proxy nodes, there may be a plurality of bypass SIDs. Each bypass SID corresponds to one of the plurality of proxy nodes. In this way, for a bypass SID, a packet whose destination address is the bypass SID can be uniquely routed to one proxy node, and therefore sent to the proxy node corresponding to the bypass SID. In an embodiment, a dual-homing access system architecture is used as an example for description. The system includes the first proxy node and the second proxy node. For distinction in description, a bypass SID corresponding to the second proxy node is referred to as the first bypass SID. The first bypass SID is used to send a packet to the second proxy node. The first bypass SID may be distributed to the network by the first proxy node, and another node in the SFC may receive the distributed first bypass SID. In addition, similarly, a bypass SID corresponding to the first proxy node is referred to as the second bypass SID. The second bypass SID is used to send a packet to the first proxy node. The second bypass SID may be distributed to the network by the second proxy node, and another node in the SFC may receive the distributed second bypass SID.

For a manner in which the first proxy node obtains the first bypass SID, a configuration operation may be performed on the first proxy node in advance, and the first proxy node may receive a configuration instruction, and obtain the first bypass SID from the configuration instruction. The first proxy node may store the first bypass SID, for example, store the first bypass SID in a local SID table of the first proxy node. When receiving the first packet, the first proxy node may read the pre-stored first bypass SID, to obtain the first bypass SID. The configuration operation may be performed by the user on the first proxy node, or may be performed by a network controller, for example, an SDN controller or an NFVM. This is not limited in this embodiment.

For example, the first proxy node may receive the following configuration instruction:

[proxy 1] segment-routing ipv6

[proxy 1-segment-routing-ipv6]locator t2 ipv6-prefix B::64 static 32

[proxy 1-segment-routing-ipv6-locator]opcode::1 end-adb peer-sid C::2

In the foregoing configuration instruction, proxy1 indicates the first proxy node, the first line of the configuration instruction means that IPv6 SR needs to be configured, and the second line of the configuration instruction means that Locator (location information) is t2, an IPv6 prefix is B:: 64, and a static route is 32. The third line of the configuration instruction means that an operation code is ::1, and the first bypass SID corresponding to the second proxy node is C::2.

Similarly, a configuration operation may be performed on the second proxy node in advance, and the second proxy node may receive a configuration instruction, and obtain the second bypass SID from the configuration instruction, for example, store the second bypass SID in a local SID table of the second proxy node. For example, the second proxy node may receive the following configuration instruction:

[proxy2] segment−routing ipv6

[proxy2−segment−routing−ipv6] locator t2 ipv6−prefix C :: 64 static 10

[proxy2−segment−routing−ipv6−locator] opcode :: 2 end−adb peer−sid B :: 1

In the foregoing configuration instruction, proxy2 indicates the second proxy node, the first line of the configuration instruction means that IPv6 SR needs to be configured, and the second line of the configuration instruction means that Locator (location information) is t2, an IPv6 prefix is C:: 64, and a static route is 10. The third line of the configuration instruction means that an operation code is ::2, and the second bypass SID corresponding to the first proxy node is B::1.

It should be noted that the bypass SIDs configured on the first proxy node and the second proxy node may be mutually referenced. That is, the second proxy node is referenced for the first bypass SID configured on the first proxy node, to indicate that the first bypass SID is used to transmit the packet to the second proxy node; similarly, the first proxy node is referenced for the second bypass SID configured on the second proxy node, to indicate that the second bypass SID is used to transmit the packet to the first proxy node.

It should be understood that a one-to-one correspondence between a bypass SID and a proxy node is merely an example. In another embodiment, a bypass SID and a proxy node may alternatively be in another correspondence. This is not limited in this embodiment.

The first control information is used to indicate the second proxy node to restore the SRH corresponding to the first packet. In an embodiment, the first control information may include a first flag. The first flag is used to identify whether the SRH hits the local cache entry, and may be denoted as a cache miss flag, a CM, or a CM-flag. A length of the first flag is one bit. If the first flag is set to 0, it indicates that the SRH has hit the local cache entry. If the first flag is set to 1, it indicates that the SRH misses the local cache entry. In an embodiment, the first flag in the first control information may be set to 1, to indicate that the SRH misses the local cache entry of the first proxy node, so that after identifying that a value of the first flag is 1, the second proxy node may look up for a local cache entry of the second proxy node to restore the SRH.

There may be a plurality of formats of the second packet. The format of the second packet may vary with a network topology structure and/or a requirement of the first proxy node on path planning, or may vary with a manner of carrying the first control information. With reference to FIG. 9 to FIG. 17, the following uses an implementation 1 and an implementation 2 as examples for description.

Implementation 1: Refer to FIG. 9, FIG. 10, FIG. 11, and FIG. 12. The second packet may include an IP header. A destination address (DA) in the IP header is the first bypass SID.

The second packet may be in a format similar to that of an IP-IP packet, and the second packet may include a plurality of IP headers. In the second packet, the IP header with the first bypass SID as the destination address may be an outer IP header of the second packet.

The IP header with the first bypass SID as the destination address may be an IPv6 header. For example, when the first packet is an IPv6 packet, the second packet may include the IPv6 header of the second packet, and also include an IPv6 header of the first packet. In this case, in the second packet, the IP header with the first bypass SID as the destination address may be the outer IPv6 header of the second packet, and the IPv6 header of the first packet may be an inner IPv6 header of the second packet. For another example, when the first packet is an IPv4 packet, the second packet may include the IPv6 header of the second packet, and also include an IPv4 header of the first packet. In this case, in the second packet, the IP header with the first bypass SID as the destination address may be the outer IPv6 header of the second packet, and the IPv4 header of the first packet may be an inner IPv4 header of the second packet.

In some embodiments, when the first bypass SID is used as the destination address, the second packet may be implemented in a plurality of formats.

Figure 9:
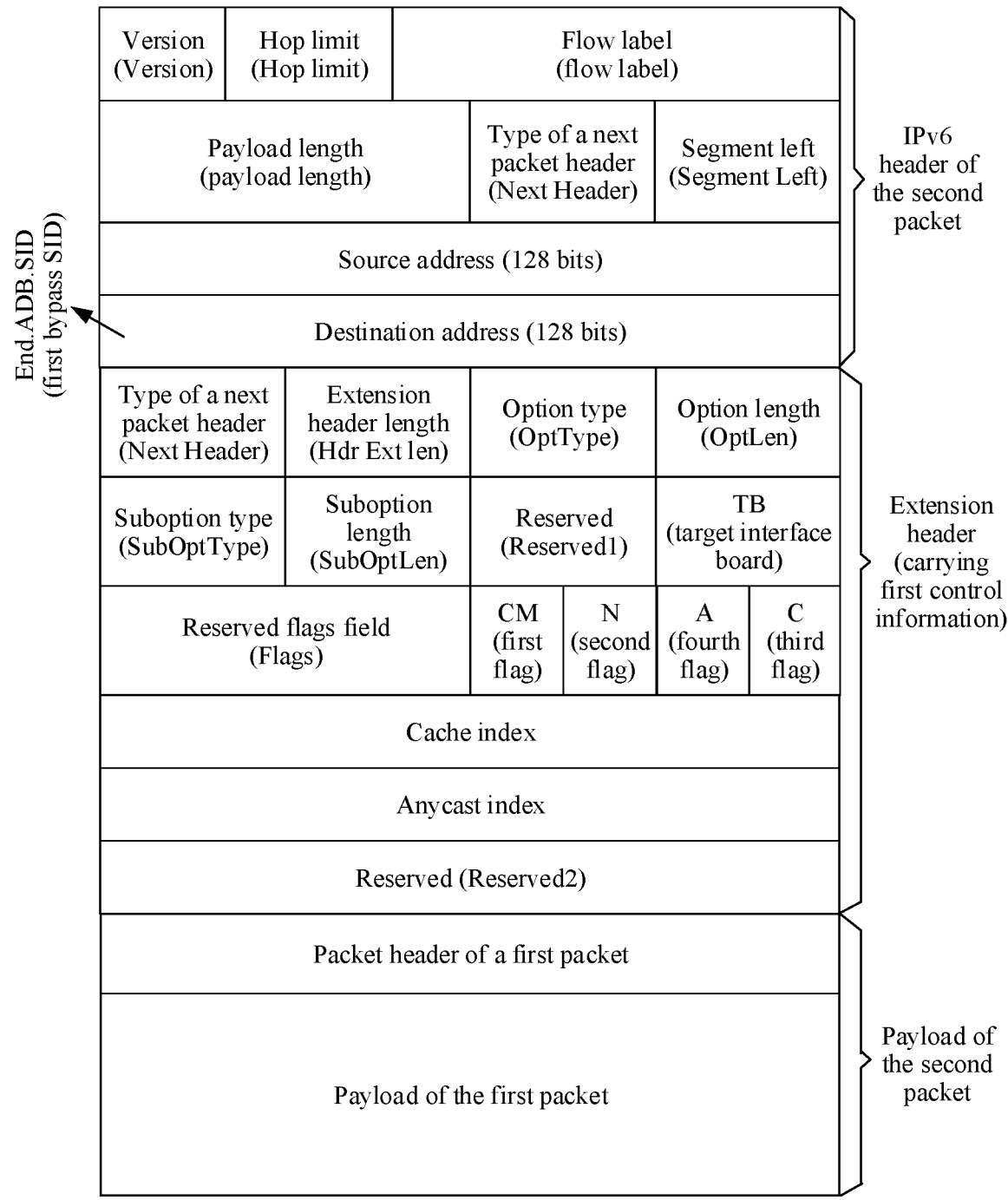
FIG. 9 is a schematic diagram of a second packet according to an embodiment of this application.

Refer to FIG. 9. For example, the second packet may include the IPv6 header, an extension header, and the payload of the second packet, where the extension header includes the first control information. In an embodiment, an SRH may be an optional part of the second packet. That is, for example, as shown in FIG. 9, the second packet may not include the SRH; or the second packet may include the SRH based on a requirement, to carry some information.

Figure 10:
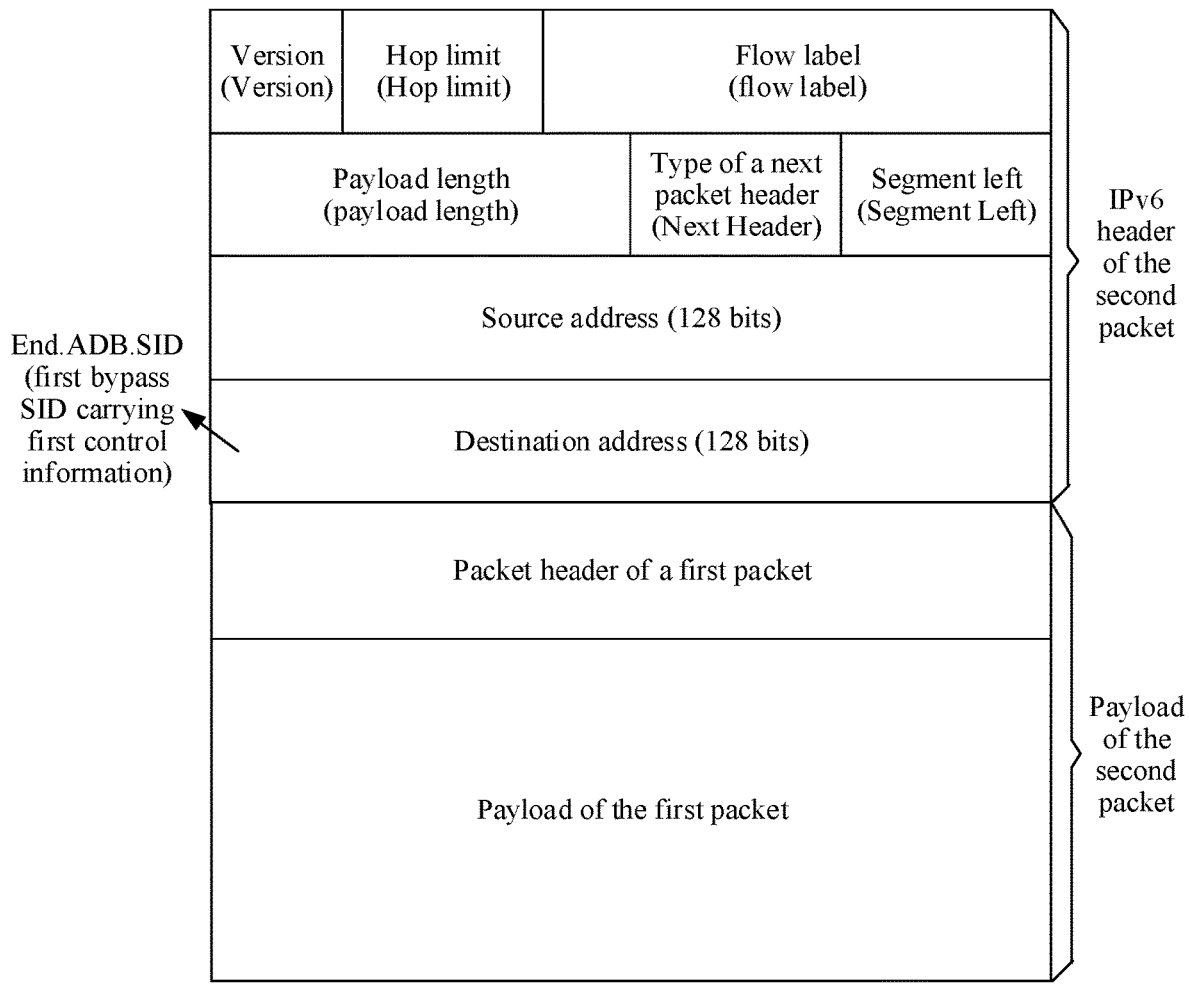
FIG. 10 is a schematic diagram of a second packet according to an embodiment of this application.

Refer to FIG. 10. For another example, the second packet may include the IPv6 header and the payload of the second packet, where the destination address in the IPv6 header, namely, the first bypass SID, includes the first control information. In an embodiment, both an SRH and an extension header may be optional parts of the second packet. That is, for example, as shown in FIG. 10, the second packet may include neither the SRH nor the extension header; or the second packet may include the SRH or the extension header based on a requirement, to carry some information.

Figure 11:
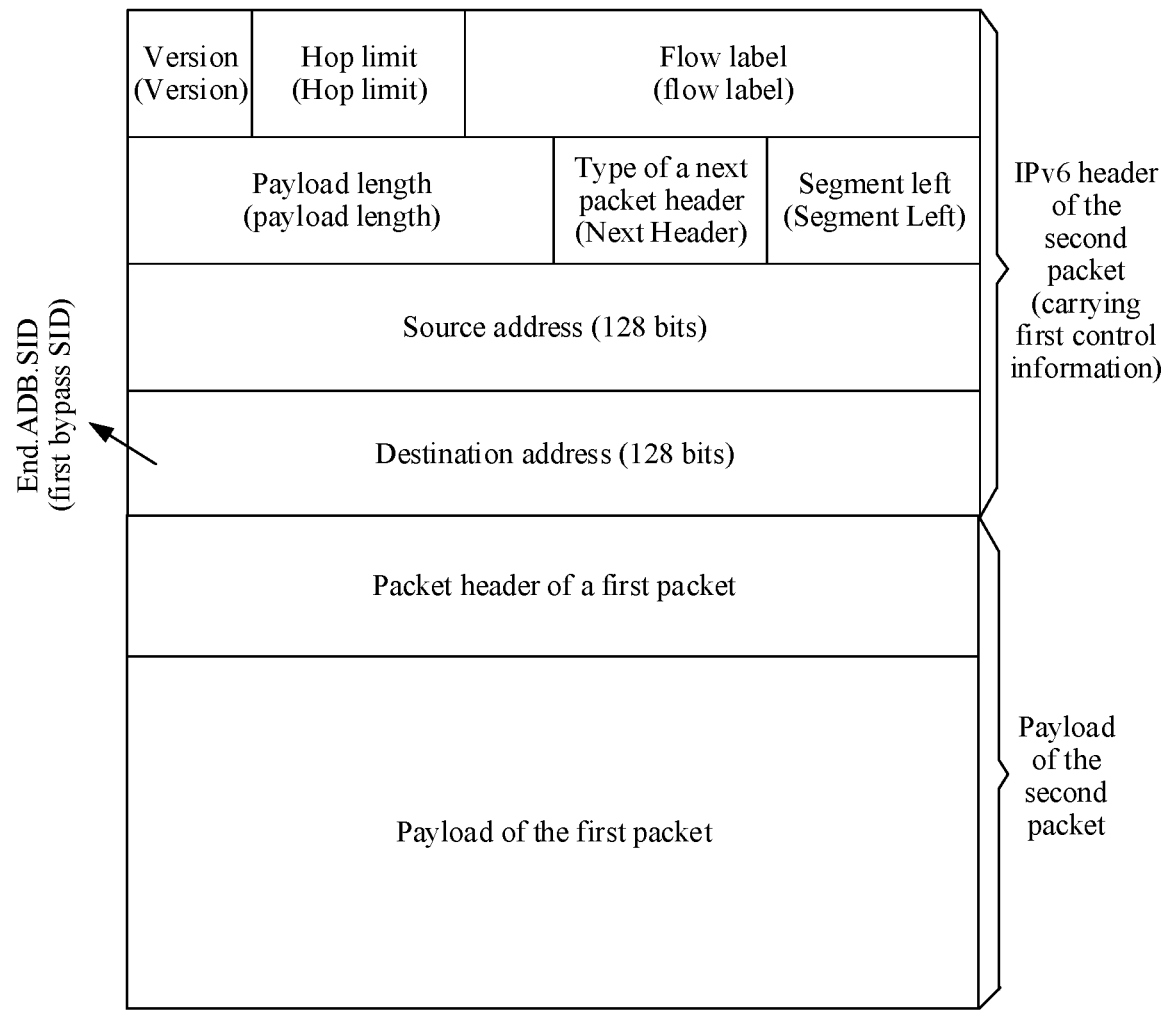
FIG. 11 is a schematic diagram of a second packet according to an embodiment of this application.

Refer to FIG. 11. For another example, the second packet may include the IPv6 header and the payload of the second packet, where the IPv6 header includes the first control information. In an embodiment, both an SRH and an extension header may be optional parts of the second packet. That is, for example, as shown in FIG. 11, the second packet may include neither the SRH nor the extension header; or the second packet may include the SRH or the extension header based on a requirement, to carry some information. In addition, a location in which the first control information is carried in the IPv6 header in FIG. 11 may be set based on a requirement. This is not limited in this embodiment.

Figure 12:
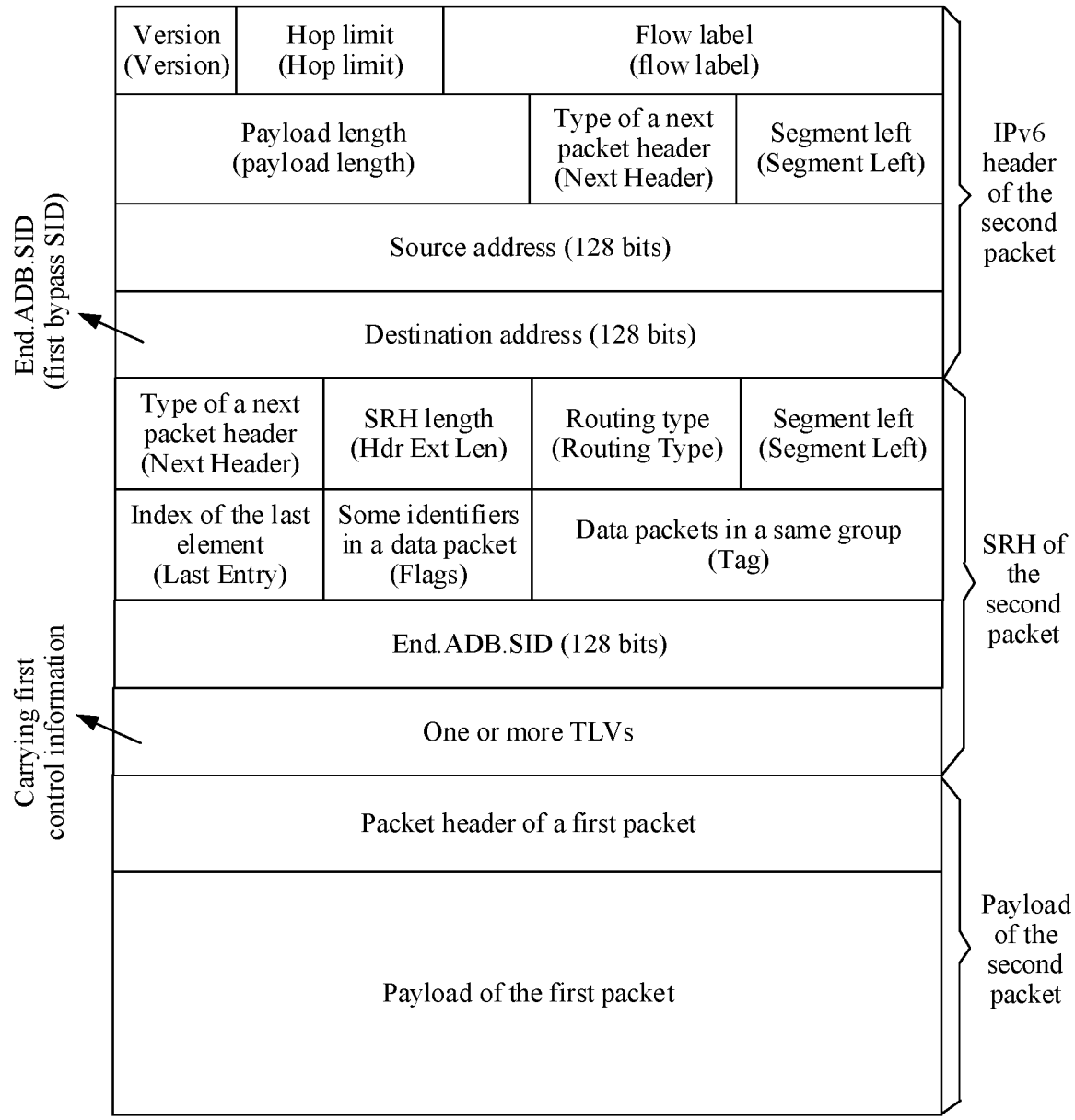
FIG. 12 is a schematic diagram of a second packet according to an embodiment of this application.

Refer to FIG. 12. For another example, the second packet may include the IPv6 header, an SRH, and the payload of the second packet, where a TLV in the SRH of the second packet includes first extension information. The SRH of the second packet may include a segment list, and the segment list includes the first bypass SID. In an embodiment, when the first bypass SID is used as the destination address, the segment list may include only one SID, namely, the first bypass SID, and does not include another SID. In this format, an SL of the SRH of the second packet is 0. In addition, in an embodiment, an extension header may be an optional part of the second packet. That is, for example, as shown in FIG. 12, the second packet may not include the extension header; or the extension header may be set in the second packet based on a requirement, to carry some information.

The second packet carries the SRH, to achieve at least the following effects: Some additional information may be carried by using one or more TLVs and the segment list in the SRH, to indicate the second proxy node or a transit node between the two proxy nodes by using the additional information to perform a specified forwarding behavior or a service. In this way, the second packet has good extensibility to provide an SRH restoration function together with another function.

The implementation 1 may be applied to a plurality of scenarios, and the following uses a scenario 1 to a scenario 3 as examples for description.

Figure 13:
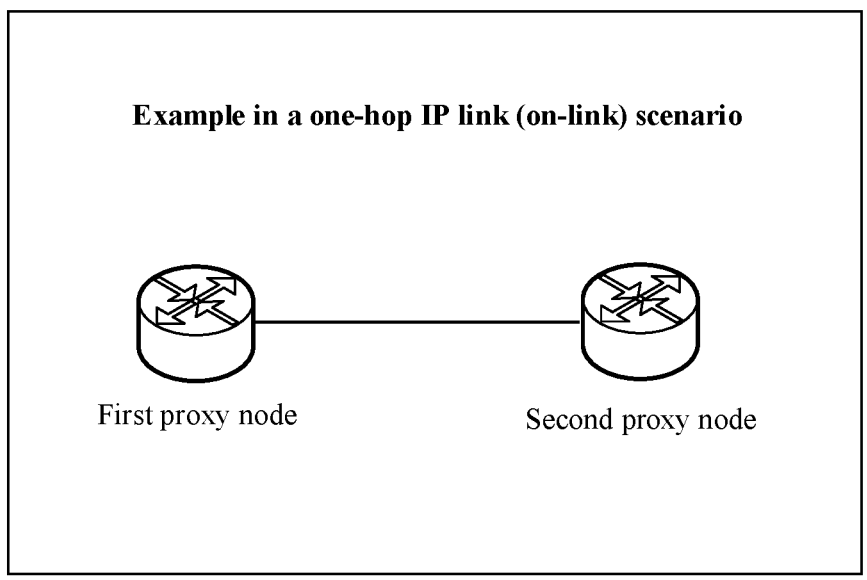
FIG. 13 is a diagram of a network topology between a first proxy node and a second proxy node according to an embodiment of this application.

Scenario 1: The first proxy node and the second proxy node are located on a one-hop IP link (on-link). For a concept of on-link, refer to the foregoing description. Details are not described herein again. FIG. 13 is a schematic diagram in which the first proxy node and the second proxy node are located on a one-hop IP link. It should be noted that although not shown in FIG. 13, a Layer 2 switch or another device may exist between the first proxy node and the second proxy node, and it is not limited that the first proxy node and the second proxy node are physically directly connected in this embodiment.

In an SRv6 network, a destination address in an IPv6 header of an SRv6 packet is usually used to identify a next SR node that is to forward the packet. Therefore, if the first proxy node and the second proxy node are located on the one-hop IP link, the first proxy node includes the first bypass SID in the destination address to indicate that a next SR node of the second packet is the second proxy node.

Scenario 2: The first proxy node and the second proxy node are located on a multi-hop IP link (off-link), and an SR function of the transit node between the first proxy node and the second proxy node is not enabled.

For the transit node whose SR function is not enabled, when receiving the second packet, the transit node may look up a routing FIB based on the destination address (namely, the first bypass SID) of the second packet, and forward the packet based on an entry that is in the routing FIB and that is hit by the destination address.

Scenario 3: The first proxy node and the second proxy node are located on a multi-hop IP link, but there is no service requirement for specifying a transit node to forward the second packet.

The scenario 3 may include a plurality of cases, and may include a case in which an SR function of the transit node is enabled and a case in which an SR function of the transit node is not enabled. For example, if the multi-hop IP link includes a plurality of forwarding paths, and the first proxy node has no requirement for specifying a forwarding path to forward the second packet, when the SR function of the transit node is enabled or not enabled, the destination address may carry the first bypass SID. For another example, if the multi-hop IP link includes only one forwarding path, for example, there is only one transit node between the first proxy node and the second proxy node, when an SR function of the transit node is enabled or not enabled, the second packet can still be forwarded by the transit node to the second proxy node without specifying the transit node by the first proxy node.

For the transit node whose SR function is enabled, when receiving the second packet, the transit node may look up a local SID table based on the destination address of the second packet, namely, the first bypass SID, that is, match the first bypass SID with each SID in the local SID table. In this case, because the first bypass SID is not a SID distributed by the transit node, and is not stored in the local SID table of the transit node, the transit node determines that the first bypass SID misses the local SID table, and forwards the second packet in a conventional IP routing manner. In an embodiment, the transit node looks up a routing FIB based on the first bypass SID, and forwards the second packet based on an entry that is in the routing FIB and that is hit by the destination address.

Implementation 2: In some embodiments, the second packet may be an SRv6 packet. Refer to FIG. 14, FIG. 15, FIG. 16, and FIG. 17. For example, the second packet includes an IP header and an SRH of the second packet. A destination address in the IP header is a SID in one or more target SIDs that corresponds to a next SR node.

The one or more target SIDs are used to indicate a target forwarding path. The target SID may be a node SID, or may be a link SID. The target SID may identify one transit node, one link, one or more instructions, one service, or one VPN between the first proxy node and the second proxy node, and there may be one or more target SIDs in the SRH of the second packet.

The target forwarding path is a path from the first proxy node to the second proxy node. The target forwarding path may be a strict explicit path, namely, a path on which each segment of link or each transit node is specified. Alternatively, the target forwarding path may be a loose explicit path, namely, a path on which a part of a link or a part of transit nodes are specified. The target forwarding path may be one link, or may be a combination of a plurality of links.

The target forwarding path may be a path at a data link layer, a path at a physical layer, or a path constructed by using a tunneling technology. The target forwarding path may be a path for transmitting an optical signal, or may be a path for transmitting an electrical signal.

The SRH of the second packet may include the first bypass SID and the one or more target SIDs. For example, the SRH of the second packet may include a segment list, and the segment list includes the first bypass SID and the one or more target SIDs. In the segment list, the one or more target SIDs may be located in front of the first bypass SID. For example, the first bypass SID may be the last SID in the SRH of the second packet. In an example scenario, the first proxy node needs to specify that the second packet is to be first forwarded to a transit node 1, then forwarded to a transit node 2, and finally forwarded to the second proxy node. If a SID corresponding to the transit node 1 is a SID 1, and a SID corresponding to the transit node 2 is a SID 2, the SRH of the second packet may include three SIDs, where Segment list [0] is the SID 1, Segment list [1] is the SID 2, and Segment list [2] is the first bypass SID. In this SID sequence, the SID 1 is the first processed SID in the segment list in a forwarding process of the second packet, and the transit node 1 performs a corresponding operation based on the SID 1. The SID 2 is the second processed SID in the segment list, and the transit node 2 performs a corresponding operation based on the SID 2. The first bypass SID is the last processed SID in the segment list, and the second proxy node performs a corresponding operation based on the first bypass SID.

It should be noted that the last SID is usually Segment list [0] in the segment list, namely, the SID 0. In an embodiment, the segment list is usually represented as <Segment list [0], Segment list [1], Segment list [2], . . . , Segment list [n]>. The segment list is encoded starting from the last segment of the path. That is, Segment list [0] is the last segment of the path, Segment list [1] is the last segment of the path but one, and Segment list [n] is the last segment of the path but n. The rest can be deduced by analogy, and a push operation is performed in reverse. In SRv6, each time an SRv6 node is passed through, a value of an SL field is decreased by 1, and destination address information is changed once. An IPv6 destination address is determined based on both the SL and the segment list. If the SL value is n, a value of the IPv6 destination address is a value of Segment list [n]. If the SL value is 1, a value of the IPv6 destination address is a value of Segment list [1]. If the SL value is 0, a value of the IPv6 DA is a value of Segment list [0]. n is a positive integer or 0.

Figure 18:
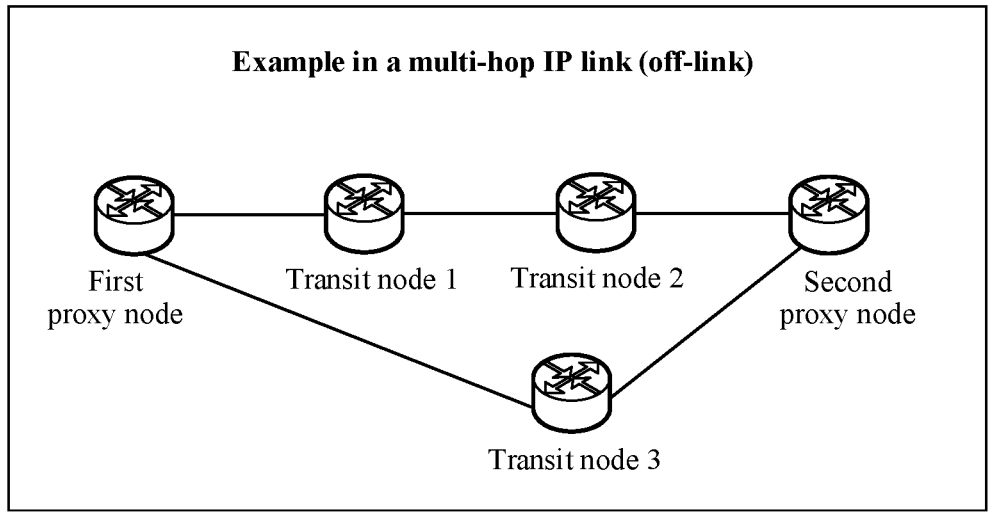
FIG. 18 is a diagram of a network topology between a first proxy node and a second proxy node according to an embodiment of this application.

Refer to FIG. 18. For example, if a transit node 1, a transit node 2, and a transit node 3 exist between the first proxy node and the second proxy node, the SRH of the second packet may include three SIDs: a SID 6 corresponding to the transit node 1, a SID 7 corresponding to the transit node 2, and the first bypass SID. In an embodiment, the target forwarding path may be specified as the first proxy node—the transit node 1—the transit node 2—the second proxy node.

Figure 19:
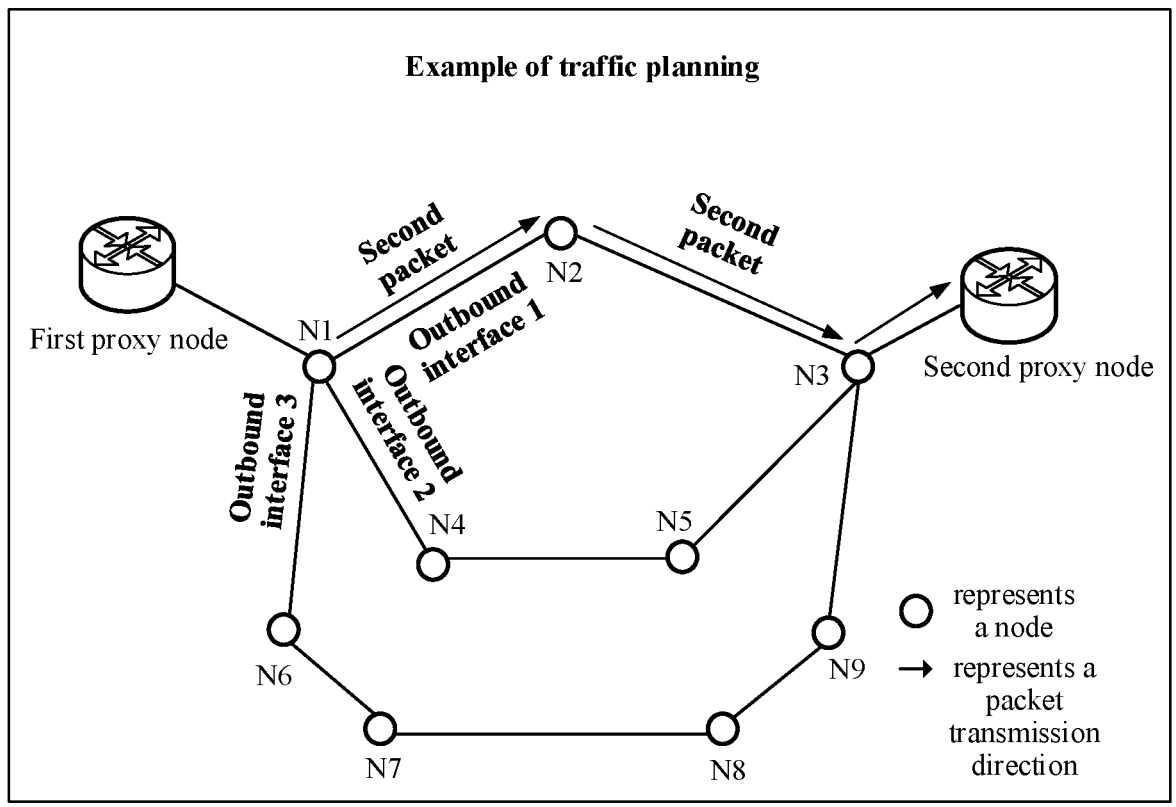
FIG. 19 is a schematic diagram of traffic planning according to an embodiment of this application.

It should be understood that it is not limited that the first proxy node must specify all transit nodes or an entire link on the forwarding path in an embodiment. The first proxy node may specify a part of the transit nodes on the forwarding path, and include a SID corresponding to the part of the transit nodes in the SRH of the second packet. Alternatively, the second proxy node may specify a part of the link on the forwarding path, and include a SID corresponding to the part of the link in the SRH of the second packet. Refer to FIG. 19. For example, the first proxy node may specify that the second packet is to pass through a node N2, and include a SID corresponding to the node N2 in the SRH of the second packet. In this case, among three forwarding paths (N1, N2, N3), (N1, N4, N5, N3), and (N1, N6, N7, N8, N9, N3) in FIG. 19, only the forwarding path (N1, N2, N3) passes through the node N2. Therefore, the target forwarding path of the second packet may be specified as (N1, N2, N3) by specifying that the second packet needs to be forwarded through the node N2 instead of by including a SID corresponding to a node N1 and a SID corresponding to a node N3 in the SRH of the second packet.

The SRH of the second packet carries SIDs indicating the forwarding path, so that the forwarding path of the second packet can be selected based on a service requirement, to control the second packet to be transmitted through the specified target forwarding path. This facilitates path planning and implements traffic optimization. Therefore, the implementation 2 may be applied to a scenario in which the first proxy node and the second proxy node are located on a multi-hop IP link and there is a service requirement for specifying a transit node to forward the second packet. The first proxy node may include the SID corresponding to the next SR node in the destination address, to indicate that the second packet needs to be forwarded from the local end to the SR node, so that the second packet is forwarded by the SR node to the second proxy node.

For example, FIG. 18 is a schematic diagram in which the first proxy node and the second proxy node are located on the multi-hop IP link, where transit nodes between the first proxy node and the second proxy node include the transit node 1, the transit node 2, and the transit node 3, and SR functions of the transit node 1, the transit node 2, and the transit node 3 are all enabled. When the first proxy node needs to specify that the second packet is to be forwarded by the transit node 3 to the second proxy node, the destination address of the second packet may carry a SID corresponding to the transit node 3. In this case, when receiving the second packet, the transit node 3 may look up a local SID table based on the destination address of the second packet, determine that the destination address of the second packet hits a SID in the local SID table, and perform an operation corresponding to the SID, for example, forward the second packet to the second proxy node.

It should be understood that a quantity of transit nodes between the first proxy node and the second proxy node may be set based on a networking requirement, and may be larger or smaller, for example, may be one or more. The quantity of transit nodes between the two proxy nodes in the multi-hop IP link scenario is not limited in this embodiment.

In some embodiments, when the SID of the next SR node is used as the destination address, the second packet may be implemented in a plurality of formats when the second packet carries the SRH.

Figure 14:
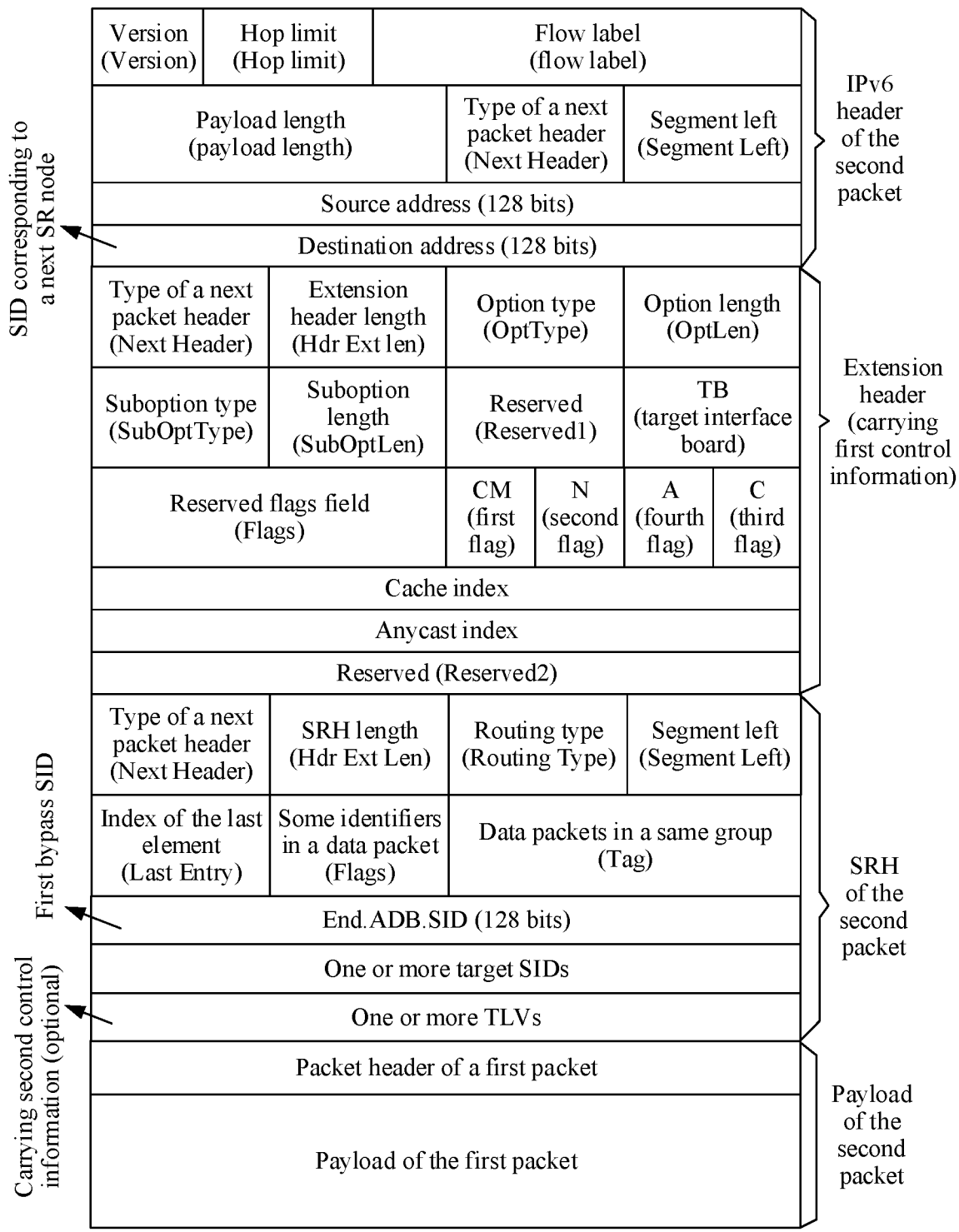
FIG. 14 is a schematic diagram of a second packet according to an embodiment of this application.

Refer to FIG. 14. For example, the second packet includes an IPv6 header, an extension header, the SRH, and the payload of the second packet, where the extension header includes the first control information.

Figure 15:
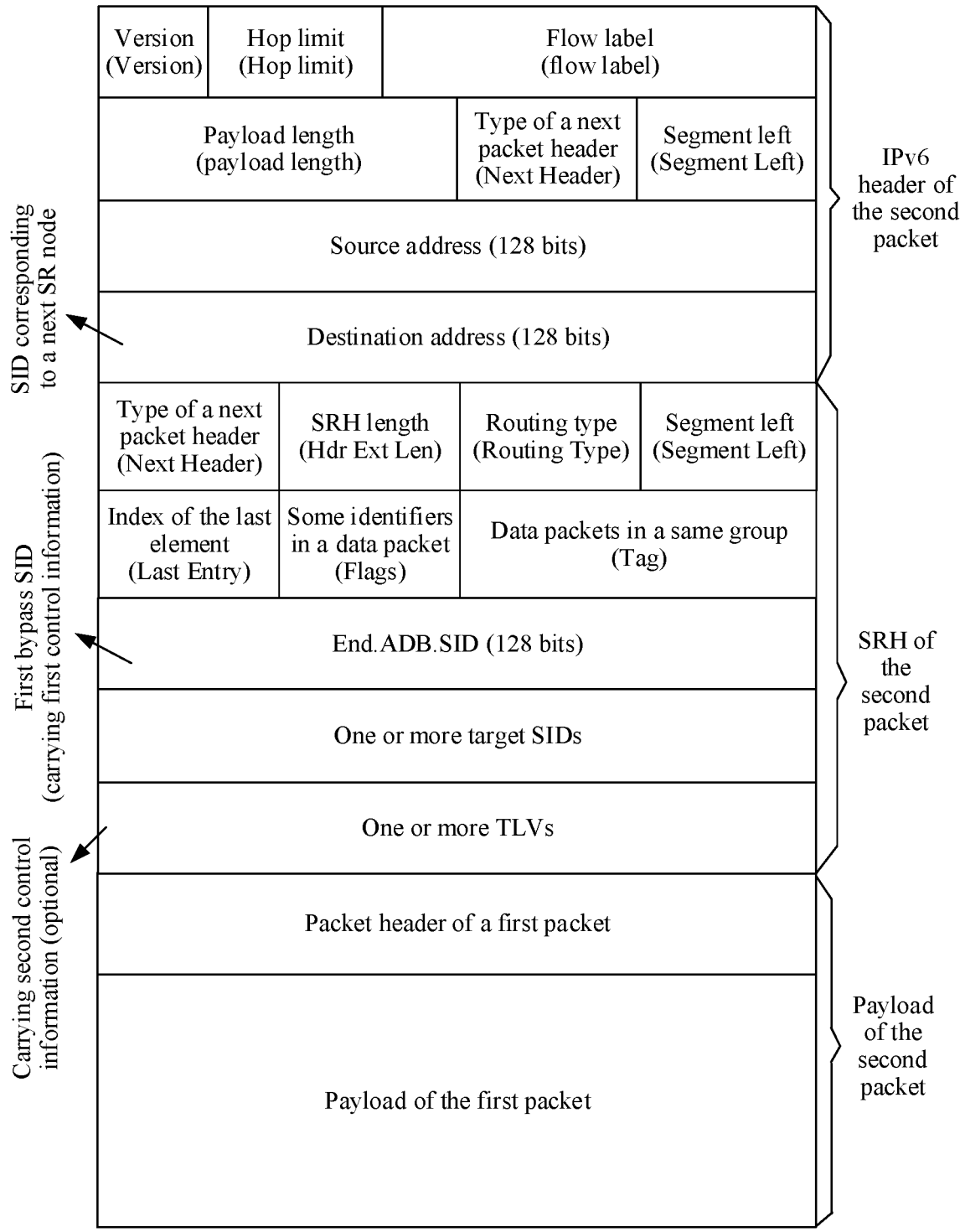
FIG. 15 is a schematic diagram of a second packet according to an embodiment of this application.

Refer to FIG. 15. For another example, the second packet may include an IPv6 header, the SRH, and the payload of the second packet, where the first bypass SID includes the first control information. In an embodiment, an extension header may be an optional part of the second packet. That is, for example, as shown in FIG. 15, the second packet may not include the extension header; or the extension header may be set in the second packet based on a requirement, to carry some information.

Figure 16:
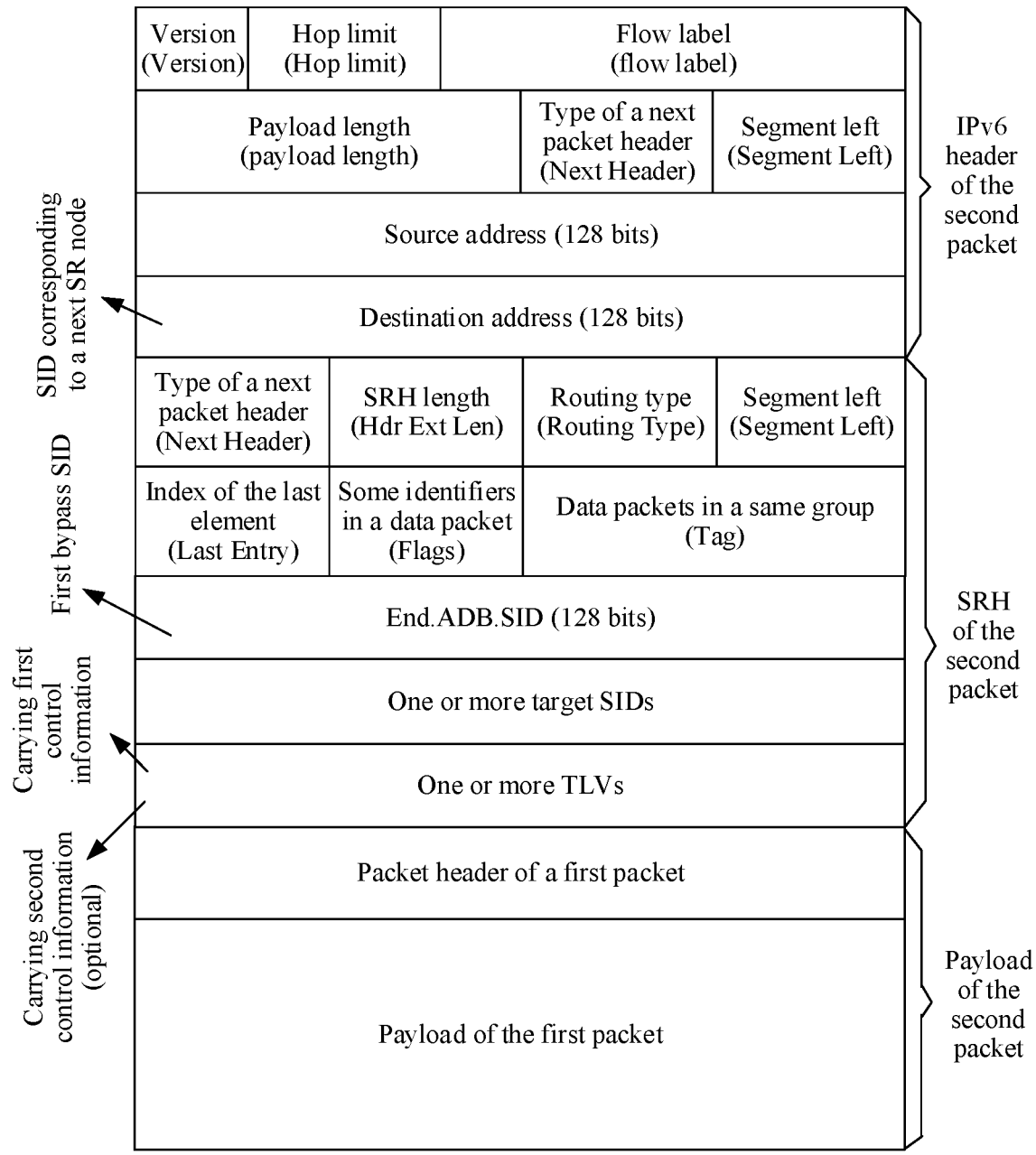
FIG. 16 is a schematic diagram of a second packet according to an embodiment of this application.

Refer to FIG. 16. For another example, the second packet may include an IPv6 header, the SRH, and the payload of the second packet, where a TLV in the SRH of the second packet may include the first control information. In an embodiment, an extension header may be an optional part of the second packet. That is, for example, as shown in FIG. 16, the second packet may not include the extension header; or the extension header may be set in the second packet based on a requirement, to carry some information.

Figure 17:
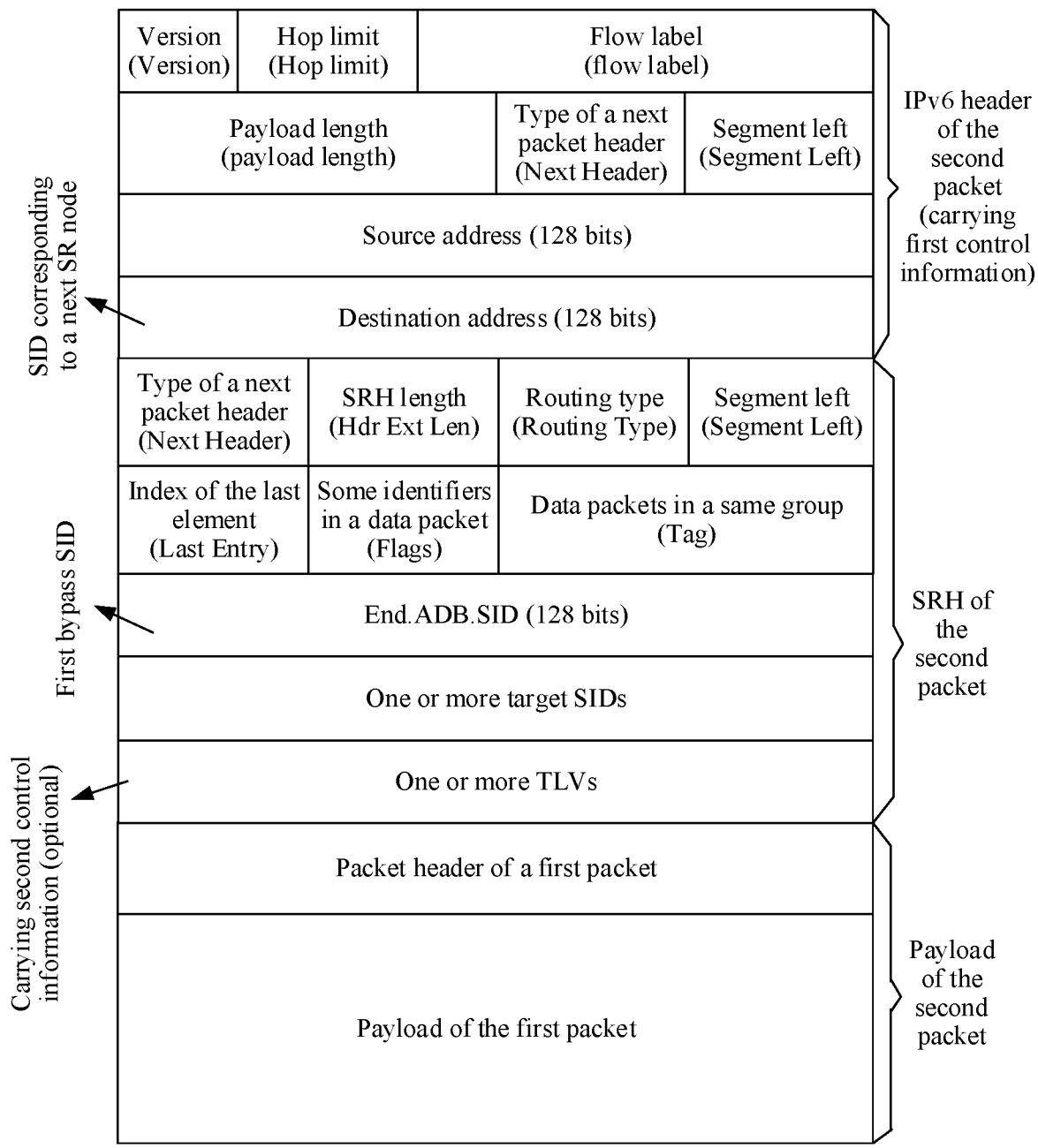
FIG. 17 is a schematic diagram of a second packet according to an embodiment of this application.

Refer to FIG. 17. For another example, the second packet may include an IPv6 header, the SRH, and the payload of the second packet, where the IPv6 header includes the first control information. That is, for example, as shown in FIG. 17, the second packet may not include an extension header; or an extension header may be set in the second packet based on a requirement, to carry some information. It should be understood that although FIG. 17 does not show a location of the first control information in the IPv6 header, the IPv6 header may carry the first control information in any idle location. This is not limited in this embodiment.

The first control information may be carried in any location in the second packet. For example, the location of the first control information may be in any one of the following (1) to (4).

(1) The first control information is carried in the extension header of the second packet.

The extension header may include two types: a hop-by-hop options header and a destination options header. According to a protocol, if a packet carries a routing header, a destination options header may be in two locations: In one case, the destination options header is in front of the routing header, and the extension header is parsed by a node specified in the routing header. In another case, the destination options header is behind the routing header, and the extension header is parsed by a final destination node of the packet.

In an embodiment, the extension header in the second packet may be the destination options header, the destination options header may be located in front of the SRH, and the first control information may be carried in the destination options header. In an embodiment, because the second packet includes the SRH corresponding to the first packet, and the SRH is a type of the routing header, the second proxy node specified in the SRH may parse the extension header, so that the second proxy node reads the first control information in the extension header, to restore the SRH based on the first control information.

FIG. 20 is a schematic diagram of an extension header according to an embodiment of this application. The extension header may include one or more of the following fields 1 to 16.

1. Type of a next packet header (next header): A packet may further include one or more extension headers or one or more higher-layer headers behind the extension header, and the next header is used to indicate a type of the extension header or the higher-layer header after the extension header in the packet. A length of the next header may be one byte.

2. Extension header length (Hdr Ext Len): used to indicate a length of the extension header. A length indicated by the Hdr Ext Len does not include the first eight bytes of the extension header, that is, the length indicated by the Hdr Ext Len is a length from the ninth byte to the last byte of the extension header. The Hdr Ext Len may be in a unit of eight bytes. A value of the Hdr Ext Len may be set to 2.

3. Option type (OptType): used to indicate a type of an option in the extension header. A length of the option type may be one byte. The option type may be a standardized experimental type, to implement interoperations between different vendors; or the option type may be an experimental option type. For example, a value of the experimental option type may be 0x1E, 0x3E, 0x5E, 0x7E, 0x9E, 0xBE, 0xDE, or 0xFE. As specified in a protocol, two most significant bits in the option type are used to define a processing action performed when an unidentified option is received, and a third most significant bit in the option type indicates whether data of the option is allowed to be modified during forwarding. In an embodiment, a value of the option type of the extension header may be set to 0x1E, and the two bits of the two highest-order digits in the option type are 00, indicating that if the option is received and not identified, the option is ignored and a remaining part of the packet continues to be processed. The third highest-order bit in the option type indicates that the data of the option is allowed to be modified during forwarding.
4. Option length (OptLen): used to indicate a length of the option in the extension header. For example, in FIG. 20, a length indicated by the OptLen may be a length from the first byte following the OptLen to the last byte of the option in the extension header. A value of the OptLen may be set to 20.
5. Suboption type (SubOptType): The option may be in a nested structure, and one option may include one or more suboptions. A value of the suboption type may be set to 1, and indicates that the suboption is used for information synchronization between two nodes that support an SRv6 SFC dynamic proxy operation, namely, SRH synchronization.
6. Suboption length (SubOptLen): used to indicate a length of a data part of the suboption. A length of the SubOptLen is one byte, and the SubOptLen may be in bytes. A value of the suboption length may be set to 20.
7. Reserved field (Reserved1): having a length of one byte. A transmit end may set a value of the reserved field to 0, and a receive end may ignore the reserved field.
8. Target board index (TB): a hardware index of a board for generating a cache entry, having a length of one byte. The TB may be set when an N-flag is set to 1. If the N-flag is a default value, the TB may be set to 0.
9. Flags field (flags): a reserved flags field that is currently undefined. A length of the flags field may be 28 bits. The transmit end may set a value of the reserved field to 0, and the receive end may ignore the reserved field.
10. First flag: used to identify whether an SRH hits a local cache entry, where the first flag may be denoted as a cache miss flag, a CM, or a CM-flag. A length of the first flag is one bit. If a value of the first flag is 0, it indicates that the SRH has hit the local cache entry. If a value of the first flag is 1, it indicates that the SRH misses the local cache entry. In a process of generating the second packet, the first proxy node may set the first flag to 1.
11. Second flag: used to identify whether an SF node associated with an End.AD SID is a NAT-type SF node, that is, whether the SF node modifies a flow identifier corresponding to the packet in a process of processing the packet. The second flag may be denoted as a NAT flag (network address translation flag), N, or an N-flag. A length of the second flag may be one bit. If the SF node associated with the End.AD SID is the NAT-type SF node, a value of the second flag may be set to 1. If the second flag is a default value, the second flag may be set to 0. If the value of the second flag is set to 1, the TB field and a Cache-Index field may be set.
12. Third flag: used to identify whether the packet is a packet obtained through copy, where the third flag may be denoted as a copy flag, C, or a C-flag. A length of the third flag may be one bit. If a value of the third flag is set to 1, it may indicate that the packet is a packet obtained through copy, and is usually a control packet, for example, a packet used to control a peer end to store an SRH in the following method embodiment, namely, a fifth packet. If a value of the third flag is set to 0, it may indicate that the packet is not a packet obtained through copy, and is usually a data packet.
13. Fourth flag: used to identify whether the packet is an acknowledge packet, where the fourth flag may be denoted as an Acknowledge-flag, A, or an A-flag. A length of the fourth flag may be one bit. If a value of the fourth flag is set to 1, it may indicate that the packet is an acknowledge packet, for example, a packet indicating acknowledgment of receiving of the packet used to control a peer end to store an SRH in the following method embodiment. If a value of the fourth flag is set to 0, it may indicate that the packet is not an acknowledge packet.
14. Cache index: used to carry an identifier of the cache entry. A length of the cache index is four bytes. The cache index may be set when the second flag is set to 1. If the second flag is a default value, the cache index may be set to 0.
15. Anycast index: an index that uniquely corresponds to an anycast End.AD SID, having a length of four bytes. The receive end may check the any cast index in the packet.
16. Reserved field (Reserved2): having a length of four bytes. According to a requirement in a standard, the transmit end must (MUST) set a value of the reserved field to 0, and the receive end should (SHOULD) ignore the reserved field.

(2) The first control information is carried in the first bypass SID.

Figure 21:
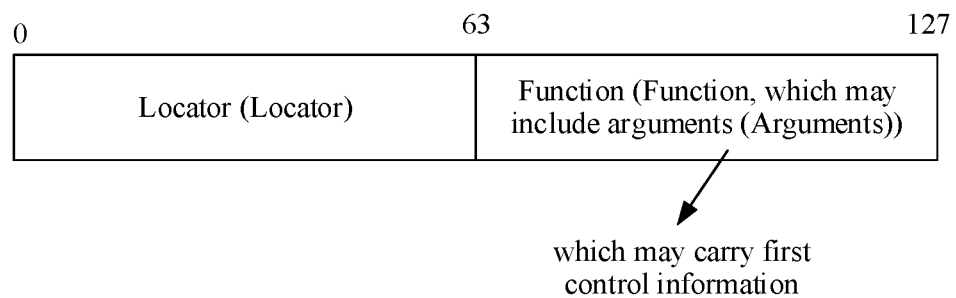
FIG. 21 is a schematic diagram of a bypass SID according to an embodiment of this application.

FIG. 21 is a schematic diagram in which a bypass SID carries first control information according to an embodiment of this application. The bypass SID may include one or more of location information (Locator), function information (Function), or arguments information (Arguments), and the first control information may be carried in function information of the first bypass SID, or may be carried in arguments information of the first bypass SID. The arguments information may be included in the function information. In an embodiment, the peer proxy node may be controlled by using the bypass SID to store the SRH. In this way, a byte additionally occupied by the first control information in the packet is reduced, so that a data amount of the packet is reduced, and therefore overheads for transmitting the packet are reduced.

(3) The first control information is carried in the IP header of the second packet.

For example, the first control information may be carried in the IPv6 header of the second packet. The first control information may be carried in a part other than the first bypass SID in the IPv6 header. In addition, if the payload of the second packet is an IPv6 packet, that is, the second packet is in a form similar to that of an IP in IP packet, and includes an outer IPv6 header and an inner IPv6 header, the first control information may be carried in the outer IPv6 header.

(4) The first control information is carried in the TLV in the SRH of the second packet.

The SRH of the second packet may include one or more TLVs, and the first control information may be carried in the TLV. In an embodiment, the second proxy node may be controlled by using the SRH to store the SRH. In this way, a byte additionally occupied by the first control information in the packet is reduced, so that a data amount of the packet is reduced, and therefore overheads for transmitting the packet are reduced.

In an embodiment, the second packet may further include second control information. The second control information is used to indicate a forwarding node to check validity of the second packet. For example, after receiving the second packet, the forwarding node may obtain the second control information from the second packet, and check the second control information. If the second control information is successfully checked, the forwarding node determines that the second packet is valid, and continues to forward the second packet. If the second control information fails to be checked, the forwarding node determines that the second packet is invalid, and discards the second packet. In an embodiment, security of transmitting the second packet can be improved. It should be noted that validity check is an example used to describe a function of the second control information. In some other embodiments, the second control information is used to indicate the transit node between the first proxy node and the second proxy node to process the second packet in another manner. For example, the second control information may be an identifier of a function of the forwarding node. After identifying the second control information, the forwarding node performs an operation corresponding to the function. For another example, the second control information may alternatively be an input parameter required for performing an operation. After identifying the second control information, the forwarding node processes the second packet based on the second control information. The second packet carries the second control information, so that in a process in which the second packet is forwarded between the first proxy node and the second proxy node, the second control information in the second packet can be used to indicate the intermediate forwarding node to perform a specified function or process the packet. This facilitates network function expansion and improves flexibility.

Alternatively, the second control information may be carried in any location in the second packet. For example, the location of the first control information may be in either of the following (1) and (2).

(1) The second control information is carried in the TLV in the SRH of the second packet. If the TLV in the SRH of the second packet further carries the first control information that indicates a peer end to restore the SRH, the second control information and the first control information may be in different locations. For example, the SRH of the second packet may include a first TLV and a second TLV, the first control information is located in the first TLV, and the second control information is located in the second TLV. The first TLV and the second TLV may be in a parallel relationship, or may be in a nested relationship. For example, the first TLV and the second TLV are TLVs at a same level. Alternatively, one of the first TLV and the second TLV is a parent TLV, and the other is a child TLV. Certainly, the first control information and the second control information may alternatively be located in a same TLV, for example, located in different fields of the same TLV.

(2) The second control information is carried in the IP header of the second packet. For example, the second control information may be carried in the outer IPv6 header of the second packet. The second control information and the first control information may be carried in different locations in the IPv6 header.

The second packet may be generated in a plurality of implementations. For example, with reference to FIG. 22, FIG. 23, FIG. 24, and FIG. 25, the following uses an implementation 1 and an implementation 2 as examples for description.

Implementation 1: Refer to FIG. 22, FIG. 23, FIG. 24, and FIG. 25. The first proxy node may generate a new IP header, and add the generated IP header to the first packet. For example, the implementation 1 may include the following operation 1 and operation 2.

Operation 1: The first proxy node generates the IP header of the second packet.

The IP header generated by the first proxy node may be an IPv6 header. A destination address of the IP header may be the first bypass SID, or may be the SID corresponding to the next SR node. A source address of the IP header may be the second bypass SID corresponding to the first proxy node, or may be other information that can identify the first proxy node. Alternatively, a source address of the IP header may be a default address.

Operation 2: The first proxy node encapsulates the IP header of the second packet into the first packet.

The first proxy node may perform a push operation to add the IP header to the first packet, to obtain a packet including the first packet and the IP header, where the packet is the second packet. An IP header encapsulation operation may be similar to a tunnel header encapsulation operation.

Figure 22:
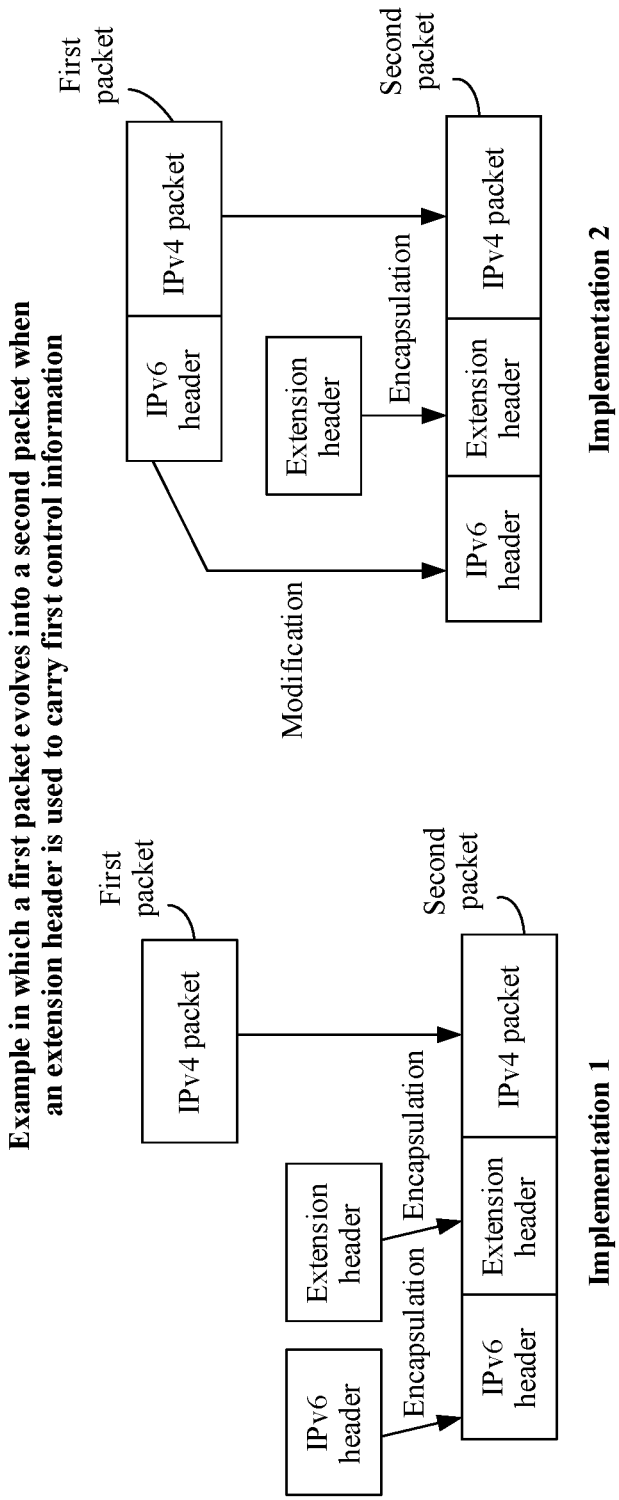
FIG. 22 is a schematic diagram in which a first packet evolves into a second packet according to an embodiment of this application.

Refer to FIG. 22. In an embodiment, if the extension header is used to carry the first control information, the first proxy node may not only perform operation 1 and operation 2, but also perform the following operation 3.

Operation 3: The first proxy node generates the extension header, and encapsulates the extension header into the first packet.

It should be understood that this embodiment is described only by using an example in which operation 2 is first described and then operation 3 is described. A time sequence of operation 2 and operation 3 is not limited in this embodiment, that is, a sequence of encapsulating the extension header and the IP header is not limited. In an embodiment, the three operations may alternatively be performed in another sequence. For example, operation 3 is first performed and then operation 2 is performed. Certainly, the two operations may alternatively be performed in parallel, that is, operation 2 and operation 3 may be performed simultaneously.

It can be learned from FIG. 22 that, two pieces of information, namely, the IPv6 header used to transmit the packet to the second proxy node and the extension header used to carry the control information, may be added to the first packet. The second packet may be obtained through such simple operations.

The second packet is generated in an embodiment, to achieve at least the following effects: The received first packet is re-encapsulated by adding the IPv6 header and the extension header, to obtain the second packet. Compared with a manner of regenerating an entire packet, this manner is simple in processing operations. Therefore, a packet generation process may be performed by a data plane (for example, a forwarding chip) of the proxy node without depending on a control plane (for example, a CPU) of the proxy node. This saves processing resources of the CPU. Because the forwarding chip can independently perform a packet generation task and a packet forwarding task, interaction between the forwarding chip and the CPU is reduced, so that processing resources required for the interaction between the forwarding chip and the CPU are saved. Therefore, forwarding performance of the forwarding chip is improved. By experiment, the foregoing packet generation logic is configured for microcode of the forwarding chip, so that the forwarding chip can perform operation 503. Therefore, this manner supports a microcode architecture and has strong practicality.

Figure 23:
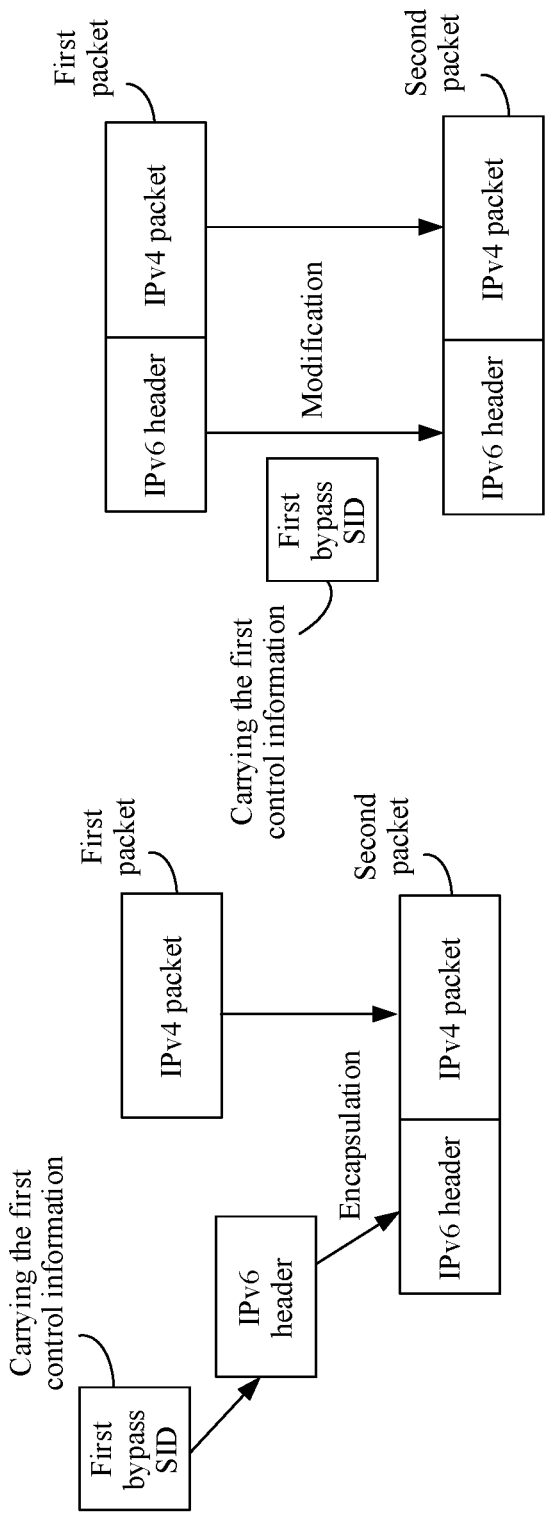
FIG. 23 is a schematic diagram in which a first packet evolves into a second packet according to an embodiment of this application.
Figure 24:
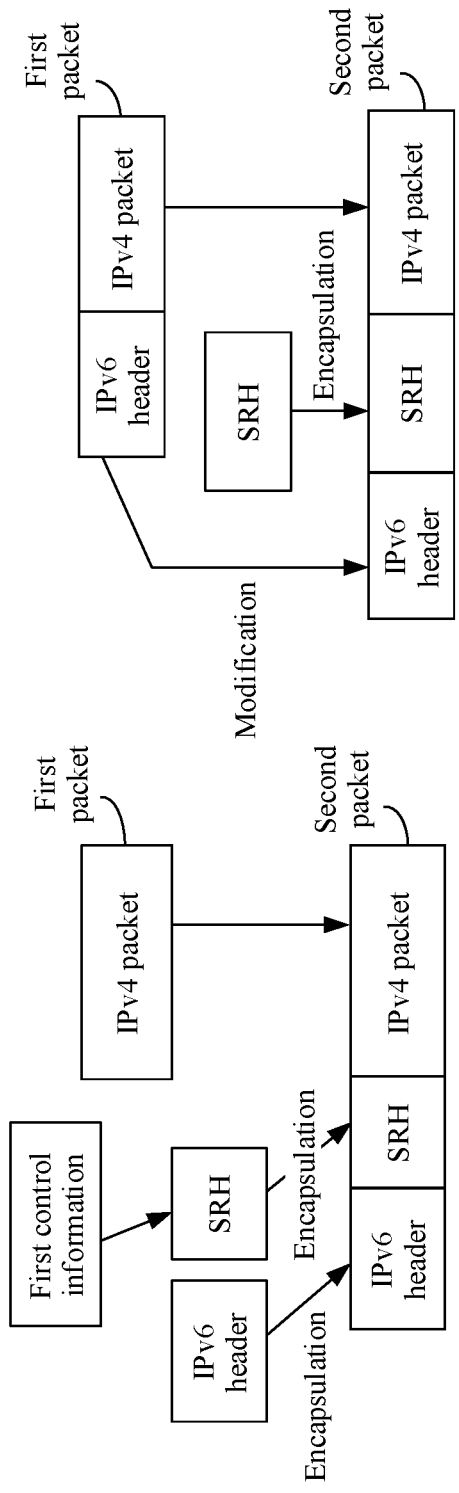
FIG. 24 is a schematic diagram in which a first packet evolves into a second packet according to an embodiment of this application.
Figure 25:
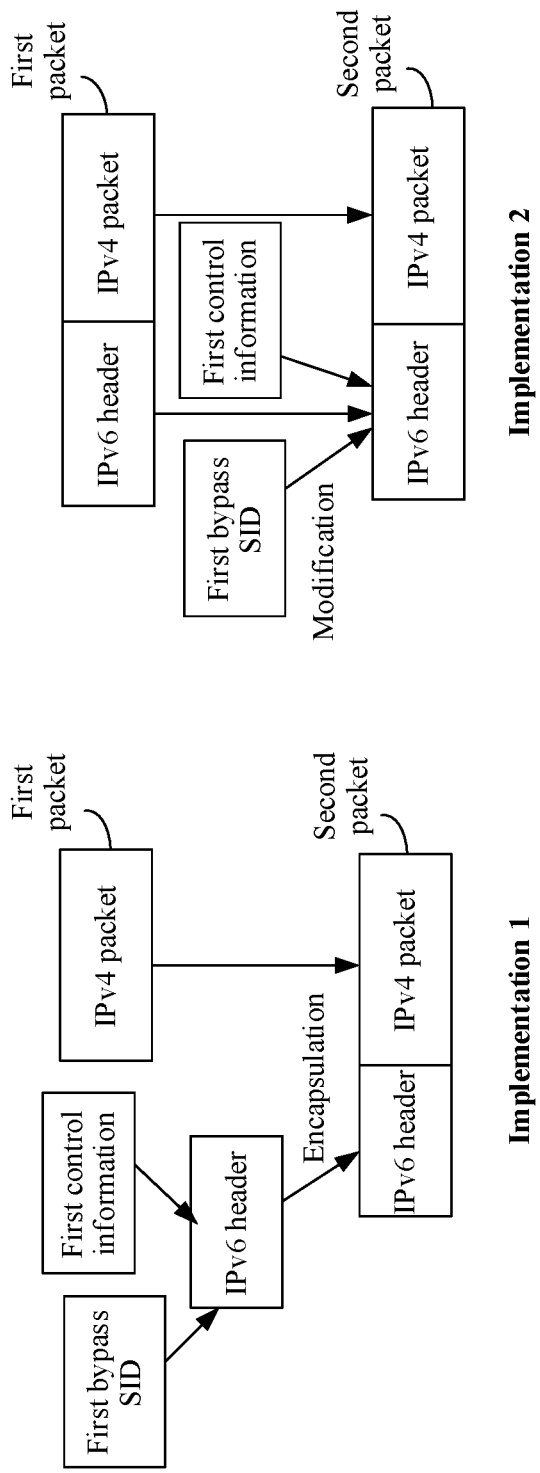
FIG. 25 is a schematic diagram in which a first packet evolves into a second packet according to an embodiment of this application.

It should be understood that extension header encapsulation is an optional manner. Refer to FIG. 23. In some other embodiments, the first control information may be carried in the first bypass SID in the generated IPv6 header, and the IPv6 header is encapsulated. Refer to FIG. 24. The first control information may be carried in the TLV in the generated SRH, and the IPv6 header and the SRH are encapsulated. Refer to FIG. 25. The first control information may be carried in the generated IPv6 header, and the IPv6 header is encapsulated. In these several examples, the extension header may not be encapsulated, or the extension header may be encapsulated based on a requirement, to carry some required information.

In an embodiment, although not shown in the figure, if the transmission tunnel is established between the first proxy node and the SF node, the first packet may further include the tunnel header corresponding to the transmission tunnel. In this case, the first proxy node may not only perform operation 1 and operation 2, but also perform the following operation 4; or the first proxy node may not only perform operation 1, operation 2, and operation 3, but also perform the following operation 4.

Operation 4: The first proxy node strips the tunnel header of the first packet.

It should be understood that a time sequence of operation 4 and operations 1, 2, and 3 is not limited in this embodiment either. For example, operation 4 may be performed before operations 1, 2, and 3. For another example, operation 4 may be performed at a moment among operations 1, 2, and 3.

Implementation 2: Refer to FIG. 22, FIG. 23, FIG. 24, and FIG. 25. The first proxy node may modify an original IP header of the first packet, so that the IP header of the first packet is updated to the IP header of the second packet. For example, the first proxy node may update the IP header of the first packet to the IP header of the second packet. For example, the first proxy node may modify a destination address in the IP header of the first packet to the first bypass SID. For another example, the first proxy node may modify a destination address in the IP header of the first packet to the SID corresponding to the next SR node. For another example, the first proxy node may modify a source address in the IP header of the first packet to the second bypass SID corresponding to the first proxy node. For another example, the first proxy node may modify a source address in the IP header of the first packet to other information that can identify the first proxy node.

Refer to FIG. 22. In an embodiment, if the extension header is used to carry the first control information, the first proxy node may not only perform an operation of updating the IP header of the first packet, but also generate the extension header, and encapsulate the extension header into the first packet. It should be understood that a time sequence of the two operations of updating the IP header and generating the extension header is not limited in the implementation 2.

In an embodiment, although not shown in the figure, if the transmission tunnel is established between the first proxy node and the SF node, the first packet may further include the tunnel header corresponding to the transmission tunnel. In this case, the first proxy node may not only perform the operation of updating the IP header of the first packet, but also strip the tunnel header of the first packet. It should be understood that a time sequence of the two operations of updating the IP header and stripping the tunnel header is not limited in the implementation 2.

Operation 504: The first proxy node sends the second packet to the second proxy node.

The forwarding path used by the first proxy node to send the second packet may include one or both of the following forwarding path 1 and forwarding path 2.

Forwarding path 1: The second packet is sent through a peer link.

Refer to FIG. 3. The peer link between the first proxy node and the second proxy node may be a first link, the first proxy node may send the second packet through the first link, and the second proxy node may receive the second packet through the first link.

A process of transmitting the second packet through the peer link may include the following operation 1.1 and operation 1.2.

Operation 1.1: The first proxy node sends the second packet to the second proxy node through a first outbound interface corresponding to the first link.

The first outbound interface is an outbound interface that is in the first proxy node and that corresponds to the first link. The first proxy node may receive a configuration instruction in advance, where the configuration instruction is used to indicate a correspondence between the first link and the first outbound interface. The first proxy node may obtain the correspondence between the first link and the first outbound interface from the configuration instruction, and store the correspondence between the first link and the first outbound interface in a routing entry. After generating the second packet, the first proxy node may select the first outbound interface corresponding to the first link, and send the second packet through the first outbound interface, so that the second packet is transmitted to the second proxy node through the first link. For example, the first proxy node may receive the following configuration instruction:

[proxy1] segment-routing ipv6

[proxy1—segment-routing-ipv6] service-chain peer-link Ethernet2/0/0 next-hop FE80::1

In the foregoing configuration instruction, proxy1 indicates the first proxy node, the first line of the configuration instruction means that IPv6 SR needs to be configured, and the second line of the configuration instruction means that an outbound interface corresponding to the peer link in a service function chain is an Ethernet interface at a slot 2, a board 0, and a port 0, and a next hop is FE80::1.

Operation 1.2: The second proxy node receives the second packet from the first proxy node through a first inbound interface corresponding to the first link.

The first inbound interface is an inbound interface that is in the second proxy node and that corresponds to the first link. The second packet may arrive at the first inbound interface of the second proxy node through the first link, and enter the second proxy node through the first inbound interface.

In an embodiment, the first proxy node may implement the forwarding path 1 by specifying an outbound interface. For example, the outbound interface of the second packet may be specified as the first outbound interface. Therefore, when needing to send the second packet, the first proxy node sends the second packet through the first outbound interface by default. Alternatively, the first proxy node may implement the forwarding path 1 by specifying a next hop. For example, the next hop of the first proxy node may be specified as the second proxy node. Therefore, when needing to send the second packet, the first proxy node uses the second proxy node as the next hop by default, and sends the second packet through the first outbound interface.

Forwarding path 2: The router node performs forwarding.

Refer to FIG. 3. A process with forwarding by the router node may include the following operations 2.1 to 2.3.

Operation 2.1: The first proxy node sends the second packet to the router node through a second outbound interface corresponding to a second link.

The second outbound interface is an outbound interface that is in the first proxy node and that corresponds to the second link. The first proxy node may receive a configuration instruction in advance, where the configuration instruction is used to indicate a correspondence between the second link and the second outbound interface. The first proxy node may obtain the correspondence between the second link and the second outbound interface from the configuration instruction, and store the correspondence between the second link and the second outbound interface in a routing entry. After generating the second packet, the first proxy node may select the second outbound interface corresponding to the second link, and send the second packet through the second outbound interface, so that the second packet is transmitted to the second proxy node through the second link.

Operation 2.2: The router node forwards the second packet to the second proxy node through a third link.

Operation 2.3: The second proxy node receives the second packet from the router node through a second inbound interface corresponding to the third link.

The second inbound interface is an inbound interface that is in the second proxy node and that corresponds to the third link. The second packet may arrive at the second inbound interface of the second proxy node through the third link, and enter the second proxy node through the second inbound interface.

In an embodiment, the first proxy node may preferentially transmit the second packet on the forwarding path 1. In an embodiment, the forwarding path 1 may be preferentially used through the following operation (1) to operation (3).

Operation (1): The first proxy node detects a status of the first link; and if the first link is in an available state, the first proxy node performs operation (2); or if the first link is in an unavailable state, the first proxy node performs operation (3).

The first proxy node may detect whether the first link has been deployed and whether a state of the first outbound interface is up. If the first link has been deployed and the state of the first outbound interface is up, the first proxy node determines that the first link is in the available state. If the first link is not deployed or the state of the first outbound interface is down, the first proxy node determines that the first link is in the unavailable state.

Operation (2): The first proxy node sends the second packet to the second proxy node through the first outbound interface corresponding to the first link.

Operation (3): The first proxy node sends the second packet to the router node through the second outbound interface corresponding to the second link.

The forwarding path 1 is preferentially used, so that the second packet is preferentially transmitted to the second proxy node through the peer link. In this case, because the forwarding path 1 is shorter than the forwarding path 2, the forwarding path 1 passes through fewer nodes than the forwarding path 2. In this way, a delay of transmitting the second packet can be reduced.

Operation 505: The second proxy node receives the second packet from the first proxy node, and determines that the first control information indicates the second proxy node to restore the SRH corresponding to the first packet.

A process of transmitting the second packet between the first proxy node and the second proxy node may be performed in a plurality of implementations based on different networking. The following uses an implementation 1 and an implementation 2 as examples for description.

Implementation 1: If the first proxy node and the second proxy node are located on the one-hop IP link, after the first proxy node sends the second packet through the outbound interface, the second packet may arrive at the inbound interface of the second proxy node through the link between the first proxy node and the second proxy node. The second proxy node may receive the second packet through the inbound interface.

Implementation 2: If the first proxy node and the second proxy node are located on the multi-hop IP link, after the first proxy node sends the second packet through the outbound interface, the second packet may arrive at an inbound interface of the next node through a link between the first proxy node and the next node. The next node may receive the second packet through the inbound interface, and send the second packet through an outbound interface, until the second packet arrives at the inbound interface of the second proxy node. In this case, the second proxy node receives the second packet through the inbound interface.

In a process in which the transit node between the first proxy node and the second proxy node forwards the packet, the forwarding node may identify the destination address in the IPv6 header of the second packet, and look up a local SID table based on the destination address. When the destination address matches a target SID in the local SID table, the transit node performs an operation corresponding to the target SID, for example, selects an outbound interface corresponding to the target SID, and forwards the second packet to a next transit node through the outbound interface. In addition, the transit node may decrease the SL in the SRH of the second packet by 1, and update the destination address in the IPv6 header of the second packet to a SID corresponding to the SL decreased by 1. For example, after receiving the second packet, the transit node 1 updates the destination address from the SID 6 to the SID 7, and updates the SL from 6 to 5. After receiving the second packet, the transit node 2 updates the destination address from the SID 7 to a SID 8, and updates the SL from 5 to 4. After receiving the second packet, the transit node 3 updates the destination address from the SID 8 to a SID 5, and updates the SL from 4 to 3.

For an action performed on the second packet, the first proxy node may read the destination address of the second packet, and look up the local SID table based on the destination address of the second packet, to determine whether the destination address matches a SID in the local SID table. When the destination address matches the first bypass SID in the local SID table, in other words, the destination address hits the first bypass SID in the local SID table, the first proxy node may determine that the second packet is an SRv6 packet, and perform an operation corresponding to the first bypass SID. The operation corresponding to the first bypass SID may include: detecting whether the second packet includes the first control information; and if the second packet includes the first control information, determining to restore the SRH corresponding to the first packet, and performing operation 506 to operation 508.

Operation 506: The second proxy node looks up the cache of the second proxy node based on the second packet, to obtain the SRH corresponding to the first packet.

In an embodiment, the SRH lookup manner may include any one of the following lookup manner 1 to lookup manner 3:

Lookup manner 1: The second proxy node may obtain a flow identifier corresponding to the first packet based on the second packet, and look up the cache by using the flow identifier corresponding to the first packet as an index, to obtain the SRH corresponding to the first packet. A flow identifier corresponding to the second packet may be the flow identifier corresponding to the first packet.

Lookup manner 2: The second proxy node may obtain an identifier of a second cache entry based on the second packet, and look up the cache by using the identifier of the second cache entry as an index, to obtain the SRH corresponding to the first packet. The second packet may include the identifier of the second cache entry. For this lookup manner, refer to the following embodiment shown in FIG. 47A and FIG. 47B. Alternatively, the second packet may include an identifier of a first cache entry, and the identifier of the first cache entry may be mapped to the identifier of the second cache entry. For this lookup manner, refer to the following embodiment shown in FIG. 49A to FIG. 49C.

Lookup manner 3: The second proxy node may obtain a flow identifier corresponding to the second packet and a VPN identifier based on the second packet, and look up the cache based on the flow identifier corresponding to the second packet, the VPN identifier, and the End. AD SID, to obtain the SRH corresponding to the first packet, where the flow identifier corresponding to the second packet may be a flow identifier corresponding to the first packet, the second packet may include the VPN identifier, and the VPN identifier may be mapped to the End.AD SID. For this lookup manner, refer to the following embodiment shown in FIG. 51A and FIG. 51B.

Operation 507: The second proxy node generates a third packet based on the second packet and the SRH corresponding to the first packet.

Figure 26:
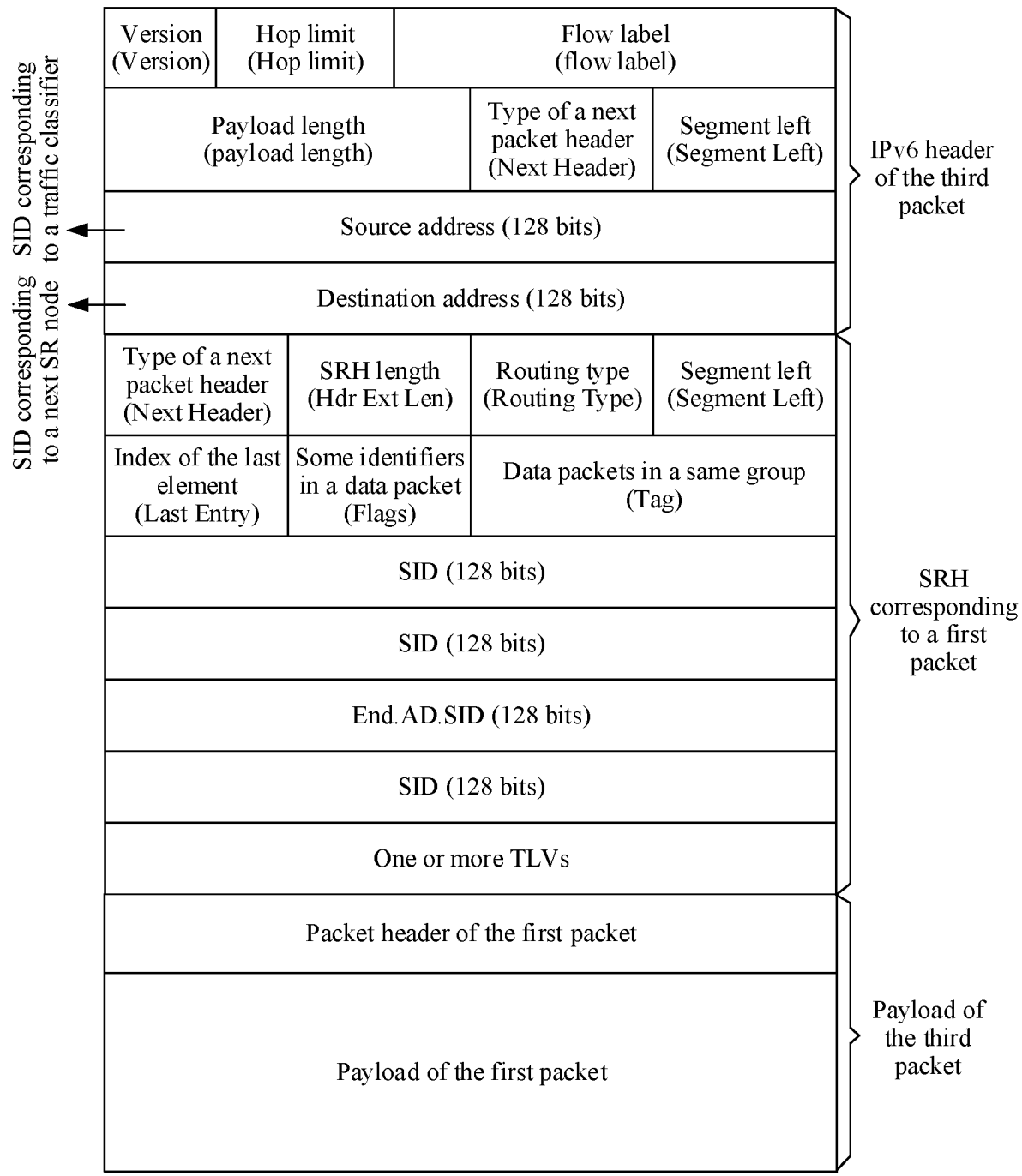
FIG. 26 is a schematic diagram of a third packet according to an embodiment of this application.

The third packet is a packet whose SRH has been restored. A format of the third packet may be that shown in FIG. 26, and the third packet may be an SRv6 packet. The third packet may include an IPv6 header, the SRH corresponding to the first packet, and the payload of the first packet. The IPv6 header may include a source address and a destination address, the SRH may include a segment list, an SL, and one or more TLVs, and the segment list may include one or more SIDs. It should be understood that FIG. 26 is merely a schematic diagram of the third packet. In an embodiment of the application, a quantity of fields and a quantity of types of the fields in the third packet may be greater than those shown in FIG. 26, or less than those shown in FIG. 26. In addition, a location and a length of each field in the third packet shown in FIG. 26 may be adaptively changed based on an actual requirement. The location and the length of each field in the packet are not limited in this embodiment.

Figure 27:
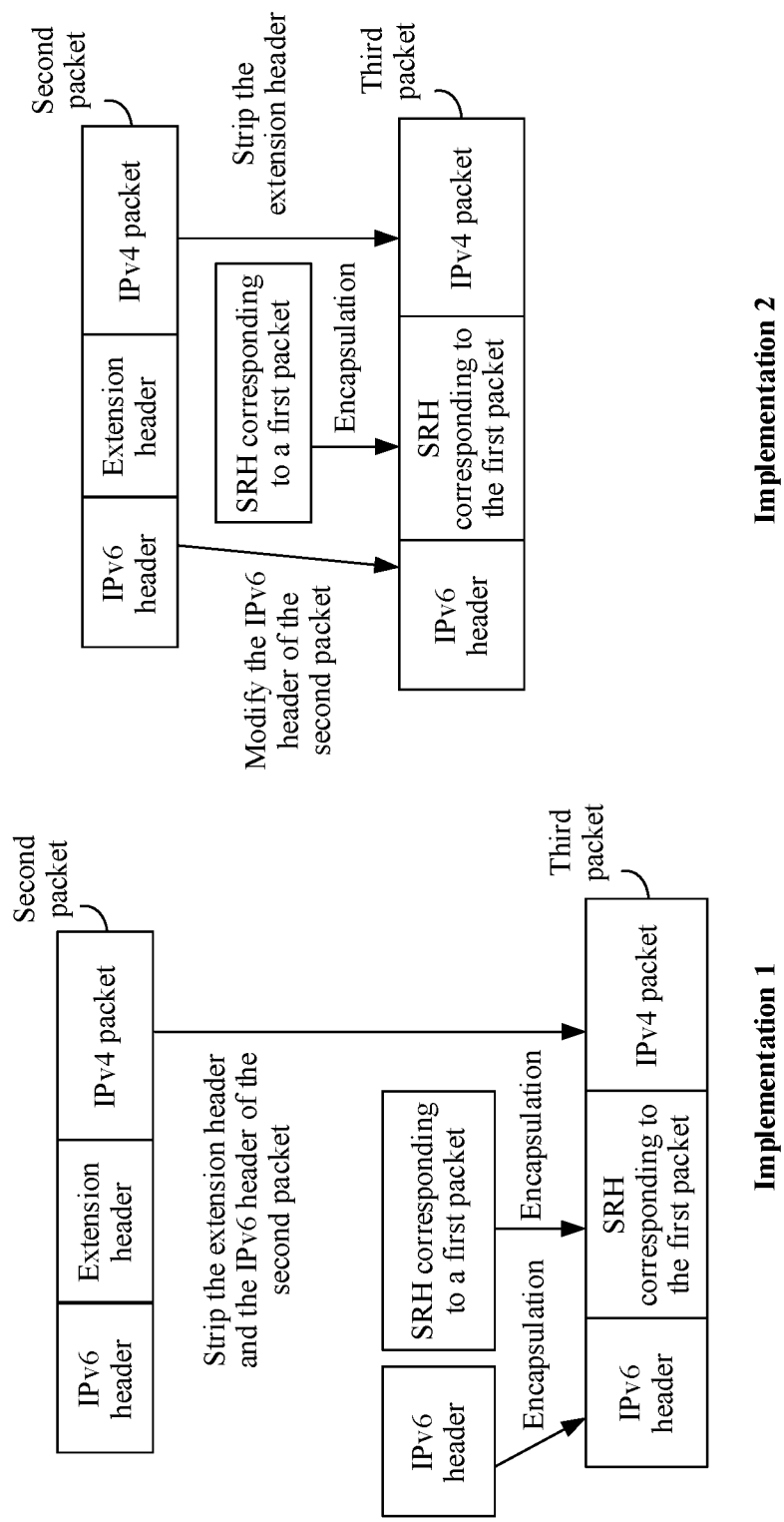
FIG. 27 is a schematic diagram in which a second packet evolves into a third packet according to an embodiment of this application.
Figure 28:
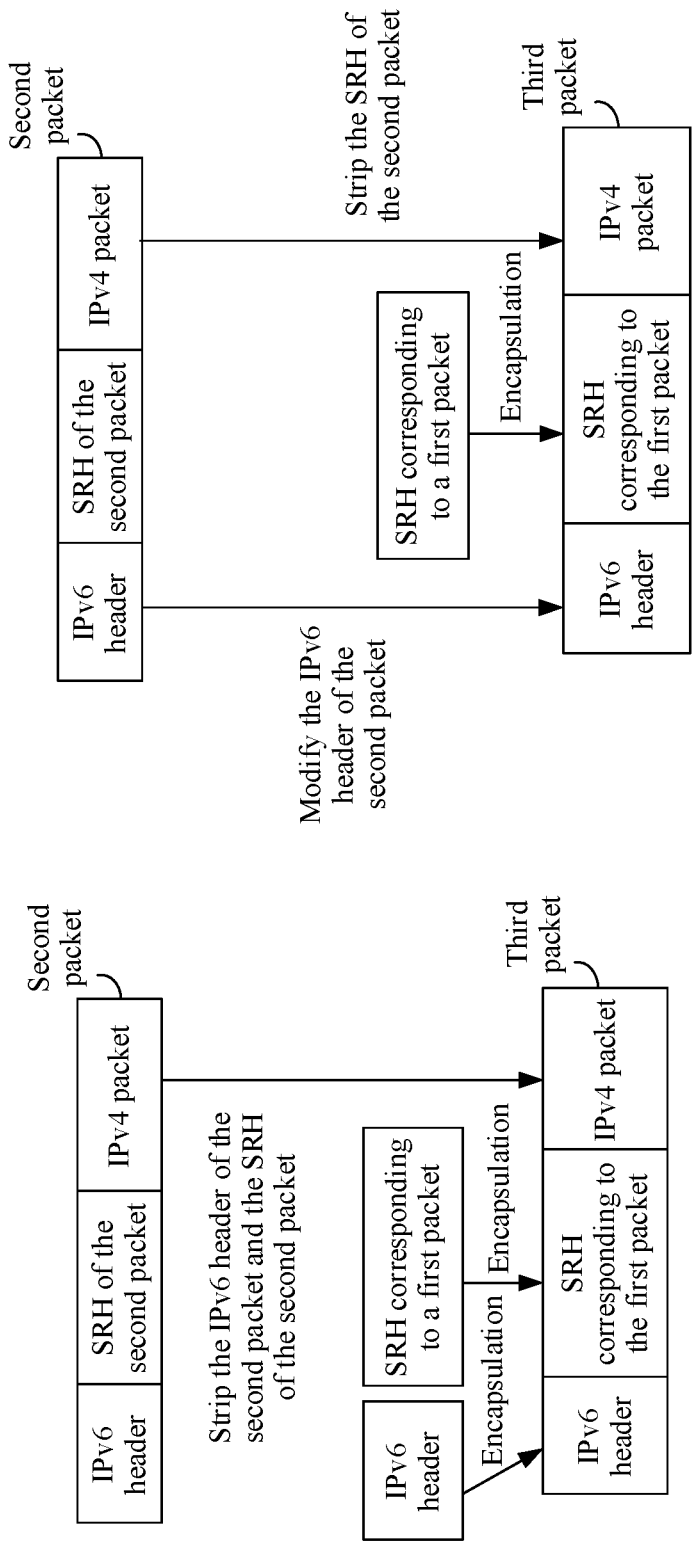
FIG. 28 is a schematic diagram in which a second packet evolves into a third packet according to an embodiment of this application.

In an embodiment, the third packet may be generated in a plurality of implementations. With reference to FIG. 26, FIG. 27, and FIG. 28, the following uses an implementation 1 and an implementation 2 as examples for description.

Implementation 1: In a process of generating the third packet, the second proxy node may strip the original IP header of the second packet. For example, the process of generating the third packet may include the following operation 1 and operation 2.

Operation 1: The second proxy node strips the IP header of the second packet from the second packet.

In an embodiment, the second proxy node may pop the IP header of the second packet by performing a pop operation in SR, to strip the IP header, so that the IP header previously encapsulated or modified by the first proxy node is removed from the second packet.

It should be noted that the second packet may include a plurality of IP headers, and the IP header that may be stripped by the second proxy node may be the outer IP header of the second packet, namely, an IP header that is of the second packet and that is used for route-based forwarding of the second packet. In an embodiment, the second proxy node may not strip an inner IP header of the second packet, and the inner IP header of the second packet may be the IP header of the first packet. For example, when the first packet is an IPv6 packet, the second proxy node may strip the outer IPv6 header without stripping the inner IPv6 header. When the first packet is an IPv4 packet, the second proxy node may strip the outer IPv6 header without stripping the inner IPv4 header. The outer IP header is stripped, and the inner IP header is retained, so that the original IP header of the first packet can be retained, and route-based forwarding are performed by using the original IP header.

In addition, in an embodiment, the second proxy node may further encapsulate the IPv6 header of the third packet. The IPv6 header of the third packet may be the IPv6 header corresponding to the first packet. The destination address in the IPv6 header of the third packet may be a SID corresponding to a next SR node of the second proxy node. The source address in the IPv6 header of the third packet may be a SID corresponding to a traffic classifier or a SID corresponding to a head-end node in an SR network, or the source address in the IPv6 header of the third packet may be a default address.

The IPv6 header corresponding to the first packet may be pre-stored on the second proxy node. For example, the IPv6 header corresponding to the first packet and the SRH corresponding to the first packet may be stored in an associated manner, for example, stored in a same cache entry. In this case, during cache lookup, the second proxy node may find the IPv6 header corresponding to the first packet and the SRH corresponding to the first packet. The second proxy node not only encapsulates the IPv6 header corresponding to the first packet, but also encapsulates the SRH corresponding to the first packet, so that the IPv6 header of the third packet is the IPv6 header corresponding to the first packet.

Refer to FIG. 27. In an embodiment, if the first proxy node further encapsulates the extension header, the second proxy node may not only strip the IP header, but also strip the extension header encapsulated by the first proxy node. The first proxy node may first strip the IP header and then strip the extension header, may first strip the extension header and then strip the IP header, or may simultaneously strip the IP header and the extension header. A time sequence of stripping the IP header and stripping the extension header is not limited in this embodiment.

Refer to FIG. 28. In an embodiment, if the first proxy node further encapsulates the SRH of the second packet, the second proxy node may not only strip the IP header, but also strip the SRH of the second packet. The second proxy node may first strip the IP header of the second packet and then strip the SRH of the second packet, may first strip the SRH of the second packet and then strip the IP header, or may simultaneously strip the IP header and the extension header. A time sequence of stripping the IP header and stripping the SRH of the second packet is not limited in this embodiment.

Figure 29:
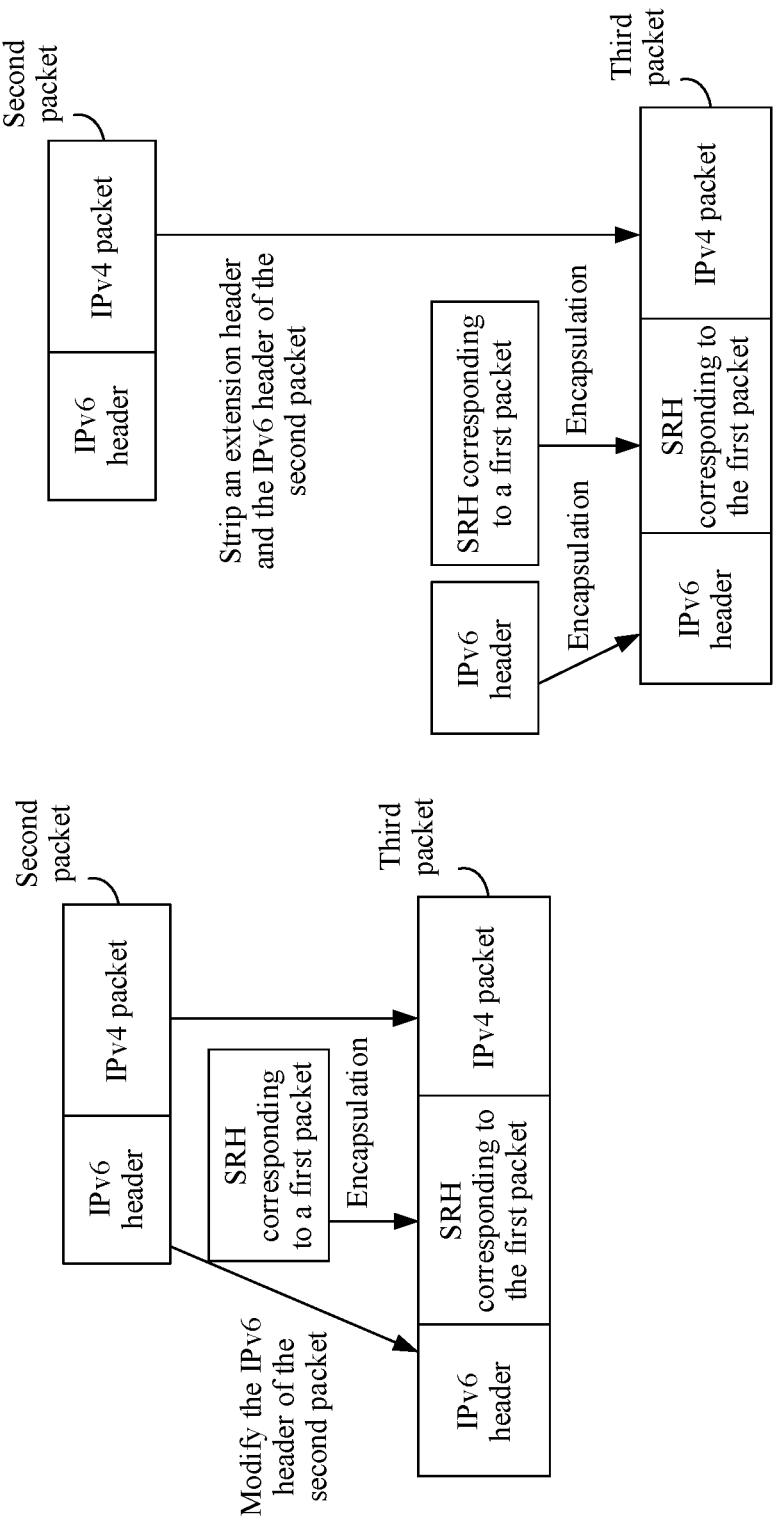
FIG. 29 is a schematic diagram in which a second packet evolves into a third packet according to an embodiment of this application.

Certainly, because it is optional that the second packet includes the extension header and the SRH, the first proxy node may not perform operations of encapsulating and stripping the extension header or the SRH. For example, FIG. 29 is a schematic diagram of generating the third packet when the second packet includes neither the extension header nor the SRH.

In an embodiment, if the second packet is obtained by encapsulating the IP header into the first packet, the second proxy node may obtain the first packet after stripping the IP header of the second packet. It is not limited that a packet obtained after the IP header is stripped must be completely the same as the first packet sent by the SF node to the first proxy node in this embodiment. In an embodiment, the packet obtained after the IP header of the second packet is stripped may be the same as the first packet sent by the SF node to the first proxy node in main content, but there is a slight difference between the two packets. For example, in a transmission process of the second packet, the intermediate forwarding node may process the second packet, so that the payload or header information that is of the first packet and that is included in the second packet changes. These cases with slight differences should also fall within the protection scope of the embodiments of this application.

Operation 2: The second proxy node encapsulates the SRH corresponding to the first packet, to obtain the third packet.

The second proxy node may perform an encapsulation operation to add the SRH corresponding to the first packet to the first packet, so that the obtained third packet carries not only the payload of the first packet but also the SRH corresponding to the first packet.

By performing the stripping operation, the second proxy node can restore the packet obtained by the first proxy node through re-encapsulation to the packet returned by the SF node to the first proxy node; and by performing the SRH encapsulation operation, the second proxy node can restore the packet returned by the SF node to the packet including the SRH. This implements a dynamic proxy function.

It should be noted that operation 1 and operation 2 may be operations at least included in a third packet generation method. It should be understood that in a process of generating the third packet, not only operation 1 and operation 2 are performed, but also another operation may be performed. That is, in the process of generating the third packet, the second proxy node may further perform another operation in addition to the operation of stripping the IP header and the operation of encapsulating the SRH, instead of performing only the operation of stripping the IP header and the operation of encapsulating the SRH. This is not enumerated herein one by one.

Whether to perform another operation is not limited in this embodiment.

In an embodiment, after encapsulating the SRH corresponding to the first packet into the first packet, the second proxy node may further update an active SID in the packet into which the SRH is encapsulated. In this case, the obtained third packet is a packet with an updated active SID. A process of updating the active SID may include: determining whether the SRH includes a to-be-processed SID; and if the SRH includes the to-be-processed SID, updating the destination address of the packet to a next to-be-processed SID, and decreasing the SL in the SRH by 1, so that the SL decreased by 1 points to the next to-be-processed SID. The updated active SID may be any type of SID, for example, may be an End.AD SID or an End.DT4 SID.

Implementation 2: In a process of generating the third packet, the second proxy node may not strip the original IP header of the second packet, but directly modify the original IP header of the second packet. In an embodiment, the process of generating the third packet may include: updating, by the second proxy node, the IP header of the second packet to the IP header of the first packet, and encapsulating the SRH corresponding to the first packet, to obtain the third packet.

The second proxy node may update the destination address in the IP header of the second packet to the destination address in the IP header of the first packet. For example, if the destination address in the IP header of the second packet is the first bypass SID, and the destination address in the IP header of the first packet is an address of a destination device of the payload of the first packet, the second proxy node may update the destination address in the IP header of the second packet from the first bypass SID to the address of the destination device of the payload of the first packet. In addition, the second proxy node may further correspondingly modify another field in the IP header of the second packet based on another field in the IP header of the first packet, for example, update the source address in the IP header of the second packet to the source address in the IP header of the first packet. This is not enumerated herein one by one.

It should be understood that a time sequence of the operation of updating the IP header and the operation of encapsulating the SRH is not limited in this embodiment. The first proxy node may first update the IP header of the second packet to the IP header of the first packet, and then encapsulate the SRH corresponding to the first packet into the packet in which the IP header has been updated; may first encapsulate the SRH corresponding to the first packet into the second packet, and then update the IP header of the packet into which the SRH is encapsulated to the IP header of the first packet; or may simultaneously perform the operation of updating the IP header and the operation of encapsulating the SRH.

It should be further understood that, in an embodiment, in the process of generating the third packet, the first proxy node may further perform another operation in addition to the operation of updating the IP header and the operation of encapsulating the SRH, instead of performing only the operation of updating the IP header and the operation of encapsulating the SRH. This is not enumerated herein one by one.

The first proxy node may first strip the IP header of the second packet and then strip the SRH of the second packet, may first strip the SRH of the second packet and then strip the IP header, or may simultaneously strip the IP header and the extension header. A time sequence of stripping the IP header and stripping the SRH of the second packet is not limited in this embodiment. Operation 508: The second proxy node sends the third packet to the router node.

In an embodiment, the second proxy node may look up the local SID table based on the active SID of the third packet, and perform a corresponding forwarding operation based on a SID that is in the local SID table and that is hit by the active SID.

With reference to operation 505 to operation 508, in some possible embodiments, using an example in which the first bypass SID is denoted as S and the second proxy node is denoted as N, operations performed based on the first bypass SID may be as follows:

When N receives a packet destined to S and S is a local End.ADB SID, N does/Annotation: When N receives a packet whose destination address is S, and S is a bypass SID in a local SID table of N, N performs the following operations./

IF (No SRH) or (NH=SRH) and SL=0/ Annotation: If an outer IPv6 header (outer IPv6 header) does not include an SRH, or a type of a next packet header (NH) of an outer IPv6 header is an SRH and a value of an SL is 0,/ pop the (outer) IPv6 header and its extension headers/
    Annotation: pop the outer IPv6 header and one or more extension headers of the IPv6 header;
  restore SRv6 header from the cache using the inner packet and outer Destination option header/Annotation: restore the SRH by using an inner packet and an outer destination options header; and
  update the active SID of the restored SRv6 packet and forward to the next-hop/Annotation: update an active SID of a restored SRv6 packet and forward an updated SRv6 packet to a next hop.

In an embodiment, a forwarding rule of the second proxy node may be preconfigured, to configure that the second proxy node must not respond to the first proxy node by using the second packet after receiving the second packet, to prevent the first proxy node from repeatedly generating the second packet and sending the second packet to the second proxy node when receiving the second packet, and therefore avoid a forwarding loop of the second packet between the first proxy node and the second proxy node.

Operation 509: The router node receives the third packet from the second proxy node, and forwards the third packet.

An embodiment provides a method for forwarding a packet to a peer end to restore an SRH. A new SID with a bypass function is extended for an End.AD SID, so that when a local proxy node fails to find the SRH from a local cache, the new SID and control information used to indicate to restore the SRH are carried in the packet whose SRH needs to be restored. The packet is transmitted to a peer proxy node by using the new SID, to indicate the peer proxy node to replace the local proxy node to restore the SRH. In this way, the SRH corresponding to the packet can be restored through the peer proxy node, and then the packet can continue to be forwarded in a network by using the SRH. This avoids a problem of a packet transmission failure caused by a failure in restoring the SRH.

The foregoing method embodiment provides a process in which when a cache miss occurs, the local proxy node sends a packet to the peer proxy node to indicate the peer proxy node to restore an SRH. In an example embodiment of this application, a cache self-healing mechanism is further provided for a cache miss scenario. If a local proxy node does not cache an SRH, a peer proxy node may transmit the SRH of a packet to the local proxy node to indicate the local proxy node to cache the SRH, thereby controlling the local proxy node to automatically relearn a cache entry that includes the SRH. In this case, after subsequently receiving a packet from an SF node again, the local proxy node may locally restore the SRH, to avoid a process of forwarding the packet to the peer proxy node to restore the SRH at the peer proxy node. With reference to an embodiment in FIG. 30A and FIG. 30B, the following describes a packet transmission procedure for implementing cache self-healing. It should be noted that the embodiment in FIG. 30A and FIG. 30B focuses on describing a difference from the embodiment in FIG. 5. For operations and other features similar to those in the embodiment in FIG. 5, refer to the embodiment in FIG. 5. Details are not described in the embodiment in FIG. 30A and FIG. 30B.

Figure 30A:
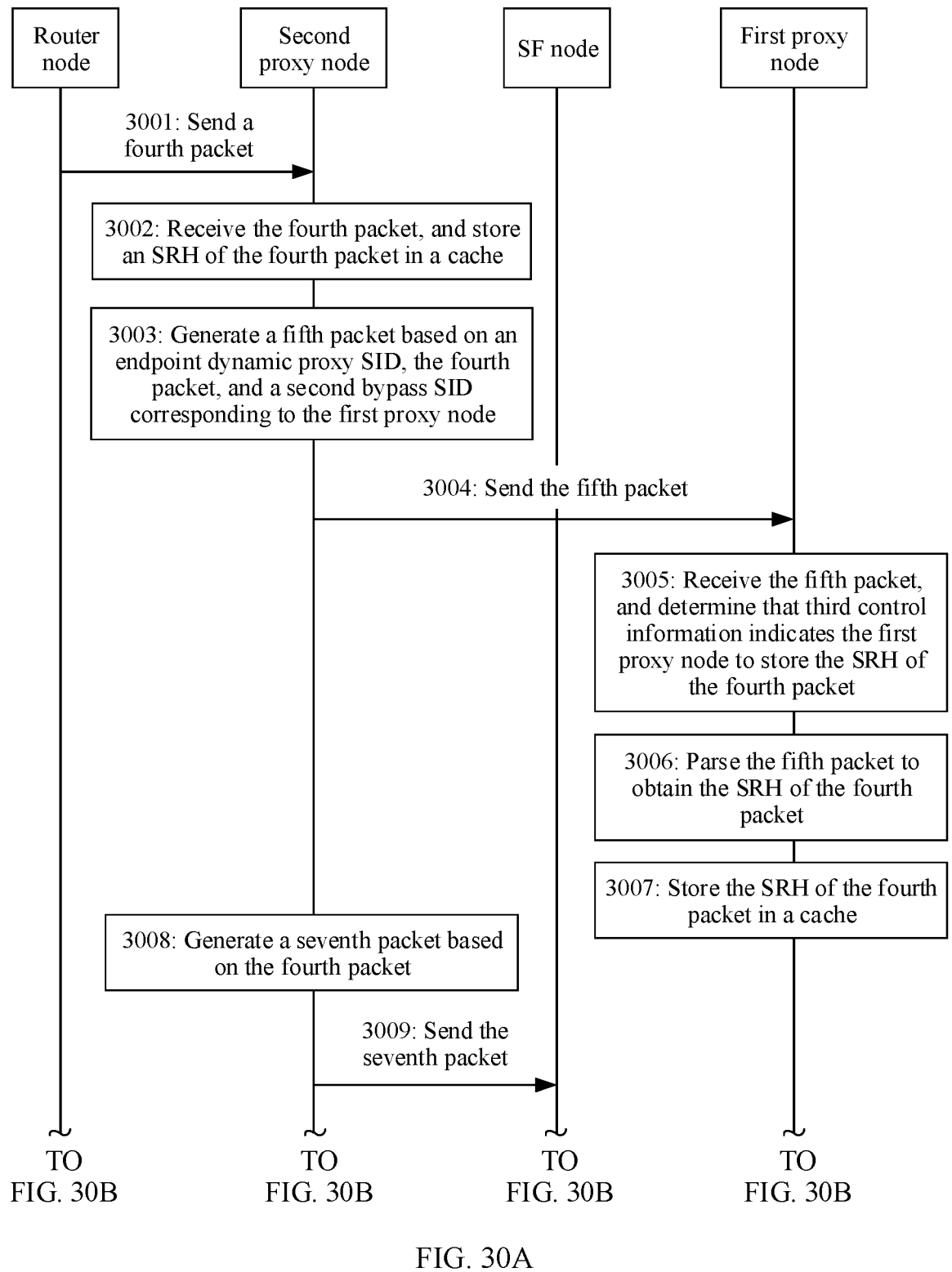
FIG. 30A and FIG. 30B are a flowchart of a packet transmission method according to an embodiment of this application.
Figure 30B:
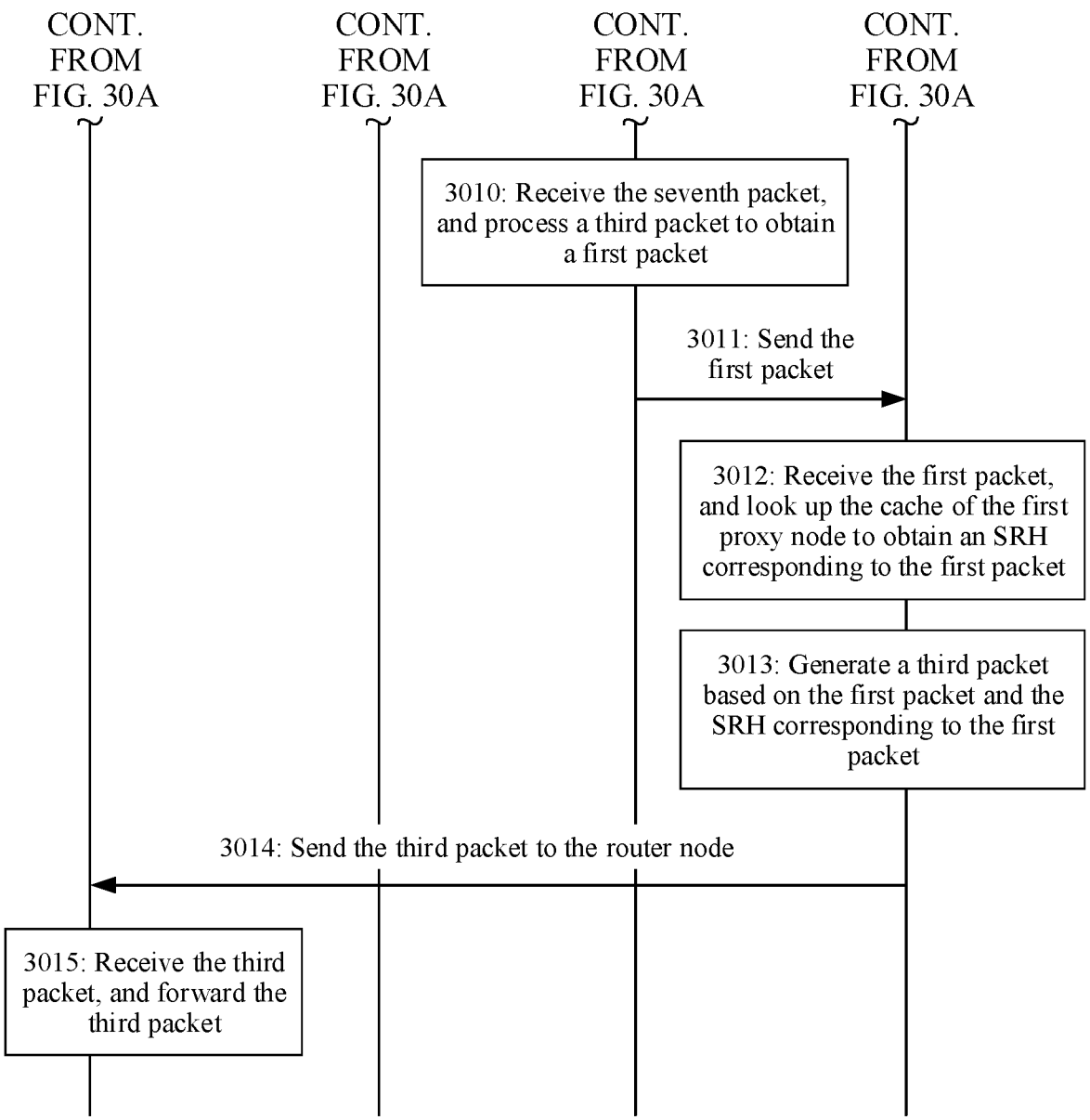

FIG. 30A and FIG. 30B are a flowchart of a packet transmission method according to an embodiment of this application. The method may include the following operations.

Operation 3001: A router node sends a fourth packet to a second proxy node.

Figure 31:
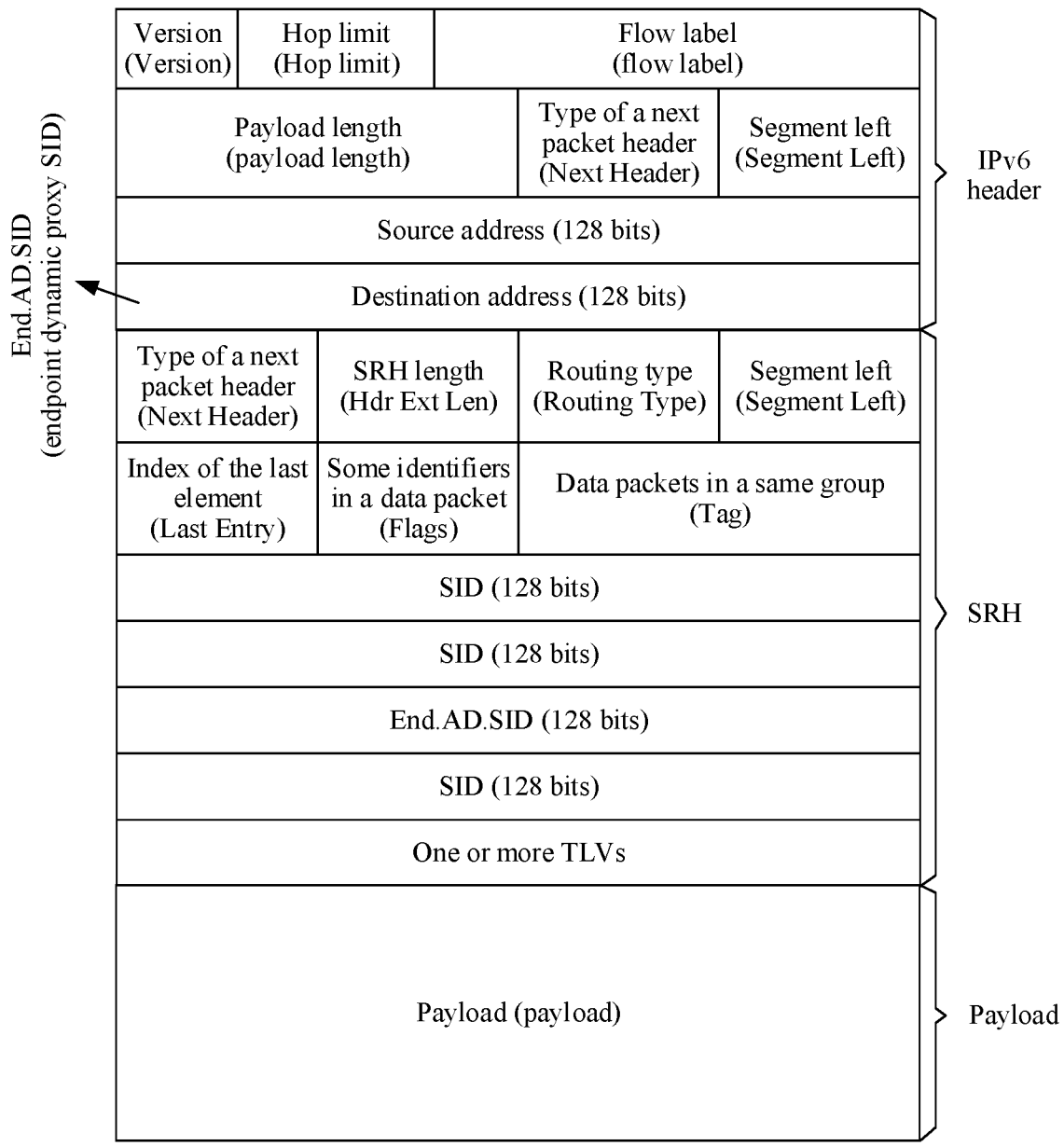
FIG. 31 is a schematic diagram of a fourth packet according to an embodiment of this application.

The fourth packet is a packet whose payload is to be processed by an SF node through service function processing. FIG. 31 is a schematic diagram of a fourth packet according to an embodiment of this application. The fourth packet may be an SRv6 packet. The fourth packet may include an IPv6 header, an SRH, and a payload. The IPv6 header may include a source address and a destination address, the SRH may include a segment list, an SL, and one or more TLVs, and the segment list may include one or more SIDs. The payload of the fourth packet may be an IPv4 packet, an IPv6 packet, or an Ethernet frame. The destination address of the fourth packet may be used to carry an active SID in the segment list. The active SID is also referred to as an active segment, and is a SID to be processed by an SR node that receives the packet. In SR MPLS, the active SID is an outermost label of a label stack. In IPv6, the active SID is the destination address of the packet. For example, if the segment list includes five SIDs, namely, a SID 0, a SID 1, a SID 2, a SID 3, and a SID 4, and a value of the SL is 2, it indicates: there are two unprocessed SIDs in the segment list: the SID 0 and the SID 1; a currently processed SID in the segment list is the SID 2; and there are two processed SIDs in the segment list: the SID 3 and the SID 4. In an embodiment, the destination address of the fourth packet may be an End.AD SID, in other words, the active SID of the fourth packet may be the End.AD SID.

The source address in the IPv6 header of the fourth packet may be used to identify a device that encapsulates the SRH. For example, the source address may be an address of a traffic classifier or an address of a head-end node. In an embodiment, the IPv6 header of the fourth packet may not carry the source address.

It should be understood that FIG. 31 is merely a schematic diagram of the fourth packet. In an embodiment of the application, a quantity of fields and a quantity of types of the fields in the fourth packet may be greater than those shown in FIG. 31, or less than those shown in FIG. 31. In addition, a location and a length of each field in the fourth packet shown in FIG. 31 may be adaptively changed based on an actual requirement. The location and the length of each field in the packet are not limited in this embodiment.

The End.AD SID is used to indicate a first proxy node or the second proxy node to perform a dynamic proxy operation. The dynamic proxy operation is also referred to as an End. AD operation, and may include operations such as stripping the SRH in the packet, caching the SRH in the packet, and sending a packet obtained by stripping the SRH. The End.AD SID may be preconfigured on the first proxy node or the second proxy node, and may be pre-stored in a local SID table of the first proxy node or the second proxy node. The End.AD SID may be distributed to a network by the first proxy node or the second proxy node. The traffic classifier may receive the distributed End.AD SID, and add the End.AD SID to the packet, so that after the packet carrying the End.AD SID is forwarded to the first proxy node or the second proxy node, the first proxy node or the second proxy node is triggered to perform the dynamic proxy operation on the packet.

The router node may send the fourth packet in a flow-based manner or a packet-based manner. A manner of sending the fourth packet is not limited in this embodiment.

Operation 3002: The second proxy node receives the fourth packet from the router node, and stores the SRH of the fourth packet in a cache.

For an operation performed by the second proxy node on the fourth packet, in an embodiment, the second proxy node may read the destination address of the fourth packet, and look up the local SID table based on the destination address of the fourth packet, to determine whether the destination address matches a SID in the local SID table. When the destination address matches the End.AD SID in the local SID table, in other words, the destination address hits the End.AD SID in the local SID table, the second proxy node may determine that the fourth packet is an SRv6 packet, and perform a dynamic proxy operation corresponding to the End.AD SID.

In an embodiment, the second proxy node may detect whether the SRH of the fourth packet has been stored in the cache. If the SRH of the fourth packet is not stored in the cache, the second proxy node allocates a cache entry to the SRH of the fourth packet, and stores the SRH of the fourth packet in the allocated cache entry. In addition, if it is detected that the SRH of the fourth packet has been stored in the cache, the operation of storing the SRH of the fourth packet may be omitted. A manner of detecting whether the SRH of the fourth packet has been stored in the cache may include: comparing an SRH in each cache entry with the SRH of the fourth packet; and if an SRH in any cache entry is consistent with the SRH of the fourth packet, determining that the SRH of the fourth packet has been stored in the cache entry; or if the SRH in each cache entry is inconsistent with the SRH of the fourth packet, determining that the SRH of the fourth packet is not stored in the cache and the cache needs to be updated to store the SRH of the fourth packet. In an embodiment, all content of the SRH in the cache entry may be compared with all content of the SRH in the fourth packet, some content of the SRH in the cache entry may be compared with some content of the SRH in the fourth packet, or a hash value of the SRH in the cache entry may be compared with a hash value of the SRH of the fourth packet. A comparison manner is not limited in this embodiment.

In an embodiment, the SRH of the fourth packet may be stored in any one of the following storage manner 1 to storage manner 3:

Storage manner 1: The second proxy node may obtain a flow identifier corresponding to the fourth packet, and store the SRH of the fourth packet by using the flow identifier corresponding to the fourth packet as an index. The second proxy node may store the SRH of the fourth packet in a key-value storage manner. In this case, the flow identifier is a key, and the SRH of the fourth packet is a value.

A flow identifier is used to identify a data flow to which a packet belongs. Packets in a same data flow correspond to a same flow identifier, and the flow identifier may be a value of one or more fields in the packet. For example, the flow identifier corresponding to the fourth packet may be a 5-tuple, MAC header information, or application layer information of the fourth packet. The 5-tuple may include a source IP address, a source port number, a destination IP address, a destination port number, and a transport layer protocol number of the packet. The MAC header information may include a source MAC address, a destination MAC address, an EtherType, and a VLAN tag of the packet. The application layer information may be a value of one or more fields in the payload of the packet.

Storage manner 2: The second proxy node may obtain an identifier of the cache entry, and store the SRH of the fourth packet by using the identifier of the cache entry as an index. The second proxy node may store the SRH of the fourth packet in a key-value storage manner. In this case, the identifier of the cache entry is a key, and the SRH of the fourth packet is a value.

Storage manner 3: The second proxy node may store the SRH of the fourth packet by using a flow identifier corresponding to the fourth packet and the End.AD SID as an index. The second proxy node may store the SRH of the fourth packet in a key-value storage manner. In this case, a combination of the flow identifier and the End.AD SID is a key, and the SRH of the fourth packet is a value.

The SRH of the fourth packet can be stored in the second proxy node through operation 3002. In this case, if the SF node or the first proxy node sends a packet not including the SRH to the second proxy node in a subsequent process, the second proxy node may find the SRH of the fourth packet by looking up the pre-generated cache entry, to restore the SRH.

Operation 3003: The second proxy node generates a fifth packet based on the endpoint dynamic proxy SID, the fourth packet, and a second bypass SID corresponding to the first proxy node.

It should be noted that, in an optional embodiment, operation 3003 may be performed after operation 505. For example, if the second proxy node finds, by receiving a second packet, that a cache miss occurs on the first proxy node, the second proxy node triggers a sending procedure for the fifth packet when receiving the fourth packet, to synchronize the SRH to the first proxy node by using the fifth packet, so that the SRH is restored in a cache of the first proxy node. This facilitates the first proxy node in cache self-healing.

The fifth packet is a packet used to transmit the SRH of the fourth packet to the peer proxy node. In an embodiment, the fifth packet may be a control packet. The fifth packet may include the second bypass SID, control information, and the SRH of the fourth packet. A source address of the fifth packet may be a first bypass SID corresponding to the second proxy node or other information that can identify the second proxy node. The fifth packet may be an SRv6 packet, and the fifth packet may include an IPv6 header, an SRH, and a payload. The IPv6 header may include the source address of the fifth packet and a destination address of the fifth packet. The SRH of the fifth packet may include each SID in the SRH of the fourth packet and the second bypass SID. The payload of the fifth packet may be a payload of the fourth packet. It should be noted that it is optional that the fifth packet includes the payload of the fourth packet. In another embodiment, the fifth packet may not include the payload of the fourth packet. The destination address in the IPv6 header of the fifth packet may be the second bypass SID corresponding to the first proxy node, and the second bypass SID is used to identify that a destination node of the fifth packet is the first proxy node.

In an optional embodiment, a processing policy corresponding to the End.AD SID may be preconfigured on the second proxy node. The processing policy may include performing the dynamic proxy operation and operations of generating and sending the fifth packet. Therefore, after receiving the fourth packet, the second proxy node performs, based on the End.AD SID in the fourth packet, not only operation 3002, operation 3008, and operation 3009 to provide a dynamic proxy service but also operation 3003 and operation 3004 to control the first proxy node to store the SRH. In an embodiment, a SID-based SRv6 programming capability is fully utilized, and the operation corresponding to the End.AD SID is extended.

For an End.AD SID configuration process, in an embodiment, a configuration operation may be performed on the second proxy node in advance, and the second proxy node may receive a configuration instruction, to obtain the End.AD SID from the configuration instruction; and the second proxy node may store the End.AD SID, for example, store the End.AD SID in the local SID table of the second proxy node. Similarly, a configuration operation may be performed on the first proxy node in advance, and the first proxy node may receive a configuration instruction, to obtain the End.AD SID from the configuration instruction; and the first proxy node may store the End.AD SID, for example, store the End.AD SID in the local SID table of the first proxy node. The configuration operation may be performed by a user on the first proxy node or the second proxy node, or may be performed by a control plane of an SFC, for example, an SDN controller or an NFVM. This is not limited in this embodiment.

In an embodiment, the second proxy node and the first proxy node may be in an anycast endpoint dynamic proxy SID (anycast End.AD SID) relationship. Anycast is an IPv6 communication mode, and means using a same address to identify a group of nodes that provide a same or corresponding service, so that a packet whose destination address is the address can be routed to any node in the group of nodes. In an embodiment, the same End.AD SID may be allocated to the second proxy node and the first proxy node, so that the End.AD SID configured on the second proxy node is the same as the End.AD SID configured on the first proxy node. In this case, if the router node receives a packet whose destination address is the End.AD SID, the router node may send the packet to the second proxy node, or may send the packet to the first proxy node. Therefore, the second proxy node or the first proxy node may perform a dynamic proxy operation on the packet. This facilitates a dual-homing access function. In addition, a corresponding anycast-index may be configured for the anycast End.AD SID. The anycast-index is used to identify the End.AD SID of a same group of nodes that are in an anycast relationship. For the same End. AD SID, an anycast-index configured on the second proxy node for the End.AD SID may be the same as an anycast index configured on the first proxy node for the End.AD SID.

For example, the second proxy node may receive the following configuration instruction, to configure the End.AD SID as the anycast End.AD SID, and configure the anycast-index corresponding to the End.AD SID:

[proxy1]segment-routing ipv6
[proxy1—segment-routing-ipv6] locator t1 ipv6-prefix A::1 64 static 32
[proxy1—segment-routing-ipv6-locator]opcode ::2 end-ad anycast-index 10
[proxy1—segment-routing-ipv6-locator-endad]encapsulation ip ipv4 outbound Ethernet1/0/0 next-hop 1.1.1.1 inbound Ethernet1/0/1

In the foregoing configuration instruction, proxy1 indicates the second proxy node, the first line of the configuration instruction means that IPv6 SR needs to be configured, and the second line of the configuration instruction means that Locator (location information) is t1, an IPv6 prefix is A::1 64, and a static route means 32. The third line of the configuration instruction means IPv6 SR Locator configuration, and means that an operation code is ::2 and the anycast-index corresponding to the End.AD SID is 10. The fourth line of the configuration instruction means IPv6 SR End.AD SID configuration, and means that an IPv4 packet is encapsulated, the IPv4 packet is sent by using an Ethernet interface at a slot 1, a board 0, and a port 0 as an outbound interface, a next-hop address is 1.1.1.1, and an inbound interface is an Ethernet interface at a slot 1, a board 0, and a port 1. A scenario in which the foregoing configuration instruction is used is that the payload of the fourth packet is an IPv4 packet, and a manner in which the proxy node generates the fifth packet is obtaining the IPv4 packet carried in the fourth packet, and using the IPv4 packet as the third packet.

Third control information is used to indicate the first proxy node to store the SRH corresponding to the first packet. In an embodiment, the third control information may include a third flag and a fourth flag. The third flag is used to identify whether the packet is a packet obtained through copy. For example, the third flag may be denoted as a copy flag (C-flag). The fifth packet may include a copy flag field, and the third flag may be carried in the copy flag field. For example, a length of the third flag may be one bit. For example, in the embodiment in FIG. 30A and FIG. 30B, the fifth packet may be a packet obtained by encapsulating a copy of the fourth packet. Therefore, the third flag may be set to 1, and the third flag may identify that the fifth packet is a packet obtained through copy. The fourth flag is used to identify whether the packet is an acknowledge packet. For example, the fourth flag may be denoted as an acknowledge flag (A-flag). The fifth packet may include an acknowledge flag field, and the fourth flag may be carried in the acknowledge flag field. For example, a length of the fourth flag may be one bit. For example, in the embodiment in FIG. 30A and FIG. 30B, the fourth flag may be set to 0, and the fourth flag may identify that the fifth packet is not an acknowledge packet.

The third control information may be carried in any location in the fifth packet. For example, the location of the third control information may be in any one of the following (1) to (4).

(1) The third control information is carried in an extension header of the fifth packet.

In an embodiment, the extension header in the fifth packet may be a destination options header, the destination options header may be located in front of the SRH, and the third control information may be carried in the destination options header. In an embodiment, because the fifth packet includes the SRH of the fourth packet, and the SRH is a type of a routing header, the first proxy node specified in the SRH may parse the extension header, so that the first proxy node reads the third control information in the extension header, to store the SRH based on the third control information.

(2) The third control information is carried in the second bypass SID.

The bypass SID may include one or more of location information, function information, or arguments information, and the third control information may be carried in the function information of the second bypass SID, or may be carried in the arguments information of the second bypass SID. In an embodiment, the peer proxy node may be controlled by using the bypass SID to store the SRH. In this way, a byte additionally occupied by the third control information in the packet is reduced, so that a data amount of the packet is reduced, and therefore overheads for transmitting the packet are reduced.

(3) The third control information is carried in an IP header of the fifth packet.

For example, the third control information may be carried in the IPv6 header of the fifth packet. The third control information may be carried in a part other than the second bypass SID in the IPv6 header. In addition, if the payload of the fifth packet is an IPv6 packet, that is, the fifth packet is in a form similar to that of an IP in IP packet, and includes an outer IPv6 header and an inner IPv6 header, the third control information may be carried in the outer IPv6 header.

(4) The third control information is carried in a TLV in the SRH of the fifth packet.

The SRH of the fifth packet may include one or more TLVs, and the third control information may be carried in the TLV. In an embodiment, the first proxy node may be controlled by using the SRH to store the SRH. In this way, a byte additionally occupied by the third control information in the packet is reduced, so that a data amount of the packet is reduced, and therefore overheads for transmitting the packet are reduced.

There may be a plurality of formats of the fifth packet. The format of the fifth packet may vary with a network topology structure and/or a requirement of the first proxy node on path planning, or may vary with a manner of carrying the control information. With reference to the accompanying drawings, the following uses an implementation 1 and an implementation 2 as examples for description.

Implementation 1: The destination address of the fifth packet may be the second bypass SID. Refer to FIG. 32, FIG. 33, FIG. 34, and FIG. 35. For example, a destination address (DA) field in the IPv6 header of the fifth packet may carry the second bypass SID.

This manner may be applied to a plurality of scenarios, and the following uses a scenario 1 to a scenario 3 as examples for description.

Scenario 1: The first proxy node and the second proxy node are located on a one-hop IP link. For a concept of the one-hop IP link, refer to the foregoing description. Details are not described herein again. FIG. 13 is a schematic diagram in which the first proxy node and the second proxy node are located on the one-hop IP link.

In an SRv6 network, a destination address in an IPv6 header of an SRv6 packet is usually used to identify a next SR node that is to forward the packet. Therefore, if the first proxy node and the second proxy node are located on the one-hop IP link, the second proxy node includes the second bypass SID in the destination address to indicate that a next SR node of the fifth packet is the first proxy node.

Scenario 2: The first proxy node and the second proxy node are located on a multi-hop IP link, and an SR function of a transit node between the first proxy node and the second proxy node is not enabled.

For the transit node whose SR function is not enabled, when receiving the fifth packet, the transit node may look up a routing FIB based on the destination address (namely, the second bypass SID) of the fifth packet, and forward the packet based on an entry that is in the routing FIB and that is hit by the destination address.

Scenario 3: The first proxy node and the second proxy node are located on a multi-hop IP link, but there is no service requirement for specifying a transit node to forward the fifth packet.

The scenario 3 may include a plurality of cases, and may include a case in which an SR function of the transit node is enabled and a case in which an SR function of the transit node is not enabled. For example, if the multi-hop IP link includes a plurality of forwarding paths, and the first proxy node has no requirement for specifying a forwarding path to forward the fifth packet, when the SR function of the transit node is enabled or not enabled, the destination address may carry the second bypass SID. For another example, if the multi-hop IP link includes only one forwarding path, for example, there is only one transit node between the first proxy node and the second proxy node, when an SR function of the transit node is enabled or not enabled, the fifth packet can still be forwarded by the transit node to the first proxy node without specifying the transit node by the second proxy node.

For the transit node whose SR function is enabled, when receiving the fifth packet, the transit node may look up a local SID table based on the destination address of the fifth packet, namely, the second bypass SID, that is, match the second bypass SID with each SID in the local SID table. In this case, because the second bypass SID is not a SID distributed by the transit node, and is not stored in the local SID table of the transit node, the transit node determines that the second bypass SID misses the local SID table, and forwards the fifth packet in a conventional IP routing manner. In an embodiment, the transit node looks up a routing FIB based on the second bypass SID, and forwards the fifth packet based on an entry that is in the routing FIB and that is hit by the destination address.

Based on different manners of carrying the third control information, there may be a plurality of formats of the fifth packet implemented through the implementation 1. With reference to FIG. 32 to FIG. 35, the following uses an implementation 1.1 to an implementation 1.4 as examples for description.

Figure 32:
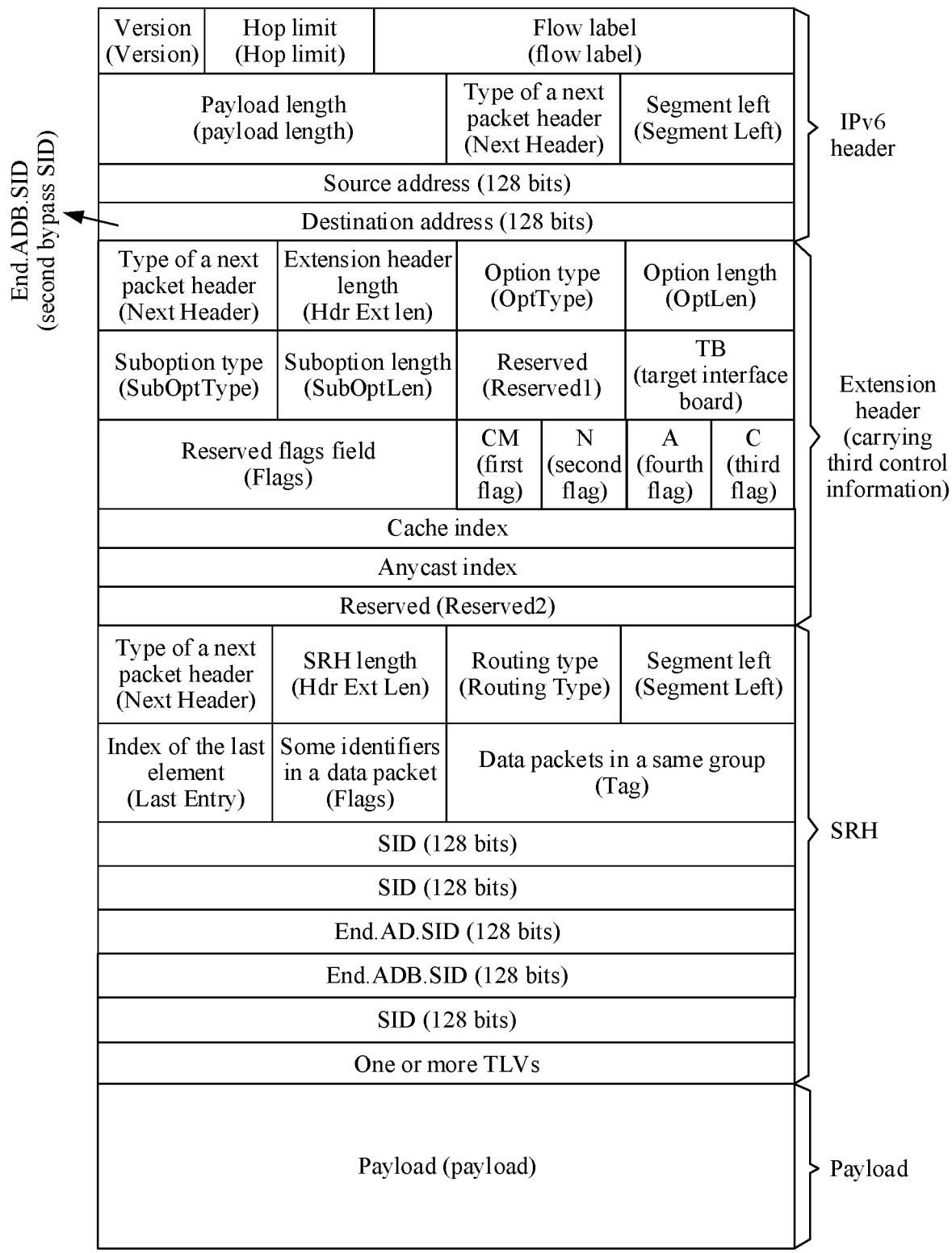
FIG. 32 is a schematic diagram of a fifth packet according to an embodiment of this application.

Implementation 1.1: Refer to FIG. 32. If the extension header is used to carry the third control information, the format of the fifth packet may be that shown in FIG. 32. The fifth packet includes the IPv6 header, the extension header, the SRH, and the payload, where the extension header of the fifth packet includes the third control information, and the extension header may be located between the IPv6 header and the SRH.

Figure 33:
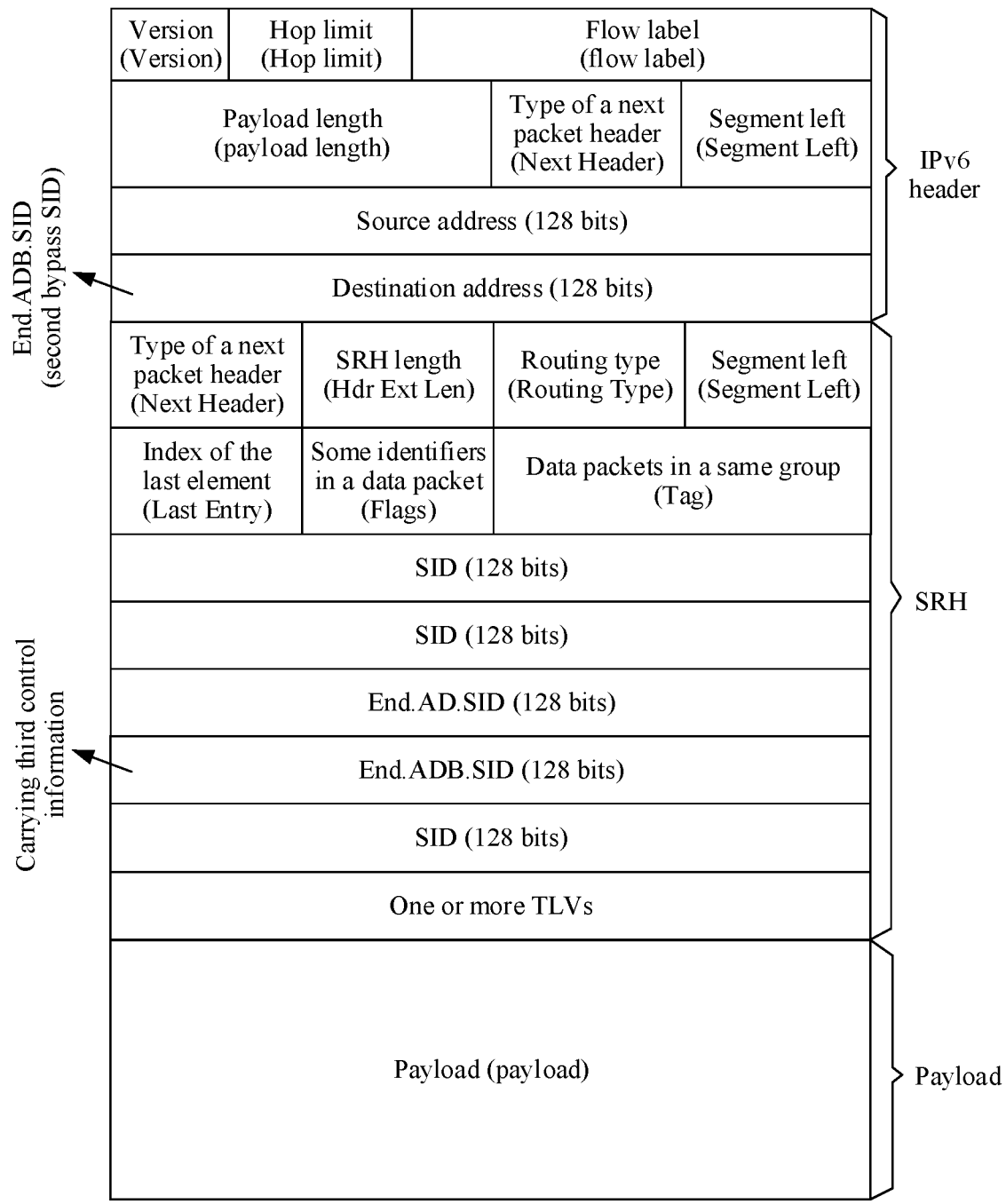
FIG. 33 is a schematic diagram of a fifth packet according to an embodiment of this application.

Implementation 1.2: Refer to FIG. 33. If the second bypass SID (namely, an End.ADB SID in the figure) is used to carry the third control information, the format of the fifth packet may be that shown in FIG. 33. The fifth packet includes the IPv6 header, the SRH, and the payload, where the second bypass SID of the fifth packet includes the third control information. It can be learned through comparison between FIG. 32 and FIG. 33 that, a length of the fifth packet is reduced in the implementation 1.2, so that the fifth packet can be compressed.

Figure 34:
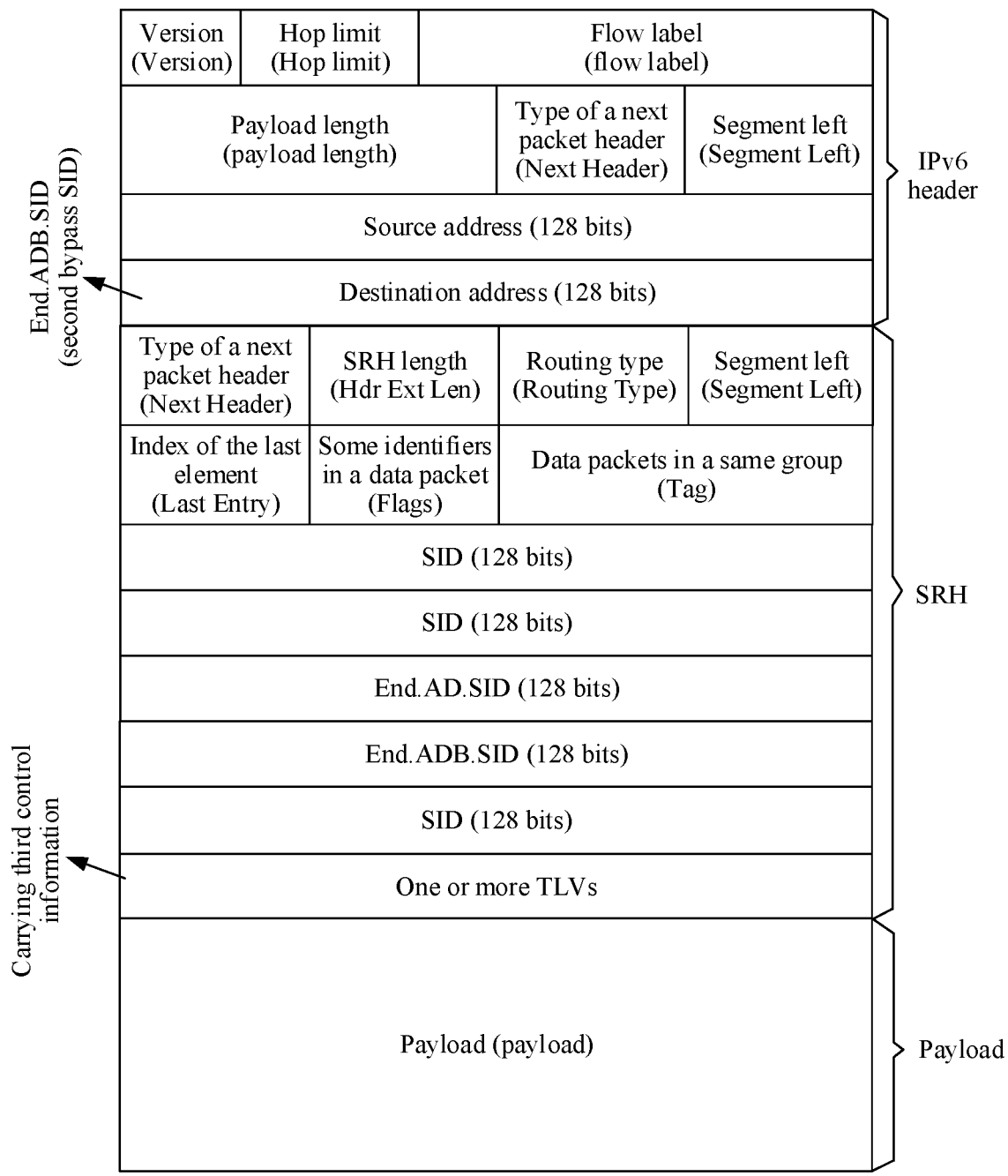
FIG. 34 is a schematic diagram of a fifth packet according to an embodiment of this application.

Implementation 1.3: Refer to FIG. 34. If the TLV in the SRH is used to carry the third control information, the format of the fifth packet may be that shown in FIG. 34. The fifth packet includes the IPv6 header, the SRH, and the payload, where the SRH of the fifth packet includes the TLV, and the TLV includes the third control information.

Figure 35:
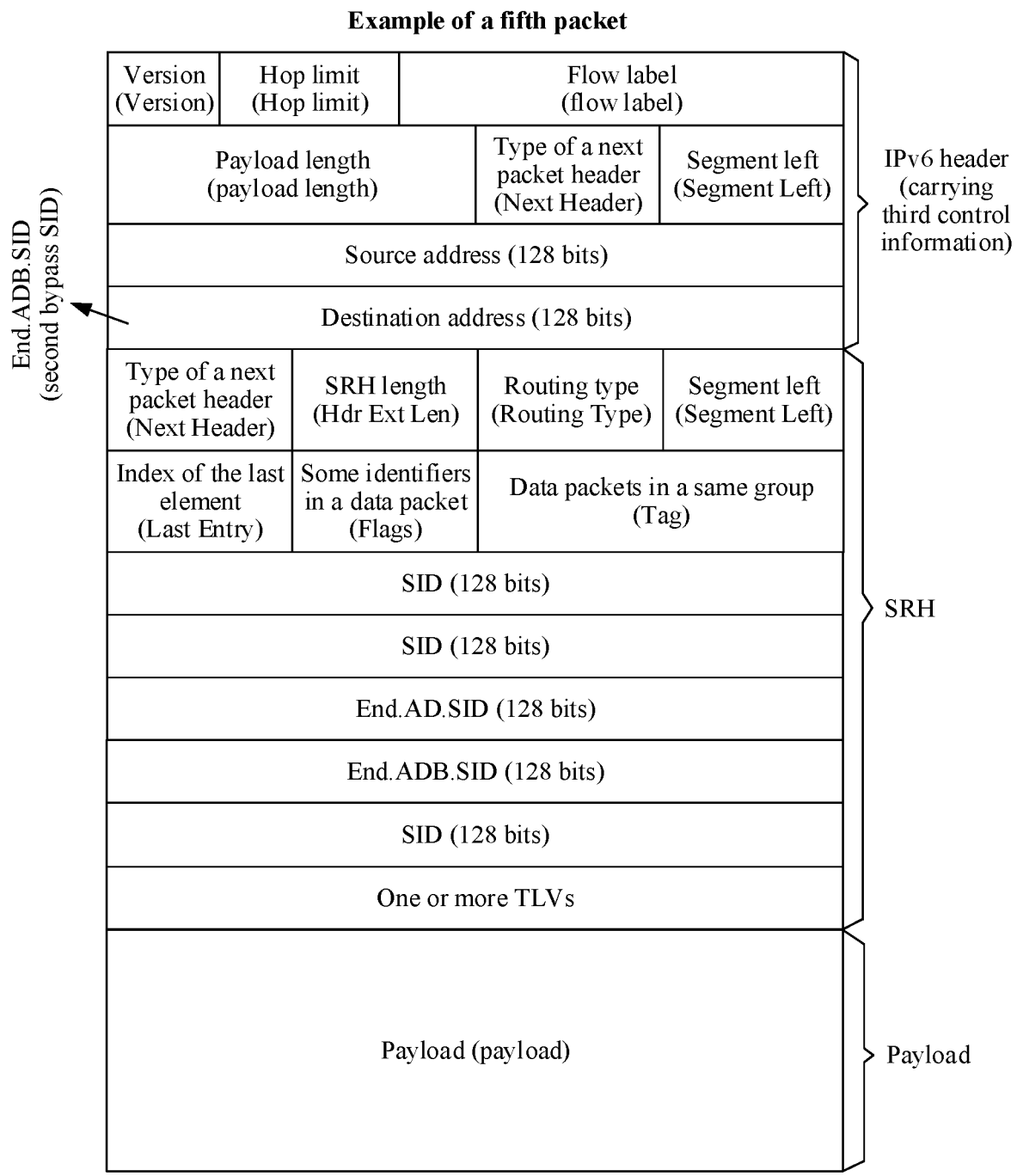
FIG. 35 is a schematic diagram of a fifth packet according to an embodiment of this application.

Implementation 1.4: Refer to FIG. 35. If the IPv6 header is used to carry the third control information, the format of the fifth packet may be that shown in FIG. 35. The fifth packet includes the IPv6 header, the SRH, and the payload, where the IPv6 header of the fifth packet includes the third control information.

Implementation 2: The destination address of the fifth packet may be a SID corresponding to a next SR node. Refer to FIG. 36, FIG. 37, FIG. 38, and FIG. 39. For example, a destination address (DA) field in the IPv6 header of the fifth packet may carry the SID corresponding to the next SR node. The SID corresponding to the next SR node may be distributed to an SR network by the next SR node, and the SID corresponding to the next SR node may be stored in a local SID table of the next SR node.

This manner may be applied to a scenario in which the first proxy node and the second proxy node are located on a multi-hop IP link and there is a service requirement for specifying a transit node to forward the fifth packet. The second proxy node may include the SID corresponding to the next SR node in the destination address, to indicate that the fifth packet needs to be forwarded from a local end to the SR node, so that the fifth packet is forwarded by the SR node to the first proxy node.

For example, FIG. 18 is a schematic diagram in which the first proxy node and the second proxy node are located on the multi-hop IP link, where transit nodes between the first proxy node and the second proxy node include a transit node 1, a transit node 2, and a transit node 3, and SR functions of the transit node 1, the transit node 2, and the transit node 3 are all enabled. When the second proxy node needs to specify that the fifth packet is to be forwarded by the transit node 3 to the first proxy node, the destination address of the fifth packet may carry a SID corresponding to the transit node 3. In this case, when receiving the fifth packet, the transit node 3 may look up a local SID table based on the destination address of the fifth packet, determine that the destination address of the fifth packet hits a SID in the local SID table, and perform an operation corresponding to the SID, for example, forward the fifth packet to the first proxy node.

Based on different manners of carrying the third control information, there may be a plurality of formats of the fifth packet implemented through the implementation 2. With reference to FIG. 36, FIG. 37, FIG. 38, and FIG. 39, the following uses an implementation 2.1 to an implementation 2.4 as examples for description.

Figure 36:
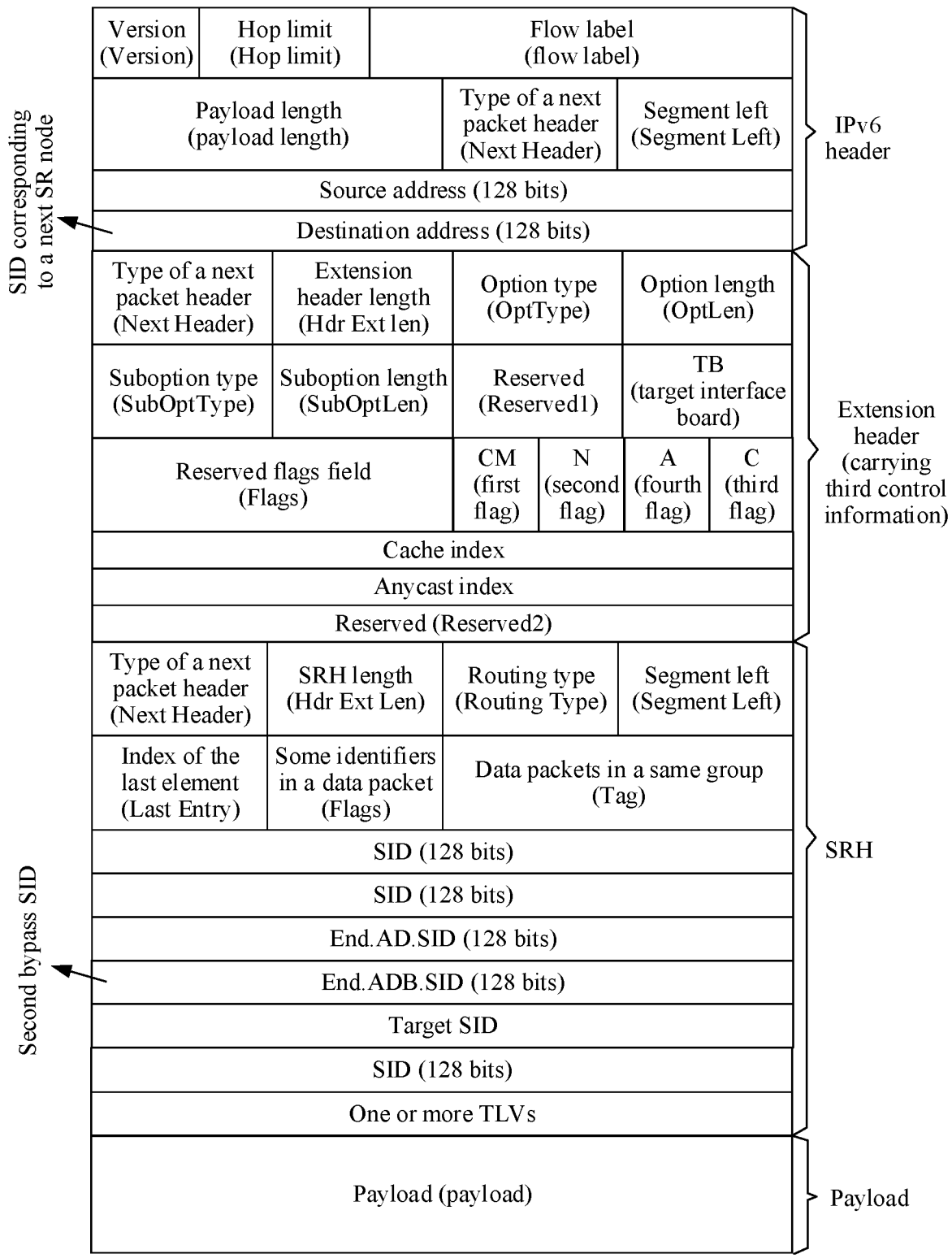
FIG. 36 is a schematic diagram of a fifth packet according to an embodiment of this application.

Implementation 2.1: Refer to FIG. 36. If the extension header is used to carry the third control information, the format of the fifth packet may be that shown in FIG. 36. The fifth packet includes the IPv6 header, the extension header, the SRH, and the payload, where the extension header of the fifth packet includes the third control information.

Figure 37:
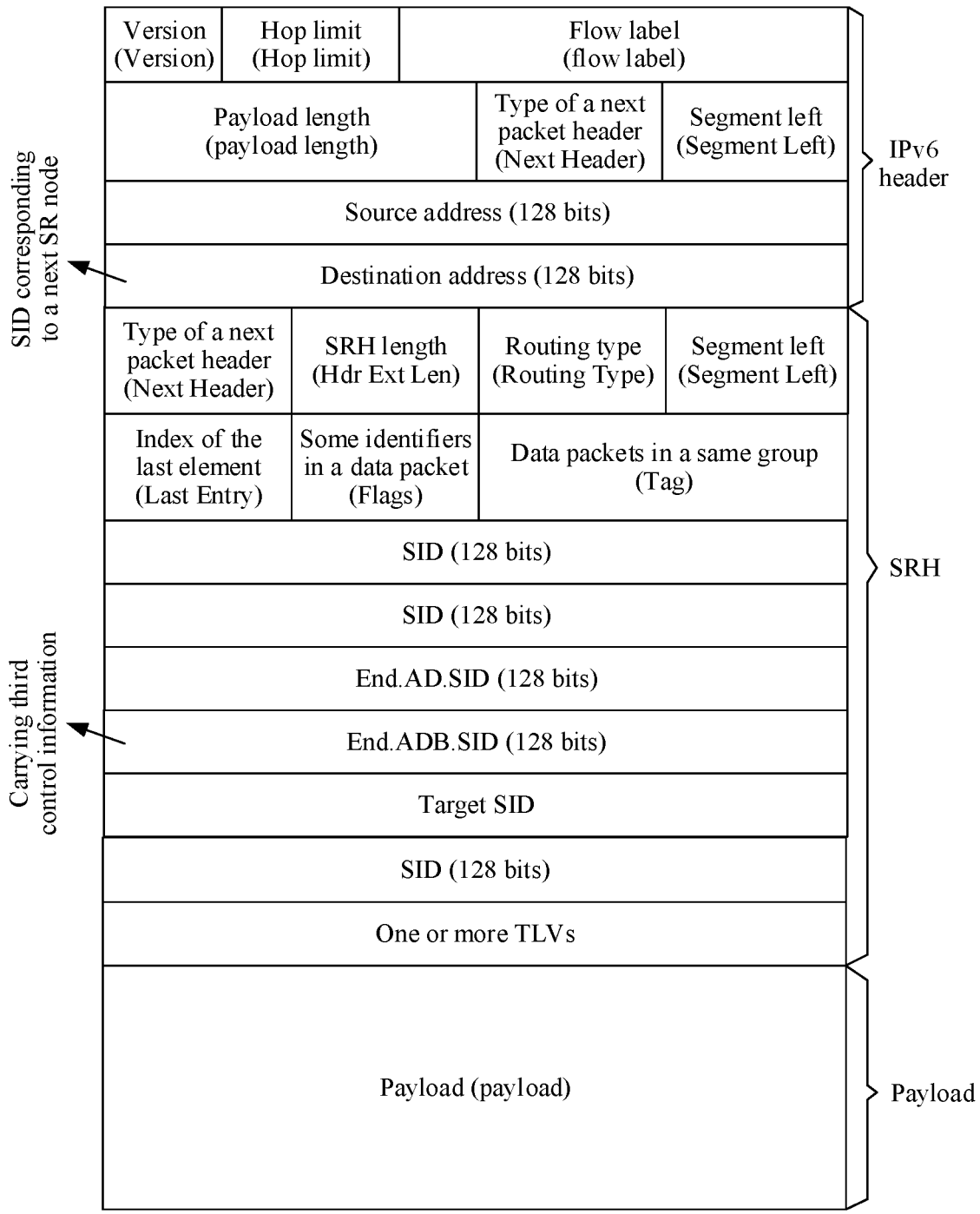
FIG. 37 is a schematic diagram of a fifth packet according to an embodiment of this application.

Implementation 2.2: Refer to FIG. 37. If the second bypass SID (namely, the End.ADB SID in FIG. 37) is used to carry the third control information, the format of the fifth packet may be that shown in FIG. 37. The fifth packet includes the IPv6 header, the SRH, and the payload, where the second bypass SID of the fifth packet includes the third control information.

Figure 38:
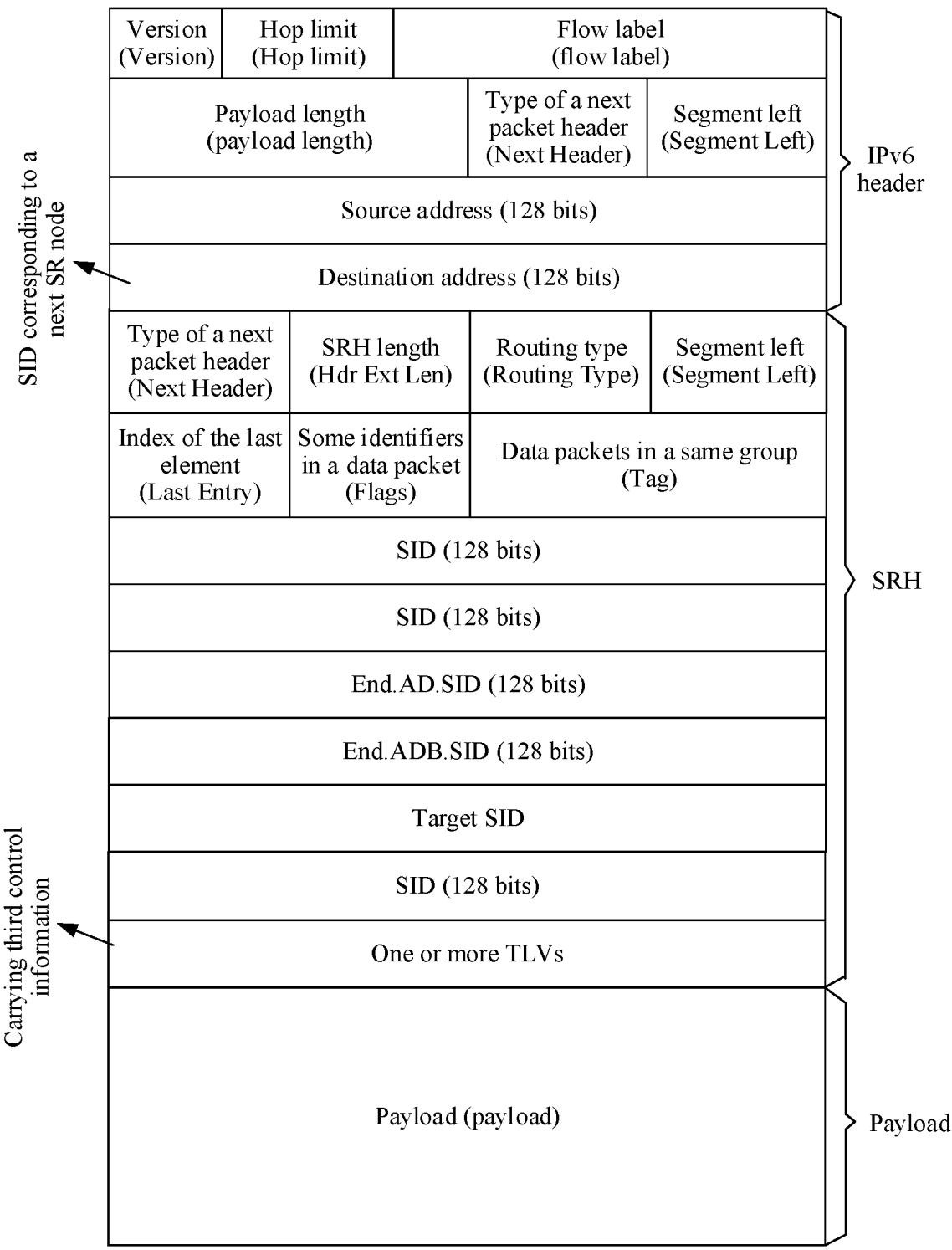
FIG. 38 is a schematic diagram of a fifth packet according to an embodiment of this application.

Implementation 2.3: Refer to FIG. 38. If the TLV in the SRH is used to carry the third control information, the format of the fifth packet may be that shown in FIG. 38. The fifth packet includes the IPv6 header, the SRH, and the payload, where the TLV in the SRH of the fifth packet includes the third control information.

Figure 39:
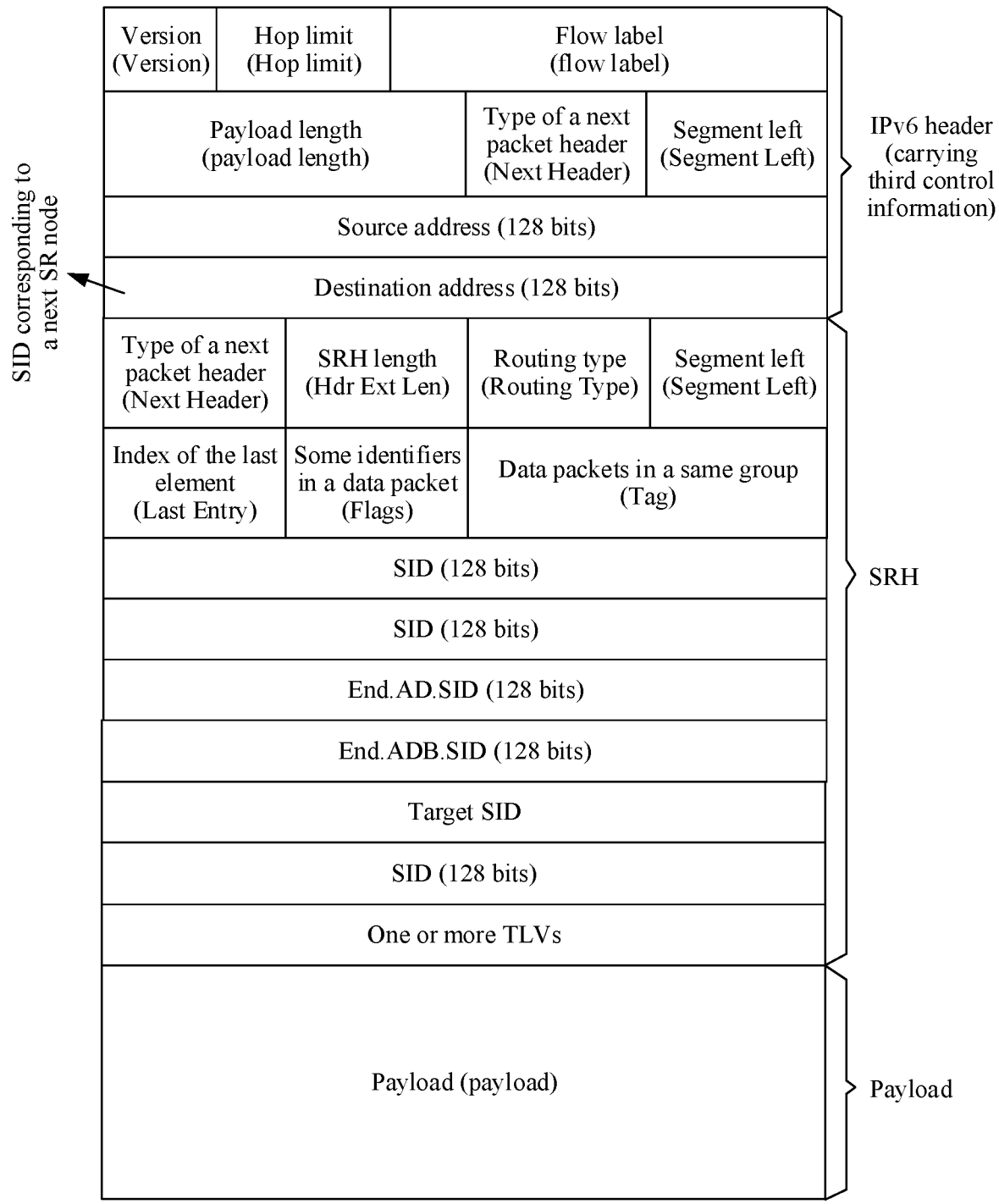
FIG. 39 is a schematic diagram of a fifth packet according to an embodiment of this application.

Implementation 2.4: Refer to FIG. 39. If the IPv6 header is used to carry the third control information, the format of the fifth packet may be that shown in FIG. 39. The fifth packet includes the IPv6 header, the SRH, and the payload, where the IPv6 header of the fifth packet includes the third control information.

In an embodiment, a generation process of the fifth packet may include the following operation 1 to operation 3.

Operation 1: The second proxy node inserts the second bypass SID into the segment list in the SRH of the fourth packet.

The second proxy node may insert the second bypass SID into the segment list by performing a push operation in SR, so that after the second bypass SID is inserted, the segment list newly includes the second bypass SID in addition to each original SID of the fourth packet. For an insertion location of the second bypass SID in the segment list, the second proxy node may insert the second bypass SID behind the active SID in the SRH, in other words, insert the second bypass SID behind the End.AD SID. FIG. 40 is a schematic diagram of inserting a second bypass SID according to an embodiment of this application. A left side of FIG. 40 shows the segment list of the fourth packet, and a right side of FIG. 40 shows a segment list of the fifth packet. In FIG. 40, the End.AD SID is a SID 2, and the second bypass SID is a SID 5. In this case, the second proxy node inserts the SID 5 behind the SID 2.

It should be noted that the foregoing provides description in a sequence from a SID 0 to the SID 5. A location of the SID 0 is referred to as "front", and a location of the SID 5 is referred to as "behind". When parsing an SRH, an SRv6 node usually reads SIDs in the SRH in reverse order. For example, in FIG. 40, the SID 4 is the first SID that is read and processed in the SRH of the fourth packet, the SID 3 is the second SID that is read and processed, and then the SID 2 is the third SID that is read and processed. The rest can be deduced by analogy, and the SID 0 is the last SID that is read and processed.

Operation 2: The second proxy node updates the SL in the SRH of the fourth packet.

Operation 3: The second proxy node updates the destination address of the fourth packet to obtain the fifth packet.

An SL of the fifth packet generated by the second proxy node is greater than the SL of the received fourth packet through the SL updating operation. In the SRv6 network, an SL in an SRH of the SRv6 packet is usually used to identify a quantity of to-be-processed SIDs. In this case, it can be indicated by modifying a value of the SL that the SRH of the fifth packet sent by the second proxy node includes more to-be-processed SIDs than the SRH of the fourth packet received by the second proxy node, so that the first proxy node and/or the transit node between the first proxy node and the second proxy node process/processes these more SIDs under an indication by the SL.

A next to-be-processed SID of the fifth packet can be updated from the End.AD SID to another SID through the destination address updating operation, so that when the first proxy node and/or the transit node perform/performs an operation corresponding to the another SID when looking up the local SID table by using the destination address.

It should be noted that the foregoing operations 1 to 3 are different from a normal SRv6 forwarding operation. In a normal SRv6 case, each SID in an SRH is inserted into an SRv6 packet by a head-end node. For each SRv6 node other than the head-end node, each time the SRv6 node receives an SRv6 packet, the SRv6 node performs only an operation corresponding to an active SID in an SRH, without inserting a SID into the SRH or deleting a SID from the SRH, in other words, each intermediate SRv6 node does not change the SID in the SRH. In addition, the SRv6 node decreases an SL in the SRH by 1, that is, performs SL--, to indicate that one SID in the SRH is processed at a local end. Therefore, a quantity of remaining unprocessed SIDs in the SRH is decreased by 1. However, in an embodiment, because the second bypass SID in the SRH is inserted into the fourth packet by the second proxy node, the second proxy node increases the SL in the SRH by 1, that is, performs SL++, to indicate that a quantity of remaining unprocessed SIDs in the SRH is increased by 1. The unprocessed SID that is newly added is the second bypass SID, and the second bypass SID needs to be transmitted to the first proxy node, so that the first proxy node performs an operation corresponding to the second bypass SID. After the SL is increased by 1, the active SID in the SRH is updated from the End.AD SID to the second bypass SID.

It should be understood that this embodiment is described only by using an example in which operation 1 is first described, then operation 2 is described, and finally operation 3 is described. A time sequence of operation 1, operation 2, and operation 3 is not limited in this embodiment. In an embodiment, the three operations may alternatively be performed in another sequence. For example, operation 3 is first performed, then operation 1 is performed, and finally operation 2 is performed. For another example, operation 2 is first performed, then operation 1 is performed, and finally operation 3 is performed. Certainly, the three operations may alternatively be performed in parallel, that is, operation 1, operation 2, and operation 3 may be performed simultaneously.

In an embodiment, if the control information is carried in the extension header, the second proxy node may not only perform operation 1, operation 2, and operation 3, but also perform the following operation 4.

Operation 4: The second proxy node generates the extension header, and encapsulates the extension header into the fourth packet.

It should be understood that a time sequence of operation 4 and operations 1, 2, and 3 is not limited in this embodiment. For example, operation 4 may alternatively be performed before operations 1, 2, and 3.

In an embodiment, the second proxy node may copy the fourth packet, to obtain two fourth packets, where one is the fourth packet itself, and the other is a copy of the fourth packet. The second proxy node may generate the fifth packet by using one of the two fourth packets, and generate a seventh packet by using the other fourth packet. In an embodiment, the second proxy node may generate the fifth packet by using the copy of the fourth packet, and generate the third packet by using the fourth packet itself. The fifth packet may carry the C-flag to indicate that the fifth packet is a packet obtained by copying the fourth packet.

The foregoing generation manner of the fifth packet may be implemented through a plurality of implementations based on different scenarios. The following uses an implementation 1 and an implementation 2 as examples for description.

Implementation 1: The second proxy node increases the SL of the fourth packet by 1. Operation 3 may be as follows: Update the destination address of the fourth packet to the first bypass SID.

Refer to FIG. 40. The left side of FIG. 40 shows the SL of the fourth packet, and the value of the SL of the fourth packet is 2. In this case, it indicates: there are two unprocessed SIDs in the segment list: the SID 0 and the SID 1; a currently active SID in the segment list is the SID 2; and there are two processed SIDs in the segment list: the SID 3 and the SID 4. The second proxy node may increase the SL by 1, so that the value of the SL is updated from 2 to 3. In this case, as shown on the right side of FIG. 40, a value of the SL of the fifth packet is 3, and it indicates: there are three unprocessed SIDs in the segment list: the SID 0, the SID 1, and the SID 2; a currently active SID in the segment list is the SID 5; and there are two processed SIDs in the segment list: the SID 3 and the SID 4. In addition, the second proxy node may modify the destination address in the IPv6 header in the fourth packet, so that the destination address of the fourth packet is updated from the End.AD SID to the second bypass SID.

The implementation 1 may be applied to a plurality of scenarios such as the scenario in which the first proxy node and the second proxy node are located on the one-hop IP link, the scenario in which the first proxy node and the second proxy node are located on the multi-hop IP link (off-link) but the SR function of the transit node between the first proxy node and the second proxy node is not enabled, and the scenario in which the first proxy node and the second proxy node are located on the multi-hop IP link but there is no service requirement for specifying the transit node to forward the fifth packet. A scenario in which the second proxy node performs the implementation 1 is not limited in this embodiment.

Implementation 2: The second proxy node may alternatively insert one or more target SIDs into the segment list in the SRH of the fourth packet. Operation 2 may be as follows: The second proxy node increases the SL of the fourth packet by N, where N is a positive integer greater than 1. Operation 3 may be as follows: The second proxy node updates the destination address of the fourth packet to the SID in the one or more target SIDs that corresponds to the next SR node.

Refer to FIG. 41. For example, if a transit node 1, a transit node 2, and a transit node 3 exist between the first proxy node and the second proxy node, the one or more target SIDs inserted by the second proxy node may be three SIDs: a SID 8 corresponding to the transit node 3, a SID 7 corresponding to the transit node 2, and a SID 6 corresponding to the transit node 1. For example, a left side of FIG. 41 shows the SL of the fourth packet, and the value of the SL of the fourth packet is 2. In this case, it indicates: there are two unprocessed SIDs in the segment list: a SID 0 and a SID 1; a currently active SID in the segment list is a SID 2; and there are two processed SIDs in the segment list: a SID 3 and a SID 4. The second proxy node may update the value of the SL from 2 to 6. In this case, as shown on a right side of FIG. 41, a value of the SL of the fifth packet is 6, and it indicates: there are six unprocessed SIDs in the segment list: the SID 0, the SID 1, the SID 2, a SID 5, the SID 6, and the SID 7; a currently active SID in the segment list is the SID 8; and there are two processed SIDs in the segment list: the SID 3 and the SID 4.

In an embodiment, a target forwarding path may be specified as the second proxy node—the transit node 3—the transit node 2—the transit node 1. It should be noted that, using a SID corresponding to each node as the target SID is merely an example. If the target forwarding path is a loose path, the one or more target SIDs inserted by the second proxy node may be a SID corresponding to a part of transit nodes.

The implementation 2 may be applied to a plurality of scenarios such as the scenario in which the first proxy node and the second proxy node are located on the multi-hop IP link and there is the service requirement for specifying the transit node to forward the fifth packet. A scenario in which the second proxy node performs the implementation 2 is not limited in this embodiment.

Figure 42:
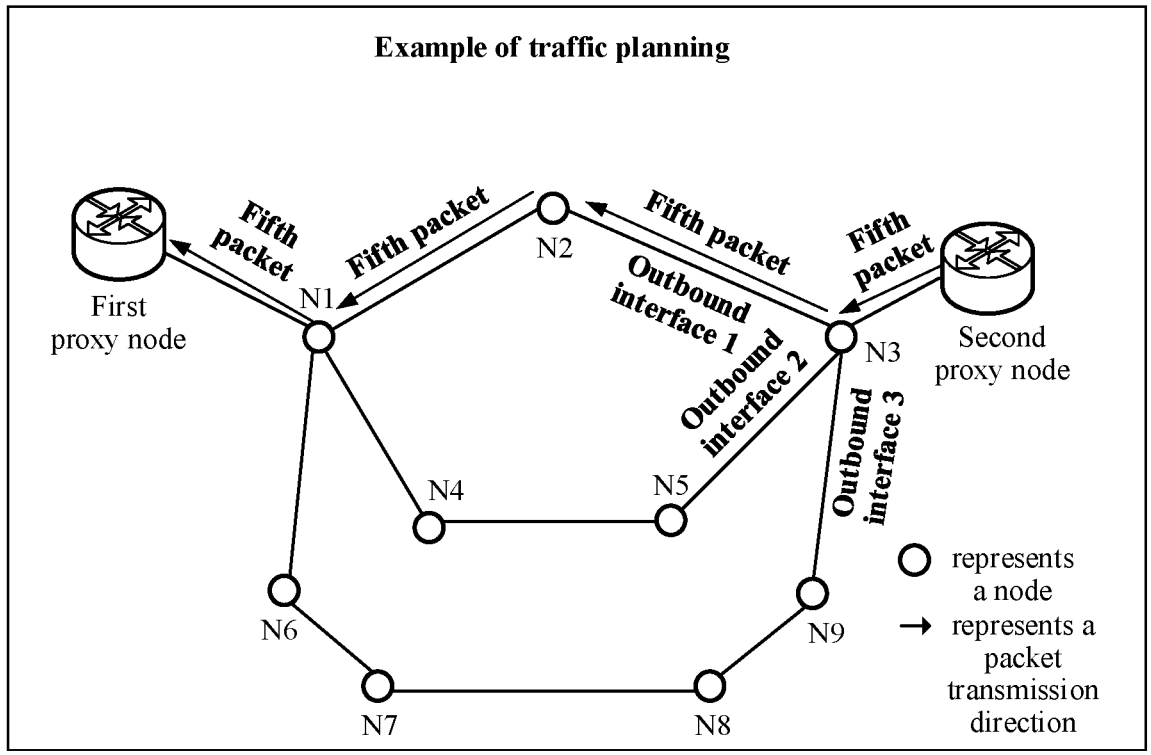
FIG. 42 is a schematic diagram of traffic planning according to an embodiment of this application.

In some possible embodiments, the second proxy node may perform traffic planning by inserting the target SID. For example, FIG. 42 is a schematic diagram of performing traffic planning by using a target SID according to an embodiment of this application. In FIG. 42, there are 9 forwarding nodes, namely, a node N1, a node N2, and a node N3 to a node N9, between the first proxy node and the second proxy node, and there are three paths, namely, (N1, N2, N3), (N1, N4, N5, N3), and (N1, N6, N7, N8, N9, N3), between the first proxy node and the second proxy node. The fifth packet may be controlled by using the target SID to be transmitted to the first proxy node through one specified path in the three paths. For example, if a bandwidth of the path (N1, N2, N3) is the largest, a SID that corresponds to a link (N2, N3) and that is distributed by the node N3 may be carried as the target SID in the segment list of the fifth packet, to transmit the fifth packet through the path (N1, N2, N3). In this case, when receiving the packet, the node N3 looks up a local SID table based on the target SID to find an outbound interface 1 bound to the link (N2, N3), and selects the outbound interface 1 to send the fifth packet, so that the fifth packet arrives at the node N2 after being sent through the outbound interface 1, and then arrives at the first proxy node through (N2, N1).

This manner may achieve at least the following effects: A forwarding path of the fifth packet can be selected based on a service requirement, to control the fifth packet to be transmitted through a specified target forwarding path. This facilitates path planning and implements traffic optimization.

In addition, the second proxy node may modify the destination address in the IPv6 header in the fourth packet, so that the destination address of the fourth packet is updated from the End.AD SID to the SID corresponding to the next SR node.

It should be noted that the foregoing implementations 1 and 2 are merely examples. In some other embodiments, the fifth packet may be generated in another implementation. For example, a binding SID (BSID) may be used to identify the target forwarding path. In this case, the second proxy node may insert the second bypass SID and the BSID into the segment list in the SRH of the fourth packet, update the destination address in the IPv6 header of the fourth packet to the BSID, and increase the SL of the fourth packet by 2. After receiving the fifth packet and looking up the local SID table by using the BSID, the next SR node may perform an End.B6. Insert operation (an SRv6 insertion operation) to insert a new SRH into the fifth packet, or may perform an End.B6.Encaps operation (an SRv6 encapsulation operation) to insert, into the fifth packet, an outer IPv6 header including an SRH. The BSID can be used to reduce a depth of the SRH and compress the SRH.

Figure 43:
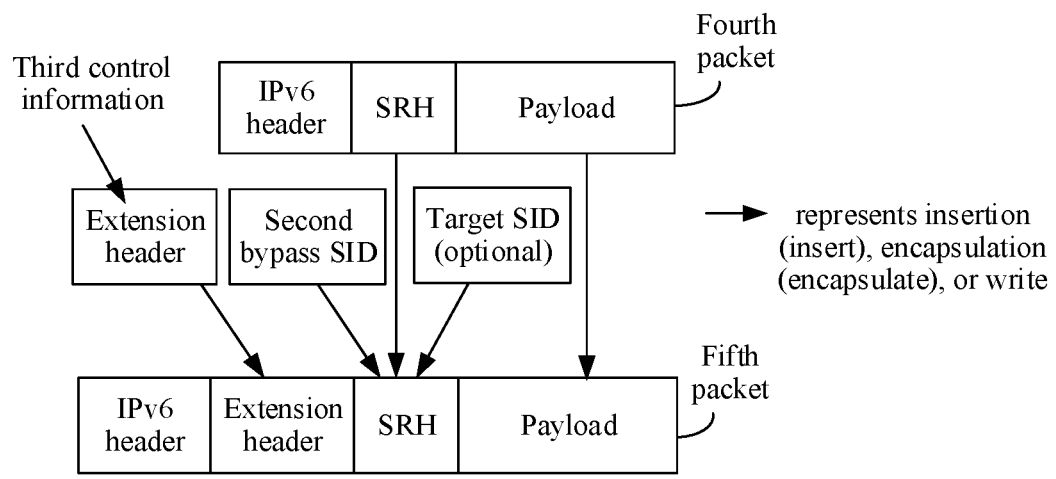
FIG. 43 is a schematic diagram in which a fourth packet evolves into a fifth packet according to an embodiment of this application.
Figure 44:
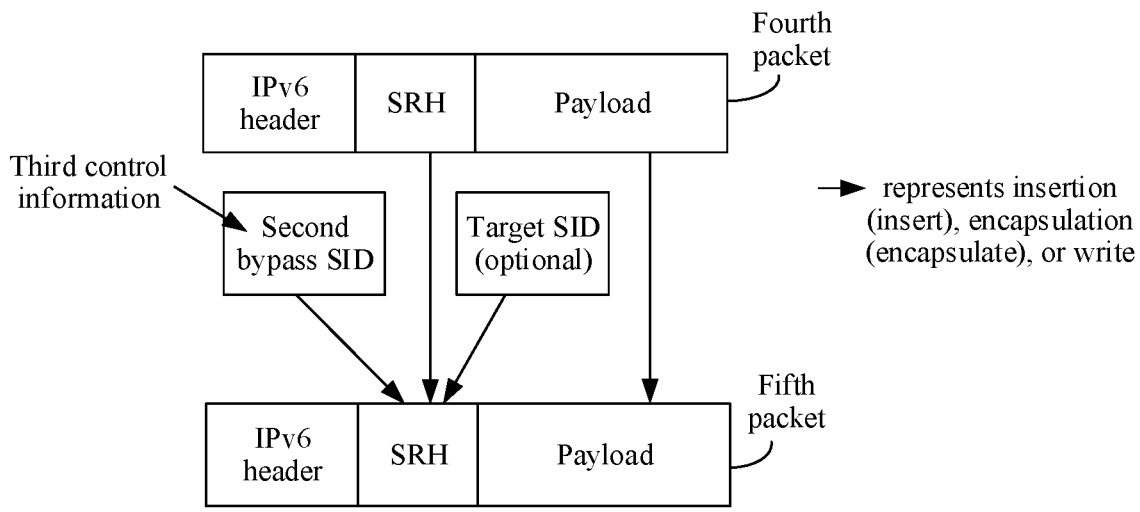
FIG. 44 is a schematic diagram in which a fourth packet evolves into a fifth packet according to an embodiment of this application.
Figure 45:
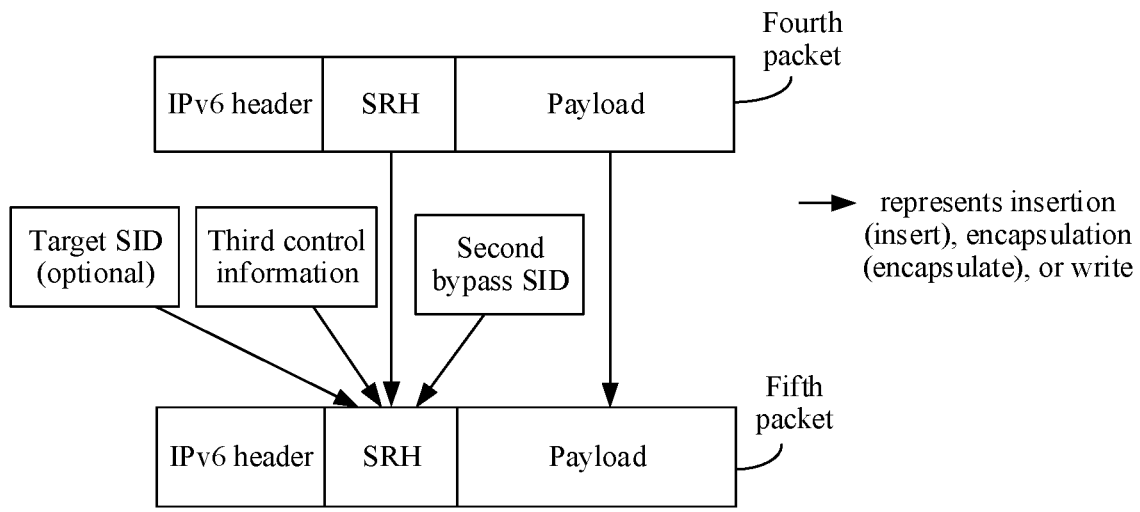
FIG. 45 is a schematic diagram in which a fourth packet evolves into a fifth packet according to an embodiment of this application.
Figure 46:
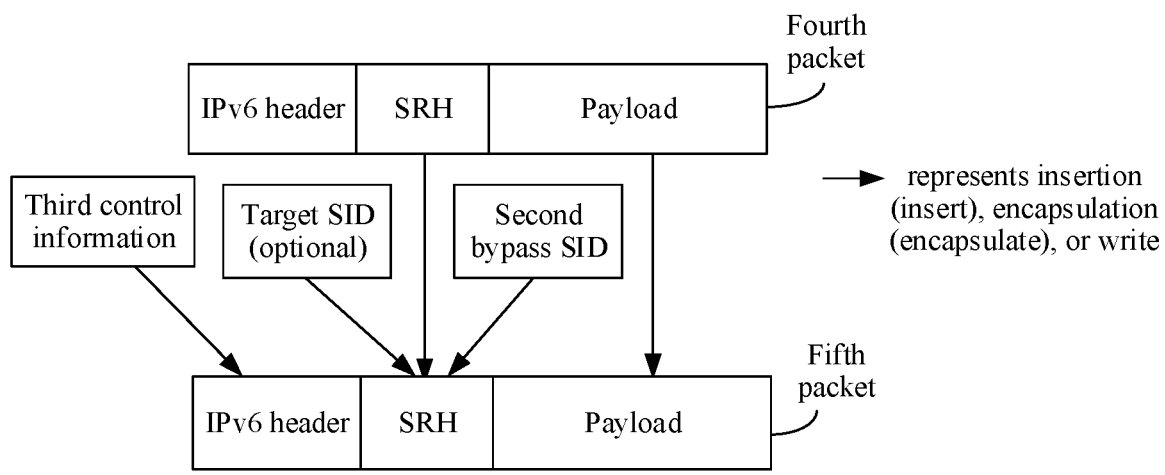
FIG. 46 is a schematic diagram in which a fourth packet evolves into a fifth packet according to an embodiment of this application.

Based on the foregoing operation 1 to operation 4, FIG. 43 is a schematic diagram in which a fourth packet evolves into a fifth packet according to an embodiment of this application, and is adapted to describe a case in which the extension header is used to carry the third control information. It can be learned from FIG. 43 that, two pieces of information, namely, the second bypass SID used to transmit the packet to the first proxy node and the extension header used to carry the third control information, may be added to the fourth packet. The fifth packet may be obtained through such simple operations. In addition, in an embodiment, the target SID may be added to indicate the target forwarding path. FIG. 44 is adapted to describe a case in which the bypass SID is used to carry the third control information. It can be learned from FIG. 44 that the second bypass SID may be added to the fourth packet to obtain the fifth packet. FIG. 45 is adapted to describe a case in which the TLV is used to carry the third control information. It can be learned from FIG. 45 that the second bypass SID may be added to the fourth packet, and the third control information is written into the TLV in the SRH, to obtain the fifth packet. FIG. 46 is adapted to describe a case in which the IP header is used to carry the third control information. It can be learned from FIG. 46 that the second bypass SID may be added to the fourth packet, and the third control information is written into the IPv6 header, to obtain the fifth packet.

The fifth packet is generated in an embodiment, to achieve at least the following effects:

Usually, each SRH cached by a proxy node is dynamically learned from a packet by a data plane (for example, a forwarding chip) of the proxy node in a packet forwarding process. To avoid affecting forwarding performance of the data plane, the data plane usually does not send the SRH to a CPU. For the CPU of the proxy node, because the CPU obtains no SRH, the CPU cannot generate a packet including the SRH, and therefore cannot back up the SRH to the second proxy node by using the packet. For the data plane of the proxy node, because the data plane can usually perform only a simple processing operation, it is complex, difficult, and not feasible for the data plane to regenerate an entire packet based on the SRH. It can be learned that how to back up the SRH to the second proxy node through the data plane is a great technical difficulty. According to the foregoing packet generation method, the fifth packet may be generated by copying the received fourth packet, inserting a SID (the second bypass SID), and encapsulating the extension header. Compared with a manner of regenerating an entire packet, this manner is quite simple in processing operations. Therefore, a packet generation process may be performed by the data plane without relying on a control plane, so that this technical difficulty is successfully overcome. By experiment, the foregoing packet generation logic is configured for microcode of the forwarding chip, so that the forwarding chip can perform an operation of generating the fifth packet. Therefore, this manner supports a microcode architecture and has strong practicality.

In an embodiment, a trigger condition for generating the fifth packet may include one or more of the following condition (1) to condition (3).

Condition (1): It is detected that a cache entry is generated.

The second proxy node may detect the cache. If the cache originally does not include a cache entry, but a new cache entry is added to the cache after the fourth packet is received, it is detected that the cache entry is generated. In this case, the second proxy node generates the fifth packet, and sends the fifth packet.

Condition (2): It is detected that a cache entry is updated.

The second proxy node may detect a cache entry in the cache. If a write operation is performed on the cache entry to update the cache entry, the second proxy node generates the fifth packet, and sends the fifth packet.

A forwarding process of the fifth packet is triggered by using the foregoing condition (1) or condition (2), to achieve at least the following effects: On the one hand, each time the second proxy node receives a new SRH, because the new SRH triggers generation of a cache entry to trigger forwarding of the fifth packet, the new SRH can be transmitted to the first proxy node in time by forwarding the fifth packet, to ensure that the new SRH is synchronized to the first proxy node in real time. On the other hand, for a previously stored SRH, because the stored SRH does not trigger generation of a cache entry, and therefore does not trigger forwarding of the fifth packet, processing overheads for transmitting the SRH to generate the fifth packet and network overheads for transmitting the fifth packet are eliminated.

In an example scenario, a data flow including N data packets arrives at the second proxy node. When the second proxy node receives the $1^{st}$ fourth packet in the data flow, an SRH of the $1^{st}$ fourth packet is a new SRH for the second proxy node. In this case, the second proxy node generates a cache entry to store the SRH of the $1^{st}$ fourth packet. In this case, the condition (1) is met, and the second proxy node is triggered to generate the fifth packet and send the fifth packet. Therefore, the SRH of the $1^{st}$ fourth packet is transmitted to the first proxy node by using the fifth packet, so that the SRH of the $1^{st}$ fourth packet is also stored in the first proxy node. When the second proxy node receives any of the $2^{nd}$ fourth packet and the $3^{rd}$ fourth packet to the last fourth packet in the data flow, because an SRH of each fourth packet in the same data flow is usually the same, SRHs of these fourth packets are stored SRHs for the second proxy node. In this case, the second proxy node does not generate a cache entry; and because the condition (1) is not met, the second proxy node does not generate the fifth packet or send the fifth packet. Therefore, overheads for forwarding N−1 fifth packets are eliminated. In addition, when receiving each fourth packet in the data flow, the second proxy node or the first proxy node may encapsulate the SRH of the Pt fourth packet into the fourth packet to restore the packet. N is a positive integer.

Condition (3): It is detected that a current time point is an end time point of a sending periodicity of the fifth packet.

The second proxy node may periodically send the fifth packet. In an embodiment, the second proxy node may set the sending periodicity for the fifth packet, and generate and send the fifth packet each time one sending periodicity elapses.

In an embodiment, the second proxy node may periodically synchronize the SRH of the fourth packet to the first proxy node by using the fifth packet, so that the first proxy node can periodically refresh the cached SRH, to improve SRH synchronization reliability.

Operation 3004: The second proxy node sends the fifth packet to the first proxy node.

The forwarding path for sending the fifth packet may be similar to a forwarding path for sending the second packet. For example, the fifth packet may be sent through a peer link or forwarded through the router node. Details are not described herein in this embodiment.

In an embodiment, transmission reliability of the fifth packet may be implemented in either of the following manners 1 and 2.
Manner 1: Repeated Sending The second proxy node may generate a plurality of fifth packets, where the plurality of fifth packets may be the same. The second proxy node may continuously send the plurality of fifth packets to the first proxy node, and the first proxy node continuously receives the plurality of fifth packets from the second proxy node.

In an embodiment, the SRH of the fourth packet can be transmitted to the first proxy node by using any of the plurality of fifth packets. Therefore, a probability that the SRH is lost in a transmission process is reduced, implementation is simple, and feasibility is high.
Manner 2: Acknowledgment Mechanism A corresponding acknowledge (ACK) packet may be designed for the fifth packet, so that a receive end of the fifth packet returns the ACK packet to notify a transmit end of the fifth packet that the receive end has received the fifth packet.

In an embodiment, a packet transmission procedure based on the acknowledgment mechanism may include the following operations 1 to 4.

Operation 1: The first proxy node generates a sixth packet based on the first bypass SID, the second bypass SID, and the fifth packet.

The sixth packet is an ACK packet corresponding to the fifth packet, and the sixth packet indicates acknowledgment of receiving of the fifth packet. The sixth packet is forwarded to the second proxy node to notify the second proxy node of an event that the first proxy node has received the fifth packet. An encapsulation format of the sixth packet may be similar to that of the fifth packet. A difference lies in that a destination address of the sixth packet is the first bypass SID corresponding to the second proxy node. The sixth packet may carry a fourth flag, and the fourth flag in the sixth packet may indicate that the sixth packet is an acknowledge packet. For example, the sixth packet may include an extension header, the extension header carries a C-flag and an A-flag, the C-flag is set to 1, and the A-flag is set to 1.

In an embodiment, the first proxy node may re-encapsulate the fifth packet to obtain the sixth packet. In an embodiment, a generation process of the sixth packet may include: updating, by the first proxy node, the source address of the fifth packet to the second bypass SID; updating, by the first proxy node, the destination address of the fifth packet from the second bypass SID to the first bypass SID; and modifying, by the first proxy node, a value of the fourth flag in the fifth packet, to obtain the sixth packet. The three operations of updating the source address, updating the destination address, and modifying the fourth flag may be combined in any order. A time sequence of the three operations is not limited in this embodiment.

The sixth packet is generated in an embodiment, to achieve at least the following effects: The first proxy node may obtain the sixth packet by modifying the source address, the destination address, and the fourth flag of the received fifth packet. Compared with a manner of regenerating an entire packet, this manner is quite simple in processing operations. Therefore, a packet generation process may be performed by a data plane, without relying on a control plane, to provide an ACK packet generation manner that can be implemented by using the data plane such as a forwarding engine without relying on the control plane such as a CPU. By experiment, the foregoing packet generation logic is configured for microcode of a forwarding chip, so that the forwarding chip can perform an operation of generating the sixth packet. Therefore, this manner supports a microcode architecture and has strong practicality.

Operation 2: The first proxy node sends the sixth packet to the second proxy node.

Operation 3: When receiving the sixth packet, the second proxy node determines that the first proxy node has received the fifth packet.

In some embodiments, the second proxy node may obtain first control information from the sixth packet, and determine that the first control information indicates that the fifth packet has been received. For example, the first proxy node may identify a value of a third flag and a value of a fourth flag in the sixth packet. If the value of the third flag is set to 1 and the value of the fourth flag is set to 1, the first proxy node determines that the control information indicates that the fifth packet has been received.

Operation 4: When not receiving the sixth packet, the second proxy node retransmits the fifth packet to the first proxy node.

Through a forwarding process of the sixth packet, the second proxy node can determine, depending on whether the sixth packet is received, whether the first proxy node has received the SRH, and perform retransmission when the first proxy node does not obtain the SRH, to ensure that the SRH is transmitted to the first proxy node. This ensures SRH transmission reliability.

Operation 3005: The first proxy node receives the fifth packet from the second proxy node, and determines that the third control information indicates the first proxy node to store the SRH of the fourth packet.

For an action performed on the fifth packet, the first proxy node may read the destination address of the fifth packet, and look up the local SID table based on the destination address of the fifth packet, to determine whether the destination address matches a SID in the local SID table. When the destination address matches the second bypass SID in the local SID table, in other words, the destination address hits the second bypass SID in the local SID table, the first proxy node may determine that the fifth packet is an SRv6 packet, and perform an operation corresponding to the second bypass SID.

In some possible embodiments, the first proxy node may identify a value of the third flag and the value of the fourth flag in the fifth packet. If the value of the third flag is set to 1 and the value of the fourth flag is set to 0, the first proxy node determines that the third control information indicates to store the SRH of the first packet.

An operation corresponding to the second bypass SID may include: detecting whether the fifth packet includes the third control information; and if the third control information is identified from the fifth packet, determining to store the SRH of the fourth packet, obtaining the SRH of the fourth packet based on the fifth packet, and storing the SRH of the fourth packet.

It should be noted that both an operation corresponding to the third control information and the operation corresponding to the End.AD SID include the operation of storing the SRH of the fourth packet, and a difference between the operation corresponding to the third control information and the operation corresponding to the End.AD SID lies in: The operation corresponding to the End.AD SID includes an operation of forwarding the payload of the fourth packet to the SF node, but the operation corresponding to the third control information may not include the operation of forwarding the payload of the fourth packet to the SF node, to avoid a case in which the SF node repeatedly processes the payload of the same packet after both the second proxy node and the first proxy node forward the payload of the fourth packet to the SF node.

Operation 3006: The first proxy node parses the fifth packet to obtain the SRH of the fourth packet.

The SRH of the fifth packet may include each SID in the SRH of the fourth packet, and may further include other information in addition to the SID in the SRH of the fourth packet. The first proxy node may obtain the SRH of the fourth packet based on the SRH of the fifth packet. In an embodiment, the SRH of the fourth packet may be obtained by performing the following operation 1 and operation 2.

Operation 1: The first proxy node deletes the second bypass SID from the segment list in the SRH of the fifth packet.

This operation may be considered as an inverse process of operation 1 in the generation process of the fifth packet in operation 3003. In an embodiment, the first proxy node may delete the second bypass SID from the segment list by performing a pop operation in the SR, so that the segment list is restored to the original segment list of the fourth packet after the second bypass SID is deleted. The first proxy node may delete the active SID in the SRH, in other words, delete the second bypass SID behind the End.AD SID. Refer to FIG. 40. The left side of FIG. 40 shows the segment list of the fourth packet, and the right side of FIG. 40 shows the segment list of the fifth packet. In FIG. 40, the End.AD SID is the SID 2, and the second bypass SID is the SID 5. In this case, the first proxy node may delete the SID 5 behind the SID 2, to restore the segment list from the segment list on the right side to the segment list on the left side.

Operation 2: The first proxy node decreases the SL in the SRH of the fifth packet by 1, to obtain the SRH of the fourth packet.

This operation may be considered as an inverse process of operation 2 in the generation process of the fifth packet in operation 3003. Refer to FIG. 40. For example, the right side of FIG. 40 shows the SL of the fifth packet, and the value of the SL of the fifth packet is 3. This indicates: there are three unprocessed SIDs in the segment list: the SID 0, the SID 1, and the SID 2, the currently active SID in the segment list is the SID 5, and there are two processed SIDs in the segment list: the SID 3 and the SID 4. The first proxy node may decrease the SL by 1, so that the value of the SL is updated from 3 to 2. In this case, as shown on the left side of FIG. 40, the value of the SL of the fourth packet is 2, and it indicates: there are two unprocessed SIDs in the segment list: the SID 0 and the SID 1; the currently active SID in the segment list is the SID 2; and there are two processed SIDs in the segment list: the SID 3 and the SID 4.

In addition, in a scenario in which the second proxy node specifies a transit node for forwarding the fifth packet, because the SL of the fifth packet may be decreased by the transit node in a transmission process, a fifth packet received by the first proxy node and the fifth packet sent by the second proxy node may be different due to an SL update. An SL of the fifth packet received by the second proxy node may be less than the SL of the fifth packet sent by the second proxy node. Refer to FIG. 41. For example, when the second proxy node sends the fifth packet, the SL of the fifth packet is 6; and because the transit node 1 updates the SL from 6 to 5, the transit node 2 updates the SL from 5 to 4, and the transit node 3 updates the SL from 4 to 3, an SL of the fifth packet received by the first proxy node is 3.

It should be noted that the foregoing operations 1 and 2 are different from the normal SRv6 forwarding operation. In the normal SRv6 case, each SID in the SRH is inserted into the SRv6 packet by the head-end node. For each SRv6 node other than the head-end node, each time the SRv6 node receives the SRv6 packet, the SRv6 node performs only the operation corresponding to the active SID in the SRH, without pushing the SID into the SRH or popping the SID from the SRH, in other words, each intermediate SRv6 node does not change the SID in the SRH.

In an embodiment, because the second bypass SID in the SRH of the fifth packet is inserted by the second proxy node, and the second bypass SID is not a SID originally included in the SRH of the fourth packet, the first proxy node deletes the second bypass SID from the SRH of the fifth packet, to strip the second bypass SID, and restore the SRH of the fifth packet to the SRH of the fourth packet.

In an embodiment, on the one hand, from the perspective of the router node, because an SRH of a packet obtained by the first proxy node is basically consistent with the SRH of the packet previously sent by the router node to the second proxy node, if the first proxy node subsequently receives a processed packet, an SRH restored by the first proxy node is basically consistent with an SRH previously sent by the router node. In this case, after the first proxy node returns, to the router node, a packet whose SRH is restored, the SRH of the packet obtained by the router node is basically consistent with the SRH of the previously sent packet. This avoids a case in which the SRH cannot be identified by the SF node and therefore is lost, and implements a proxy function of the first proxy node. On the other hand, from the perspective of the SF node, after the SF node chooses to forward a processed packet to the second proxy node or the first proxy node, because SRHs stored in the second proxy node and the first proxy node are basically consistent, after receiving the packet, either of the second proxy node and the first proxy node restores a basically consistent SRH for the packet, thereby ensuring peer functions of the second proxy node and the first proxy node, and implementing a dual-homing architecture based on two proxy nodes.

It should be understood that, that SRHs of two packets are basically consistent herein means that main content in the SRHs of the two packets is consistent, but it is not limited that the SRHs of the two packets are necessarily completely the same. In an embodiment, the SRHs of the two packets may be slightly different. For example, segment lists in the SRHs of the two packets are the same, but SLs in the SRHs of the two packets are different. For example, because the End.AD SID is processed by the second proxy node, the SL is decreased by 1. For another example, because some parameters included in the TLV of the SRH are identified and processed by the two proxy nodes or the transit node between the two proxy nodes, content in the TLV is changed. These cases with slight differences should also fall within the protection scope of the embodiments of this application.

Operation 3007: The first proxy node stores the SRH of the fourth packet in the cache.

In an embodiment, the first proxy node may detect whether the SRH of the fourth packet has been stored in the cache. If the SRH of the fourth packet is not stored in the cache, the first proxy node allocates a cache entry to the SRH of the fourth packet to obtain the cache entry, and stores the SRH of the fourth packet in the allocated cache entry. In addition, if detecting that the SRH of the fourth packet has been stored in the cache, the first proxy node may skip the operation of storing the SRH of the fourth packet.

With reference to operation 3005 to operation 3007, in some possible embodiments, using an example in which the second bypass SID is denoted as S and the first proxy node is denoted as N, operations performed based on the second bypass SID may be as follows:

When N receives a packet destined to S and S is a local End.ADB SID, N does/Annotation: When N receives a packet whose destination address is S, and S is a bypass SID distributed by N, N performs the following operations./
   decrement SL/Annotation: Decrease an SL by 1;/
   update the IPv6 DA with SRH[SL]/Annotation: update the IPv6 destination address by using an SRH[SL];/
   lookup the local SID table using the updated DA/Annotation: look up a local SID table by using an updated destination address; and
   forward accordingly to the matched entry/Annotation: perform a forwarding operation based on a matched entry in the local SID table.

After the SL is decreased by 1, the SRH[SL] corresponds to the End.AD SID. In this case, after the destination address is updated by using the SRH[SL], the destination address is updated to the End.AD SID. Therefore, the matched entry corresponding to the End.AD SID is found by looking up the local SID table by using the End.AD SID. The matched entry that is in the local SID table and that corresponds to the End.AD SID may be used to indicate an operation corresponding to the End.AD SID, and the matched entry corresponding to the End.AD SID may be preconfigured, so that the operation corresponding to the End.AD SID includes: detecting whether the packet includes third control information; and if the packet includes the third control information, storing an SRH of the packet without forwarding a payload of the packet to the SF node.

In an embodiment, a forwarding rule of the first proxy node may be preconfigured, to configure that the first proxy node must not respond to the second proxy node by using the fifth packet after receiving the fifth packet, to prevent the second proxy node from repeatedly generating the fifth packet and sending the fifth packet to the first proxy node when receiving the fifth packet, and therefore avoid a forwarding loop of the fifth packet between the second proxy node and the first proxy node.

Operation 3008: The second proxy node generates a seventh packet based on the fourth packet.

The seventh packet is a packet used to transmit the payload of the fourth packet to the SF node. The seventh packet may be a data packet, and the seventh packet may include the payload of the fourth packet but does not include the SRH of the fourth packet. For a generation process of the seventh packet, the second proxy node may strip the SRH from the fourth packet to obtain the seventh packet, so that the SRH of the fourth packet is removed, but the payload of the fourth packet is carried in the seventh packet.

In an embodiment, the seventh packet may further include a tunnel header. In an embodiment, a transmission tunnel may be established between the second proxy node and the SF node. In this case, the second proxy node may not only strip the SRH of the fourth packet, but also generate the tunnel header corresponding to the transmission tunnel, and encapsulate the tunnel header, so that the seventh packet includes the tunnel header. The tunnel header of the seventh packet may be a VXLAN tunnel header, a GRE tunnel header, an IP in IP tunnel header, or the like.

The second proxy node may first strip the SRH of the fourth packet, and then encapsulate the tunnel header into the fourth packet from which the SRH is stripped; or may first encapsulate the tunnel header into the fourth packet, and then strip the SRH from the fourth packet into which the tunnel header is encapsulated. A time sequence of stripping the SRH and encapsulating the tunnel header in the generation process of the seventh packet is not limited in this embodiment.

It should be understood that it is optional that the seventh packet includes the tunnel header. In another embodiment, the second proxy node may directly use the fourth packet from which the SRH is stripped as the seventh packet. In this case, the seventh packet may alternatively not include the tunnel header.

Operation 3009: The second proxy node sends the seventh packet to the SF node.

Operation 3008 and operation 3009 may be performed to achieve at least the following effects: On the one hand, the second proxy node can transmit the payload of the fourth packet to the SF node, so that the SF node can process the payload, to implement a corresponding service function by processing the packet. On the other hand, the SRH of the packet is prevented from being transmitted to the SF node, to avoid a case in which the SF node cannot identify the SRH and therefore fail to process the packet. As a result, a dynamic proxy function is implemented.

It should be understood that this embodiment is described only by using an example in which the generation and sending processes of the seventh packet are first described and then the generation and sending processes of the fifth packet are described. A sequence of generating the fifth packet and generating the seventh packet is not limited in this embodiment, and a sequence of sending the fifth packet and sending the seventh packet is not limited either. In an embodiment, operation 3003 and operation 3004 may be performed with operation 3008 and operation 3009 in sequence. For example, operation 3008 and operation 3009 may be performed first, and then operation 3003 and operation 3004 are performed. Alternatively, operation 3003 and operation 3004 may be performed first, and then operation 3008 and operation 3009 are performed. In another embodiment, operation 3003 and operation 3004 may be simultaneously performed with operation 3008 and operation 3009.

Operation 3010: The SF node receives the seventh packet from the second proxy node, and processes the seventh packet to obtain a first packet.

The SF node may perform service function processing on the seventh packet according to a configured service policy. For example, the SF node may perform intrusion detection on the seventh packet, to implement a service function of a firewall. For another example, the SF node may modify a 5-tuple, MAC information, or application layer information of the seventh packet, to implement a NAT service function. For still another example, the SF node may perform load balancing, user authentication, and the like on the seventh packet. A processing manner by the SF node is not limited in this embodiment.

Operation 3011: The SF node sends the first packet to the first proxy node.

Operation 3012: The first proxy node receives the first packet from the SF node, and looks up the cache of the first proxy node to obtain an SRH corresponding to the first packet.

The first proxy node may obtain an index of the SRH corresponding to the first packet based on the first packet, and look up SRHs in the cache of the first proxy node based on the index, to find the SRH of the fourth packet, where the SRH of the fourth packet is the SRH corresponding to the first packet.

In an embodiment, the SRH lookup manner may include any one of the following lookup manner 1 to lookup manner 3:

Lookup manner 1: The first proxy node may obtain a flow identifier corresponding to the first packet based on the first packet, and look up the cache by using the flow identifier corresponding to the first packet as an index, to obtain the SRH corresponding to the first packet, where the first packet may include the flow identifier.

Lookup manner 2: The first proxy node may obtain an identifier of a cache entry based on the first packet, and look up the cache by using the identifier of the cache entry as an index, to obtain the SRH corresponding to the first packet, where the first packet may include the identifier of the cache entry.

Lookup manner 3: The first proxy node may obtain a flow identifier corresponding to the first packet and a VPN identifier based on the first packet, and look up the cache based on the flow identifier corresponding to the first packet, the VPN identifier, and the End. AD SID, to obtain the SRH of the first packet, where the first packet may include the VPN identifier, and the VPN identifier may be mapped to the End.AD SID.

Operation 3013: The first proxy node generates a third packet based on the first packet and the SRH corresponding to the first packet.

Operation 3014: The first proxy node sends the third packet to the router node.

Operation 3015: The router node receives the third packet from the first proxy node, and forwards the third packet.

According to the method provided in this embodiment, the second proxy node receives the second packet sent by the first proxy node, and finds that the first proxy node loses the cached SRH. In this case, subsequently, each time the second proxy node receives a packet including an SRH, the second proxy node includes the SRH in the fifth packet, and sends the fifth packet to the first proxy node. The first proxy node may re-obtain the SRH by using the fifth packet, to re-cache the SRH. In this way, after a cache miss, the first proxy node may automatically and quickly relearn a cache entry including the SRH, and therefore implements cache self-healing. If subsequently receiving a packet whose SRH needs to be restored, the first proxy node may locally perform an SRH restoration task to implement a dynamic proxy function, without forwarding the packet to the second proxy node, thereby avoiding a transmission delay caused by traffic bypass.

A basic packet transmission procedure is described in the foregoing method embodiment, and the method provided in the embodiments of this application may further support a NAT scenario. In the NAT scenario, the method provided in the embodiments of this application may be performed to ensure that when the SF node modifies a flow identifier corresponding to a packet, the proxy node can still find an SRH of the packet based on a packet with a modified flow identifier, thereby ensuring that the SRH of the packet is restored. The following describes a packet transmission procedure in the NAT scenario with reference to FIG. 47A and FIG. 47B. It should be noted that the embodiment in FIG. 47A and FIG. 47B focuses on describing a difference from the embodiment in FIG. 5. For operations and other features similar to those in the embodiment in FIG. 5, refer to the embodiment in FIG. 5. Details are not described in the embodiment in FIG. 47A and FIG. 47B.

Figure 47A:
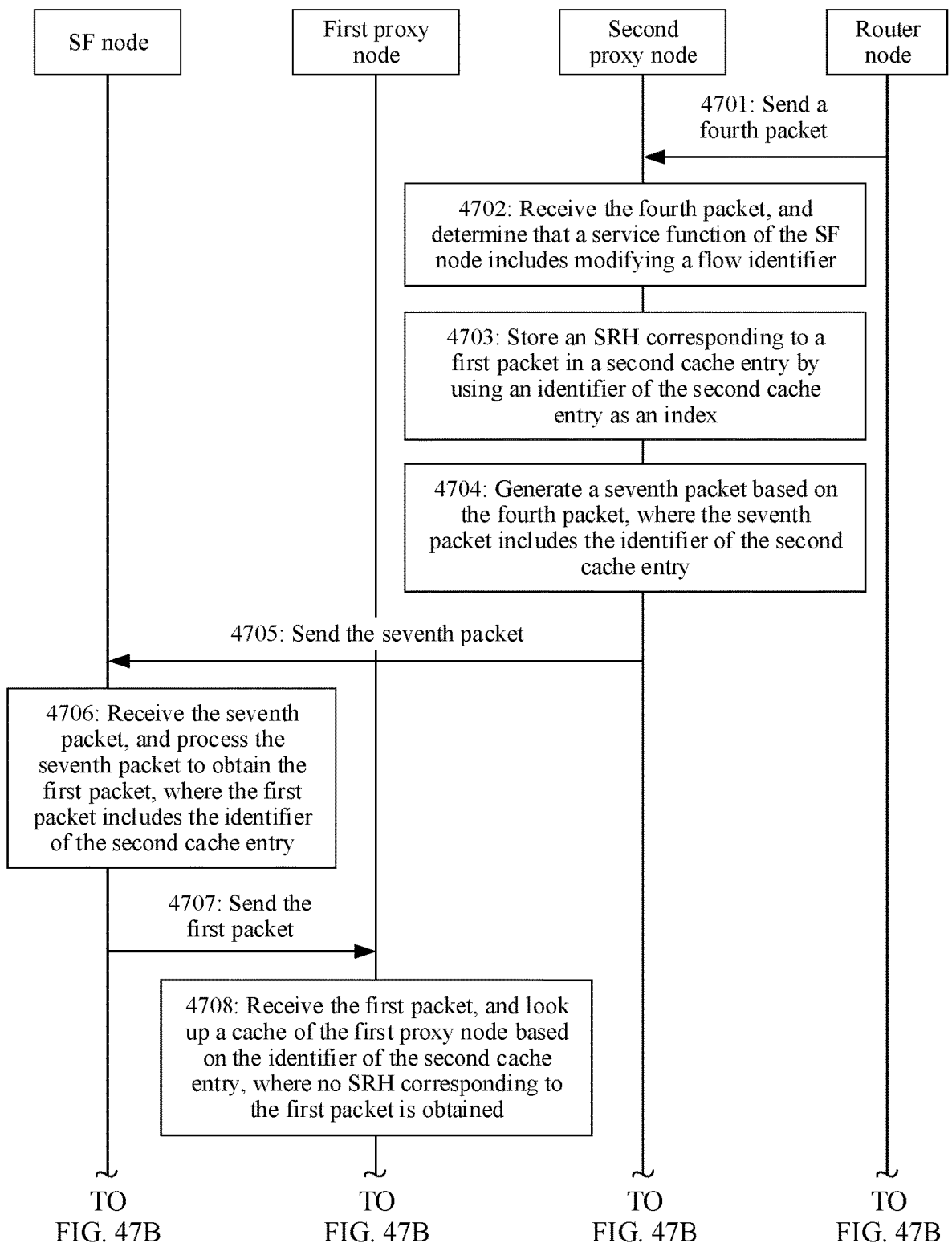
FIG. 47A and FIG. 47B are a flowchart of a packet transmission method according to an embodiment of this application.
Figure 47B:
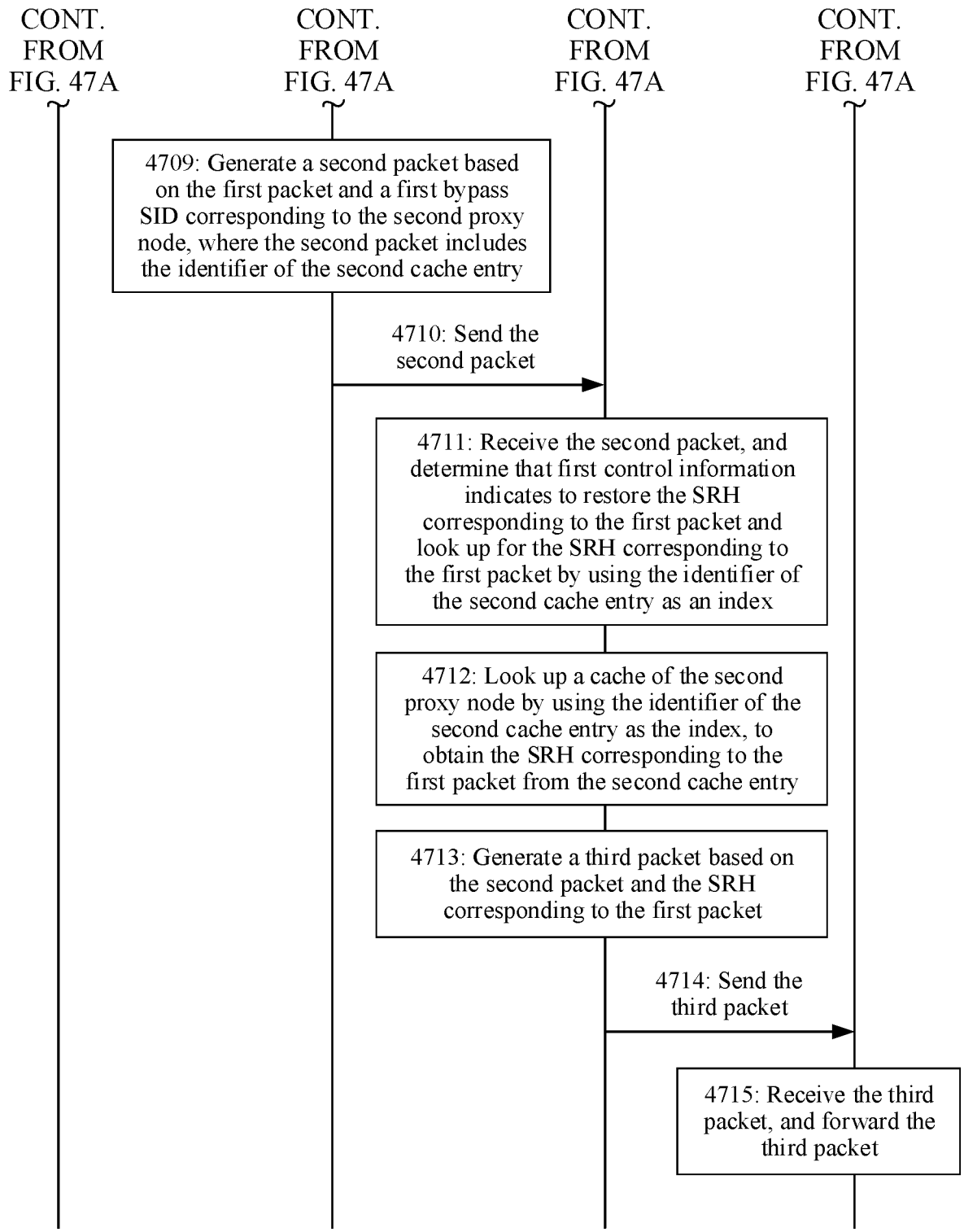

FIG. 47A and FIG. 47B are a flowchart of a packet transmission method according to an embodiment of this application. As shown in FIG. 47A and FIG. 47B, the method may include the following operations.

Operation 4701: A router node sends a fourth packet to a second proxy node.

The fourth packet may include an SRH corresponding to a first packet. For example, an SRH of the fourth packet may be the SRH corresponding to the first packet.

Operation 4702: The second proxy node receives the fourth packet from the router node, and determines that a service function of an SF node includes modifying a flow identifier.

In an embodiment, the second proxy node may read a destination address of the fourth packet, and look up a local SID table based on the destination address of the fourth packet, to determine whether the destination address matches a SID in the local SID table. When the destination address matches an End.AD SID in the local SID table, in other words, the destination address hits the End.AD SID in the local SID table, the second proxy node may determine that the fourth packet is an SRv6 packet, and perform a dynamic proxy operation corresponding to the End.AD SID.

For a process of determining the service function of the SF node, in an embodiment, a configuration operation may be performed on the second proxy node in advance, and the second proxy node may receive a configuration instruction, to obtain service function information of the SF node from the configuration instruction. The service function information indicates that the service function of the SF node includes modifying the flow identifier. The second proxy node may store the service function information of the SF node, and determine, based on the service function information, that the service function of the SF node includes modifying the flow identifier. In another embodiment, the second proxy node may alternatively automatically find that the service function of the SF node includes modifying the flow identifier. For example, the second proxy node may send a capability lookup request to the SF node, and the SF node may receive the capability lookup request, and send service function information to the second proxy node in response to the capability lookup request. The second proxy node may determine, based on the received service function information, that the service function of the SF node includes modifying the flow identifier. Certainly, a traffic classifier or a network controller may alternatively send the service function information of the SF node to the second proxy node. How the second proxy node determines the service function of the SF node is not limited in this embodiment.

In an embodiment, by determining that the service function of the SF node includes modifying the flow identifier, the second proxy node may perform a manner provided in subsequent operations, to ensure that when the SF node modifies a flow identifier corresponding to a packet, the proxy node can still find an SRH of the packet based on a packet with a modified flow identifier, to ensure that the SRH of the packet is restored.

Operation 4703: The second proxy node stores the SRH corresponding to the first packet in a second cache entry by using an identifier of the second cache entry as an index.

The identifier of the second cache entry is used to uniquely identify the second cache entry in a cache of the second proxy node. The identifier of the second cache entry may include a cache index of the second cache entry, and the cache index is used to identify the second cache entry on an interface board of the second proxy node. In an embodiment, the second proxy node may include a plurality of interface boards. In this case, the identifier of the second cache entry may further include an identifier of a target board (TB), where the target board is a board on which the second cache entry is located, and the identifier of the target board is used to identify an interface board of the second proxy node.

In an embodiment, the second proxy node may detect whether the SRH corresponding to the first packet has been stored in the cache. If the SRH corresponding to the first packet is not stored in the cache, the second proxy node allocates a cache entry to the SRH corresponding to the first packet, to obtain the second cache entry, and stores the SRH corresponding to the first packet in the second cache entry. In addition, if it is detected that the SRH corresponding to the first packet has been stored in the cache, the operation of storing the SRH corresponding to the first packet may be omitted.

Operation 4704: The second proxy node generates a seventh packet based on the fourth packet.

In an embodiment, the seventh packet may include an identifier of a cache entry used to store the SRH, and the identifier of the cache entry may be carried in a payload of the seventh packet. The seventh packet carries the identifier of the cache entry, so that the packet received by the SF node carries the identifier of the cache entry. In this case, after the SF node performs service processing on the packet, an obtained packet also carries the identifier of the cache entry. In this way, the packet returned by the SF node to the proxy node may carry the identifier of the cache entry. Therefore, the proxy node may find, by using the identifier that is of the cache entry and that is in the returned packet, the cache entry previously used to store the SRH. In an embodiment, the identifier that is of the cache entry used to store the SRH and that is included in the seventh packet may be the identifier of the second cache entry.

Operation 4705: The second proxy node sends the seventh packet to the SF node.

Operation 4706: The SF node receives the seventh packet from the second proxy node, and processes the seventh packet to obtain the first packet.

In a process of processing the packet, the SF node may include, in the first packet, the identifier that is of the cache entry and that is included in the seventh packet, so that the first packet includes the identifier of the cache entry used to cache the SRH. The identifier that is of the cache entry and that is included in the first packet is the same as the identifier that is of the cache entry and that is included in the seventh packet, and the identifier of the cache entry may be carried in a payload of the first packet. In an embodiment, the first packet may include the identifier of the second cache entry.

Operation 4707: The SF node sends the first packet to a first proxy node.

Operation 4708: The first proxy node receives the first packet from the SF node, and looks up a cache of the first proxy node, where no SRH corresponding to the first packet is obtained.

Operation 4709: The first proxy node generates a second packet based on the first packet and a first bypass SID corresponding to the second proxy node.

In a process of generating the packet, the first proxy node may include, in the second packet, the identifier that is of the second cache entry and that is included in the first packet. In this case, the second packet may include the identifier of the second cache entry.

In addition, a difference from the embodiment in FIG. 5 lies in: In an embodiment, in addition to indicating the second proxy node to restore the SRH corresponding to the first packet, first control information may be further used to indicate the second proxy node to look up for the SRH corresponding to the first packet by using the identifier of the second cache entry as the index. For example, the first control information may include a second flag, where the second flag is used to identify that the service function of the SF node includes modifying the flow identifier. The second proxy node may be preconfigured, so that if the second proxy node determines that the control information includes the second flag, the second proxy node looks up for the SRH corresponding to the first packet by using the identifier of the second cache entry as the index. For example, the second flag may be denoted as a NAT flag, and the NAT flag is used to identify that the service function of the SF node includes NAT. Refer to FIG. 20. For example, the second packet may include an extension header shown in FIG. 20, where a cache index field and a TB field are used to carry the identifier of the second cache entry. A value of the cache index field may be the cache index in the identifier of the second cache entry. A value of the TB field may be the identifier of the target board in the identifier of the second cache entry. An N field is used to carry the second flag. For example, a value of the N field may be 1, and it indicates that the SF node is a NAT-type SF and the service function of the SF node includes modifying the flow identifier. Therefore, when it is identified that the value of the N field is 1, the cache needs to be looked up by using the identifier of the cache entry as the index.

Operation 4710: The first proxy node sends the second packet to the second proxy node.

Operation 4711: The second proxy node receives the second packet from the first proxy node, and determines that the first control information indicates the second proxy node to restore the SRH corresponding to the first packet and look up for the SRH corresponding to the first packet by using the identifier of the second cache entry as the index.

In some possible embodiments, the second proxy node may identify a value of a first flag and a value of the second flag in the second packet. If the value of the first flag is set to 1 and the value of the second flag is set to 1, the second proxy node determines that the control information indicates to store the SRH of the first packet and a mapping relationship between an identifier of a first cache entry and the identifier of the second cache entry.

Operation 4712: The second proxy node looks up the cache of the second proxy node by using the identifier of the second cache entry as the index, to obtain the SRH corresponding to the first packet from the second cache entry.

For example, the router node sends an SRv6 packet to the second proxy node in advance, where a payload of the SRv6 packet is an IPv4 packet, and the SRv6 packet carries an SRH 1. The second proxy node strips the SRH 1 from the SRv6 packet, and stores the SRH 1 in a TB 2. If a cache index of the SRH 1 in the TB 2 is a cache index 2, the identifier of the second cache entry is (TB 2, cache index 2). The second proxy node may include (TB 2, cache index 2) in the IPv4 packet, and send the IPv4 packet to the SF node. After processing the IPv4 packet, the SF node returns a processed IPv4 packet to the first proxy node, where the returned IPv4 packet still carries (TB 2, cache index 2). The first proxy node receives the processed IPv4 packet, looks up the local cache by using (TB 2, cache index 2) as an index, and finds that a local cache miss occurs. In this case, the first proxy node re-encapsulates the IPv4 packet, and forwards an IPv4 packet obtained through re-encapsulation to the second proxy node, where the forwarded IPv4 packet still carries (TB 2, cache index 2). The second proxy node receives the forwarded IPv4 packet, looks up the TB 2 for a cache entry corresponding to the cache index 2 by using (TB 2, cache index 2) as the index, and obtains the SRH corresponding to the first packet from the cache entry.

Operation 4713: The second proxy node generates a third packet based on the second packet and the SRH corresponding to the first packet.

Operation 4714: The second proxy node sends the third packet to the router node.

Operation 4715: The router node receives the third packet from the second proxy node, and forwards the third packet.

Figure 48:
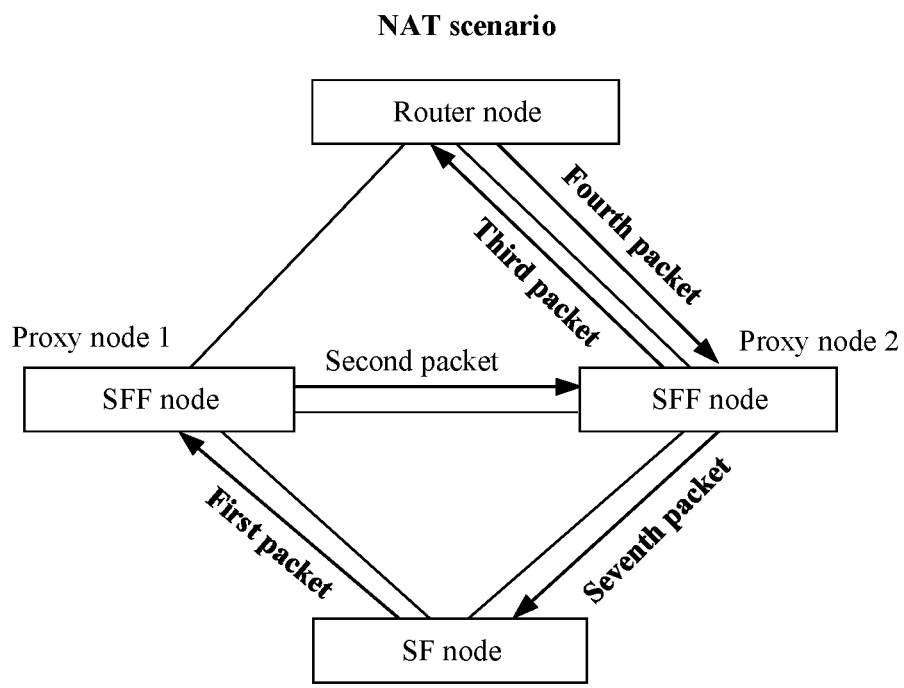
FIG. 48 is a schematic diagram of packet transmission in a NAT scenario according to an embodiment of this application.

FIG. 48 is a schematic diagram of packet transmission according to an embodiment. The schematic diagram shows a procedure in which a proxy node restores an SRH when accessing an SF node whose service function is of a NAT type.

In a related technology, a dynamic proxy node in an SRv6 SFC usually stores an SRH of a packet in a cache entry by using a 5-tuple of the packet as a key; and after receiving a packet returned by an SF node, the dynamic proxy node looks up a cache for the corresponding cache entry still by using a 5-tuple of the packet as a key. In this case, if a service function of the SF node is NAT, the SF node modifies the 5-tuple of the packet in a process of processing the packet. In this case, the 5-tuple of the packet returned by the SF node is inconsistent with the 5-tuple of the previously received packet, and consequently, the 5-tuple of the packet received by the proxy node from the SF node is inconsistent with the 5-tuple of the packet previously sent to the SF node. Therefore, when the proxy node looks up the cache based on the received packet, because the key used for cache lookup is inconsistent with the key used for storage in the cache, the proxy node cannot find the SRH, and therefore cannot restore the SRH for the packet. As a result, packet transmission fails. For example, the proxy node previously stores the SRH by using a 5-tuple 1 as a key, but the SF node changes the 5-tuple of the packet from the 5-tuple 1 to a 5-tuple 2. In this case, when looking up the cache by using the 5-tuple 2 as a key, the proxy node cannot find the SRH.

According to the method provided in an embodiment, the proxy node looks up for an SRH of a packet by using, as a key, an identifier of a cache entry for storing the SRH. In this case, if the SF node returns a packet with a modified flow identifier to the proxy node, because the cache entry for storing the SRH is usually fixed to the proxy node, and does not change due to the modification of a flow identifier, an SRH of the packet with the modified flow identifier can be found by using the identifier of the cache entry as the index, to restore the SRH for the packet with the modified flow identifier. Based on this manner, even if the SF is an SF with a NAT function, and causes the flow identifier of the packet to be changed in a transmission process, the proxy node can still restore the SRH. Therefore, the proxy node may be enabled to support access to the SF with the NAT function, to provide a dynamic proxy function for the SF with the NAT function.

The embodiment in FIG. 47A and FIG. 47B provides a solution for supporting SRH restoration in the NAT scenario. In the embodiment in FIG. 47A and FIG. 47B, the SRH cached by the second proxy node is previously sent by the router node to the second proxy node. A source of the SRH in the second proxy node is not limited in the embodiments of this application. In some other embodiments, the SRH cached by the second proxy node may not be sent by the router node to the second proxy node, but may be previously sent by another node to the second proxy node. Using an example in which the first proxy node sends the SRH to the second proxy node, the following describes another SRH restoration procedure in the NAT scenario by using an embodiment in FIG. 49A to FIG. 49C.

Figure 49A:
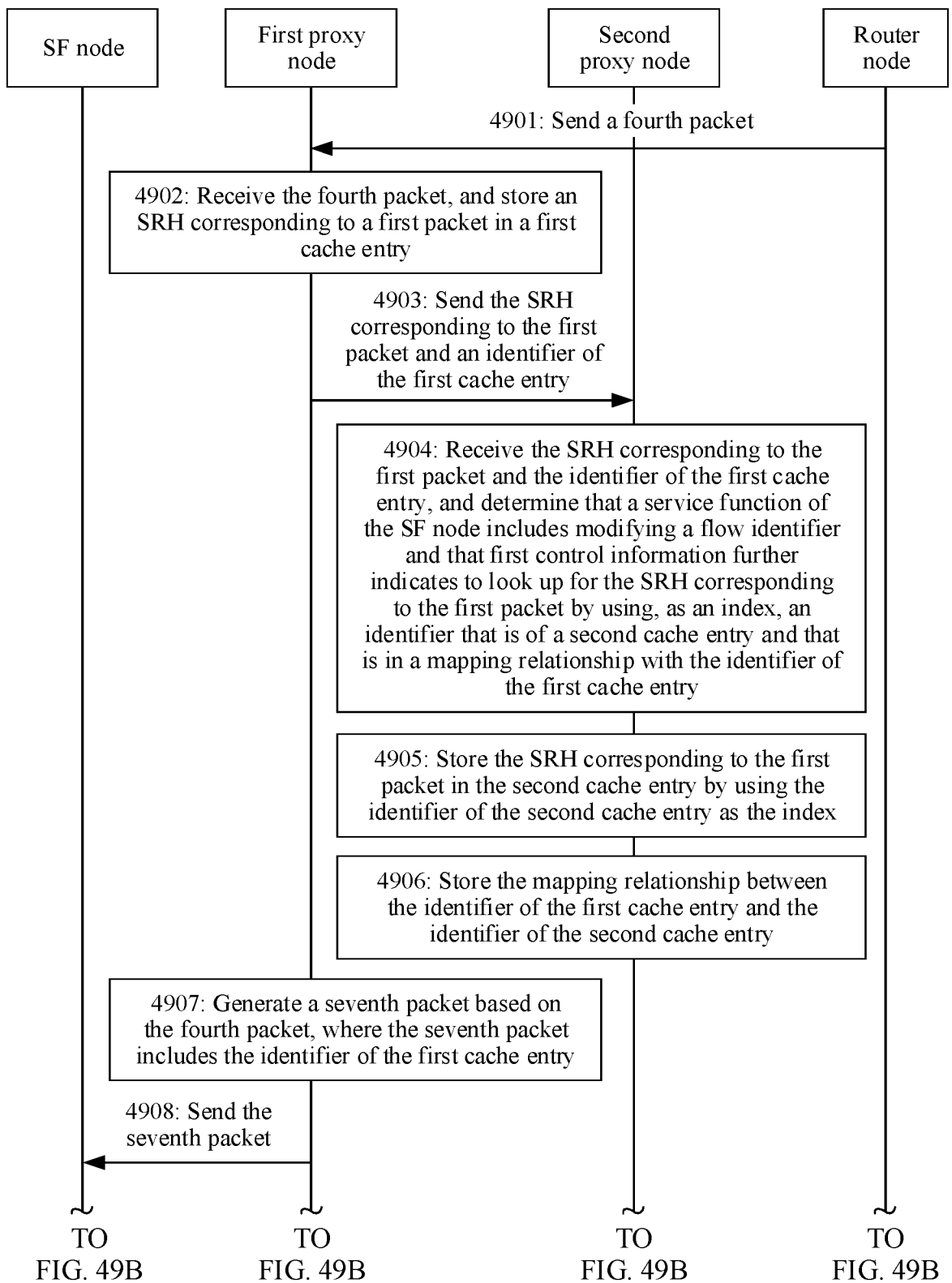
FIG. 49A to FIG. 49C are a flowchart of a packet transmission method according to an embodiment of this application.
Figure 49B:
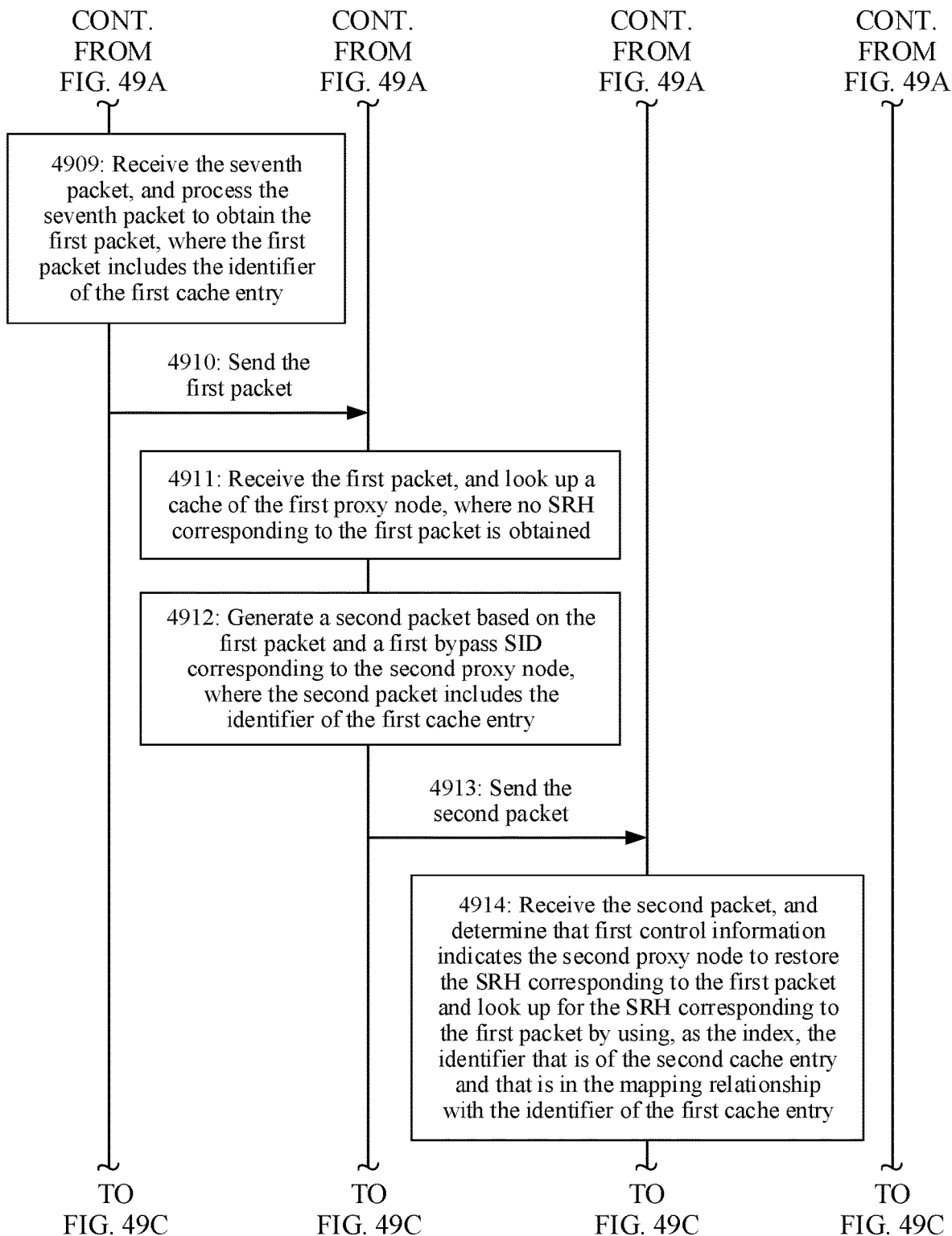
Figure 49C:
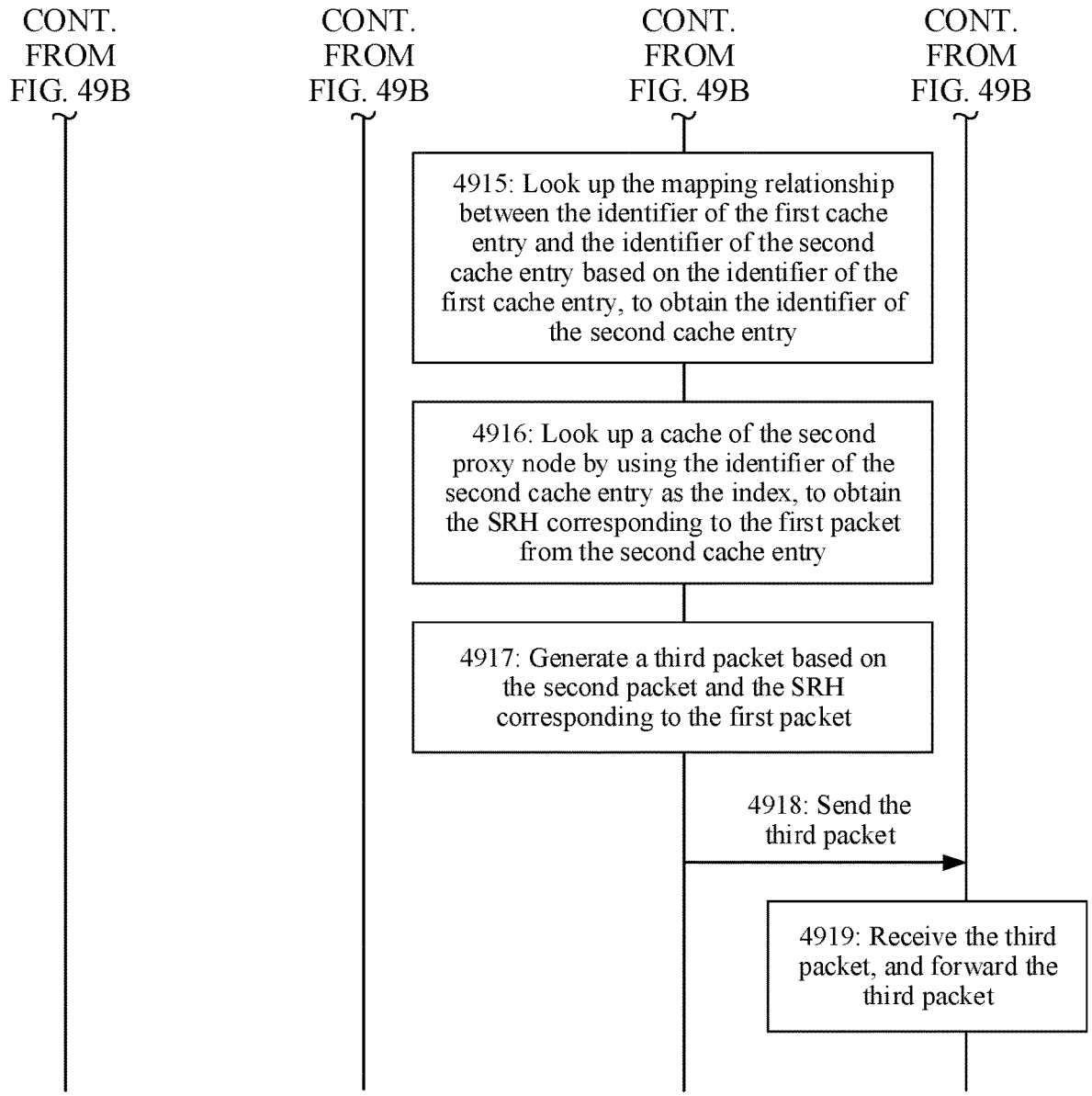

FIG. 49A to FIG. 49C are a flowchart of a packet transmission method according to an embodiment of this application. As shown in FIG. 49A to FIG. 49C, the method may include the following operations.

Operation 4901: A router node sends a fourth packet to a first proxy node.

Operation 4902: The first proxy node receives the fourth packet from the router node, and stores an SRH corresponding to a first packet in a first cache entry.

The first cache entry is a cache entry used by the first proxy node to historically store the SRH corresponding to the first packet. In an embodiment, the first proxy node may detect whether the SRH corresponding to the first packet has been stored in a cache. If the SRH corresponding to the first packet is not stored in the cache, the first proxy node allocates a cache entry to the SRH corresponding to the first packet, to obtain the first cache entry, and stores the SRH corresponding to the first packet in the first cache entry. In addition, if it is detected that the SRH corresponding to the first packet has been stored in the cache, the operation of storing the SRH corresponding to the first packet may be omitted. The first proxy node may include an interface board, the interface board may include a forwarding entry memory, and the first cache entry may be stored in the forwarding entry memory.

An identifier of the first cache entry is used to uniquely identify the first cache entry in the cache of the first proxy node. The identifier of the first cache entry may include a cache index of the first cache entry, and the cache index is used to identify the first cache entry on the interface board of the first proxy node. In an embodiment, the first proxy node may include a plurality of interface boards. In this case, the identifier of the first cache entry may further include an identifier of a target board (TB), where the target board is a board on which the first cache entry is located, and the identifier of the target board is used to identify an interface board of the first proxy node.

Operation 4903: The first proxy node sends the SRH corresponding to the first packet and the identifier of the first cache entry to a second proxy node.

For a trigger condition for sending the SRH and the identifier of the first cache entry, in an embodiment, each time the first proxy node caches an SRH, the first proxy node may synchronize, to a peer proxy node, the SRH and an identifier of a cache entry used to cache the SRH. If the first proxy node receives the SRH corresponding to the first packet from the router node, the first proxy node may allocate the cache entry to the SRH corresponding to the first packet, to obtain the first cache entry, and store the SRH corresponding to the first packet in the first cache entry. In this case, operation 4903 may be triggered.

For a method for sending the SRH and the identifier of the first cache entry, in an embodiment, the first proxy node may generate a fifth packet based on an endpoint dynamic proxy SID, the SRH corresponding to the first packet, and a first bypass SID corresponding to the second proxy node, and send the fifth packet to the second proxy node. In an embodiment, the fifth packet is used to transmit the SRH corresponding to the first packet to the peer proxy node. The fifth packet may include the SRH corresponding to the first packet and the identifier of the first cache entry.

In some embodiments, the fifth packet may be forwarded in a network by using a SID. In an embodiment, the fifth packet may be an SRv6 packet, and a destination address of the fifth packet may be the first bypass SID, in other words, an active SID of the fifth packet may be the first bypass SID. An SRH of the fifth packet may include each SID in the SRH corresponding to the first packet and the first bypass SID.

In an optional embodiment, a processing policy corresponding to the End. AD SID may be preconfigured on the first proxy node. The processing policy may include performing a dynamic proxy operation and operations of generating and sending the fifth packet. Therefore, after receiving the first packet, based on the End.AD SID in the first packet, the first proxy node not only provides a dynamic proxy service but also control the second proxy node to store the SRH. In an embodiment, a SID-based SRv6 programming capability is fully utilized, and an operation corresponding to the End.AD SID is extended.

In an embodiment, the first proxy node may re-encapsulate the fourth packet to obtain the fifth packet. Details are as follows:

A generation process of the fifth packet may include the following operation 1 to operation 3.

Operation 1: The first proxy node inserts the first bypass SID into a segment list in an SRH of the fourth packet.

Operation 2: The first proxy node increases an SL in the SRH of the fourth packet by 1.

Operation 3: The first proxy node updates a destination address of the fourth packet to the first bypass SID, to obtain the fifth packet.

In an embodiment, the fifth packet may include third control information, and the third control information is used to indicate the second proxy node to store the SRH corresponding to the first packet.

If the third control information is carried in an extension header, the first proxy node may not only perform operation 1, operation 2, and operation 3, but also perform the following operation 4.

Operation 4: The first proxy node generates the extension header, and encapsulates the extension header into the fourth packet, where the extension header includes the third control information.

It should be noted that the process in which the first proxy node generates the fifth packet may be similar to a process in which the second proxy node generates a fifth packet. For details, refer to operation 1303, and details are not described herein again.

Operation 4904: The second proxy node receives the SRH corresponding to the first packet and the identifier of the first cache entry from the first proxy node, and determines that a service function of an SF node includes modifying a flow identifier and that the third control information further indicates to look up for the SRH corresponding to the first packet by using, as an index, an identifier that is of a second cache entry and that is in a mapping relationship with the identifier of the first cache entry.

In an embodiment, the second proxy node may receive the fifth packet, and parse the fifth packet to obtain the SRH corresponding to the first packet and the identifier of the first cache entry that are carried in the fifth packet. An action performed by the second proxy node on the fifth packet may be similar to an action performed by the first proxy node on a fifth packet. For details, refer to the foregoing description. Details are not described herein again. In addition, a process of determining the service function of the SF node is similar to that in the foregoing embodiment. For details, refer to the foregoing description. The details are not described herein again.

The second proxy node may identify a value of a second flag, a value of a third flag, and a value of a fourth flag in a fifth packet. If a value of an N flag (which is a NAT flag, namely, the foregoing second flag) is set to 1, a value of a C flag (C flag, which is a copy flag, namely, the foregoing third flag) is set to 1, and a value of an A flag (which is an ACK flag, namely, the foregoing fourth flag) is set to 0, the second proxy node determines that the control information indicates to store the SRH of the first packet and store the mapping relationship between the identifier of the first cache entry and the identifier of the second cache entry.

Operation 4905: The second proxy node stores the SRH corresponding to the first packet in the second cache entry by using the identifier of the second cache entry as an index.

Operation 4906: The second proxy node stores the mapping relationship between the identifier of the first cache entry and the identifier of the second cache entry.

In an embodiment, the second proxy node may establish the mapping relationship between the identifier of the first cache entry and the identifier of the second cache entry, and store the mapping relationship. For example, if the identifier that is of the first cache entry and that is sent by the first proxy node is (TB 1, cache index 1), the second proxy node stores the SRH in a TB 2, and a cache index of the SRH in the TB 2 is a cache index 2, the identifier of the second cache entry is (TB 2, cache index 2), and the second proxy node may establish a mapping relationship (TB 1, cache index 1, TB 2, cache index 2), and store the mapping relationship (TB 1, cache index 1, TB 2, cache index 2).

Operation 4907: The first proxy node generates a seventh packet based on the fourth packet.

A process in which the first proxy node generates the seventh packet is similar to a process in which the second proxy node generates a seventh packet in the foregoing embodiment. A difference lies in that, in an embodiment, the identifier that is of the cache entry used to store the SRH and that is included in the seventh packet is the identifier of the first cache entry.

Operation 4908: The first proxy node sends the seventh packet to the SF node.

Operation 4909: The SF node receives the seventh packet from the first proxy node, and processes the seventh packet to obtain the first packet.

Operation 4910: The SF node sends the first packet to the first proxy node.

In an embodiment, the first packet may include the identifier of the first cache entry.

Operation 4911: The first proxy node receives the first packet from the SF node, and looks up the cache of the first proxy node, where no SRH corresponding to the first packet is obtained.

Operation 4912: The first proxy node generates a second packet based on the first packet and the first bypass SID corresponding to the second proxy node.

The second packet further includes the identifier of the first cache entry. In addition to indicating the second proxy node to restore the SRH corresponding to the first packet, first control information may be further used to indicate to look up for the SRH corresponding to the first packet by using, as the index, the identifier that is of the second cache entry and that is in the mapping relationship with the identifier of the first cache entry.

Operation 4913: The first proxy node sends the second packet to the second proxy node.

Operation 4914: The second proxy node receives the second packet from the first proxy node, and determines that the first control information indicates the second proxy node to restore the SRH corresponding to the first packet and look up for the SRH corresponding to the first packet by using, as the index, the identifier that is of the second cache entry and that is in the mapping relationship with the identifier of the first cache entry.

Operation 4915: The second proxy node looks up the mapping relationship between the identifier of the first cache entry and the identifier of the second cache entry based on the identifier of the first cache entry, to obtain the identifier of the second cache entry.

Operation 4916: The second proxy node looks up a cache of the second proxy node by using the identifier of the second cache entry as the index, to obtain the SRH corresponding to the first packet from the second cache entry.

For example, if the identifier that is of the cache entry and that is carried in the second packet is (TB 1, cache index 1), and the mapping relationship stored by the second proxy node includes (TB 1, cache index 1, TB 2, cache index 2), the second proxy node may obtain an identifier of a local cache entry (TB 2, cache index 2) by looking up the mapping relationship based on (TB 1, cache index 1). The second proxy node looks up the TB 2 for a cache entry corresponding to the cache index 2, and obtains the SRH corresponding to the first packet from the cache entry.

Operation 4917: The second proxy node generates a third packet based on the second packet and the SRH corresponding to the first packet.

Operation 4918: The second proxy node sends the third packet to the router node.

Operation 4919: The router node receives the third packet from the second proxy node, and forwards the third packet.

Figure 50:
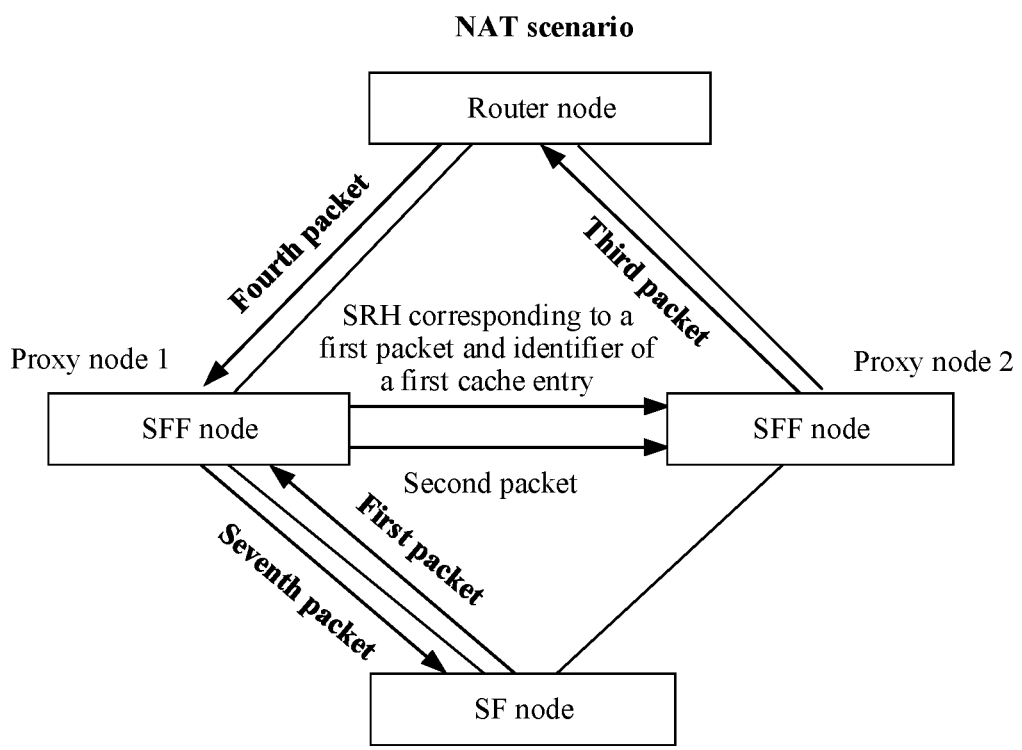
FIG. 50 is a schematic diagram of packet transmission in a NAT scenario according to an embodiment of this application.

FIG. 50 is a schematic diagram of packet transmission according to an embodiment. The schematic diagram shows a procedure in which a proxy node restores an SRH when accessing an SF node whose service function is of a NAT type.

According to the method provided in an embodiment, the proxy node maintains a mapping relationship between a local cache entry and a peer cache entry. When the first proxy node does not find the SRH from the local cache, the first proxy node may transmit the identifier of the cache entry to the second proxy node, and indicate the second proxy node by using the control information to find, with reference to the mapping relationship, the cache entry for storing the SRH in the second proxy node, so that the second proxy node finds the SRH of the packet from the cache entry, and restores the SRH for the packet with a modified flow identifier Based on this manner, even if the SF is an SF with a NAT function, and causes a flow identifier of the packet to be changed in a transmission process, the proxy node can still restore the SRH. Therefore, the proxy node may be enabled to support access to the SF with the NAT function, to provide a dynamic proxy function for the SF with the NAT function.

The packet transmission procedure supporting the NAT scenario is described in the foregoing method embodiment. The method provided in the embodiments of this application may further support an SRv6 VPN scenario. An SRv6 VPN means transmitting VPN data through an SRv6 tunnel. In the SRv6 VPN scenario, an SF node in a service chain needs to process the VPN data, to implement a VPN service. In this scenario, a proxy node may support the SF node that implements the VPN service, and perform the following method embodiment to provide a dynamic proxy service for the SF node that implements the VPN service. The following describes a packet transmission procedure in a VPN scenario by using a method embodiment shown in FIG. 51A and FIG. 51B. It should be noted that the embodiment in FIG. 51A and FIG. 51B focuses on describing a difference from the embodiment in FIG. 5. For operations or other features similar to those in the embodiment in FIG. 5, refer to the embodiment in FIG. 5. Details are not described in the embodiment in FIG. 51A and FIG. 51B.

Figure 51A:
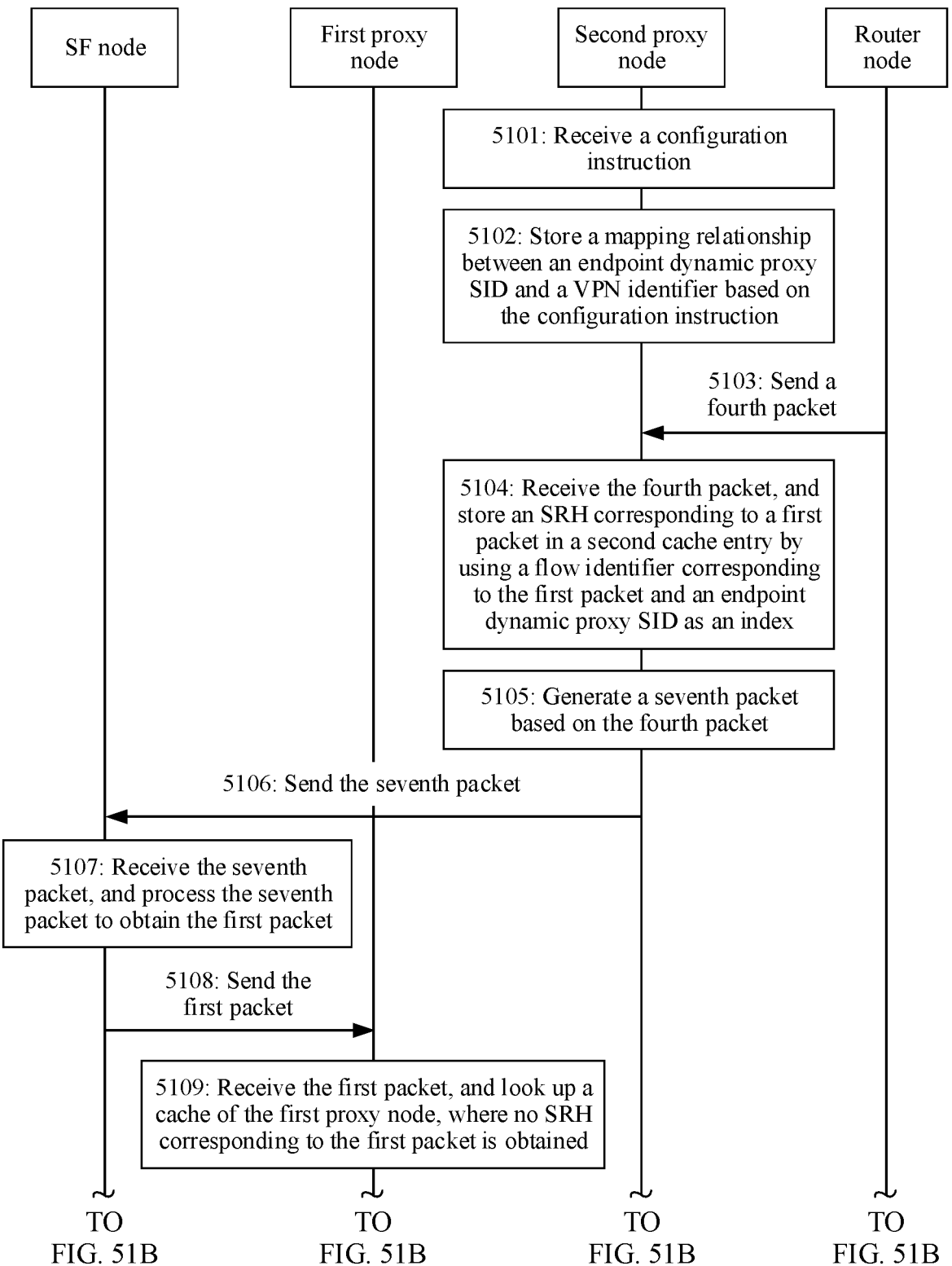
FIG. 51A and FIG. 51B are a flowchart of a packet transmission method according to an embodiment of this application.
Figure 51B:
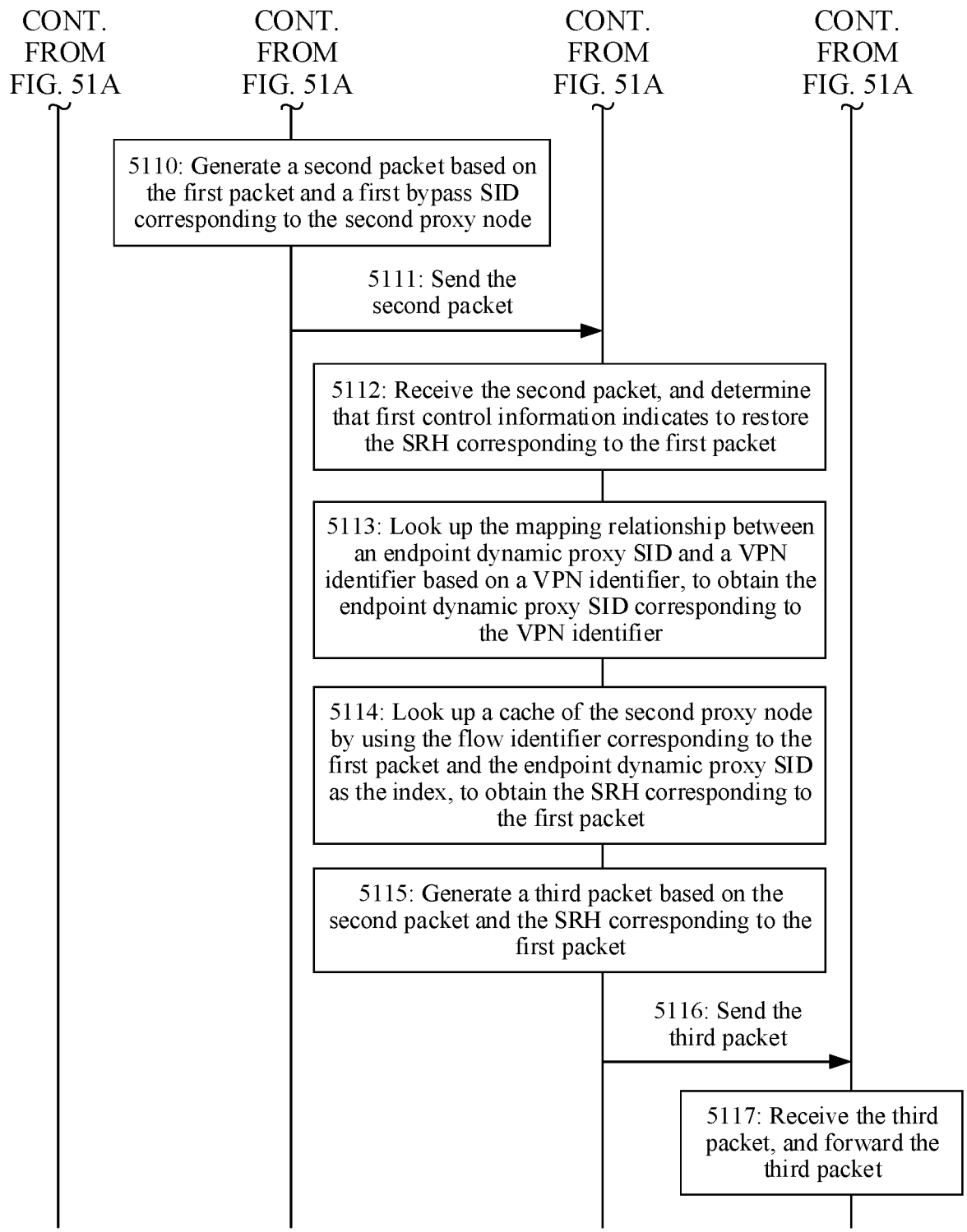

FIG. 51A and FIG. 51B are a flowchart of a packet transmission method according to an embodiment of this application. The method may include the following operations.

Operation 5101: A second proxy node receives a configuration instruction.

Operation 5102: The second proxy node stores a mapping relationship between an endpoint dynamic proxy SID and a VPN identifier based on the configuration instruction.

The second proxy node may access a plurality of SF nodes, and the plurality of SF nodes may belong to different VPNs. Therefore, in a process in which the second proxy node provides dynamic proxy services for all the plurality of SF nodes, the second proxy node may receive packets to be sent to different VPNs. However, the packets of the different VPNs may correspond to a same flow identifier. Therefore, if SRHs are stored by using the flow identifier as an index, indexes of the SRHs of the packets of the different VPNs are the same. As a result, the SRHs of the packets of the different VPNs are stored in a same location. On the one hand, information isolation between the different VPNs cannot be implemented, affecting security. On the other hand, because the same index hits a plurality of SRHs in a cache, an SRH to be restored for a packet cannot be determined, causing an SRH restoration failure.

In an embodiment, a corresponding End.AD SID may be pre-allocated to the SF node in each VPN, and the SF nodes in the different VPNs correspond to different End. AD SIDs. In this End. AD SID allocation manner, the End.AD SID can be used as a VPN identifier, the packets sent to the SF nodes in the different VPNs carry different End. AD SIDs, and the packets of the different VPNs can be distinguished by using the different End.AD SIDs. For example, the second proxy node accesses 10 SF nodes, namely, an SF node 0 and an SF node 1 to an SF node 9, the 10 SF nodes belong to two different VPNs, the SF node 0 to the SF node 5 belong to a VPN 1, and the SF node 6 to the SF node 9 belong to a VPN 2. In this example, two End.AD SIDs may be allocated to the 10 SF nodes, where one End.AD SID is allocated to the SF node 0 to the SF node 5, and the other End.AD SID is allocated to the SF node 6 to the SF node 9. An End.AD SID that is in a packet and that belongs to the two End.AD SIDs can be used to identify a VPN to which the packet is to be sent. For example, the End.AD SID allocated to the SF node 0 to the SF node 5 may be A::1, and the End.AD SID allocated to the SF node 6 to the SF node 9 may be B::2. In this case, if a packet 1 and a packet 2 are received, an End.AD SID carried in the packet 1 is A::1, and an End.AD SID carried in the packet 2 is B::2, it indicates that the packet 1 corresponds to the VPN 1, and the packet 2 corresponds to the VPN 2.

The packets sent to the SF nodes in the different VPNs carry different End.AD SIDs. Therefore, if the SRH is stored by using the flow identifier and the End.AD SID as an index, indexes of the packets of the different VPNs can be distinguished by using different End.AD SIDs. In this way, it is ensured that the SRHs of the packets of the different VPNs are stored separately, thereby implementing information isolation between the different VPNs. In addition, a same index is prevented from hitting packets of a plurality of VPNs, so that the foregoing technical problem is resolved.

In addition, the SF nodes accessed by the second proxy node may separately belong to a public network and a VPN, and corresponding End.AD SIDs may be separately allocated to the SF node in the public network and the SF node in the VPN, where the End.AD SID corresponding to the SF node in the public network is different from the End.AD SID corresponding to the SF node in the VPN. For example, in the 10 SF nodes accessed by the second proxy node, the SF node 0 to the SF node 4 belong to the public network, and the SF node 5 to the SF node 9 belong to a VPN 1. In this example, two End.AD SIDs may be allocated to the 10 SF nodes, where one End.AD SID is allocated to the SF node 0 to the SF node 4, and the other End. AD SID is allocated to the SF node 5 to the SF node 9. In this allocation manner, the SRH is stored by using the flow identifier and the End. AD SID as an index, to ensure that an SRH of a packet of the public network and an SRH of a packet of the VPN are stored separately, and prevent a same index from hitting both the packet of the public network and the packet of the VPN.

In an embodiment, a configuration operation may be performed on the second proxy node to configure the End.AD SID allocated to the SF node in each VPN. The second proxy node may receive the configuration instruction, and may store the mapping relationship between an endpoint dynamic proxy SID and a VPN identifier based on the configuration instruction. The configuration instruction includes the End.AD SID corresponding to the SF node in each VPN. The second proxy node may parse the configuration instruction to obtain the End.AD SID that is carried in the configuration instruction and that corresponds to the SF node in each VPN. For example, if the second proxy node accesses SF nodes in two VLANs, and the two VLANs are respectively identified by using a VLAN ID 100 and a VLAN ID 200, two End.AD SIDs may be preconfigured on the second proxy node, where for example, A:: 1 is allocated to an SF in the VLAN identified by the VLAN ID 100, and A::2 is allocated to an SF in the VLAN identified by the VLAN ID 200; and a mapping relationship between A::1 and 100 and a mapping relationship between A::2 and 200 may be stored. Certainly, storing the mapping relationship between an End.AD SID and a VPN identifier in the foregoing manner is merely an example. The second proxy node may alternatively store the mapping relationship between an End.AD SID and a VPN identifier in another manner, for example, automatically learn the mapping relationship between an End.AD SID and a VPN identifier, or receive the mapping relationship between an End.AD SID and a VPN identifier from a controller.

Operation 5103: A router node sends a fourth packet to the second proxy node.

Operation 5104: The second proxy node receives the fourth packet from the router node, and stores an SRH corresponding to a first packet in a second cache entry by using a flow identifier corresponding to the first packet and an endpoint dynamic proxy SID as an index.

The fourth packet includes the SRH corresponding to the first packet, a destination address of the fourth packet is the End.AD SID, and a flow identifier corresponding to the fourth packet is the flow identifier corresponding to the first packet. For example, the flow identifier is a 5-tuple. The fourth packet may include a 5-tuple, and the 5-tuple in the fourth packet is the same as a 5-tuple in the first packet. The fourth packet may include the SRH corresponding to the first packet, and the SRH corresponding to the first packet may include the End.AD SID. The second proxy node may obtain the flow identifier corresponding to the fourth packet, to obtain the flow identifier corresponding to the first packet. In addition, the second proxy node may obtain the End.AD SID carried in the fourth packet, and cache the SRH corresponding to the first packet by using the flow identifier and the End.AD SID as a key and using the SRH corresponding to the first packet as a value.

Operation 5105: The second proxy node generates a seventh packet based on the fourth packet.

A flow identifier corresponding to the seventh packet is the flow identifier corresponding to the first packet. The seventh packet may include a VPN identifier. The VPN identifier is used to identify a VPN to which a service function node belongs, and may be an ID of the VPN. For example, the VPN identifier may be a VLAN ID. In an embodiment, a transmission tunnel may be established between the second proxy node and the SF node. The second proxy node may generate a tunnel header corresponding to the transmission tunnel, and encapsulate the tunnel header, so that the seventh packet includes the tunnel header. The VPN identifier may be carried in the tunnel header.

Operation 5106: The second proxy node sends the seventh packet to the SF node.

Operation 5107: The SF node receives the seventh packet from the second proxy node, and processes the seventh packet to obtain the first packet.

The first packet may include a VPN identifier, and the VPN identifier in the first packet is the same as the VPN identifier in the seventh packet. For example, the first packet may include a tunnel header, and the VPN identifier may be carried in the tunnel header. In an embodiment, the SF node may not strip the tunnel header of the seventh packet in a process of processing the seventh packet, so that the first packet obtained through processing includes the tunnel header of the seventh packet.

Operation 5108: The SF node sends the first packet to a first proxy node.

Operation 5109: The first proxy node receives the first packet from the SF node, and looks up a cache of the first proxy node, where no SRH corresponding to the first packet is obtained.

Operation 5110: The first proxy node generates a second packet based on the first packet and a first bypass SID corresponding to the second proxy node.

A flow identifier corresponding to the second packet is the flow identifier corresponding to the first packet, and the second packet may include a VPN identifier. In a process of re-encapsulating the first packet to obtain the second packet, the first proxy node may keep the flow identifier corresponding to the first packet unchanged, so that the flow identifier corresponding to the generated second packet is the same as the flow identifier corresponding to the first packet.

Operation 5111: The first proxy node sends the second packet to the second proxy node.

Operation 5112: The second proxy node receives the second packet from the first proxy node, and determines that first control information indicates the second proxy node to restore the SRH corresponding to the first packet.

Operation 5113: The second proxy node looks up the mapping relationship between an endpoint dynamic proxy SID and a VPN identifier based on the VPN identifier, to obtain the endpoint dynamic proxy SID corresponding to the VPN identifier.

The second packet may include the flow identifier corresponding to the first packet, the VPN identifier, and a payload. The second proxy node may obtain the VPN identifier from the second packet, and look up the mapping relationship between an End.AD SID and a VPN identifier based on the VPN identifier, to find the End.AD SID corresponding to the VPN identifier. For example, if there is a mapping relationship between an End.AD SID A::1 and a VLAN ID 100, there is a mapping relationship between an End.AD SID A::2 and a VLAN ID 200, and the VPN identifier obtained by the second proxy node from the second packet is 100, the second proxy node looks up the mapping relationship based on 100, to obtain the corresponding End.AD SID A::1.

Operation 5114: The second proxy node looks up a cache of the second proxy node by using the flow identifier corresponding to the first packet and the endpoint dynamic proxy SID as an index, to obtain the SRH corresponding to the first packet.

Operation 5115: The second proxy node generates a third packet based on the second packet and the SRH corresponding to the first packet.

Operation 5116: The second proxy node sends the third packet to the router node.

Operation 5117: The router node receives the third packet from the second proxy node, and forwards the third packet.

An embodiment provides a method for providing a dynamic proxy service in an SRv6 VPN scenario. A corresponding End.AD SID is allocated to an SF node in each VPN, so that the End.AD SID can be used as a VPN identifier. Therefore, the proxy node looks up for a corresponding SRH by using a flow identifier and the End.AD SID as an index, to distinguish between indexes of SRHs of packets of different VPNs by using different End.AD SIDs. In this way, the SRHs of the packets of the different VPNs are stored separately, thereby implementing information isolation between the different VPNs. In addition, a same index is prevented from hitting SRHs of packets of a plurality of VPNs, to ensure lookup accuracy.

In the foregoing method embodiments, the first proxy node or the second proxy node may maintain cache entry synchronization between the two proxy nodes by using a state machine. The following uses examples to describe the state machine.

The state machine may be denoted as a peer cache state machine, and indicates a state in which a peer proxy node stores an SRH. A state machine of the first proxy node indicates a state in which the second proxy node stores an SRH, and a state machine of the second proxy node indicates a state in which the first proxy node stores an SRH. For either of the first proxy node and the second proxy node, the proxy node may add a target field to each cache entry in the cache, write a current state of the state machine into the target field, and when receiving the first packet, determine a to-be-performed action based on a value of the target field in the cache entry. The target field may be denoted as a PeerCacheState field, and the target field is used to record the current state of the state machine. The state machine may include the current state, a next state, an event, and a target action. The first proxy node may perform, based on a detected event and the current state of the state machine, a target action that is in the state machine and that corresponds to the event and the current state, and switch the state machine to the next state of the current state. For example, the state machine may be either of a first state machine and a second state machine.

Figure 52:
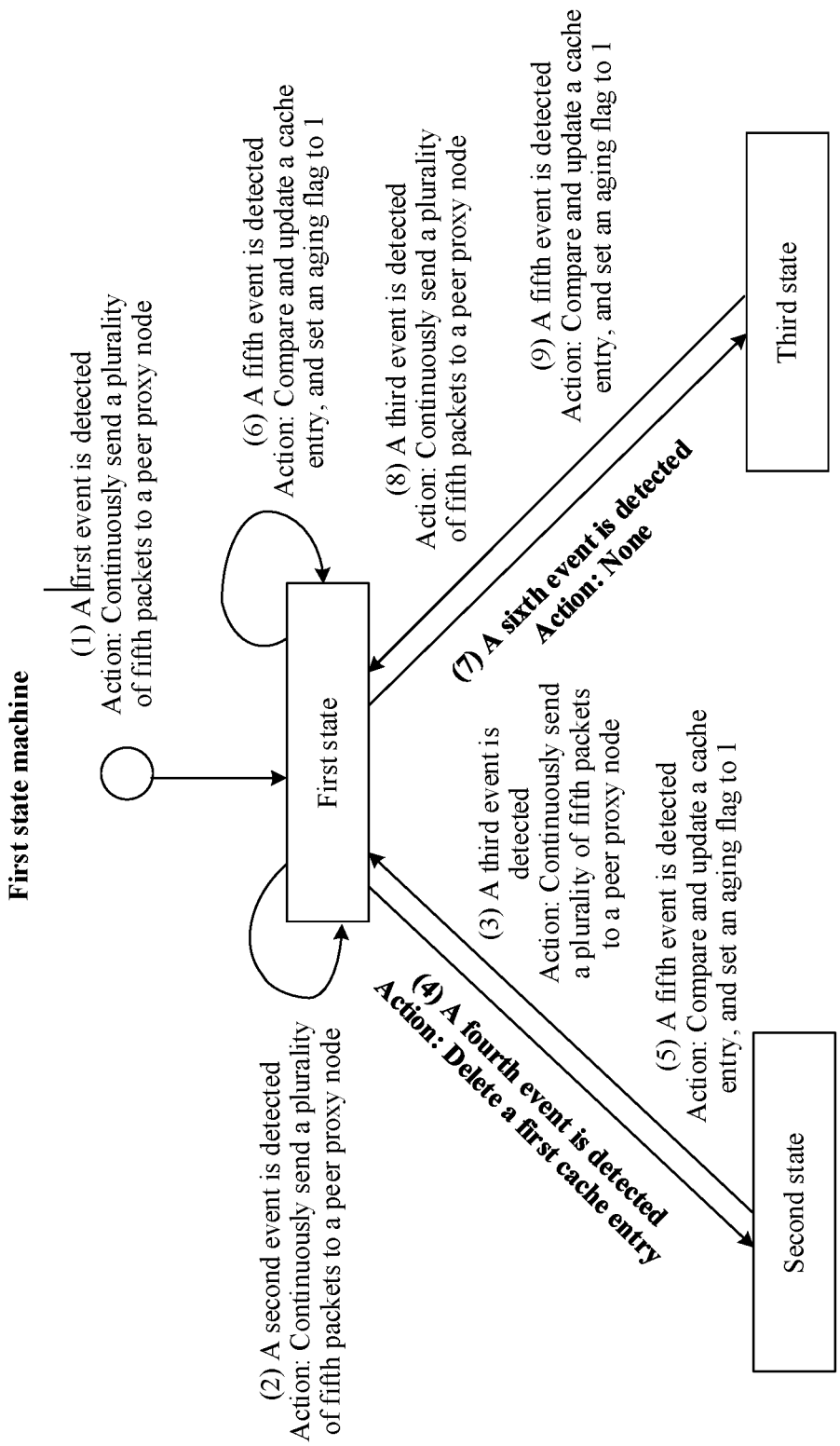
FIG. 52 is a schematic diagram of a first state machine according to an embodiment of this application.

FIG. 52 is a schematic diagram of a first state machine according to an embodiment of this application. The first state machine is applicable to a case in which repeated sending is performed to ensure transmission reliability, and a processing policy provided by the first state machine may include one or more of the following (1) to (9). It should be understood that the following first state machine may be applied to the first proxy node, or may be applied to the second proxy node. For the first proxy node, the peer proxy node is the second proxy node; for the second proxy node, the peer proxy node is the first proxy node.

(1) If a first event is detected, a plurality of fifth packets are continuously sent to the peer proxy node, and the state machine is switched to a first state.

The first event is that a first cache entry is generated, and the first event may be recorded in a program as a local cache new (a new cache entry is locally added) event. The first state indicates that a second cache entry is consistent with the first cache entry, and the first state may be recorded in the program as a cache equal state.

(2) If a second event is detected, a plurality of fifth packets are continuously sent to the peer proxy node, and the state machine is switched to a first state.

The second event is that a first cache entry is updated, and the second event may be recorded in a program as a LocalCache_Upd (literally translated as local cache update, where Upd is update, and represents an update) event.

(3) If a third event is detected, and the state machine is in a second state, a plurality of fifth packets are continuously sent to the peer proxy node, and the state machine is switched to a first state.

The third event is that a fourth packet is received, and the third event may be recorded in a program as a Local Cache Touch (a local cache is read) event. The second state indicates that it is determined that a peer cache entry is older than a local cache entry, or a peer cache entry is suspected to be older than a local cache entry. In the second state, the local proxy node may send the fifth packet to the peer proxy node, to update an SRH in the cache entry of the peer proxy node. The second state may be recorded in the program as a cache older state.

(4) If a fourth event is detected, and the state machine is in a first state, a first cache entry is deleted.

The fourth event is that an aging timer expired, and the fourth event may be recorded in a program as an Aging-Timer_Expired event. When the aging timer expired, it indicates that the first cache entry is in an aged state, and the first cache entry may be cleared to save cache space. In an embodiment, the first proxy node may start the aging timer, and set a corresponding aging flag for the first cache entry, where a value of the aging flag may be 1 or 0. In addition, the first proxy node may periodically scan the first cache entry by using the aging timer. If finding through scanning that the aging flag corresponding to the first cache entry is 1, the first proxy node modifies the aging flag to 0; or if finding through scanning that the aging flag corresponding to the first cache entry is 0, the first proxy node deletes the first cache entry. In a process in which the first proxy node forwards a packet, if the first cache entry is hit during cache lookup, the first proxy node sets the aging flag corresponding to the first cache entry to 1, so that the first cache entry remains in the cache.

(5) If a fifth event is detected, and the state machine is in a first state, it is compared whether an SRH carried in a fifth packet is consistent with an SRH stored in the cache. If the SRH carried in the fifth packet is inconsistent with the stored SRH, the SRH carried in the fifth packet is stored in a cache entry to update the cache, an aging flag is set to 1, and the current state of the state machine remains unchanged.

The fifth event is that the fifth packet is received, and the fifth event may be recorded in a program as a CacheSync_Recv (literally translated as a received cache synchronization message/packet, where Sync is synchronize, represents synchronization, and means synchronizing the SRH to the cache of the peer proxy node; and Recv is receive, and represents receiving) event.

(6) If a fifth event is detected, and the state machine is in a second state, it is compared whether an SRH carried in the fifth packet is consistent with an SRH stored in the cache. If the SRH carried in the fifth packet is inconsistent with the stored SRH, the SRH carried in the fifth packet is stored in a cache entry to update the cache, an aging flag is set to 1, and the state machine is switched to a first state.

(7) If a sixth event is detected, and the state machine is in a first state, the state machine is switched to a third state.

The sixth event is that a first packet is received, and the sixth event may be recorded in a program as a Cache_Miss event. The third state indicates that it is determined that a peer cache entry is lost, and a fifth packet needs to be sent, so that a cache entry is recreated at a peer end. The third state may be recorded in the program as a CacheMiss_Recv state in which a packet including a cache miss identifier is received.

(8) If a third event is detected, and the state machine is in a third state, a plurality of fifth packets are continuously sent to the peer proxy node, and the state machine is switched to a first state.

(9) If a fifth event is detected, and the state machine is in a third state, it is compared whether an SRH that corresponds to a fourth packet and that is carried in a fifth packet is consistent with an SRH stored in the cache. If the SRH that corresponds to the fourth packet and that is carried in the fifth packet is inconsistent with the stored SRH, the SRH that corresponds to the fourth packet and that is carried in the fifth packet is stored in a cache entry to update the cache, an aging flag is set to 1, and the state machine is switched to a first state.

Figure 53:
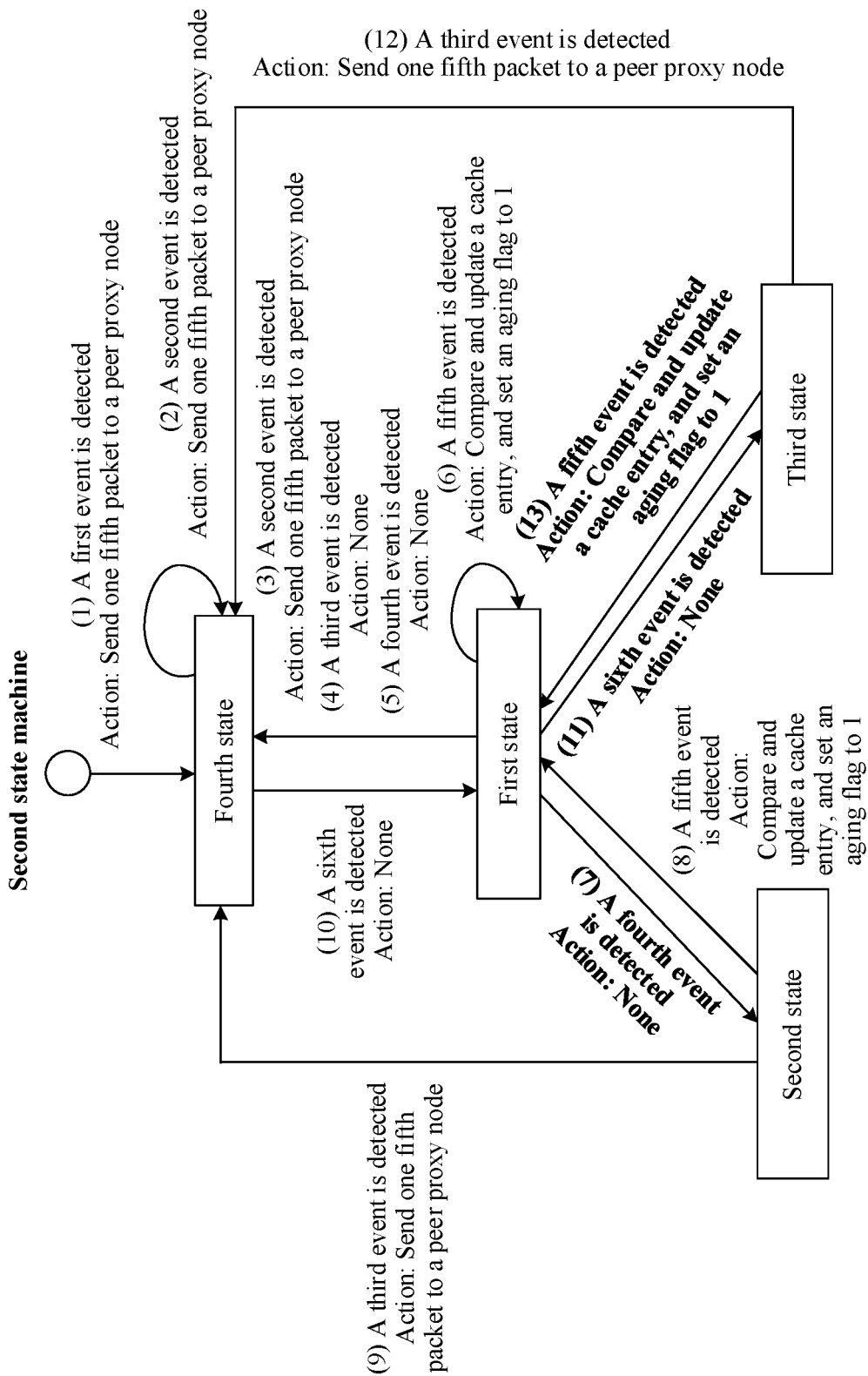
FIG. 53 is a schematic diagram of a second state machine according to an embodiment of this application.

FIG. 53 is a schematic diagram of a second state machine according to an embodiment of this application. The second state machine is applicable to a case in which an acknowledgment mechanism is used to ensure transmission reliability, and a processing policy provided by the second state machine may include one or more of the following (1) to (13). It should be noted that the following focuses on differences of the second state machine from the first state machine. For features similar to those of the first state machine, refer to the first state machine. Details are not described below.

(1) If a first event is detected, one fifth packet is sent to the peer proxy node, and the state machine is switched to a fourth state.

The fourth state indicates that a cache entry is locally generated or updated, the fifth packet has been sent to the peer proxy node, and an acknowledgment from the peer proxy node for an operation result of the fifth packet is waited for. The fourth state may be recorded in a program as a Sync_Start (literally transmitted as synchronization start, where Sync is synchronize, and Start is start) state.

(2) If a second event is detected, and the state machine is in a fourth state, one fifth packet is sent to the peer proxy node, and the current state of the state machine remains unchanged.

(3) If a second event is detected, and the state machine is in a first state, one fifth packet is sent to the peer proxy node, and the state machine is switched to a fourth state.

(4) If a third event is detected, and the state machine is in a fourth state, the state machine is switched to a first state.

(5) If a fourth event is detected, and the state machine is in a fourth state, the state machine is switched to a first state.

In (4) and (5), an action of sending a fifth packet may not be performed, to prevent the two proxy nodes from simultaneously being in the fourth state and therefore being interlocked.

(6) If a fifth event is detected, and the state machine is in a first state, it is compared whether an SRH carried in a fifth packet is consistent with an SRH stored in the cache. If the SRH carried in the fifth packet is inconsistent with the stored SRH, the SRH carried in the fifth packet is stored in a cache entry to update the cache, an aging flag is set to 1, and the current state of the state machine remains unchanged.

(7) If a fourth event is detected, and the state machine is in a first state, the state machine is switched to a second state.

(8) If a fifth event is detected, and the state machine is in a second state, it is compared whether an SRH carried in a fifth packet is consistent with an SRH stored in the cache. If the SRH carried in the fifth packet is inconsistent with the stored SRH, the SRH carried in the fifth packet is stored in a cache entry to update the cache, an aging flag is set to 1, and the state machine is switched to a first state.
(9) If a third event is detected, and the state machine is in a second state, one fifth packet is sent to the peer proxy node, and the state machine is switched to a fourth state.
(10) If a sixth event is detected, and the state machine is in a fourth state, the state machine is switched to a first state.

The sixth event is that a sixth packet is received, and the sixth event may be recorded in a program as a CacheSync_Ack (literally translated as cache synchronization acknowledgment, where Sync is synchronize, and Ack is acknowledge, and represents acknowledgment) event.

(11) If a sixth event is detected, and the state machine is in a first state, the state machine is switched to a third state.
(12) If a third event is detected, and the state machine is in a third state, one fifth packet is sent to the peer proxy node, and the state machine is switched to a fourth state.
(13) If a fifth event is detected, and the state machine is in a third state, it is compared whether an SRH that corresponds to a fourth packet and that is carried in a fifth packet is consistent with an SRH stored in the cache. If the SRH that corresponds to the fourth packet and that is carried in the fifth packet is inconsistent with the stored SRH, the SRH that corresponds to the fourth packet and that is carried in the fifth packet is stored in a cache entry to update the cache, an aging flag (agingflag) is set to 1, and the state machine is switched to a first state.

The state machine mechanism may be used to achieve at least the following effects: A currently to-be-performed action can be determined in real time by using the state machine based on a state in which the peer proxy node caches an SRH, to transmit the SRH to the peer proxy node in time, so that it can be ensured that cache entries of the local proxy node and the peer proxy node remain synchronized, thereby implementing SRH consistency between proxy nodes dual-homed to a same SF node.

The foregoing describes the packet transmission method in the embodiments of this application. The following describes the first proxy node and the second proxy node.

Figure 54:
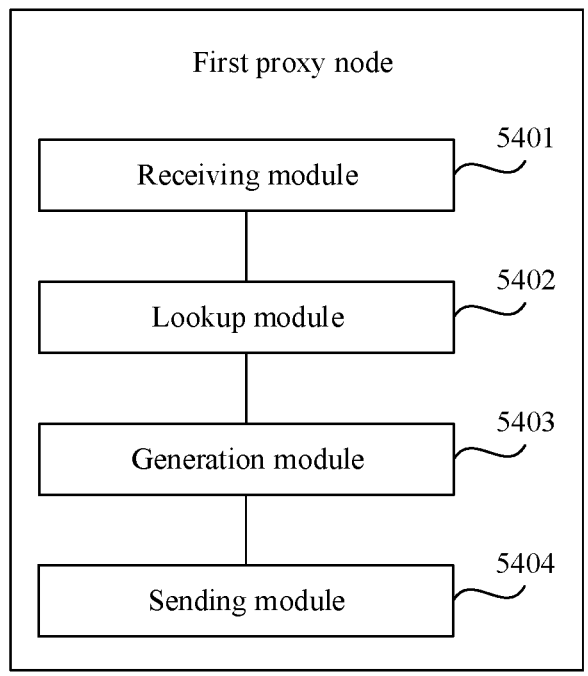
FIG. 54 is a schematic diagram of a structure of a first proxy node according to an embodiment of this application.

FIG. 54 is a schematic diagram of a structure of a first proxy node according to an embodiment of this application. As shown in FIG. 54, the first proxy node includes: a receiving module 5401, a lookup module 5402, a generation module 5403, and a sending module 5404. The receiving module 5401 is configured to perform an operation of receiving a first packet, for example, may perform operation 502, operation 3012, operation 4708, operation 4911, or operation 5109 in the foregoing method embodiments. The lookup module 5402 is configured to perform a cache lookup operation, for example, may perform operation 502, operation 3012, operation 4708, operation 4911, or operation 5109 in the foregoing method embodiments. The generation module 5403 is configured to perform an operation of generating a second packet, and for example, may perform operation 503, operation 3013, operation 4709, operation 4912, or operation 5110 in the foregoing method embodiments. The sending module 5404 is configured to perform an operation of sending the second packet, for example, may perform operation 504, operation 3014, operation 4710, operation 4913, or operation 5111 in the foregoing method embodiments.

In an embodiment, the second packet includes an IP header, and a destination address of the IP header is a first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from the first proxy node to a second proxy node, and the SRH includes a first bypass SID and the one or more target SIDs.

In an embodiment, the generation module 5403 is configured to generate the IP header of the second packet, and encapsulate the IP header of the second packet into the first packet.

In an embodiment, the generation module 5403 is configured to update an IP header of the first packet to the IP header of the second packet.

In an embodiment, the second packet further includes second control information, and the second control information is used to indicate a transit node between the first proxy node and the second proxy node to check validity of the second packet.

In an embodiment, the second control information is carried in a type length value TLV in the SRH of the second packet; or
the second control information is carried in the IP header of the second packet.

In an embodiment, first control information is carried in an extension header of the second packet;
first control information is carried in the first bypass SID;
first control information is carried in the internet protocol IP header of the second packet; or
first control information is carried in the TLV in the SRH of the second packet.

In an embodiment, the first packet is obtained after service function processing is performed on a packet from the second proxy node, the first packet includes an identifier of a second cache entry, and the second cache entry is a cache entry used by the second proxy node to store an SRH corresponding to the first packet.

The second packet further includes the identifier of the second cache entry, and the first control information is further used to indicate the second proxy node to look up for the SRH corresponding to the first packet by using the identifier of the second cache entry as an index.

In an embodiment, the first packet is obtained after service function processing is performed on a packet from the first proxy node, the first packet includes an identifier of a first cache entry, and the first cache entry is a cache entry used by the first proxy node to historically store an SRH corresponding to the first packet.

The second packet includes the identifier of the first cache entry, and the first control information is further used to indicate the second proxy node to look up for the SRH corresponding to the first packet by using, as an index, an identifier that is of a second cache entry and that is in a mapping relationship with the identifier of the first cache entry.

In an embodiment, the first proxy node is connected to the second proxy node through a first link, and the sending module 5404 is configured to send the second packet to the second proxy node through a first outbound interface corresponding to the first link; or the first proxy node is connected to a router node through a second link, the router node is connected to the second proxy node through a third link, and the sending module 5404 is configured to send the second packet to the router node through a second outbound interface corresponding to the second link, where the second packet is forwarded by the router node to the second proxy node through the third link.

In an embodiment, the first proxy node further includes a detection module, configured to detect a status of the first link.

The sending module 5404 is configured to: if the first link is in an available state, send the second packet to the second proxy node through the first outbound interface corresponding to the first link; or if the first link is in an unavailable state, send the second packet to the router node through the second outbound interface corresponding to the second link.

It should be understood that the first proxy node provided in the embodiment in FIG. 54 corresponds to the first proxy node in the foregoing method embodiments. The modules in the first proxy node and the foregoing other operations and/or functions are used to implement various operations and methods implemented by the first proxy node in the method embodiments. For details, refer to the foregoing method embodiments. For brevity, the details are not described herein again.

It should be noted that, when the first proxy node provided in the embodiment in FIG. 54 transmits a packet, division into the foregoing functional modules is merely used as an example for description. In an actual application, the foregoing functions may be allocated to different functional modules for implementation based on a requirement, that is, an internal structure of the first proxy node is divided into different functional modules, to complete all or some of the functions described above. In addition, the first proxy node provided in the foregoing embodiment and the foregoing packet transmission method embodiments belong to a same concept. For an implementation process of the first proxy node, refer to the method embodiments. Details are not described herein again.

Figure 55:
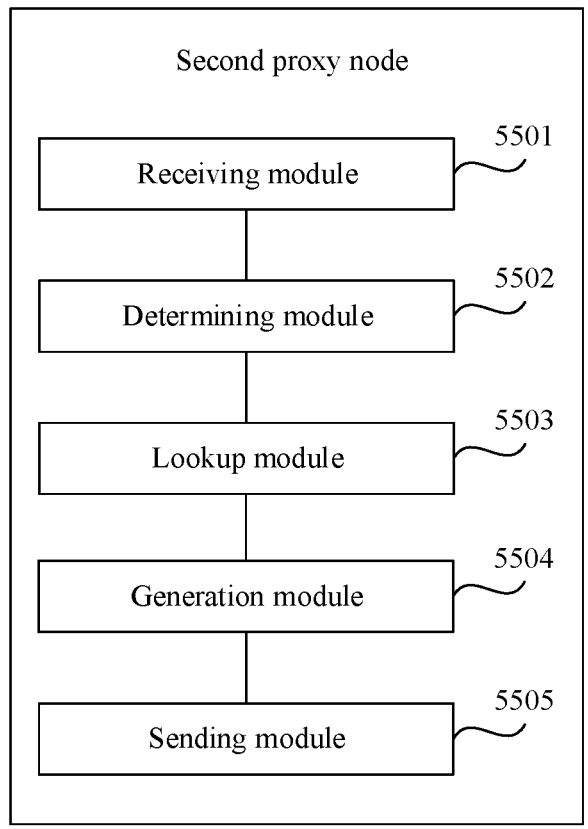
FIG. 55 is a schematic diagram of a structure of a second proxy node according to an embodiment of this application.

FIG. 55 is a schematic diagram of a structure of a second proxy node according to an embodiment of this application. As shown in FIG. 55, the second proxy node includes: a receiving module 5501, a determining module 5502, a lookup module 5503, a generation module 5504, and a sending module 5505. The receiving module 5501 is configured to perform an operation of receiving a second packet, for example, may perform operation 505, operation 3011, operation 4714, or operation 5112 in the foregoing method embodiments. The determining module 5502 is configured to perform an operation of determining that first control information indicates to restore an SRH, for example, may perform operation 505, operation 3011, operation 4714, or operation 5112 in the foregoing method embodiments. The lookup module 5503 is configured to perform a cache lookup operation, for example, may perform operation 506, operation 3012, operation 4716, or operation 5114 in the foregoing method embodiments. The generation module 5504 is configured to perform an operation of generating a third packet, for example, may perform operation 507, operation 3013, operation 4717, or operation 5115 in the foregoing method embodiments. The sending module 5505 is configured to perform an operation of sending the third packet, for example, may perform operation 508, operation 3014, operation 4718, or operation 5116 in the foregoing method embodiments.

In an embodiment, the second packet includes an internet protocol IP header, and a destination address of the IP header is a first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from a first proxy node to the second proxy node, and the SRH includes a first bypass SID and the one or more target SIDs.

In an embodiment, the generation module 5504 is configured to strip the IP header of the second packet from the second packet, and encapsulate an SRH corresponding to a first packet, to obtain the third packet.

In an embodiment, the generation module 5504 is configured to update the IP header of the second packet to an IP header of a first packet, and encapsulate an SRH corresponding to the first packet, to obtain the third packet.

In an embodiment, the SRH of the second packet includes a type length value TLV, the TLV includes second control information, and the second control information is used to indicate a transit node between the first proxy node and the second proxy node to check validity of the second packet.

In an embodiment, the second control information is carried in the type length value TLV in the SRH of the second packet; or
   the second control information is carried in the IP header of the second packet.

In an embodiment, first control information is carried in an extension header of the second packet;
   the first control information is carried in the first bypass SID;
   the first control information is carried in the IP header of the second packet; or
   the first control information is carried in the TLV in the SRH of the second packet.

In an embodiment, the second packet further includes an identifier of a second cache entry, and the determining module 5502 is further configured to determine that the first control information further indicates to look up for the SRH corresponding to the first packet by using the identifier of the second cache entry as an index.

The lookup module 5503 is configured to look up a cache of the second proxy node by using the identifier of the second cache entry as the index, to obtain the SRH corresponding to the first packet from the second cache entry.

In an embodiment, the second packet further includes an identifier of a first cache entry, and the first cache entry is a cache entry used by the first proxy node to historically store the SRH corresponding to the first packet.

The determining module 5502 is further configured to determine that the first control information further indicates to look up for the SRH corresponding to the first packet by using, as an index, an identifier that is of a second cache entry and that is in a mapping relationship with the identifier of the first cache entry.

The lookup module 5503 is further configured to look up the mapping relationship between the identifier of the first cache entry and the identifier of the second cache entry based on the identifier of the first cache entry, to obtain the identifier of the second cache entry.

The lookup module 5503 is configured to look up a cache of the second proxy node by using the identifier of the second cache entry as the index, to obtain the SRH corresponding to the first packet from the second cache entry.

In an embodiment, the determining module 5502 is further configured to determine that a service function of a service function node includes modifying a flow identifier.

In an embodiment, a flow identifier corresponding to the second packet is a flow identifier corresponding to the first packet, and the lookup module 5503 is configured to look up the cache of the second proxy node by using the flow identifier corresponding to the first packet and an endpoint dynamic proxy SID as an index, to obtain the SRH corresponding to the first packet.

In an embodiment, the second packet includes a VPN identifier of a virtual private network VPN to which the SF node belongs. The lookup module 5503 is further configured to look up a mapping relationship between an endpoint dynamic proxy SID and a VPN identifier based on the VPN identifier, to obtain the endpoint dynamic proxy SID corresponding to the VPN identifier.

In an embodiment, the receiving module 5501 is further configured to receive a configuration instruction, where the configuration instruction includes an endpoint dynamic proxy SID corresponding to a service function node in each VPN.

The storage module is further configured to store the mapping relationship between an endpoint dynamic proxy SID and a VPN identifier based on the configuration instruction.

In an embodiment, the receiving module 5501 is further configured to receive a fourth packet, where the fourth packet includes the SRH corresponding to the first packet, a destination address of the fourth packet is the endpoint dynamic proxy SID, and a flow identifier corresponding to the fourth packet is the flow identifier corresponding to the first packet.

The storage module is configured to store the SRH corresponding to the first packet in a second cache entry by using the flow identifier corresponding to the first packet and the endpoint dynamic proxy SID as the index.

In an embodiment, the second proxy node is connected to the first proxy node through a first link, and the receiving module 5501 is configured to receive the second packet from the first proxy node through a first inbound interface corresponding to the first link; or the second proxy node is connected to a router node through a third link, the router node is connected to the first proxy node through a second link, and the receiving module 5501 is configured to receive the second packet from the router node through a second inbound interface corresponding to the third link, where the second packet is sent by the first proxy node to the router node through the second link.

It should be understood that the second proxy node provided in the embodiment in FIG. 55 corresponds to the second proxy node in the foregoing method embodiments. The modules in the second proxy node and the foregoing other operations and/or functions are used to implement various operations and methods implemented by the second proxy node in the method embodiments. For details, refer to the foregoing method embodiments. For brevity, the details are not described herein again.

It should be noted that, when the second proxy node provided in the embodiment in FIG. 55 transmits a packet, division into the foregoing functional modules is merely used as an example for description. In an actual application, the foregoing functions may be allocated to different functional modules for implementation based on a requirement, that is, an internal structure of the second proxy node is divided into different functional modules, to complete all or some of the functions described above. In addition, the second proxy node provided in the foregoing embodiment and the foregoing packet transmission method embodiments belong to a same concept. For an implementation process of the second proxy node, refer to the method embodiments. Details are not described herein again.

The foregoing describes the first proxy node and the second proxy node provided in the embodiments of this application. The following describes possible product forms of the first proxy node and the second proxy node. It should be understood that, any form of product that has the features of the first proxy node and any form of product that has the features of the second proxy node fall within the protection scope of this application. It should be further understood that the following description is merely examples, and product forms of the first proxy node and the second proxy node in the embodiments of this application are not limited thereto.

An embodiment of this application provides a proxy node. The proxy node may be a first proxy node or a second proxy node.

The proxy node includes a processor, and the processor is configured to execute instructions, so that the proxy node performs the packet transmission method provided in the foregoing method embodiments.

For example, the processor may be a network processor (NP), a central processing unit (CPU), an application-specific integrated circuit (aASIC), or an integrated circuit configured to control program execution in the solutions of this application. The processor may be a single-core (single-CPU) processor, or may be a multi-core (multi-CPU) processor. There may be one or more processors.

In some possible embodiments, the proxy node may further include a memory.

The memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory is not limited thereto.

The memory and the processor may be separately disposed, or the memory and the processor may be integrated together.

In some possible embodiments, the proxy node may further include a transceiver.

The transceiver is configured to communicate with another device or a communication network. A network communication mode may be but is not limited to the Ethernet, a radio access network (RAN), a wireless local area network (WLAN), or the like. In an embodiment of the application, a communication interface may be configured to receive a packet sent by another node, or may send a packet to another node.

In some possible embodiments, the proxy node may be implemented as a network device, and a network processor in the network device may perform the operations in the foregoing method embodiments. For example, the network device may be a router, a switch, or a firewall.

Figure 56:
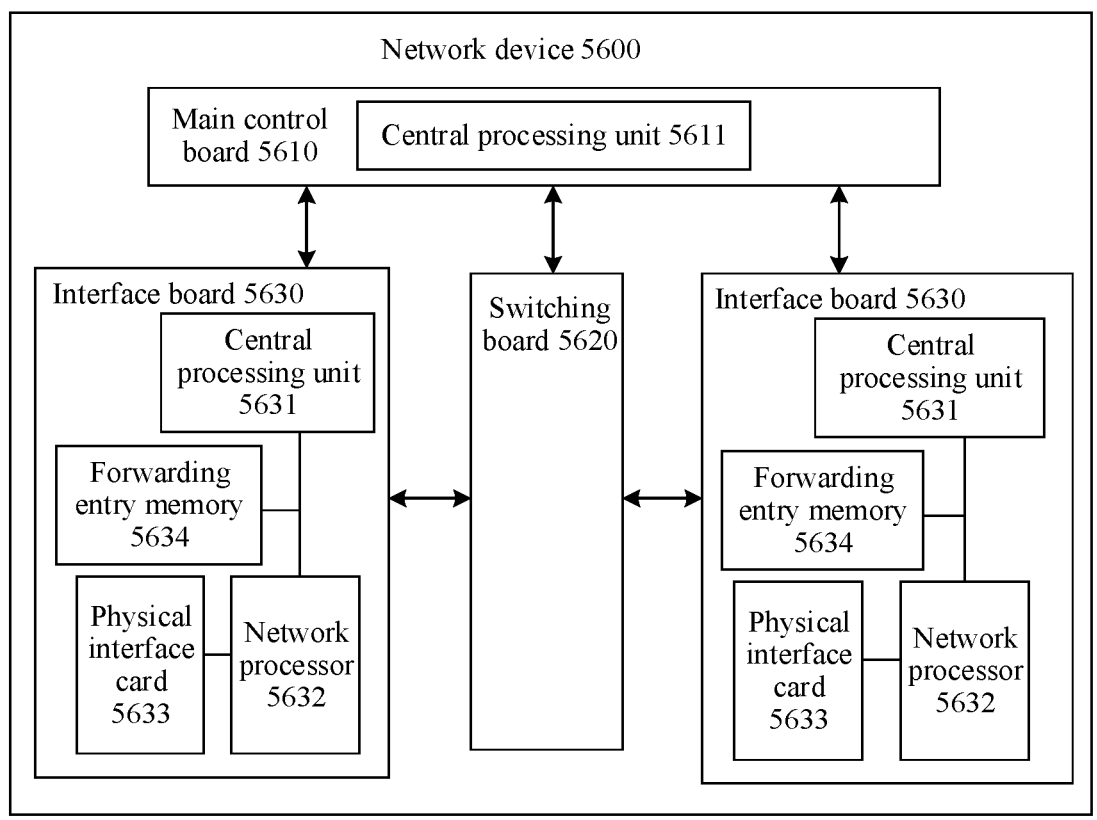
FIG. 56 is a schematic diagram of a structure of a network device according to an embodiment of this application.

FIG. 56 is a schematic diagram of a structure of a network device according to an example embodiment of this application. The network device may be configured as a first proxy node or a second proxy node.

The network device 5600 includes a main control board 5610, an interface board 5630, a switching board 5620, and an interface board 5640. The main control board 5610 is configured to complete functions such as system management, device maintenance, and protocol processing. The switching board 5620 is configured to complete data exchange between the interface boards (the interface board is also referred to as a line card or a service board). The interface boards 5630 and 5640 are configured to provide various service interfaces (for example, an Ethernet interface and a POS interface), and implement data packet forwarding. The main control board 5610, the interface boards 5630 and 5640, and the switching board 5620 are connected to a system backboard through a system bus for communication. A central processing unit 5631 on the interface board 5630 is configured to control and manage the interface board, and communicate with a central processing unit 5611 on the main control board 5610.

If the network device 5600 is configured as the first proxy node, a physical interface card 5633 receives a first packet, and sends the first packet to a network processor 5632. The network processor 5632 looks up a forwarding entry memory 5634, and fails to obtain a segment routing header SRH corresponding to the first packet. In this case, the network processor 5632 generates a second packet based on the first packet and a first bypass SID corresponding to a second proxy node, and sends the second packet through the physical interface card 5633 based on information such as an outbound interface after link layer encapsulation is completed, so that the second packet is transmitted to the second proxy node.

In an embodiment, the second packet includes an IP header, and a destination address of the IP header is the first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from the first proxy node to the second proxy node, and the SRH includes a first bypass SID and the one or more target SIDs.

In an embodiment, the network processor 5632 may generate the IP header of the second packet, and encapsulate the IP header of the second packet into the first packet.

In an embodiment, the second packet further includes second control information, and the second control information is used to indicate a transit node between the first proxy node and the second proxy node to check validity of the second packet.

In an embodiment, the second control information is carried in a TLV in the SRH of the second packet; or the second control information is carried in the IP header of the second packet.

In an embodiment, first control information is carried in an extension header of the second packet; first control information is carried in the first bypass SID; first control information is carried in the IP header of the second packet; or first control information is carried in the TLV in the SRH of the second packet.

In an embodiment, the first packet is obtained after service function processing is performed on a packet from the second proxy node, the first packet includes an identifier of a second cache entry, and the second cache entry is a cache entry used by the second proxy node to store the SRH corresponding to the first packet. The second packet further includes the identifier of the second cache entry, and the first control information is further used to indicate the second proxy node to look up for the SRH corresponding to the first packet by using the identifier of the second cache entry as an index.

In an embodiment, the first packet is obtained after service function processing is performed on a packet from the first proxy node, the first packet includes an identifier of a first cache entry, and the first cache entry is a cache entry used by the first proxy node to historically store the SRH corresponding to the first packet. The second packet includes the identifier of the first cache entry, and the first control information is further used to indicate the second proxy node to look up for the SRH corresponding to the first packet by using, as an index, an identifier that is of a second cache entry and that is in a mapping relationship with the identifier of the first cache entry.

In an embodiment, the first proxy node is connected to the second proxy node through a first link, and the network processor 5632 selects a first outbound interface that is in the physical interface card 5633 and that corresponds to the first link, to send the second packet through the first outbound interface in the physical interface card 5633.

In an embodiment, the first proxy node is connected to a router node through a second link, the router node is connected to the second proxy node through a third link, and the network processor 5632 selects a second outbound interface that is in the physical interface card 5633 and that corresponds to the second link, to send the second packet through the second outbound interface in the physical interface card 5633, where the second packet is forwarded by the router node to the second proxy node through the third link.

In an embodiment, the network processor 5632 detects a status of the first link. If the first link is in an available state, the network processor 5632 selects the first outbound interface that is in the physical interface card 5633 and that corresponds to the first link, to send a third packet through the first outbound interface in the physical interface card 5633. Alternatively, if the first link is in an unavailable state, the network processor 5632 selects the second outbound interface that is in the physical interface card 5633 and that corresponds to the second link, to send a third packet through the second outbound interface in the physical interface card 5633.

If the network device 5600 is configured as the second proxy node, a physical interface card 5633 receives a second packet, and sends the second packet to a network processor 5632. The network processor 5632 determines that first control information indicates the second proxy node to restore an SRH corresponding to a first packet; looks up a cache of the second proxy node based on the second packet, to obtain the SRH corresponding to the first packet; generates a third packet based on the second packet and the SRH corresponding to the first packet, where the third packet includes the SRH corresponding to the first packet and a payload of the first packet; and sends the third packet through the physical interface card 5633 based on information such as an outbound interface after link layer encapsulation is completed, so that the third packet is transmitted to a first proxy node.

In an embodiment, the second packet includes an internet protocol IP header, and a destination address of the IP header is a first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from the first proxy node to the second proxy node, and the SRH includes a first bypass SID and the one or more target SIDs.

In an embodiment, the network processor 5632 strips the IP header of the second packet from the second packet, and encapsulates the SRH corresponding to the first packet, to obtain the third packet.

In an embodiment, the network processor 5632 updates the IP header of the second packet to an IP header of the first packet, and encapsulates the SRH corresponding to the first packet, to obtain the third packet.

In an embodiment, the second packet further includes second control information, and the second control information is used to indicate a transit node between the first proxy node and the second proxy node to check validity of the second packet.

In an embodiment, the second control information is carried in a type length value TLV in the SRH of the second packet; or the second control information is carried in the IP header of the second packet.

In an embodiment, the first control information is carried in an extension header of the second packet; the first control information is carried in the first bypass SID; the first control information is carried in the internet protocol IP header of the second packet; or the first control information is carried in the TLV in the SRH of the second packet.

In an embodiment, the network processor 5632 determines that the first control information further indicates to look up for the SRH corresponding to the first packet by using an identifier of a second cache entry as an index, and looks up for the second cache entry in a forwarding entry memory 5634 by using the identifier of the second cache entry as the index, to obtain the SRH corresponding to the first packet from the second cache entry.

In an embodiment, the second packet further includes an identifier of a first cache entry, and the first cache entry is a cache entry used by the first proxy node to historically store the SRH corresponding to the first packet. The network processor 5632 determines that the first control information further indicates to look up for the SRH corresponding to the first packet by using an identifier that is of a second cache entry and that is in a mapping relationship with the identifier of the first cache entry. The network processor 5632 looks up for, based on the identifier of the first cache entry, the mapping relationship that is stored in a forwarding entry memory 5634 and that is between the identifier of the first cache entry and the identifier of the second cache entry, to obtain the identifier of the second cache entry, and looks up the forwarding entry memory 5634 by using the identifier of the second cache entry as the index, to obtain the SRH corresponding to the first packet from the second cache entry stored in the forwarding entry memory 5634.

In an embodiment, the network processor 5632 determines that a service function of a service function node includes modifying a flow identifier.

In an embodiment, a flow identifier corresponding to the second packet is a flow identifier corresponding to the first packet, and the network processor 5632 looks up the forwarding entry memory 5634 by using the flow identifier corresponding to the first packet and an endpoint dynamic proxy SID as an index, to obtain the SRH that corresponds to the first packet and that is stored in the forwarding entry memory 5634.

In an embodiment, the second packet includes a VPN identifier of a VPN to which the SF node belongs. The network processor 5632 looks up, based on the VPN identifier, a mapping relationship that is stored in the forwarding entry memory 5634 and that is between an endpoint dynamic proxy SID and a VPN identifier, to obtain the endpoint dynamic proxy SID corresponding to the VPN identifier.

In an embodiment, the central processing unit 5611 on the main control board 5610 may receive a configuration instruction, and store the mapping relationship between an endpoint dynamic proxy SID and a VPN identifier in the forwarding entry memory 5634 based on the configuration instruction.

In an embodiment, the physical interface card 5633 receives a fourth packet, and sends the fourth packet to the network processor 5632. The network processor 5632 stores the SRH corresponding to the first packet in a second cache entry in the forwarding entry memory 5634 by using the flow identifier corresponding to the first packet and the endpoint dynamic proxy SID as the index.

In an embodiment, the physical interface card 5633 receives the second packet through a first inbound interface corresponding to a first link; or the physical interface card 5633 receives the second packet through a second inbound interface corresponding to a third link.

It should be understood that, in an embodiment of the application, an operation on the interface board 5640 is consistent with an operation on the interface board 5630. For brevity, details are not described again. It should be understood that the network device 5600 in this embodiment may correspond to the first proxy node or the second proxy node in the foregoing method embodiments. The main control board 5610, and the interface board 5630 and/or the interface board 5640 in the network device 5600 may implement the functions of and/or the operations implemented by the first proxy node or the second proxy node in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, the switching boards may jointly implement load sharing and redundancy backup. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. In an embodiment, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. An architecture that is to be used depends on a network deployment scenario. This is not limited herein.

In some possible embodiments, the proxy node may be implemented as a computing device, and a central processing unit in the computing device may perform the operations in the foregoing method embodiments. For example, the computing device may be a host, a server, or a personal computer. The computing device may be implemented by using a general bus architecture.

Figure 57:
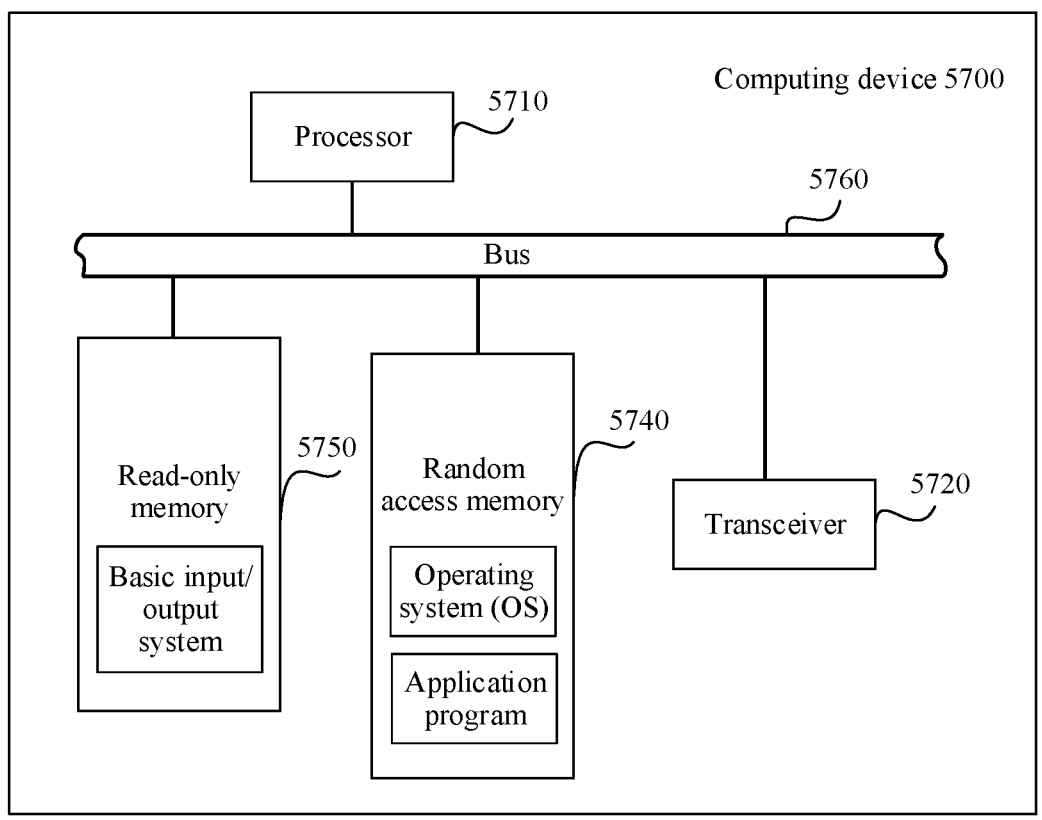
FIG. 57 is a schematic diagram of a structure of a computing device according to an embodiment of this application.

FIG. 57 is a schematic diagram of a structure of a computing device according to an example embodiment of this application. The computing device may be configured as a first proxy node or a second proxy node.

The computing device 5700 includes a processor 5710, a transceiver 5720, a random access memory 5740, a read-only memory 5750, and a bus 5760. The processor 5710 is coupled to the transceiver 5720, the random access memory 5740, and the read-only memory 5750 through the bus 5760. When the computing device 5700 needs to be run, the computing device 5700 is started by using a basic input/output system built into the read-only memory 5750 or a bootloader bootstrap system in an embedded system, to boot the computing device 5700 to enter a normal running state.

If the computing device 5700 is configured as the first proxy node, the transceiver 5720 receives a first packet, and sends the first packet to the processor 5710. The processor 5710 looks up the random access memory 5740, and fails to obtain a segment routing header SRH corresponding to the first packet. In this case, the processor 5710 generates a second packet based on the first packet and a first bypass SID corresponding to a second proxy node, and sends the second packet through the transceiver 5720 based on information such as an outbound interface after link layer encapsulation is completed, so that the second packet is transmitted to the second proxy node.

In an embodiment, the second packet includes an IP header, and a destination address of the IP header is the first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from the first proxy node to the second proxy node, and the SRH includes a first bypass SID and the one or more target SIDs.

In an embodiment, the processor 5710 may generate the IP header of the second packet, and encapsulate the IP header of the second packet into the first packet.

In an embodiment, the second packet further includes second control information, and the second control information is used to indicate a transit node between the first proxy node and the second proxy node to check validity of the second packet.

In an embodiment, the second control information is carried in a TLV in the SRH of the second packet; or the second control information is carried in the IP header of the second packet.

In an embodiment, first control information is carried in an extension header of the second packet; first control information is carried in the first bypass SID; first control information is carried in the IP header of the second packet; or first control information is carried in the TLV in the SRH of the second packet.

In an embodiment, the first packet is obtained after service function processing is performed on a packet from the second proxy node, the first packet includes an identifier of a second cache entry, and the second cache entry is a cache entry used by the second proxy node to store the SRH corresponding to the first packet. The second packet further includes the identifier of the second cache entry, and the first control information is further used to indicate the second proxy node to look up for the SRH corresponding to the first packet by using the identifier of the second cache entry as an index.

In an embodiment, the first packet is obtained after service function processing is performed on a packet from the first proxy node, the first packet includes an identifier of a first cache entry, and the first cache entry is a cache entry used by the first proxy node to historically store the SRH corresponding to the first packet. The second packet includes the identifier of the first cache entry, and the first control information is further used to indicate the second proxy node to look up for the SRH corresponding to the first packet by using, as an index, an identifier that is of a second cache entry and that is in a mapping relationship with the identifier of the first cache entry.

In an embodiment, the first proxy node is connected to the second proxy node through a first link, and the processor 5710 selects a first outbound interface that is in the transceiver 5720 and that corresponds to the first link, to send the second packet through the first outbound interface in the transceiver 5720.

In an embodiment, the first proxy node is connected to a router node through a second link, the router node is connected to the second proxy node through a third link, and the processor 5710 selects a second outbound interface that is in the transceiver 5720 and that corresponds to the second link, to send the second packet through the second outbound interface in the transceiver 5720, where the second packet is forwarded by the router node to the second proxy node through the third link.

In an embodiment, the processor 5710 detects a status of the first link. If the first link is in an available state, the processor 5710 selects the first outbound interface that is in the transceiver 5720 and that corresponds to the first link, to send a third packet through the first outbound interface in the transceiver 5720. Alternatively, if the first link is in an unavailable state, the processor 5710 selects the second outbound interface that is in the transceiver 5720 and that corresponds to the second link, to send a third packet through the second outbound interface in the transceiver 5720.

If the computing device 5700 is configured as the second proxy node, the transceiver 5720 receives a second packet, and sends the second packet to the processor 5710. The processor 5710 determines that first control information indicates the second proxy node to restore an SRH corresponding to a first packet; looks up a cache of the second proxy node based on the second packet, to obtain the SRH corresponding to the first packet; generates a third packet based on the second packet and the SRH corresponding to the first packet, where the third packet includes the SRH corresponding to the first packet and a payload of the first packet; and sends the third packet through the transceiver

5720 based on information such as an outbound interface after link layer encapsulation is completed, so that the third packet is transmitted to a first proxy node.

In an embodiment, the second packet includes an internet protocol IP header, and a destination address of the IP header is a first bypass SID.

In an embodiment, the second packet includes an IP header and an SRH of the second packet, a destination address of the IP header is a SID in one or more target SIDs that corresponds to a next segment routing SR node, the one or more target SIDs are used to indicate a target forwarding path, the target forwarding path is a path from the first proxy node to the second proxy node, and the SRH includes a first bypass SID and the one or more target SIDs.

In an embodiment, the processor 5710 strips the IP header of the second packet from the second packet, and encapsulates the SRH corresponding to the first packet, to obtain the third packet.

In an embodiment, the processor 5710 updates the IP header of the second packet to an IP header of the first packet, and encapsulates the SRH corresponding to the first packet, to obtain the third packet.

In an embodiment, the second packet further includes second control information, and the second control information is used to indicate a transit node between the first proxy node and the second proxy node to check validity of the second packet.

In an embodiment, the second control information is carried in a type length value TLV in the SRH of the second packet; or the second control information is carried in the IP header of the second packet.

In an embodiment, the first control information is carried in an extension header of the second packet; the first control information is carried in the first bypass SID; the first control information is carried in the internet protocol IP header of the second packet; or the first control information is carried in the TLV in the SRH of the second packet.

In an embodiment, the processor 5710 determines that the first control information further indicates to look up for the SRH corresponding to the first packet by using an identifier of a second cache entry as an index, and looks up for the second cache entry in the random access memory 5740 by using the identifier of the second cache entry as the index, to obtain the SRH corresponding to the first packet from the second cache entry.

In an embodiment, the second packet further includes an identifier of a first cache entry, and the first cache entry is a cache entry used by the first proxy node to historically store the SRH corresponding to the first packet. The processor 5710 determines that the first control information further indicates to look up for the SRH corresponding to the first packet by using an identifier that is of a second cache entry and that is in a mapping relationship with the identifier of the first cache entry. The processor 5710 looks up, based on the identifier of the first cache entry, the mapping relationship that is stored in the random access memory 5740 and that is between the identifier of the first cache entry and the identifier of the second cache entry, to obtain the identifier of the second cache entry, and looks up the random access memory 5740 by using the identifier of the second cache entry as the index, to obtain the SRH corresponding to the first packet from the second cache entry stored in the random access memory 5740.

In an embodiment, the processor 5710 determines that a service function of a service function node includes modifying a flow identifier.

In an embodiment, a flow identifier corresponding to the second packet is a flow identifier corresponding to the first packet, and the processor 5710 looks up the random access memory 5740 by using the flow identifier corresponding to the first packet and an endpoint dynamic proxy SID as an index, to obtain the SRH that corresponds to the first packet and that is stored in the random access memory 5740.

In an embodiment, the second packet includes a VPN identifier of a VPN to which the SF node belongs. The processor 5710 looks up, based on the VPN identifier, a mapping relationship that is stored in the random access memory 5740 and that is between an endpoint dynamic proxy SID and a VPN identifier, to obtain the endpoint dynamic proxy SID corresponding to the VPN identifier.

In an embodiment, the processor 5710 may receive a configuration instruction, and store the mapping relationship between an endpoint dynamic proxy SID and a VPN identifier in the random access memory 5740 based on the configuration instruction.

In an embodiment, the transceiver 5720 receives a fourth packet, and sends the fourth packet to the processor 5710. The processor 5710 stores the SRH corresponding to the first packet in a second cache entry in the random access memory 5740 by using the flow identifier corresponding to the first packet and the endpoint dynamic proxy SID as the index.

In an embodiment, the transceiver 5720 receives the second packet through a first inbound interface corresponding to a first link; or the transceiver 5720 receives the second packet through a second inbound interface corresponding to a third link.

The computing device in an embodiment of the application may correspond to the first proxy node or the second proxy node in the foregoing method embodiments, and the processor 5710, the transceiver 5720, and the like in the computing device may implement the functions of and/or the operations and methods implemented by the first proxy node or the second proxy node in the foregoing method embodiments. For brevity, details are not described herein again.

In some possible embodiments, the proxy node may be implemented as a virtualized device.

For example, the virtualized device may be a virtual machine (VM) on which a program having a packet sending function runs, and the virtual machine is deployed on a hardware device (for example, a physical server). The virtual machine is a complete computer system that is simulated by software, that has a complete hardware system function, and that runs in a totally isolated environment. The virtual machine may be configured as a first proxy node or a second proxy node. For example, the first proxy node or the second proxy node may be implemented based on a general-purpose physical server in combination with an NFV technology. The first proxy node or the second proxy node is a virtual host, a virtual router, or a virtual switch. After reading this application, one of ordinary skilled in the art may virtualize, on the general-purpose physical server in combination with the NFV technology, the first proxy node or the second proxy node having the foregoing functions. Details are not described herein.

For example, the virtualized device may be a container, and the container is an entity used to provide an isolated virtualized environment. For example, the container may be a docker container. The container may be configured as a first proxy node or a second proxy node. For example, the proxy node may be created by using a corresponding image. For example, two container instances, namely, a container instance proxy-container 1 and a container instance proxy-container 2, may be created for a proxy-container (a container that provides a proxy service) by using an image of the proxy-container. The container instance proxy-container 1 is provided as the first proxy node, and the container instance proxy-container 2 is provided as the second proxy node. When a container technology is used for implementation, the proxy node may run by using a kernel of a physical machine, and a plurality of proxy nodes may share an operating system of the physical machine. The container technology may be used to isolate different proxy nodes. A containerized proxy node may run in a virtualized environment, for example, may run in a virtual machine, or the containerized proxy node may directly run in a physical machine.

For example, the virtualized device may be a pod. The pod is a basic unit of Kubernetes (Kubernetes is an open-source container orchestration engine of Google, K8s) for deploying, managing, and orchestrating a containerized application. The pod may include one or more containers. Generally, containers in a same pod are deployed on a same host. Therefore, the containers in the same pod may communicate with each other via the host, and may share storage resources and network resources of the host. The pod may be configured as a first proxy node or a second proxy node. For example, a container as a service (CaaS, which is a container-based PaaS service) may be indicated to create a pod, and the pod is provided as the first proxy node or the second proxy node.

Certainly, the proxy node may alternatively be another virtualized device, which is not enumerated herein one by one.

In some possible embodiments, the proxy node may alternatively be implemented by a general-purpose processor. For example, a form of the general-purpose processor may be a chip. In an embodiment, the general-purpose processor implementing the first proxy node or the second proxy node includes a processing circuit, and an input interface and an output interface that are internally connected to and communicate with the processing circuit. The processing circuit is configured to perform the packet generation operation in the foregoing method embodiments through the input interface. The processing circuit is configured to perform the receiving operation in the foregoing method embodiments through the input interface. The processing circuit is configured to perform the sending operation in the foregoing method embodiments through the output interface. In an embodiment, the general-purpose processor may further include a storage medium. The processing circuit is configured to perform the storage operation in the foregoing method embodiments by using the storage medium.

In a possible product form, the first proxy node or the second proxy node in the embodiments of this application may alternatively be implemented by using the following: one or more field programmable gate arrays (FPGA), a programmable logic device (PLD), a controller, a state machine, gate logic, a discrete hardware component, any other appropriate circuit, or any combination of circuits that can perform the functions described in this application.

In some possible embodiments, the proxy node may alternatively be implemented by using a computer program product. For example, an embodiment of this application provides a computer program product. When the computer program product runs on a first proxy node, the first proxy node is enabled to perform the packet transmission method in the foregoing method embodiments. An embodiment of this application further provides a computer program product. When the computer program product runs on a second proxy node, the second proxy node is enabled to perform the packet transmission method in the foregoing method embodiments.

It should be understood that the first proxy node or the second proxy node in the foregoing product forms respectively have any function of the first proxy node or the second proxy node in the foregoing method embodiments. Details are not described herein again.

One of ordinary skilled in the art may be aware that, method operations and units described with reference to the embodiments disclosed in this specification may be implemented by electronic hardware, computer software, or a combination thereof. To clearly describe interchangeability between the hardware and the software, the foregoing has generally described operations and compositions in the embodiments based on functions. Whether the functions are performed by hardware or software depends on particular applications and design constraints of the technical solutions. One of ordinary skilled in the art may use different methods to implement the described functions for each particular application, but it should not be considered that this implementation goes beyond the scope of this application.

It can be clearly understood by one of ordinary skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units may be electrical connections, mechanical connections, or connections in other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for indicating a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely implementations of this application, but is not intended to limit the protection scope of this application. Any equivalent modification or replacement readily figured out by one of ordinary skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

One of ordinary skilled in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing description is merely optional embodiments of this application, but is not intended to limit this application. Any modification, equivalent replacement, improvement, or the like made without departing from the principle of this application shall fall within the protection scope of this application.

What is claimed is:

1. A packet transmission method performed by a first proxy node, comprising:
   receiving a first packet from a service function node;
   looking up a cache of the first proxy node, wherein no segment routing header (SRH) corresponding to the first packet is obtained;
   generating a second packet based on the first packet and a first bypass segment identifier (SID) corresponding to a second proxy node, wherein the second proxy node and the first proxy node are connected to the same service function node, wherein the second packet comprises the first bypass SID used to identify that a destination node of the second packet is the second proxy node, first control information used to indicate the second proxy node to restore the SRH corresponding to the first packet, and a payload of the first packet; and
   sending the second packet to the second proxy node.

2. The method according to claim 1, wherein the second packet comprises an internet protocol (IP) header, and wherein a destination address of the IP header is the first bypass SID.

3. The method according to claim 1, wherein the second packet comprises an IP header and an SRH of the second packet, wherein a destination address of the IP header is a SID in one or more target SIDs that corresponds to a next segment routing (SR) node, wherein the one or more target SIDs are used to indicate a target forwarding path from the first proxy node to the second proxy node, and wherein the SRH of the second packet comprises the first bypass SID and the one or more target SIDs.

4. The method according to claim 2, wherein the generating the second packet based on the first packet and the first bypass segment identifier SID corresponding to the second proxy node comprises:
   generating the IP header of the second packet; and
   encapsulating the IP header of the second packet into the first packet.

5. The method according to claim 2, wherein the generating the second packet based on the first packet and the first bypass segment identifier SID corresponding to the second proxy node comprises:
   updating an IP header of the first packet to the IP header of the second packet.

6. The method according to claim 1, wherein the second packet further comprises second control information used to indicate a transit node between the first proxy node and the second proxy node to check validity of the second packet.

7. The method according to claim 6, wherein
   the second control information is carried in a type length value (TLV) in the SRH of the second packet; or
   the second control information is carried in the IP header of the second packet.

8. The method according to claim 1, wherein
   the first control information is carried in an extension header of the second packet;
   the first control information is carried in the first bypass SID;
   the first control information is carried in the IP header of the second packet; or
   the first control information is carried in the TLV in the SRH of the second packet.

9. The method according to claim 1, wherein the first packet is obtained after service function processing is performed on a packet from the second proxy node, wherein the first packet comprises an identifier of a second cache entry used by the second proxy node to store the SRH corresponding to the first packet; and
   the second packet further comprises the identifier of the second cache entry, wherein the first control information is further used to indicate the second proxy node to look up for the SRH corresponding to the first packet by using the identifier of the second cache entry as an index.

10. The method according to claim 1, wherein the first packet is obtained after service function processing is performed on a packet from the first proxy node, wherein the first packet comprises an identifier of a first cache entry used by the first proxy node to historically store the SRH corresponding to the first packet; and the second packet comprises the identifier of the first cache entry, wherein the first control information is further used to indicate the second proxy node to look up for the SRH corresponding to the first packet by using, as an index, an identifier of a second cache entry in a mapping relationship with the identifier of the first cache entry.

11. A packet transmission device operating as a first proxy node, comprising:
a memory; and
a processor coupled to the memory storing instruction, which when executed by the processor, cause the packet transmission device to:
receive a first packet from a service function node;
look up a cache of the first proxy node, wherein no segment routing header SRH corresponding to the first packet is obtained;
generate a second packet based on the first packet and a first bypass segment identifier SID corresponding to a second proxy node, wherein the second proxy node and the first proxy node are connected to the same service function node, wherein the second packet comprises the first bypass SID used to identify that a destination node of the second packet is the second proxy node, first control information used to indicate the second proxy node to restore the SRH corresponding to the first packet, and a payload of the first packet; and
send the second packet to the second proxy node.

12. The device according to claim 11, wherein the second packet comprises an internet protocol (IP) header, and wherein a destination address of the IP header is the first bypass SID.

13. The device according to claim 11, wherein the second packet comprises an IP header and an SRH of the second packet, wherein a destination address of the IP header is a SID in one or more target SIDs that corresponds to a next segment routing (SR) node, wherein the one or more target SIDs are used to indicate a target forwarding path from the first proxy node to the second proxy node, and wherein the SRH of the second packet comprises the first bypass SID and the one or more target SIDs.

14. The device according to claim 12, wherein the processor coupled to the memory to execute the instructions to generate the IP header of the second packet, and encapsulate the IP header of the second packet into the first packet.

15. The device according to claim 12, wherein the processor coupled to the memory to execute the instructions to update an IP header of the first packet to the IP header of the second packet.

16. The first proxy node according to claim 11, wherein the second packet further comprises second control information used to indicate a transit node between the first proxy node and the second proxy node to check validity of the second packet.

17. The device according to claim 16, wherein
the second control information is carried in a type length value (TLV) in the SRH of the second packet; or
the second control information is carried in the IP header of the second packet.

18. The device according to claim 11, wherein
the first control information is carried in an extension header of the second packet;
the first control information is carried in the first bypass SID;
the first control information is carried in the IP header of the second packet; or
the first control information is carried in the TLV in the SRH of the second packet.

19. The device according to claim 11, wherein the first packet is obtained after service function processing is performed on a packet from the second proxy node, wherein the first packet comprises an identifier of a second cache entry used by the second proxy node to store the SRH corresponding to the first packet; and
the second packet further comprises the identifier of the second cache entry, wherein the first control information is further used to indicate the second proxy node to look up for the SRH corresponding to the first packet by using the identifier of the second cache entry as an index.

20. The device according to claim 11, wherein the first packet is obtained after service function processing is performed on a packet from the first proxy node, wherein the first packet comprises an identifier of a first cache entry used by the first proxy node to historically store the SRH corresponding to the first packet; and
the second packet comprises the identifier of the first cache entry, wherein the first control information is further used to indicate the second proxy node to look up for the SRH corresponding to the first packet by using, as an index, an identifier of a second cache entry in a mapping relationship with the identifier of the first cache entry.

* * * * *